US012597291B2

(12) United States Patent
Zass et al.

(10) Patent No.: US 12,597,291 B2
(45) Date of Patent: Apr. 7, 2026

(54) IMAGE ANALYSIS FOR PERSONAL INTERACTION

(71) Applicants: Ron Zass, Kiryat Tivon (IL); Ben Ingel, Binyamina (IL)

(72) Inventors: Ron Zass, Kiryat Tivon (IL); Ben Ingel, Binyamina (IL)

( * ) Notice: Subject to any disclaimer, the term of this patent is extended or adjusted under 35 U.S.C. 154(b) by 0 days.

(21) Appl. No.: 18/814,687

(22) Filed: Aug. 26, 2024

(65) Prior Publication Data

US 2024/0428619 A1     Dec. 26, 2024

Related U.S. Application Data

(60) Provisional application No. 63/685,978, filed on Aug. 22, 2024, provisional application No. 63/685,988, (Continued)

(51) Int. Cl.
| | |
|---|---|
| *G06V 40/20* | (2022.01) |
| *G06F 40/279* | (2020.01) |
| *G06F 40/35* | (2020.01) |
| *G06V 40/16* | (2022.01) |
| *G10L 13/02* | (2013.01) |

(Continued)

(52) U.S. Cl.
CPC ............ *G06V 40/20* (2022.01); *G06F 40/279* (2020.01); *G06F 40/35* (2020.01); *G06V 40/174* (2022.01); *G10L 13/02* (2013.01); *G10L 15/063* (2013.01); *G10L 15/07* (2013.01);

(Continued)

(58) Field of Classification Search
CPC ................................ G06V 40/20; G06F 40/35
See application file for complete search history.

(56) References Cited

U.S. PATENT DOCUMENTS

| | | | |
|---|---|---|---|
| 4,305,131 A | 12/1981 | Best |
| 6,077,085 A | 6/2000 | Parry |

(Continued)

FOREIGN PATENT DOCUMENTS

| | | |
|---|---|---|
| CN | 102422639 A | 4/2012 |
| EP | 1928189 A1 | 6/2008 |
| WO | 2017088136 A1 | 6/2017 |

OTHER PUBLICATIONS

K. Nurgaliyev et al.; "Improved Multi-user Interaction in a Smart Environment through a Preference-Based Conflict Resolution Virtual Assistant," Nov. 23, 2017 International Conference on Intelligent Environments (IE), 2017, pp. 100-107. (Year: 2017).

*Primary Examiner* — Kevin Ky

(57) ABSTRACT

Systems, methods and non-transitory computer readable media for image analysis for personal interaction are provided. Audio data may be received. The audio data may include an input from an entity in a natural language. The input may include at least a first part and a second part. Further, image data may be received. The image data may depict a particular movement. The particular movement may be a movement of a particular portion of a particular body. The particular movement and the first part may be concurrent. The particular body may be associated with the entity. Further, a conversational artificial intelligence model may be used to analyze the audio data and the image data to generate a response in the natural language to the input. The response may be based on the input and the particular movement. Further, the generated response may be provided to the entity.

33 Claims, 19 Drawing Sheets

Related U.S. Application Data filed on Aug. 22, 2024, provisional application No. 63/549,534, filed on Feb. 4, 2024, provisional application No. 63/535,234, filed on Aug. 29, 2023.

(51) Int. Cl.

| | |
|---|---|
| *G10L 15/06* | (2013.01) |
| *G10L 15/07* | (2013.01) |
| *G10L 15/18* | (2013.01) |
| *G10L 15/22* | (2006.01) |
| *G10L 25/51* | (2013.01) |

(52) U.S. Cl.

CPC .......... *G10L 15/1807* (2013.01); *G10L 15/22* (2013.01); *G10L 25/51* (2013.01)

(56) References Cited

U.S. PATENT DOCUMENTS

| | | | |
|---|---|---|---|
| 6,778,252 B2 | 8/2004 | Moulton et al. | |
| 8,140,322 B2 | 3/2012 | Simonsen et al. | |
| 9,280,973 B1 | 3/2016 | Soyannwo et al. | |
| 9,747,282 B1 | 8/2017 | Baker et al. | |
| 9,864,933 B1 | 1/2018 | Cosic | |
| 9,908,039 B1* | 3/2018 | Rull | A63F 13/79 |
| 10,360,716 B1 | 7/2019 | van der Meulen et al. | |
| 10,423,999 B1 | 9/2019 | Doctor | |
| 10,433,052 B2 | 10/2019 | Zass et al. | |
| 10,467,792 B1 | 11/2019 | Roche | |
| 10,516,938 B2 | 12/2019 | Zass | |
| 10,607,134 B1 | 3/2020 | Cosic | |
| 10,827,024 B1 | 11/2020 | Schissel et al. | |
| 11,024,194 B1 | 6/2021 | Beigman Klebanov | |
| 11,140,459 B2 | 10/2021 | Ingel | |
| 11,159,597 B2 | 10/2021 | Ingel | |
| 11,195,542 B2 | 12/2021 | Zass | |
| 11,202,131 B2 | 12/2021 | Zass | |
| 11,232,645 B1 | 1/2022 | Roche et al. | |
| 11,244,385 B1 | 2/2022 | Fraser | |
| 11,520,079 B2 | 12/2022 | Zass | |
| 11,663,182 B2* | 5/2023 | Emma | G06N 3/006 706/55 |
| 11,837,249 B2 | 12/2023 | Zass | |
| 11,966,688 B1 | 4/2024 | Ehrlich | |
| 12,010,399 B2 | 6/2024 | Ingel et al. | |
| 12,341,930 B2* | 6/2025 | Jorasch | H04N 21/4781 |
| 12,437,483 B2* | 10/2025 | Lin | G06T 19/006 |
| 2002/0087317 A1 | 7/2002 | Lee et al. | |
| 2002/0161578 A1 | 10/2002 | Saindon et al. | |
| 2002/0161579 A1 | 10/2002 | Saindon et al. | |
| 2004/0034535 A1* | 2/2004 | Belenger | G10L 21/06 704/277 |
| 2004/0068410 A1 | 4/2004 | Mohamed et al. | |
| 2004/0172257 A1 | 9/2004 | Liqin et al. | |
| 2004/0186712 A1 | 9/2004 | Coles et al. | |
| 2005/0246165 A1* | 11/2005 | Pettinelli | G10L 15/1807 704/E15.025 |
| 2005/0255431 A1 | 11/2005 | Baker | |
| 2005/0272013 A1 | 12/2005 | Knight | |
| 2006/0285654 A1 | 12/2006 | Nesvadba et al. | |
| 2007/0124166 A1 | 5/2007 | Van Luchene | |
| 2007/0130529 A1 | 6/2007 | Shrubsole | |
| 2007/0208569 A1 | 9/2007 | Subramanian et al. | |
| 2007/0220575 A1 | 9/2007 | Cooper et al. | |
| 2008/0015968 A1 | 1/2008 | Van Luchene | |
| 2008/0195386 A1 | 8/2008 | Proidl | |
| 2008/0295130 A1 | 11/2008 | Worthen | |
| 2009/0037179 A1 | 2/2009 | Liu et al. | |
| 2009/0175596 A1 | 7/2009 | Hirai | |
| 2010/0082326 A1 | 4/2010 | Bangalore | |
| 2010/0100907 A1 | 4/2010 | Chang | |
| 2010/0238179 A1 | 9/2010 | Kelly | |
| 2011/0064388 A1 | 3/2011 | Brown et al. | |
| 2011/0076992 A1 | 3/2011 | Chou | |
| 2012/0054619 A1 | 3/2012 | Spooner et al. | |

| | | |
|---|---|---|
| 2013/0038737 A1 | 2/2013 | Yehezkel et al. |
| 2013/0110513 A1 | 5/2013 | Jhunja et al. |
| 2013/0188862 A1 | 7/2013 | Lievens |
| 2014/0142918 A1 | 5/2014 | Dotterer et al. |
| 2014/0164507 A1 | 6/2014 | Tesch et al. |
| 2014/0303958 A1 | 10/2014 | Lee et al. |
| 2014/0358518 A1 | 12/2014 | Wu et al. |
| 2015/0092007 A1 | 4/2015 | Koborita et al. |
| 2015/0319518 A1 | 11/2015 | Wilson |
| 2015/0356967 A1 | 12/2015 | Byron et al. |
| 2016/0005436 A1 | 1/2016 | Axen et al. |
| 2016/0021334 A1 | 1/2016 | Rossano et al. |
| 2016/0042766 A1 | 2/2016 | Kummer |
| 2016/0049146 A1 | 2/2016 | Chang |
| 2016/0132578 A1 | 5/2016 | Allen |
| 2016/0254795 A1 | 9/2016 | Ballard |
| 2016/0328391 A1 | 11/2016 | Choi |
| 2016/0365087 A1 | 12/2016 | Freud |
| 2017/0004820 A1 | 1/2017 | Lv et al. |
| 2017/0011745 A1 | 1/2017 | Navaratnam |
| 2017/0075877 A1 | 3/2017 | Lepeltier |
| 2017/0076749 A1 | 3/2017 | Kanevsky |
| 2017/0255616 A1 | 9/2017 | Yun et al. |
| 2018/0143809 A1 | 5/2018 | Zang et al. |
| 2018/0174577 A1 | 6/2018 | Jothilingam et al. |
| 2018/0174595 A1 | 6/2018 | Dirac et al. |
| 2018/0240458 A1 | 8/2018 | Zass |
| 2018/0253992 A1 | 9/2018 | Koul et al. |
| 2018/0260448 A1 | 9/2018 | Osotio et al. |
| 2018/0322875 A1 | 11/2018 | Adachi |
| 2018/0357215 A1 | 12/2018 | Austin et al. |
| 2018/0374461 A1 | 12/2018 | Serletic |
| 2019/0065478 A1 | 2/2019 | Tsujikawa et al. |
| 2019/0114302 A1 | 4/2019 | Bequet |
| 2019/0164533 A1 | 5/2019 | Lawrenson et al. |
| 2019/0166176 A1 | 5/2019 | Jain et al. |
| 2019/0250891 A1 | 8/2019 | Kumar et al. |
| 2019/0317739 A1 | 10/2019 | Turek et al. |
| 2019/0354592 A1 | 11/2019 | Musham et al. |
| 2020/0005796 A1 | 1/2020 | Ziv et al. |
| 2020/0007946 A1 | 1/2020 | Olkha |
| 2020/0042286 A1* | 2/2020 | Bui ........................... G06N 3/08 |
| 2020/0042601 A1 | 2/2020 | Doggett |
| 2020/0043112 A1 | 2/2020 | Brinkley, II |
| 2020/0051566 A1 | 2/2020 | Shin |
| 2020/0058289 A1 | 2/2020 | Gabryjelski et al. |
| 2020/0066304 A1 | 2/2020 | Chen |
| 2020/0105245 A1 | 4/2020 | Gupta |
| 2020/0111474 A1 | 4/2020 | Kumar et al. |
| 2020/0143813 A1 | 5/2020 | Nakagawa |
| 2020/0150981 A1 | 5/2020 | Westberg et al. |
| 2020/0159862 A1 | 5/2020 | Kleiner et al. |
| 2020/0174776 A1 | 6/2020 | Vinod et al. |
| 2020/0221176 A1 | 7/2020 | Hwang et al. |
| 2020/0296510 A1 | 9/2020 | Li et al. |
| 2020/0311120 A1 | 10/2020 | Zhao et al. |
| 2021/0019373 A1 | 1/2021 | Freitag |
| 2021/0042110 A1 | 2/2021 | Basyrov et al. |
| 2021/0063363 A1 | 3/2021 | Kaminski et al. |
| 2021/0081101 A1 | 3/2021 | Speare et al. |
| 2021/0097976 A1 | 4/2021 | Chicote et al. |
| 2021/0182468 A1 | 6/2021 | Co et al. |
| 2021/0192824 A1 | 6/2021 | Chen |
| 2021/0224319 A1 | 7/2021 | Ingel |
| 2021/0225365 A1 | 7/2021 | Sinha et al. |
| 2021/0232759 A1 | 7/2021 | Schick et al. |
| 2021/0264369 A1 | 8/2021 | Zass |
| 2021/0271815 A1 | 9/2021 | Li et al. |
| 2021/0279822 A1 | 9/2021 | Bellaish |
| 2021/0287150 A1 | 9/2021 | Zass |
| 2021/0303318 A1 | 9/2021 | Raghavan |
| 2021/0397418 A1 | 12/2021 | Nikumb et al. |
| 2021/0400101 A1 | 12/2021 | Ingel |
| 2022/0070550 A1 | 3/2022 | Ingel |
| 2022/0382524 A1 | 12/2022 | Ansari et al. |
| 2023/0048149 A1 | 2/2023 | Zass |
| 2023/0049015 A1 | 2/2023 | Zass |
| 2023/0052442 A1 | 2/2023 | Zass |
| 2023/0057835 A1 | 2/2023 | Zass |

(56)  References Cited

U.S. PATENT DOCUMENTS

| | | | |
|---|---|---|---|
| 2023/0069088 A1 | 3/2023 | Zass | |
| 2023/0095089 A1 | 3/2023 | Kaliyaperumal et al. | |
| 2023/0115185 A1 | 4/2023 | Huang et al. | |
| 2023/0245651 A1* | 8/2023 | Wang | G06N 5/022 |
| | | | 704/275 |
| 2023/0252224 A1 | 8/2023 | Tran | |
| 2023/0351120 A1* | 11/2023 | Gelfenbeyn | G06N 3/006 |
| 2023/0401976 A1* | 12/2023 | Scanlon | G06F 40/35 |
| 2023/0409298 A1 | 12/2023 | Ciminelli et al. | |
| 2023/0418459 A1 | 12/2023 | Ciminelli et al. | |
| 2023/0418571 A1 | 12/2023 | Ciminelli et al. | |
| 2023/0418572 A1 | 12/2023 | Ciminelli et al. | |
| 2023/0418632 A1 | 12/2023 | Ciminelli et al. | |
| 2023/0418633 A1 | 12/2023 | Ciminelli et al. | |
| 2024/0055014 A1 | 2/2024 | Zass | |
| 2024/0086051 A1 | 3/2024 | Ciminelli et al. | |
| 2024/0112562 A1* | 4/2024 | Sicconi | G07C 5/085 |
| 2024/0143065 A1* | 5/2024 | Lal | G06F 3/011 |
| 2024/0181637 A1* | 6/2024 | Gillett | B25J 17/00 |
| 2024/0220521 A1 | 7/2024 | Ehrlich | |
| 2024/0220712 A1 | 7/2024 | Zass | |
| 2024/0220714 A1 | 7/2024 | Ehrlich | |
| 2024/0221742 A1* | 7/2024 | Yun | G10L 25/63 |
| 2024/0256583 A1 | 8/2024 | Zass | |
| 2024/0256767 A1 | 8/2024 | Zass | |
| 2024/0265191 A1 | 8/2024 | Zass | |
| 2024/0265197 A1 | 8/2024 | Zass | |
| 2024/0273305 A1 | 8/2024 | Zass | |
| 2024/0276072 A1 | 8/2024 | Ingel et al. | |
| 2024/0314260 A1* | 9/2024 | Reale | A63F 13/65 |
| 2024/0428619 A1* | 12/2024 | Zass | G10L 15/1807 |
| 2025/0045066 A1* | 2/2025 | Lee | G06N 3/006 |

* cited by examiner

Figure 3A:
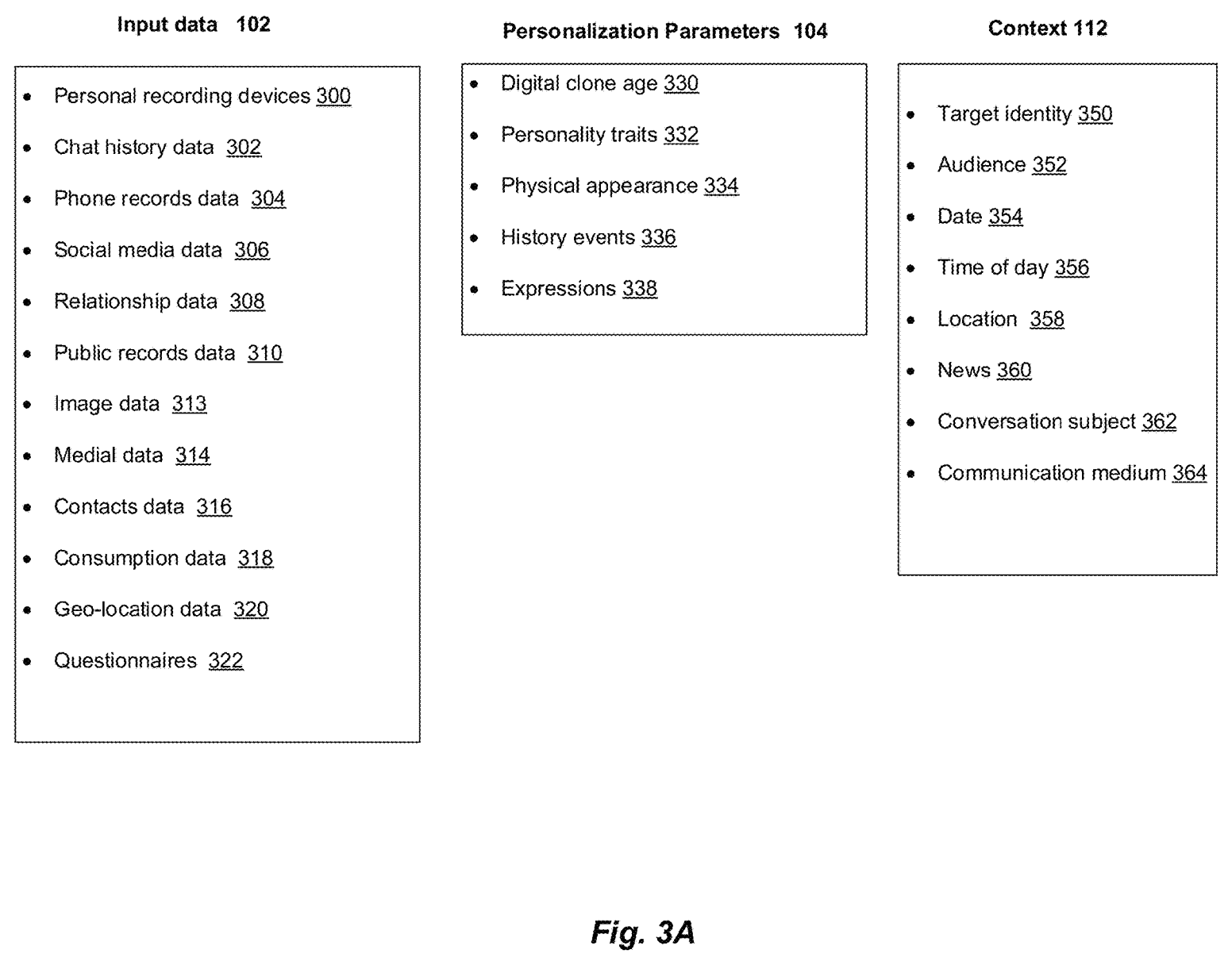

Context 112

- Target identity 350
- Audience 352
- Date 354
- Time of day 356
- Location 358
- News 360
- Conversation subject 362
- Communication medium 364

Personalization Parameters 104

- Digital clone age 330
- Personality traits 332
- Physical appearance 334
- History events 336
- Expressions 338

Input data 102

- Personal recording devices 300
- Chat history data 302
- Phone records data 304
- Social media data 306
- Relationship data 308
- Public records data 310
- Image data 313
- Medial data 314
- Contacts data 316
- Consumption data 318
- Geo-location data 320
- Questionnaires 322

<u>1001</u>  Accessing a conversational artificial intelligence model

↓

<u>502</u>  Accessing digital individual data, the digital individual data includes at least one of personality data, location data, temporal data, or environment data

↓

<u>504</u>  Receiving from an entity an input, the input includes at least one of an input in a natural language, an indication of suprasegmental features, an indication of body movement, or relation data

↓

<u>506</u>  Using the conversational artificial intelligence model to analyze the input and the digital individual data to determine a desired reaction to the input, the desired reaction includes at least one of a generated response in the natural language, usage of desired suprasegmental features, desired movements, or a generated media content

↓

<u>508</u>  Causing the desired reaction

Figure 6:
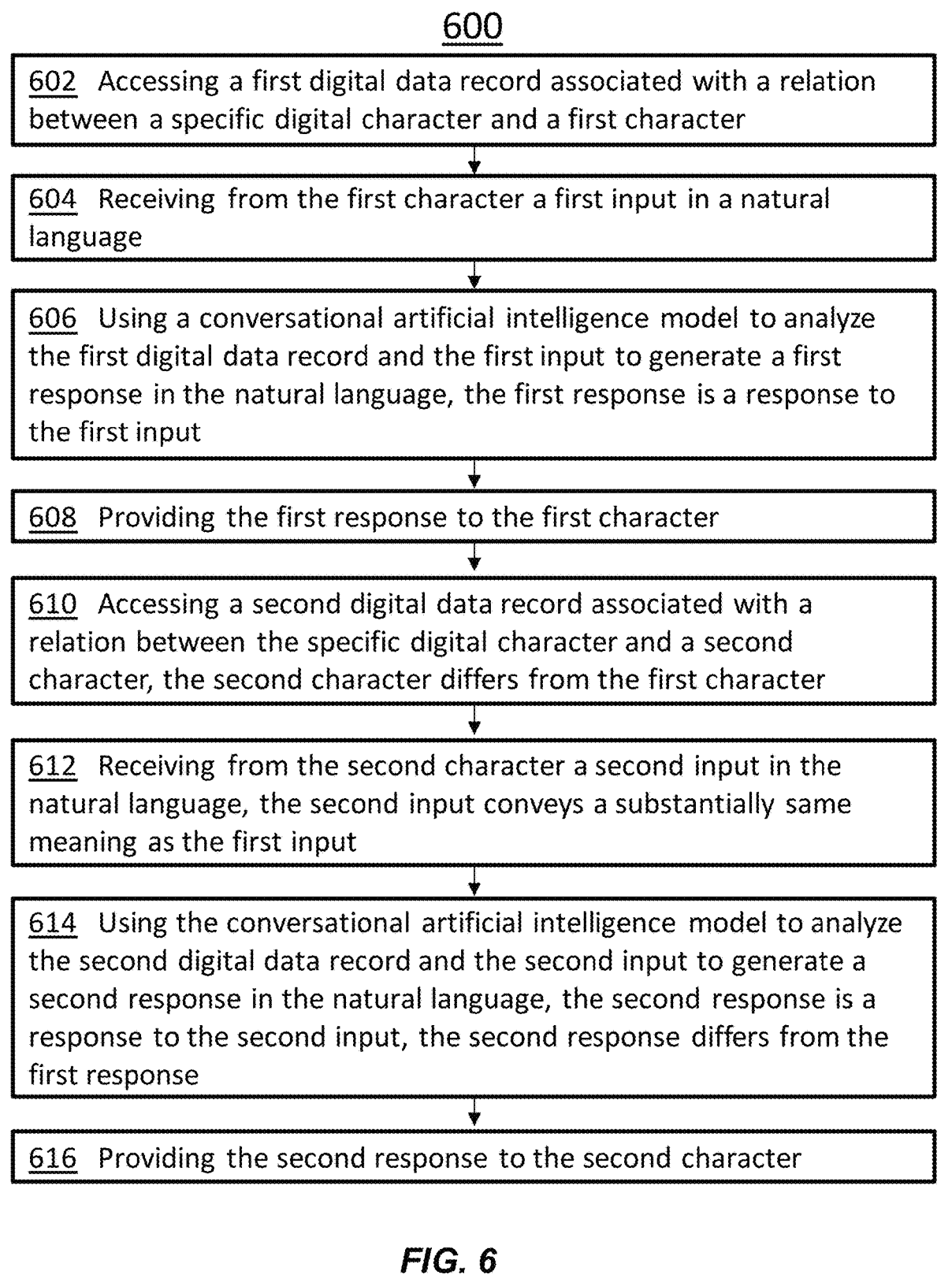

602   Accessing a first digital data record associated with a relation between a specific digital character and a first character

↓

604   Receiving from the first character a first input in a natural language

↓

606   Using a conversational artificial intelligence model to analyze the first digital data record and the first input to generate a first response in the natural language, the first response is a response to the first input

↓

608   Providing the first response to the first character

↓

610   Accessing a second digital data record associated with a relation between the specific digital character and a second character, the second character differs from the first character

↓

612   Receiving from the second character a second input in the natural language, the second input conveys a substantially same meaning as the first input

↓

614   Using the conversational artificial intelligence model to analyze the second digital data record and the second input to generate a second response in the natural language, the second response is a response to the second input, the second response differs from the first response

↓

616   Providing the second response to the second character

Figure 7:
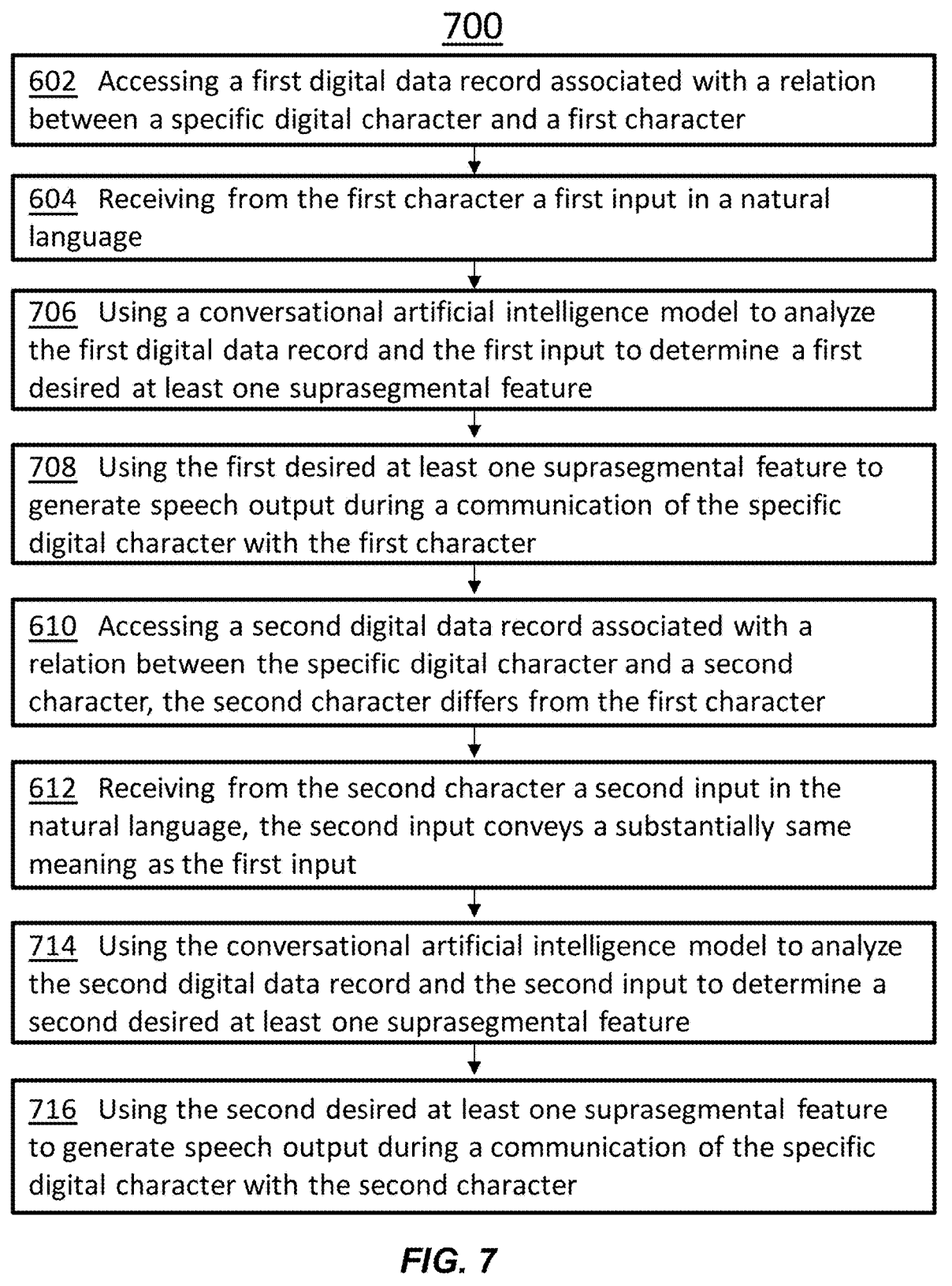

602   Accessing a first digital data record associated with a relation between a specific digital character and a first character 604   Receiving from the first character a first input in a natural language 706   Using a conversational artificial intelligence model to analyze the first digital data record and the first input to determine a first desired at least one suprasegmental feature 708   Using the first desired at least one suprasegmental feature to generate speech output during a communication of the specific digital character with the first character 610   Accessing a second digital data record associated with a relation between the specific digital character and a second character, the second character differs from the first character 612   Receiving from the second character a second input in the natural language, the second input conveys a substantially same meaning as the first input 714   Using the conversational artificial intelligence model to analyze the second digital data record and the second input to determine a second desired at least one suprasegmental feature 716   Using the second desired at least one suprasegmental feature to generate speech output during a communication of the specific digital character with the second character

Figure 8:
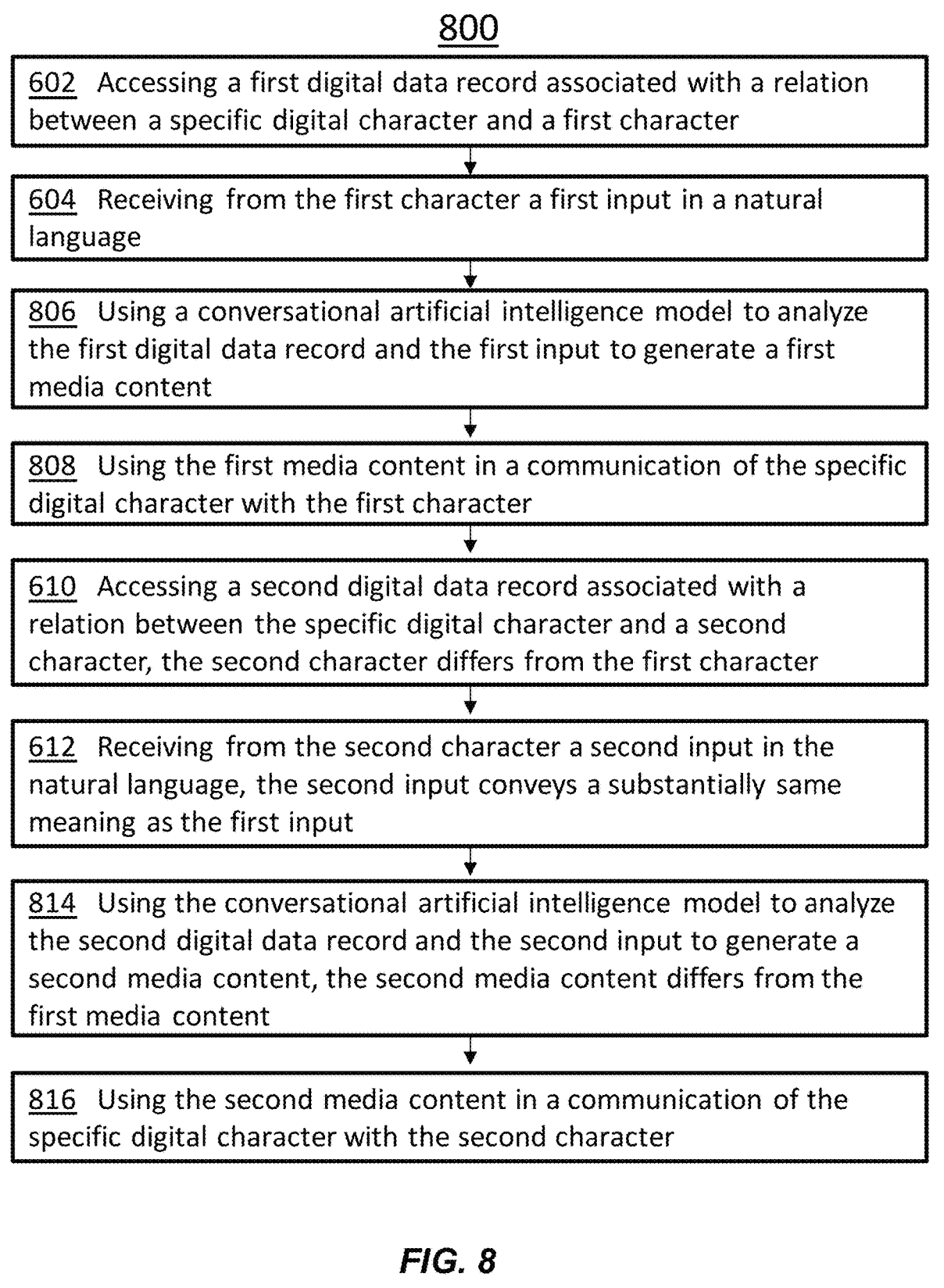

| |
|---|
| 602 Accessing a first digital data record associated with a relation between a specific digital character and a first character |

↓

| |
|---|
| 604 Receiving from the first character a first input in a natural language |

↓

| |
|---|
| 806 Using a conversational artificial intelligence model to analyze the first digital data record and the first input to generate a first media content |

↓

| |
|---|
| 808 Using the first media content in a communication of the specific digital character with the first character |

↓

| |
|---|
| 610 Accessing a second digital data record associated with a relation between the specific digital character and a second character, the second character differs from the first character |

↓

| |
|---|
| 612 Receiving from the second character a second input in the natural language, the second input conveys a substantially same meaning as the first input |

↓

| |
|---|
| 814 Using the conversational artificial intelligence model to analyze the second digital data record and the second input to generate a second media content, the second media content differs from the first media content |

↓

| |
|---|
| 816 Using the second media content in a communication of the specific digital character with the second character |

Figure 9:
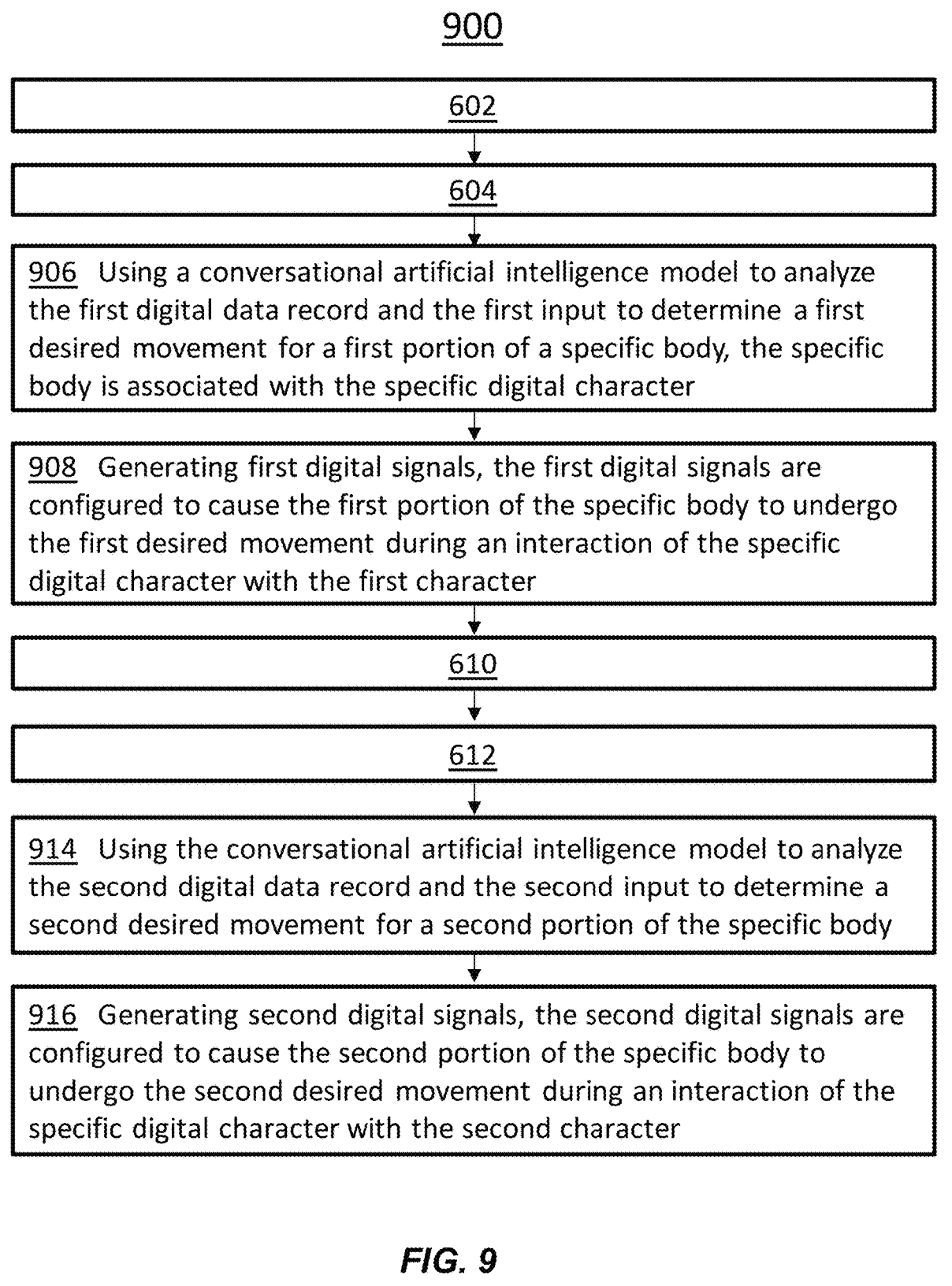

906 Using a conversational artificial intelligence model to analyze the first digital data record and the first input to determine a first desired movement for a first portion of a specific body, the specific body is associated with the specific digital character 908 Generating first digital signals, the first digital signals are configured to cause the first portion of the specific body to undergo the first desired movement during an interaction of the specific digital character with the first character

610

612

914 Using the conversational artificial intelligence model to analyze the second digital data record and the second input to determine a second desired movement for a second portion of the specific body 916 Generating second digital signals, the second digital signals are configured to cause the second portion of the specific body to undergo the second desired movement during an interaction of the specific digital character with the second character

Figures 10, 11:
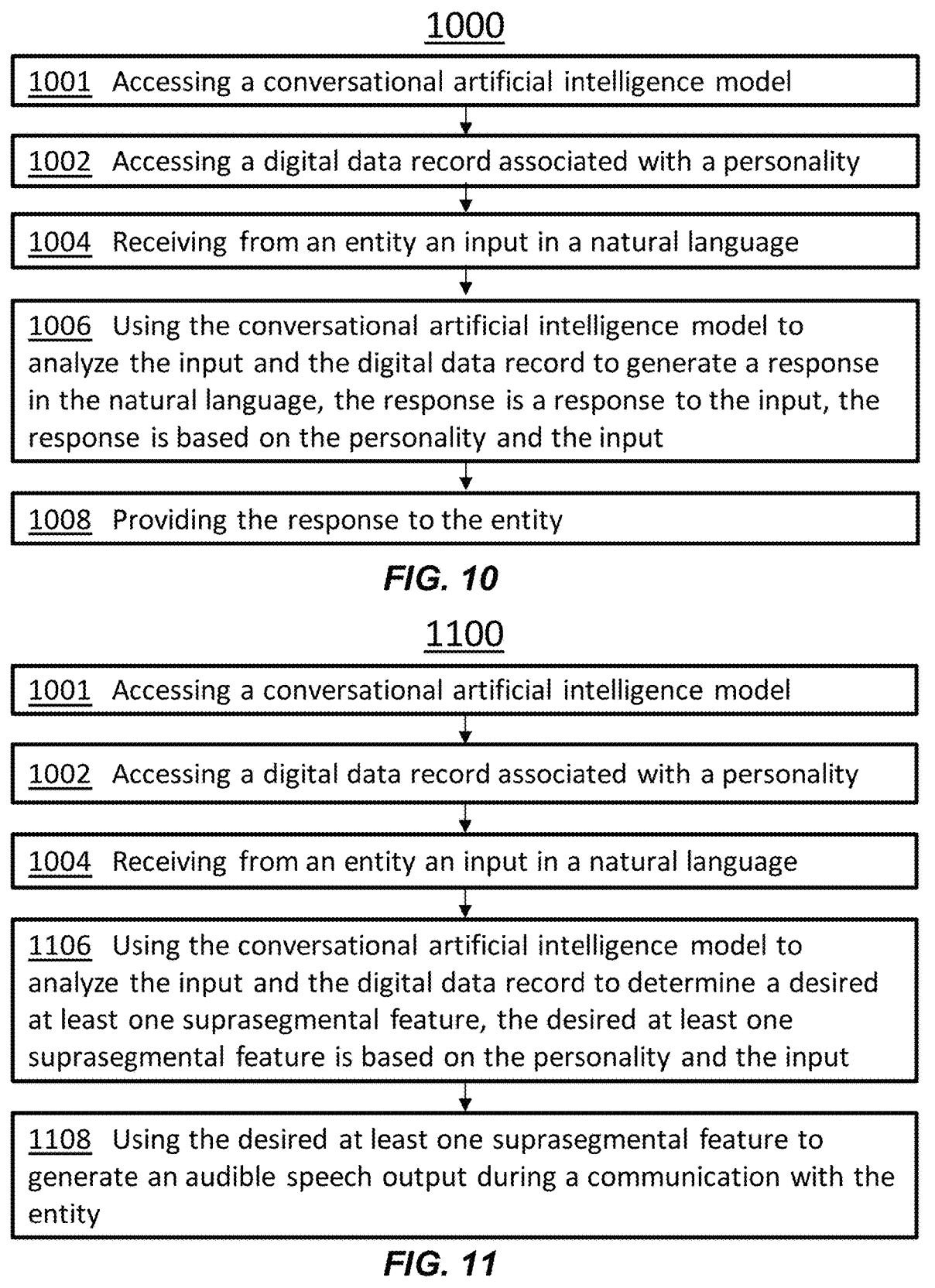

| 1001 Accessing a conversational artificial intelligence model |
|---|

| 1002 Accessing a digital data record associated with a personality |
|---|

| 1004 Receiving from an entity an input in a natural language |
|---|

| 1006 Using the conversational artificial intelligence model to analyze the input and the digital data record to generate a response in the natural language, the response is a response to the input, the response is based on the personality and the input |
|---|

| 1008 Providing the response to the entity |
|---|

| 1001 Accessing a conversational artificial intelligence model |
|---|

| 1002 Accessing a digital data record associated with a personality |
|---|

| 1004 Receiving from an entity an input in a natural language |
|---|

| 1106 Using the conversational artificial intelligence model to analyze the input and the digital data record to determine a desired at least one suprasegmental feature, the desired at least one suprasegmental feature is based on the personality and the input |
|---|

| 1108 Using the desired at least one suprasegmental feature to generate an audible speech output during a communication with the entity |
|---|

Figures 12, 13:
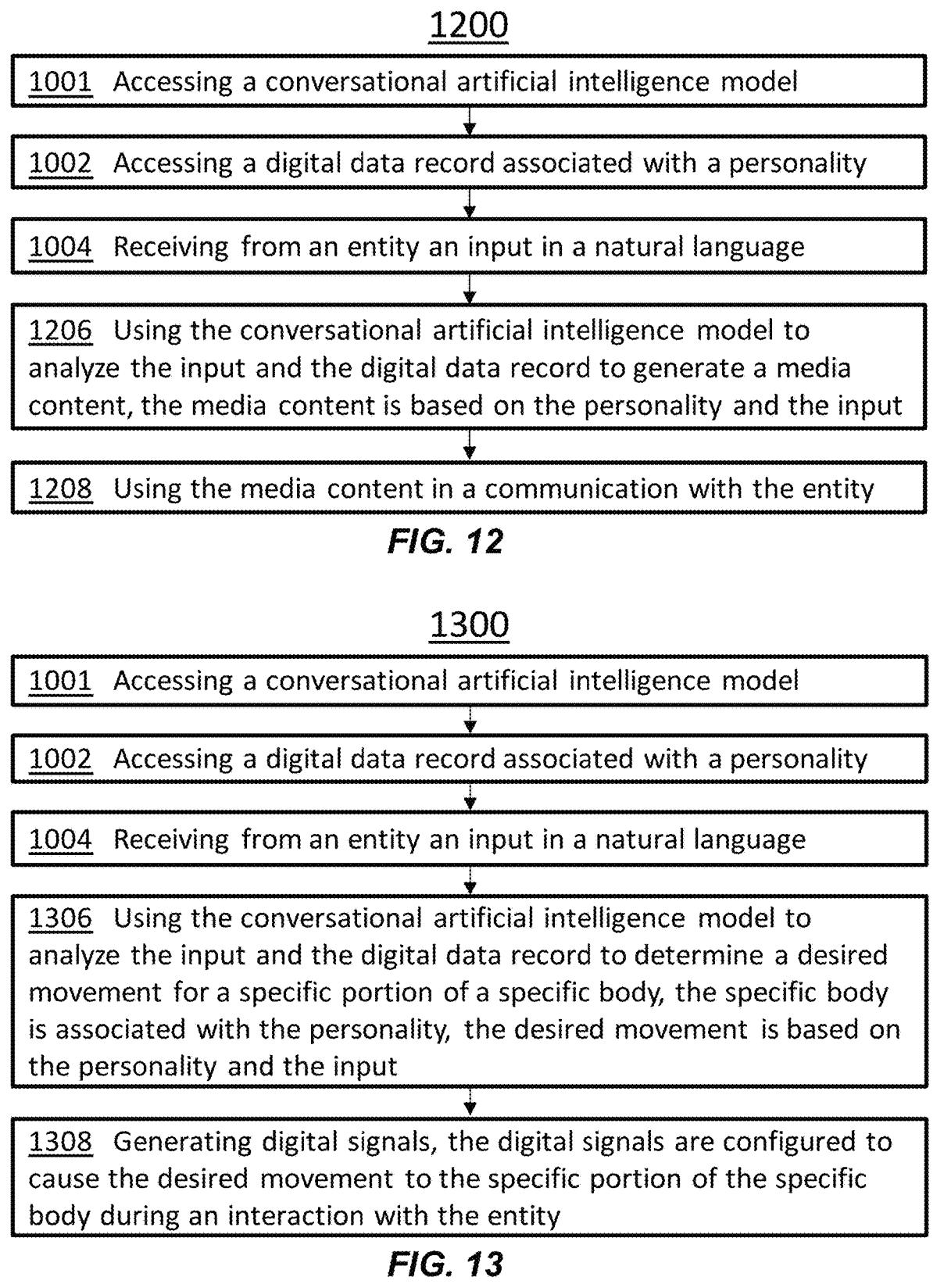

| |
|---|
| 1001 Accessing a conversational artificial intelligence model |

↓

| |
|---|
| 1002 Accessing a digital data record associated with a personality |

↓

| |
|---|
| 1004 Receiving from an entity an input in a natural language |

↓

| |
|---|
| 1206 Using the conversational artificial intelligence model to analyze the input and the digital data record to generate a media content, the media content is based on the personality and the input |

↓

| |
|---|
| 1208 Using the media content in a communication with the entity |

| |
|---|
| 1001 Accessing a conversational artificial intelligence model |

↓

| |
|---|
| 1002 Accessing a digital data record associated with a personality |

↓

| |
|---|
| 1004 Receiving from an entity an input in a natural language |

↓

| |
|---|
| 1306 Using the conversational artificial intelligence model to analyze the input and the digital data record to determine a desired movement for a specific portion of a specific body, the specific body is associated with the personality, the desired movement is based on the personality and the input |

↓

| |
|---|
| 1308 Generating digital signals, the digital signals are configured to cause the desired movement to the specific portion of the specific body during an interaction with the entity |

Figure 14:
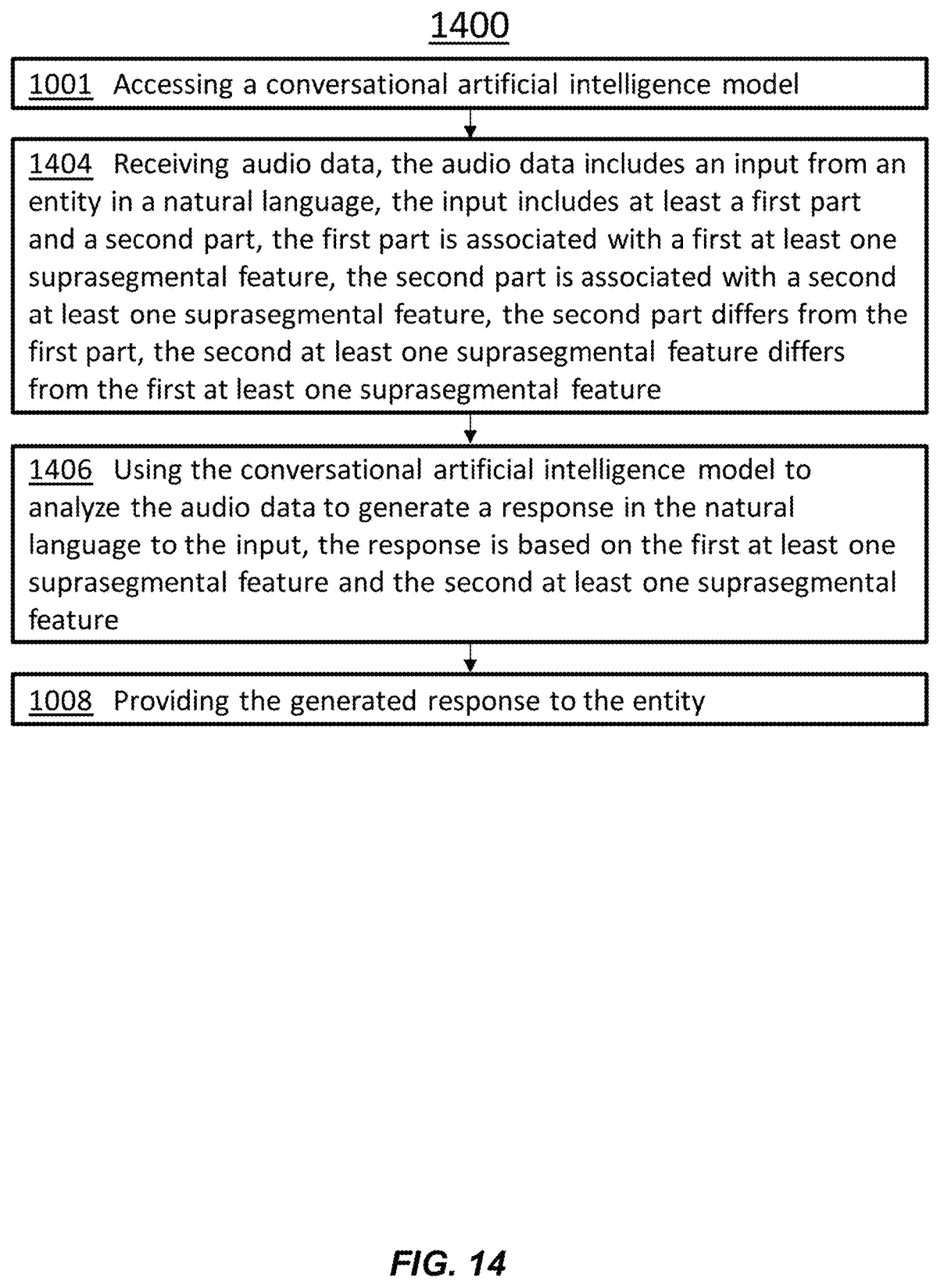

1001  Accessing a conversational artificial intelligence model

1404  Receiving audio data, the audio data includes an input from an entity in a natural language, the input includes at least a first part and a second part, the first part is associated with a first at least one suprasegmental feature, the second part is associated with a second at least one suprasegmental feature, the second part differs from the first part, the second at least one suprasegmental feature differs from the first at least one suprasegmental feature 1406  Using the conversational artificial intelligence model to analyze the audio data to generate a response in the natural language to the input, the response is based on the first at least one suprasegmental feature and the second at least one suprasegmental feature 1008  Providing the generated response to the entity

| <u>1001</u> Accessing a conversational artificial intelligence model |
| --- |

↓

| <u>1404</u> |
| --- |

↓

| <u>1506</u> Using the conversational artificial intelligence model to analyze the audio data to determine a desired at least one suprasegmental feature, the desired at least one suprasegmental feature is based on the first at least one suprasegmental feature and the second at least one suprasegmental feature |
| --- |

↓

| <u>1108</u> Using the desired at least one suprasegmental feature to generate an audible speech output during a communication with the entity |
| --- |

| <u>1001</u> Accessing a conversational artificial intelligence model |
| --- |

↓

| <u>1404</u> |
| --- |

↓

| <u>1606</u> Using the conversational artificial intelligence model to analyze the audio data to generate a media content, the media content is based on the first at least one suprasegmental feature and the second at least one suprasegmental feature |
| --- |

↓

| <u>1208</u> Using the media content in a communication with the entity |
| --- |

Figure 17:
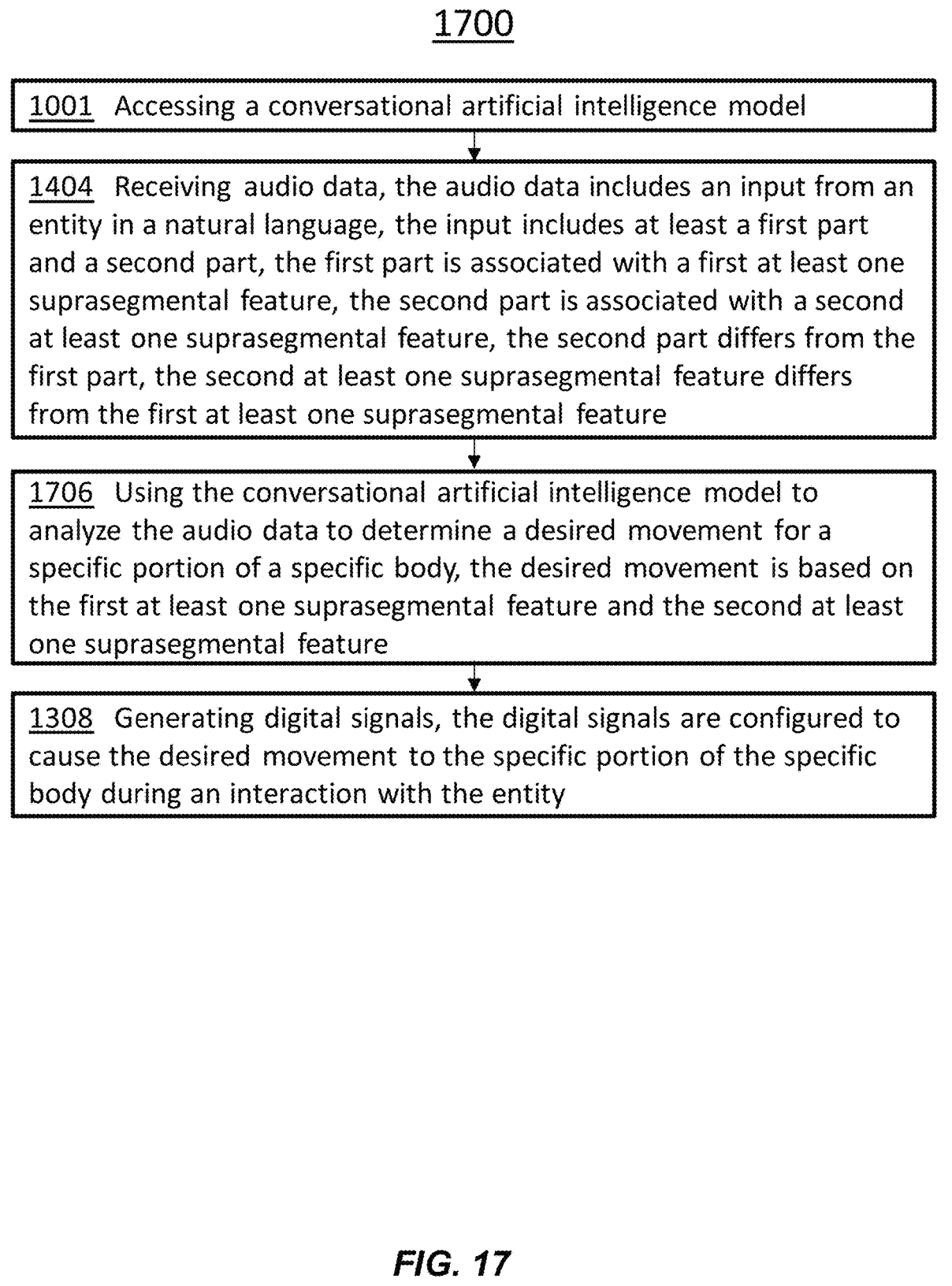

<u>1001</u>  Accessing a conversational artificial intelligence model

<u>1404</u>  Receiving audio data, the audio data includes an input from an entity in a natural language, the input includes at least a first part and a second part, the first part is associated with a first at least one suprasegmental feature, the second part is associated with a second at least one suprasegmental feature, the second part differs from the first part, the second at least one suprasegmental feature differs from the first at least one suprasegmental feature <u>1706</u>  Using the conversational artificial intelligence model to analyze the audio data to determine a desired movement for a specific portion of a specific body, the desired movement is based on the first at least one suprasegmental feature and the second at least one suprasegmental feature <u>1308</u>  Generating digital signals, the digital signals are configured to cause the desired movement to the specific portion of the specific body during an interaction with the entity

Figure 18:
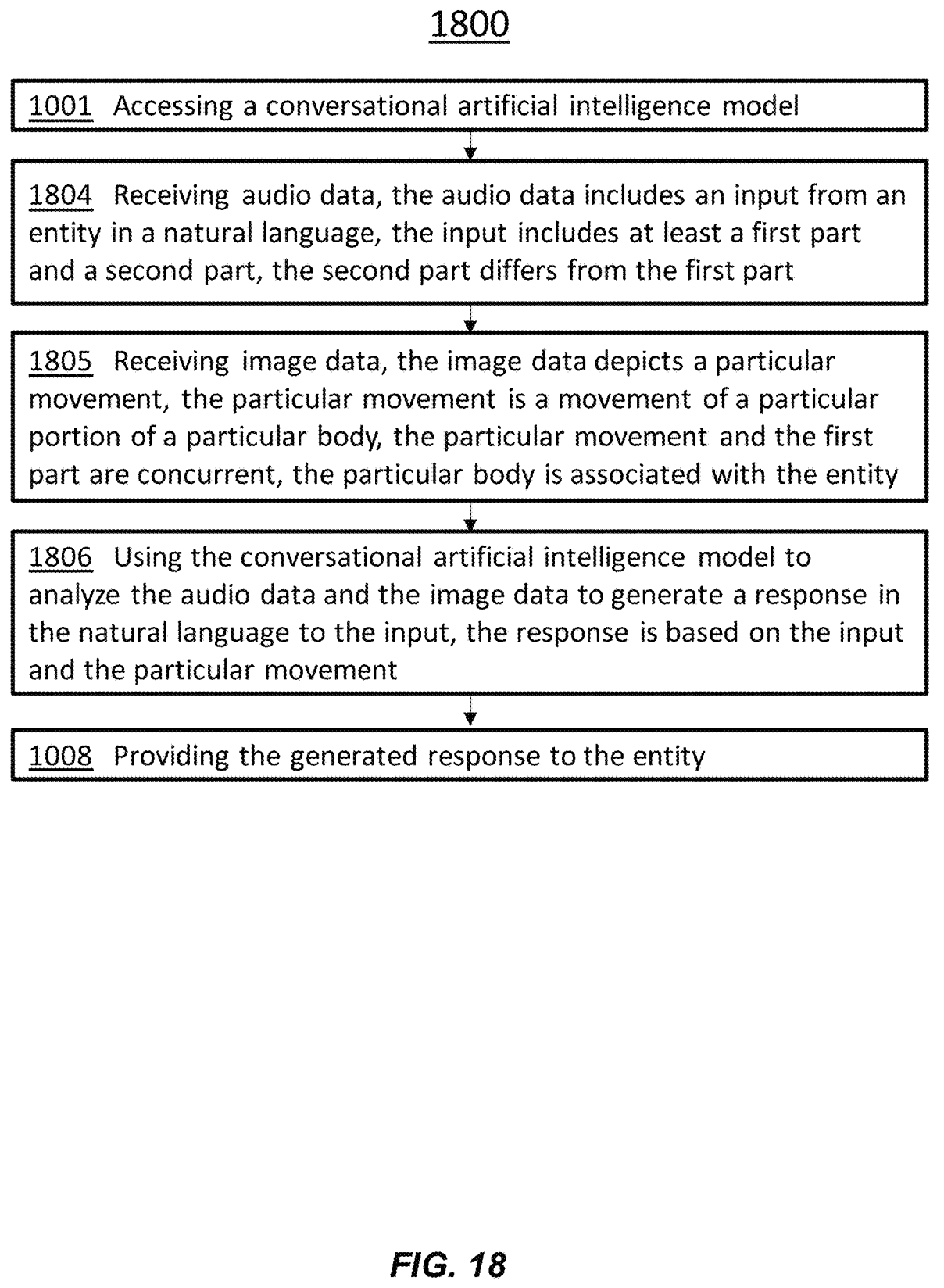

| 1001   Accessing a conversational artificial intelligence model |
| --- |

↓

| 1804   Receiving audio data, the audio data includes an input from an entity in a natural language, the input includes at least a first part and a second part, the second part differs from the first part |
| --- |

↓

| 1805   Receiving image data, the image data depicts a particular movement, the particular movement is a movement of a particular portion of a particular body, the particular movement and the first part are concurrent, the particular body is associated with the entity |
| --- |

↓

| 1806   Using the conversational artificial intelligence model to analyze the audio data and the image data to generate a response in the natural language to the input, the response is based on the input and the particular movement |
| --- |

↓

| 1008   Providing the generated response to the entity |
| --- |

1001  Accessing a conversational artificial intelligence model

1804  Receiving audio data, the audio data includes an input from an entity in a natural language, the input includes at least a first part and a second part, the second part differs from the first part 1805  Receiving image data, the image data depicts a particular movement, the particular movement is a movement of a particular portion of a particular body, the particular movement and the first part are concurrent, the particular body is associated with the entity 1906  Using the conversational artificial intelligence model to analyze the audio data and the image data to determine a desired at least one suprasegmental feature, the desired at least one suprasegmental feature is based on the input and the particular movement 1108  Using the desired at least one suprasegmental feature to generate an audible speech output during a communication with the entity

1001   Accessing a conversational artificial intelligence model

1804   Receiving audio data, the audio data includes an input from an entity in a natural language, the input includes at least a first part and a second part, the second part differs from the first part 1805   Receiving image data, the image data depicts a particular movement, the particular movement is a movement of a particular portion of a particular body, the particular movement and the first part are concurrent, the particular body is associated with the entity 2006   Using the conversational artificial intelligence model to analyze the audio data and the image data to generate a media content, the media content is based on the input and the particular movement 1208   Using the media content in a communication with the entity

1001  Accessing a conversational artificial intelligence model

1804  Receiving audio data, the audio data includes an input from an entity in a natural language, the input includes at least a first part and a second part, the second part differs from the first part 1805  Receiving image data, the image data depicts a particular movement, the particular movement is a movement of a particular portion of a particular body, the particular movement and the first part are concurrent, the particular body is associated with the entity 2106  Using the conversational artificial intelligence model to analyze the audio data and the image data to determine a desired movement for a specific portion of a specific body, the desired movement is based on the input and the particular movement, the specific body differs from the particular body 1308  Generating digital signals, the digital signals are configured to cause the desired movement to the specific portion of the specific body during an interaction with the entity

*FIG. 21*

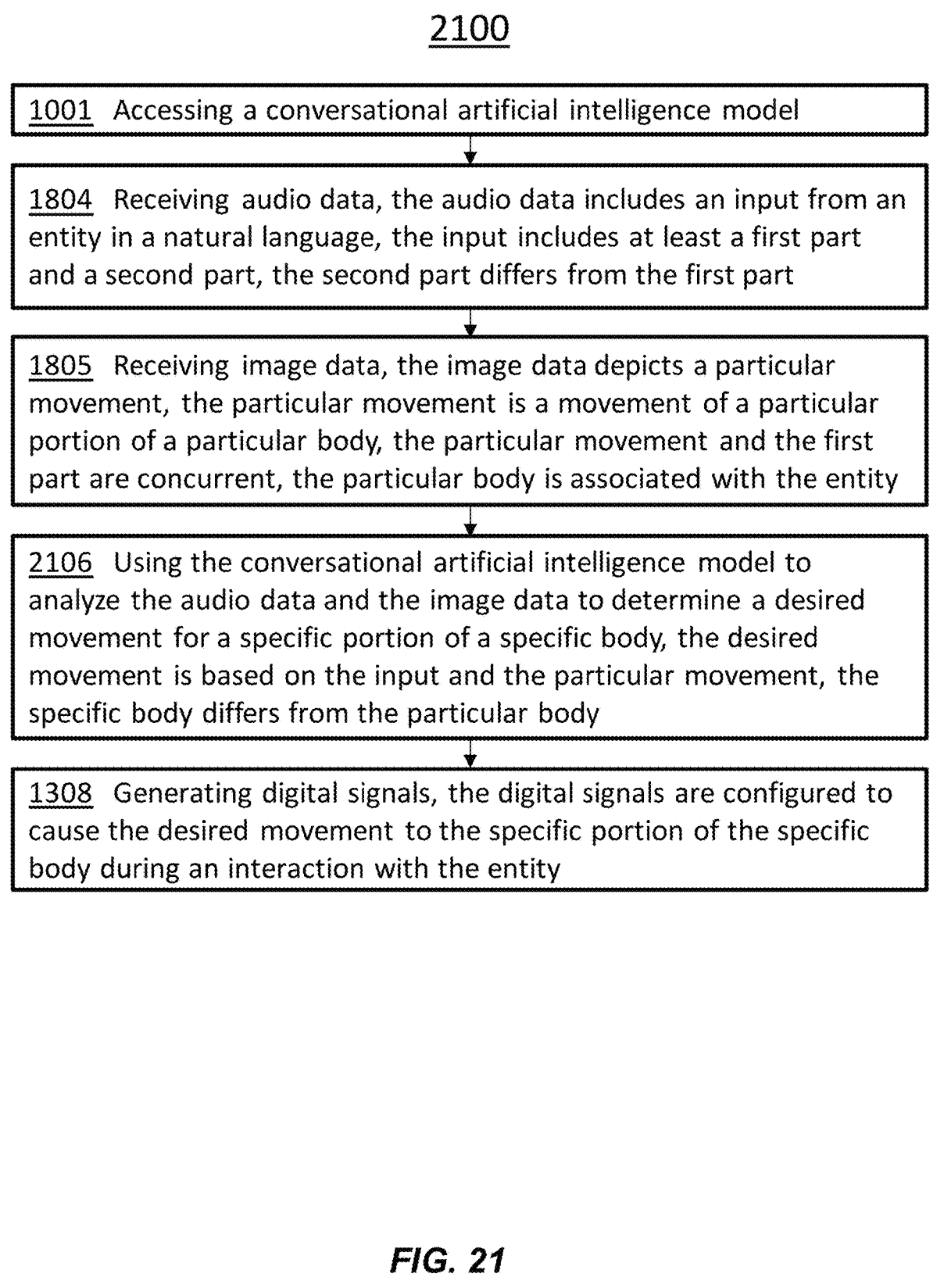

IMAGE ANALYSIS FOR PERSONAL INTERACTION

CROSS-REFERENCE TO RELATED APPLICATIONS

This application claims the benefit of priority of U.S. Provisional Patent Application No. 63/535,234 (filed on Aug. 29, 2023), U.S. Provisional Patent Application No. 63/549,534 (filed on Feb. 4, 2024), U.S. Provisional Patent Application No. 63/685,978 (filed on Aug. 22, 2024), and U.S. Provisional Patent Application No. 63/685,988 (filed on Aug. 22, 2024), the disclosures of which are incorporated herein by reference in their entirety.

BACKGROUND OF THE INVENTION

Technological Field

Some disclosed embodiments generally relate to systems and methods for image analysis. More particularly, some disclosed embodiments relate to systems and methods for image analysis for personal interaction.

Background Information

In today's world, artificial entities based on the innovative Generative Pre-trained Transformer (GPT) architecture and other innovative natural language processing (NLP) models respond to users' questions using generic databases and their conversation records. Yet, the relentless march of technology has shattered the boundaries of possibility, making the dream of personalized artificial entities a feasible solution.

Personalized artificial entities can harness the power of deep-learning algorithms to meticulously process an individual's data, be it text, audio, photos, or videos. By doing so, the personalized artificial entities can mirror or adjust to the unique cognitive traits, preferences, and unique manner of interactions of their source individuals. This provides the personalized artificial entities with an uncanny ability to offer functionalities with unprecedented authenticity and engagement with the source individuals and other individuals.

This groundbreaking technology will revolutionize how humans interact in digital environments, ushering in a new era of innovative ways for communication, productivity, entertainment, and social engagement.

SUMMARY OF THE INVENTION

In some examples, systems, methods and non-transitory computer readable media for generating and operating personalized artificial entities are provided.

In some examples, systems, methods and non-transitory computer readable media for using conversational artificial intelligence model are provided. In some examples, digital individual data may be accessed. The digital individual data may include at least one of personality data, location data, temporal data, or environment data. Further, an input may be received from an entity. The input may include at least one of an input in a natural language. An indication of suprasegmental features, an indication of body movement, or relation data. Further, the conversational artificial intelligence model may be used to analyze the input and the digital individual data to determine a desired reaction to the input. The desired reaction may include at least one of a generated response in the natural language, usage of desired suprasegmental features, desired movements, or a generated media content. In some examples, the desired reaction may be caused.

In some examples, systems, methods and non-transitory computer readable media for personalization of conversational artificial intelligence are provided. In some examples, a first digital data record associated with a relation between a specific digital character and a first character may be accessed. Further, a first input in a natural language may be received from the first character. Further, a conversational artificial intelligence model may be used to analyze the first digital data record and the first input to generate a first response in the natural language. The first response may be a response to the first input. Further, the first response may be provided to the first character. Further, a second digital data record associated with a relation between the specific digital character and a second character may be accessed. The second character may differ from the first character. Further, a second input in the natural language may be received from the second character. The second input may convey a substantially same meaning as the first input. Further, the conversational artificial intelligence model may be used to analyze the second digital data record and the second input to generate a second response in the natural language. The second response may be a response to the second input. The second response may differ from the first response. Further, the second response may be provided to the second character.

In some examples, systems, methods and non-transitory computer readable media for personalization of voice characteristics via conversational artificial intelligence are provided. In some examples, a first digital data record associated with a relation between a specific digital character and a first character may be accessed. Further, a first input in a natural language may be received from the first character. Further, a conversational artificial intelligence model may be used to analyze the first digital data record and the first input to determine a first desired at least one suprasegmental feature. Further, the first desired at least one suprasegmental feature may be used to generate an audible speech output during a communication of the specific digital character with the first character. Further, a second digital data record associated with a relation between the specific digital character and a second character may be accessed. The second character may differ from the first character. Further, a second input in the natural language may be received from the second character. The second input may convey a substantially same meaning as the first input. Further, the conversational artificial intelligence model may be used to analyze the second digital data record and the second input to determine a second desired at least one suprasegmental feature. The second desired at least one suprasegmental feature may differ from the first desired at least one suprasegmental feature. Further, the second desired at least one suprasegmental feature may be used to generate an audible speech output during a communication of the specific digital character with the second character.

In some examples, systems, methods and non-transitory computer readable media for personalization of media content generation via conversational artificial intelligence are provided. In some examples, a first digital data record associated with a relation between a specific digital character and a first character may be accessed. Further, a first input in a natural language may be received from the first character. Further, a conversational artificial intelligence model may be used to analyze the first digital data record and the first input to generate a first media content. Further, the first media content may be used in a communication of the specific digital character with the first character. Further, a second digital data record associated with a relation between the specific digital character and a second character may be accessed. The second character may differ from the first character. Further a second input in the natural language may be received from the second character. The second input may convey a substantially same meaning as the first input. Further, the conversational artificial intelligence model may be used to analyze the second digital data record and the second input to generate a second media content. The second media content may differ from the first media content. Further, the second media content may be used in a communication of the specific digital character with the second character.

In some examples, systems, methods and non-transitory computer readable media for personalization of body movements via conversational artificial intelligence are provided. In some examples, a first digital data record associated with a relation between a specific digital character and a first character may be accessed. Further, a first input in a natural language may be received from the first character. Further, a conversational artificial intelligence model may be used to analyze the first digital data record and the first input to determine a first desired movement for a first portion of a specific body. The specific body may be associated with the specific digital character. Further first digital signals may be generated. The first digital signals may be configured to cause the first portion of the specific body to undergo the first desired movement during an interaction of the specific digital character with the first character. Further, a second digital data record associated with a relation between the specific digital character and a second character may be accessed. The second character may differ from the first character. Further, a second input in the natural language may be received from the second character. The second input may convey a substantially same meaning as the first input. Further, the conversational artificial intelligence model may be used to analyze the second digital data record and the second input to determine a second desired movement for a second portion of the specific body. The second desired movement may differ from the first desired movement. Further, second digital signals may be generated. The second digital signals may be configured to cause the second portion of the specific body to undergo the second desired movement during an interaction of the specific digital character with the second character.

In some examples, systems, methods and non-transitory computer readable media for individualization of conversational artificial intelligence are provided. In some examples, a conversational artificial intelligence model may be accessed. Further, a digital data record associated with a personality may be accessed. Further, an input in a natural language may be received from an entity. Further, the conversational artificial intelligence model may be used to analyze the input and the digital data record to generate a response in the natural language. The response may be a response to the input. The response may be based on the personality and the input. Further, the response may be provided to the entity.

In some examples, systems, methods and non-transitory computer readable media for individualization of voice characteristics via conversational artificial intelligence are provided. In some examples, a conversational artificial intelligence model may be accessed. Further, a digital data record associated with a personality may be accessed. Further, an input in a natural language may be received from an entity. Further, the conversational artificial intelligence model may be used to analyze the input and the digital data record to determine a desired at least one suprasegmental feature. The desired at least one suprasegmental feature may be based on the personality and the input. Further, the desired at least one suprasegmental feature may be used to generate an audible speech output during a communication with the entity.

In some examples, systems, methods and non-transitory computer readable media for individualization of media content generation via conversational artificial intelligence are provided. In some examples, a conversational artificial intelligence model may be accessed. Further, a digital data record associated with a personality may be accessed. Further, an input in a natural language may be received from an entity. Further, the conversational artificial intelligence model may be used to analyze the input and the digital data record to generate a media content. The media content may be based on the personality and the input. Further, the media content may be used in a communication with the entity.

In some examples, systems, methods and non-transitory computer readable media for individualization of body movements via conversational artificial intelligence are provided. In some examples, a conversational artificial intelligence model may be accessed. Further, a digital data record associated with a personality may be accessed. Further, an input in a natural language may be received from an entity. Further, the conversational artificial intelligence model may be used to analyze the input and the digital data record to determine a desired movement for a specific portion of a specific body. The specific body may be associated with the personality. The desired movement may be based on the personality and the input. Further, digital signals may be generated. The digital signals may be configured to cause the desired movement to the specific portion of the specific body during an interaction with the entity.

In some examples, systems, methods and non-transitory computer readable media for using perceived voice characteristics in conversational artificial intelligence are provided. In some examples, a conversational artificial intelligence model may be accessed. Further, audio data may be received. The audio data may include an input from an entity in a natural language. The input may include at least a first part and a second part. The first part may be associated with a first at least one suprasegmental feature. The second part may be associated with a second at least one suprasegmental feature. The second part may differ from the first part. The second at least one suprasegmental feature may differ from the first at least one suprasegmental feature. Further, the conversational artificial intelligence model may be used to analyze the audio data to generate a response in the natural language to the input. The response may be based on the first at least one suprasegmental feature and the second at least one suprasegmental feature. Further, the generated response may be provided to the entity.

In some examples, systems, methods and non-transitory computer readable media for using perceived voice characteristics to control generated voice characteristics in conversational artificial intelligence are provided. In some examples, a conversational artificial intelligence model may be accessed. Further, audio data may be received. The audio data may include an input from an entity in a natural language. The input may include at least a first part and a second part. The first part may be associated with a first at least one suprasegmental feature. The second part may be associated with a second at least one suprasegmental feature. The second part may differ from the first part. The second at least one suprasegmental feature may differ from the first at least one suprasegmental feature. Further, the conversational artificial intelligence model may be used to analyze the audio data to determine a desired at least one suprasegmental feature. The desired at least one suprasegmental feature may be based on the first at least one suprasegmental feature and the second at least one suprasegmental feature. Further, the desired at least one suprasegmental feature may be used to generate an audible speech output during a communication with the entity.

In some examples, systems, methods and non-transitory computer readable media for using perceived voice characteristics to control media content generation via conversational artificial intelligence are provided. In some examples, a conversational artificial intelligence model may be accessed. Further, audio data may be received. The audio data may include an input from an entity in a natural language. The input may include at least a first part and a second part. The first part may be associated with a first at least one suprasegmental feature. The second part may be associated with a second at least one suprasegmental feature. The second part may differ from the first part. The second at least one suprasegmental feature may differ from the first at least one suprasegmental feature. Further, the conversational artificial intelligence model may be used to analyze the audio data to generate a media content. The media content may be based on the first at least one suprasegmental feature and the second at least one suprasegmental feature. Further, the media content may be used in a communication with the entity.

In some examples, systems, methods and non-transitory computer readable media for using perceived voice characteristics to control body movements via conversational artificial intelligence are provided. In some examples, a conversational artificial intelligence model may be accessed. Further, audio data may be received. Further, the audio data may include an input from an entity in a natural language. The input may include at least a first part and a second part. The first part may be associated with a first at least one suprasegmental feature. The second part may be associated with a second at least one suprasegmental feature. The second part may differ from the first part. The second at least one suprasegmental feature may differ from the first at least one suprasegmental feature. Further, the conversational artificial intelligence model may be used to analyze the audio data to determine a desired movement for a specific portion of a specific body. The desired movement may be based on the first at least one suprasegmental feature and the second at least one suprasegmental feature. Further, digital signals may be generated. The digital signals may be configured to cause the desired movement to the specific portion of the specific body during an interaction with the entity.

In some examples, systems, methods and non-transitory computer readable media for using perceived body movements in conversational artificial intelligence are provided. In some examples, systems, methods and non-transitory computer readable media for image analysis for personal interaction are provided. In some examples, a conversational artificial intelligence model may be accessed. Further, audio data may be received. The audio data may include an input from an entity in a natural language. The input may include at least a first part and a second part. The second part may differ from the first part. Further, image data may be received. The image data may depict a particular movement. The particular movement may be a movement of a particular portion of a particular body. The particular movement and the first part may be concurrent. The particular body may be associated with the entity. Further, the conversational artificial intelligence model may be used to analyze the audio data and the image data to generate a response in the natural language to the input. The response may be based on the input and the particular movement. Further, the generated response may be provided to the entity.

In some examples, systems, methods and non-transitory computer readable media for using perceived body movements to control generated voice characteristics in conversational artificial intelligence are provided. In some examples, a conversational artificial intelligence model may be accessed. Further, audio data may be received. The audio data may include an input from an entity in a natural language. The input may include at least a first part and a second part. The second part may differ from the first part. Further, image data may be received. The image data may depict a particular movement. The particular movement may be a movement of a particular portion of a particular body. The particular movement and the first part may be concurrent. The particular body may be associated with the entity. Further, the conversational artificial intelligence model may be used to analyze the audio data and the image data to determine a desired at least one suprasegmental feature. The desired at least one suprasegmental feature may be based on the input and the particular movement. Further, the desired at least one suprasegmental feature may be used to generate an audible speech output during a communication with the entity.

In some examples, systems, methods and non-transitory computer readable media for using perceived body movements to control media content generation via conversational artificial intelligence are provided. In some examples, a conversational artificial intelligence model may be accessed. Further, audio data may be received. The audio data may include an input from an entity in a natural language. The input may include at least a first part and a second part. The second part may differ from the first part. Further, image data may be received. The image data may depict a particular movement. The particular movement may be a movement of a particular portion of a particular body. The particular movement and the first part may be concurrent. The particular body may be associated with the entity. Further, the conversational artificial intelligence model may be used to analyze the audio data and the image data to generate a media content. The media content may be based on the input and the particular movement. Further, the media content may be used in a communication with the entity.

In some examples, systems, methods and non-transitory computer readable media for using perceived body movements to control generated body movements via conversational artificial intelligence are provided. In some examples, a conversational artificial intelligence model may be accessed. Further, audio data may be received. The audio data may include an input from an entity in a natural language. The input may include at least a first part and a second part. The second part may differ from the first part. Further, image data may be received. The image data may depict a particular movement. The particular movement may be a movement of a particular portion of a particular body. The particular movement and the first part may be concurrent. The particular body may be associated with the entity. Further, the conversational artificial intelligence model may be used to analyze the audio data and the image data to determine a desired movement for a specific portion of a specific body. The desired movement may be based on the input and the particular movement. The specific body may differ from the particular body. Further, digital signals may be generated. The digital signals may be configured to cause the desired movement to the specific portion of the specific body during an interaction with the entity.

BRIEF DESCRIPTION OF DRAWINGS

The accompanying drawings, which are incorporated in and constitute a part of this disclosure, illustrate various disclosed embodiments. In the drawings:

FIG. 3A is a diagram illustrating examples of input data of the system of FIG. 1, the consistent with some embodiments of the present disclosure.

FIG. 5 is a flowchart of an exemplary process for using conversational artificial intelligence, consistent with some embodiments of the present disclosure.

FIG. 6 is a flowchart of an exemplary process for personalization of conversational artificial intelligence, consistent with some embodiments of the present disclosure.

FIG. 7 is a flowchart of an exemplary process for personalization of voice characteristics via conversational artificial intelligence, consistent with some embodiments of the present disclosure.

FIG. 8 is a flowchart of an exemplary process for personalization of media content generation via conversational artificial intelligence, consistent with some embodiments of the present disclosure.

FIG. 9 is a flowchart of an exemplary process for personalization of body movements via conversational artificial intelligence, consistent with some embodiments of the present disclosure.

FIG. 10 is a flowchart of an exemplary process for individualization of conversational artificial intelligence, consistent with some embodiments of the present disclosure.

FIG. 11 is a flowchart of an exemplary process for individualization of voice characteristics via conversational artificial intelligence, consistent with some embodiments of the present disclosure.

FIG. 12 is a flowchart of an exemplary process for individualization of media content generation via conversational artificial intelligence, consistent with some embodiments of the present disclosure.

FIG. 13 is a flowchart of an exemplary process for individualization of body movements via conversational artificial intelligence, consistent with some embodiments of the present disclosure.

FIG. 14 is a flowchart of an exemplary process for using perceived voice characteristics in conversational artificial intelligence, consistent with some embodiments of the present disclosure.

FIG. 15 is a flowchart of an exemplary process for using perceived voice characteristics to control generated voice characteristics in conversational artificial intelligence, consistent with some embodiments of the present disclosure.

FIG. 16 is a flowchart of an exemplary process for using perceived voice characteristics to control media content generation via conversational artificial intelligence, consistent with some embodiments of the present disclosure.

FIG. 17 is a flowchart of an exemplary process for using perceived voice characteristics to control body movements via conversational artificial intelligence, consistent with some embodiments of the present disclosure.

FIG. 18 is a flowchart of an exemplary process for using perceived body movements in conversational artificial intelligence, consistent with some embodiments of the present disclosure.

FIG. 19 is a flowchart of an exemplary process for using perceived body movements to control generated voice characteristics in conversational artificial intelligence, consistent with some embodiments of the present disclosure.

FIG. 20 is a flowchart of an exemplary process for using perceived body movements to control media content generation via conversational artificial intelligence, consistent with some embodiments of the present disclosure.

FIG. 21 is a flowchart of an exemplary process for using perceived body movements to control generated body movements via conversational artificial intelligence, consistent with some embodiments of the present disclosure.

DETAILED DESCRIPTION OF THE INVENTION

Figure 1:
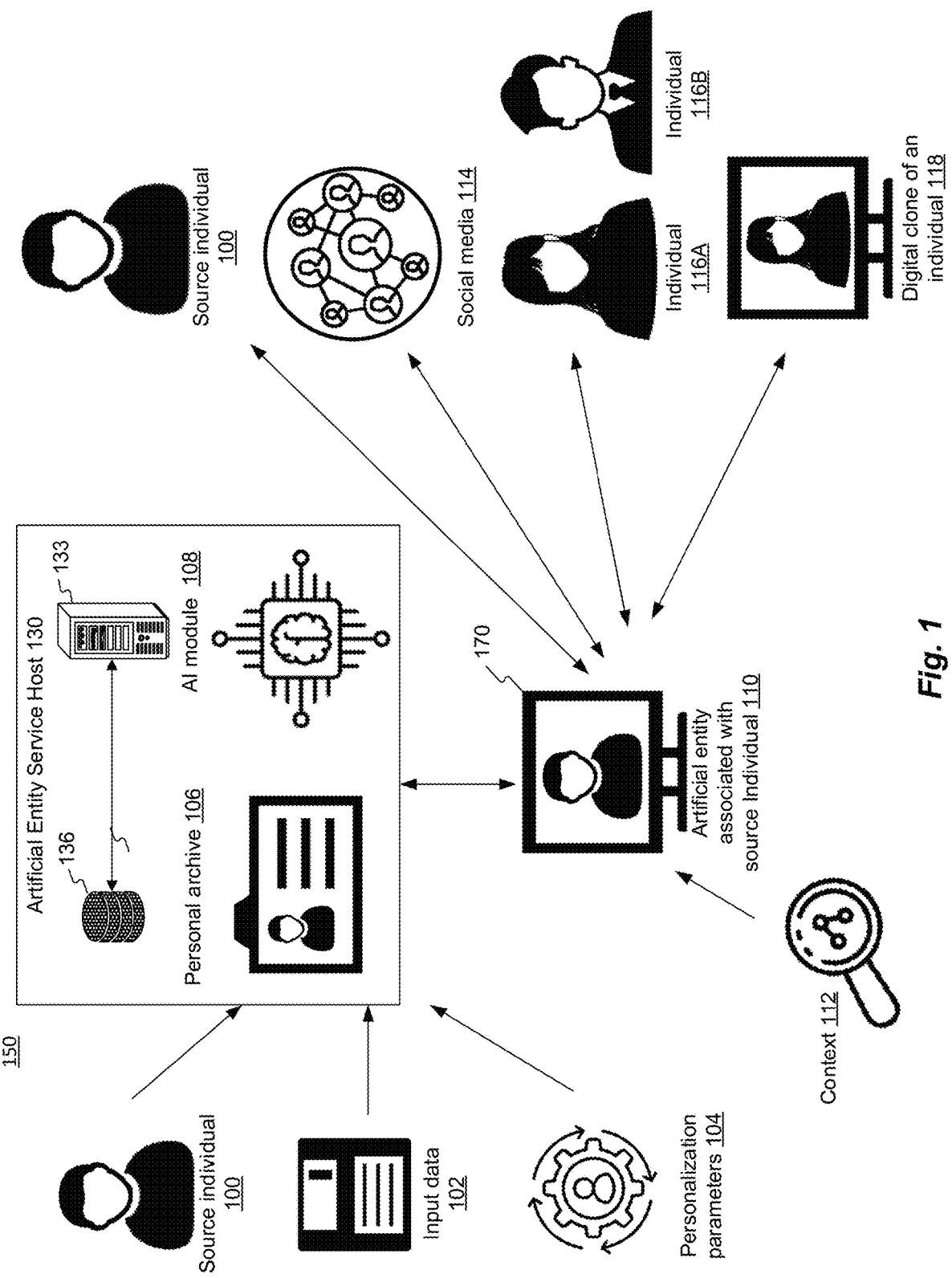
FIG. 1 is a block diagram illustrating a system that enables generation of artificial entities, consistent with some embodiments of the present disclosure.

Exemplary embodiments are described with reference to the accompanying drawings. The Figures are not necessarily drawn to scale. While examples and features of disclosed principles are described herein, modifications, adaptations, and other implementations are possible without departing from the spirit and scope of the disclosed embodiments. Also, the words "comprising," "having," "containing," "including," and other similar forms are intended to be equivalent in meaning and be open ended in that an item or items following any one of these words is not meant to be an exhaustive listing of such item or items, or meant to be limited to only the listed item or items. It should also be noted that, as used herein and in the appended claims, the singular forms "a," "an," and "the" include plural references unless the context clearly dictates otherwise. Moreover, the relational terms herein such as "first" and "second" are used only to differentiate an entity or operation from another entity or operation, and do not require or imply any actual relationship or sequence between these entities or operations.

As used herein, unless specifically stated otherwise, the term "or" encompasses all possible combinations, except where infeasible. For example, if it is stated that a component can include A or B, then, unless specifically stated otherwise or infeasible, the component can include A or B, or A and B. As a second example, if it is stated that a component can include at least one of A, B, or C, then, unless specifically stated otherwise or infeasible, the component can include A, B, or C, or A and B, or A and C, or B and C, or A, B, and C.

This disclosure employs open-ended permissive language, indicating for example, that some embodiments "may" employ, involve, or include specific features. The use of the term "may," and other open-ended terminology is intended to indicate that although not every embodiment may employ the specific disclosed feature, at least one embodiment employs the specific disclosed feature.

In the following description, various working examples are provided for illustrative purposes. However, is to be understood the present disclosure may be practiced without one or more of these details. Reference will now be made in detail to non-limiting examples of this disclosure, examples of which are illustrated in the accompanying drawings. The examples are described below by referring to the drawings, wherein like reference numerals refer to like elements. When similar reference numerals are shown, corresponding description(s) are not repeated, and the interested reader is referred to the previously discussed Figure(s) for a description of the like element(s).

Various embodiments are described herein with reference to a system, method, device, or computer-readable medium. It is intended that the disclosure of one is a disclosure of all. For example, it is to be understood that disclosure of a computer-readable medium described herein also constitutes a disclosure of methods implemented by the computer-readable medium, and systems and devices for implementing those methods, via, for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer-readable medium containing instructions that, when executed by at least one processor, cause the at least one processor to perform operations for executing a web accessibility method. Non-transitory computer-readable media may include any medium capable of storing data in any memory in a way that may be read by any computing device with a processor to carry out methods or any other instructions stored in the memory. The non-transitory computer-readable medium may be implemented as hardware, firmware, software, or any combination thereof. Moreover, the software may preferably be implemented as an application program tangibly embodied on a program storage unit or computer-readable medium consisting of parts, or of certain devices or a combination of devices. The application program may be uploaded to, and executed by, a machine having any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program or any combination thereof which may be executed by a CPU, whether or not such a computer or processor is explicitly described. In addition, various other peripheral units may be connected to the computer platform, such as an additional data storage unit and a printing unit. Furthermore, a non-transitory computer-readable medium may be any computer-readable medium except for a transitory propagating signal.

Some disclosed embodiments may involve "at least one processor," which may include any physical device or group of devices having electric circuitry that performs a logic operation on an input or on inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The term memory as used in this context and other contexts may include a Random Access Memory (RAM), a Read-Only Memory (ROM), a hard disk, an optical disk, a magnetic medium, a flash memory, other permanent, fixed, or volatile memory, or any other mechanism capable of storing instructions. Memory may include one or more separate storage devices collocated or disbursed, capable of storing data structures, instructions, or any other data. Memory may further include a memory portion containing instructions for the processor to execute. The memory may also be used as a working scratch pad for the processors or as a temporary storage In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively and may be co-located or located remotely from each other. The processors may be coupled electrically, magnetically, optically, acoustically, mechanically or by other means that permit them to interact.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers; for example, a data structure may be owned or operated by the same or different entities. Thus, the term "data structure," as used herein in the singular, is inclusive of plural data structures.

Some embodiments disclosed herein may involve a network. A network may include any type of physical or wireless computer networking arrangement used to exchange data. For example, a network may be the Internet, a private data network, a virtual private network using a public network, a Wi-Fi network, a LAN or WAN network, a combination of one or more of the forgoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

In connection with some embodiments, machine learning/artificial intelligence models may be trained using training examples. The models may employ learning algorithms. Some non-limiting examples of such learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long/short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

Reference is now made to FIG. 1, which shows an example of a system 150 for enabling source individuals 100 to generate and operate personalized artificial entities 110. System 150 may be computer-based and may include at least some computer system components, desktop computers, workstations, tablets, handheld computing devices, memory devices, and internal networks connecting the components. System 150 may include or be connected to various network computing resources (e.g., servers, routers, switches, network connections, storage devices, etc.) for supporting services provided by system 150. For example, system 150 may include or be connected to an artificial entity service host 130 over a communications network that facilitates communications and data exchange between different system components and the different entities associated with system 150.

The artificial entity service host 130 may receive input data 102 from source individual 100 or from individuals associated with the source individual. Input data refers to a wide array of information and content collected, recorded, or generated from various sources, often digitally, for analysis, processing, or other purposes. Consistent with embodiments of the present disclosure, the received information included in input data 102 can provide insights into different aspects of an individual's life, behavior, and interactions. FIG. 3A provides examples of the information received as part of input data 102. As shown, the received information may originate from personal recording devices 300 (e.g., audio or video recordings made using devices such as smartphones, cameras, or voice recorders) that capture personal conversations, thoughts, and experiences, providing a direct window into a person's daily life. The received information may also include chat history data 302 (e.g., text-based conversations from messaging platforms or chat applications) that offer insights into communication patterns, relationships, and interactions. Additionally, the received information may include phone records data 304 (e.g., call logs, text messages, and other communication records) that provide information about the frequency and duration of interactions with contacts. Social media data 306 (e.g., content posted, shared, and interactions on social media platforms) may also be included, offering insights into an individual's online presence, interests, and social connections. Relationship data 308 (e.g., information about individuals' connections with others, such as family, friends, and professional contacts) can offer insights into the nature and strength of these relationships. Public records data 310 (e.g., information available in official records, such as birth certificates, marriage records, and legal documents) may be included to help establish a person's legal and life milestones. Image data 313 (e.g., images captured through cameras or smartphones) provides visual records of events, places, and people in an individual's life, adding a visual dimension to the personal archive of the source individual. Medical data 314 (e.g., health-related records, such as medical history, diagnoses, prescriptions, and test results) can be used to understand the source individual's health journey. Furthermore, the received information may include contacts data 316 (e.g., information about people in an individual's address book, including names, phone numbers, and email addresses) that provide insights into the social and professional network of the source individual. Consumption data 318 (e.g., records of transactions indicative of the individual's spending habits and purchasing behaviors) can reveal preferences and interests. Geo-location data 320 (e.g., data indicating an individual's physical movements and locations over time, often collected through GPS-enabled devices) may provide insights into travel patterns and routines. Finally, the received information may include answers to questionnaires 322 (e.g., responses to surveys or questionnaires), which can cover various topics and be used to gather insights into the opinions, preferences, and attitudes of the source individual.

The artificial entity service host 130 may also receive personalization parameters 104 from source individual 100 or from individuals associated with the source individual. Personalization parameters refer to specific characteristics, attributes, or settings that can be customized to tailor an experience or representation to an individual's preferences, needs, or identity. These parameters are utilized to create a more personalized and engaging experience for users in various contexts, such as virtual environments, digital platforms, storytelling, and more. By reflecting an individual's unique qualities, these parameters enhance the overall user experience. FIG. 3A provides examples of personalization parameters 104. One example is the digital clone age 330, where users can choose the age of their artificial entity. This personalization parameter allows user to adjust the age of their artificial entity, influencing their appearance, behavior, and interactions within other individuals. For instance, a younger artificial entity might be more energetic and curious, while an older artificial entity could appear wiser and more reserved. Another example is personality traits 332, which allows users (e.g., source individual 100) to personalize an artificial entity (such as a virtual assistant or an entity with whom the source individual wishes to establish a romantic relationship) with specific traits. Users might select whether they want the artificial entity to be humorous, professional, empathetic, or a combination of traits, ensuring that interactions align with the user's preferred conversational style. Physical appearance 334 is another personalization parameter that users can select in order to personalize their artificial entity. Users can adjust attributes such as height, body type, facial features, and clothing choices, allowing them to create artificial entities that closely match their own preferences or desired identities. History events 336 is a personalization parameter that allows users to select specific historical events they are interested in learning about. The artificial entity will be educated about the specific historical events from the point of view of the source individual. Finally, expressions 338 is another personalization parameter that enables users to customize the expressions and animations of their artificial entity during, for example, video calls or chats.

As shown in FIG. 1, artificial entity service host 130 may be associated with a server 133 coupled to one or more physical or virtual storage devices such as a data structure 136. In some embodiments, server 133 may include or otherwise associated with an AI module 108. AI module 108—designed to generate text, images, and video as well as create an artificial entity (e.g., a digital clone) associated with a source individual—is a sophisticated computational system that leverages artificial intelligence techniques to mimic human-like creativity and replication. This module combines natural language processing (NLP) and computer vision technologies to generate textual content, images, and even digital representations of individuals with a high degree of realism. In one embodiment, AI module 108 is capable of generating text for artificial entity 110. For example, AI module 108 employs NLP models to generate coherent and contextually relevant textual content. It can create articles, stories, conversations, product descriptions, and more based on prompts or guidelines provided. In one embodiment, AI module 108 may utilize generative adversarial networks (GANs) or similar techniques, in order to generate images that match certain criteria. This can include generating artistic renditions, product visuals, scenes, or even abstract images. In one embodiment, AI module 108 is capable of generating artificial entity 110. To do so, AI module 108 first gathers extensive information about the source individual (e.g., input data 102). In one example, AI module 108 may employ deep learning and computer vision techniques to understand facial features, expressions, body language, and voice characteristics of the source individual. In some embodiments, AI module 108 may analyzing voice recordings of the source individual to be synthesize speech for the artificial entity in the voice of the source individual (e.g., the synthesized voice may have the same intonation, pitch, and speaking style). In other embodiments, AI module 108 may reconstruct a 3D model of the source individual's face, capturing unique features, proportions, and expressions. In other embodiments, AI module 108 may learn from the person's behavior in videos to replicate their gestures, movements, and body language. In some embodiments, the generated artificial entity may be an interactive representation of the source individual, capable of engaging in conversations, displaying emotions, and mimicking their visual and auditory attributes.

Data associated with artificial entity 110 (e.g., input data 102) may be stored in data structure 136 and used to form personal archive 106. Data structure 136 may utilize a volatile or non-volatile, magnetic, semiconductor, tape, optical, removable, non-removable, other type of storage device or tangible or non-transitory computer-readable medium, or any medium or mechanism for storing information related to artificial entity 110. Data structure 136 may be part of server 133 or separate from server 133. When data structure 136 is not part of server 133, server 133 may exchange data with data structure 136 via a communication link. Data structure 136 may include one or more memory devices that store data and instructions used to perform one or more features of the disclosed embodiments. In one embodiment, data structure 136 may include any of a plurality of suitable data structures, ranging from small data structures hosted on a workstation to large data structures distributed among data centers. Data structure 136 may also include any combination of one or more data structures controlled by memory controller devices (e.g., servers) or software.

Examples of received information that may be stored in a personal archive 106 include digital versions of the following: correspondence (e.g., personal letters, postcards, emails, and other forms of written communication that reflect relationships, experiences, and emotions), image data (e.g., pictures and videos capturing moments from various stages of life, such as family gatherings, vacations, achievements, and everyday activities), journals and diaries (e.g., written accounts of personal thoughts, feelings, and experiences that provide a deeper understanding of the inner world of the source individual), certificates (e.g., academic diplomas, certificates of achievement, and awards received for accomplishments in various fields), audio recordings (e.g., voice recordings, music playlists, and other audio files that hold sentimental or meaningful value), documents (e.g., personal documents such as birth certificates, passports, legal agreements, and other paperwork that document important life events), social media content (e.g., captured posts, photos, and interactions from social media platforms, family history records (e.g., genealogical records, family trees, and documents tracing the history of the individual's ancestors and relatives), career materials (work-related documents such as resumes, portfolios, and work samples that showcase professional achievements), personal projects (e.g., creative works, such as writings, art, music compositions, and other projects that reflect personal interests and talents), medical records (e.g., health-related documents and records that provide a comprehensive overview of the individual's medical history), food related memos (e.g., favorite recipes, cooking tips, and memories associated with food).

According to embodiments of the present disclosure, communications network may be any type of network (including infrastructure) that supports exchanges of information, and/or facilitates the exchange of information between the components of system 150. For example, communications network may be the Internet, the world-wide-web (WWW), a private data network, a virtual private network using a public network, a Wi-Fi network, a local area network (LAN), a wide area network (WAN), a metro area network (MAN), and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

According to embodiments of the present disclosure, artificial entity 110 may be displayed on computing device 170. The computing device may include processing circuitry communicatively connected to a network interface and to a memory, wherein the memory contains instructions that, when executed by the processing circuitry, configure the computing device to execute a method. Computing devices referenced herein may include all possible types of devices capable of exchanging data in a communications network such as the Internet. In some examples, the communication device may include a smartphone, a tablet, a smartwatch, a personal digital assistant, a desktop computer, a laptop computer, an IoT device, a dedicated terminal, and any other device that enables display of digital content conveyed via the communications network. In some cases, the computing device may include or be connected to a display device such as an LED display, a touchscreen display, an augmented reality (AR) device, or a virtual reality (VR) device.

Artificial entity 110 may communicate with one or more entities. For example, artificial entity 110 may communicate with source individual 100 (e.g., for tuning and improving the artificial entity), with social media 114 (e.g., for reacting with posts and content behalf of the source individual), with individual 116 (e.g., to provide advice according to the source individual point of view); and/or with artificial entity of target individual 118 (e.g., to make planes of an events based on the preferences of each individual). The components and arrangements of system 150 shown in FIG. 1 are intended to be exemplary only and are not intended to limit the disclosed embodiments, as the system components used to implement the disclosed processes and features may vary.

When communicating with one or more entities listed above, the artificial entity service host 130 may obtain context 112 of the conversation or interaction and, based on the obtained context, determine the response of the artificial entity 110. Context 112 refers to the relevant information and parameters that influence how AI module 108 generates a response. It helps AI module 108 understand the specific situation or setting in which a response is being generated, allowing it to tailor its output accordingly. FIG. 3A lists examples of various contextual factors that may help AI module 108 understand the specific situation. One example is target identity 350, which relates to knowing who the recipient of the response is and helps personalize the response of the artificial entity to match the recipient's preferences, knowledge level, and communication style. For instance, the artificial entity might provide a more technical explanation to a researcher compared to a simplified version for a general audience. Another example is audience 352, which relates to the intended audience (in addition to the reference individual who asked the question). For example, the artificial entity might use different tones and language levels, such as formal language for a business audience and informal language for a casual group of friends. Another example is date 355, which involves incorporating the current date as context into the answer generated by the artificial entity. For instance, if the date is close to a major holiday, the artificial entity might tailor its response to include holiday-related greetings or information. Time of day 356 is another example, where the artificial entity incorporates the time of day into its response. For example, the entity may offer a cheerful "Good morning!" in the morning, a productive "Good afternoon!" around midday, or a relaxed "Good evening!" in the evening. Location 358 involves incorporating the geographic location of the reference individual as context in the answer. For example, if the user is in a particular city, the artificial entity may recall places the source individual has visited. News 360 includes recent news events as context for the response. For instance, if there's breaking news about a scientific discovery, the artificial entity could incorporate that information into its responses when discussing related topics. Conversation subject 362 involves incorporating the ongoing topic of conversation into the response. For example, if the discussion is about space exploration, the artificial entity's responses would be tailored to that subject, drawing from relevant knowledge and terminology. Finally, communication medium 364 relates to incorporating the platform or medium through which communication is taking place as context. For example, if the reference individual is speaking over the phone, the artificial entity's responses may be shorter and more concise than if the individual is communicating via a personal computer or in virtual environment.

Figure 2:
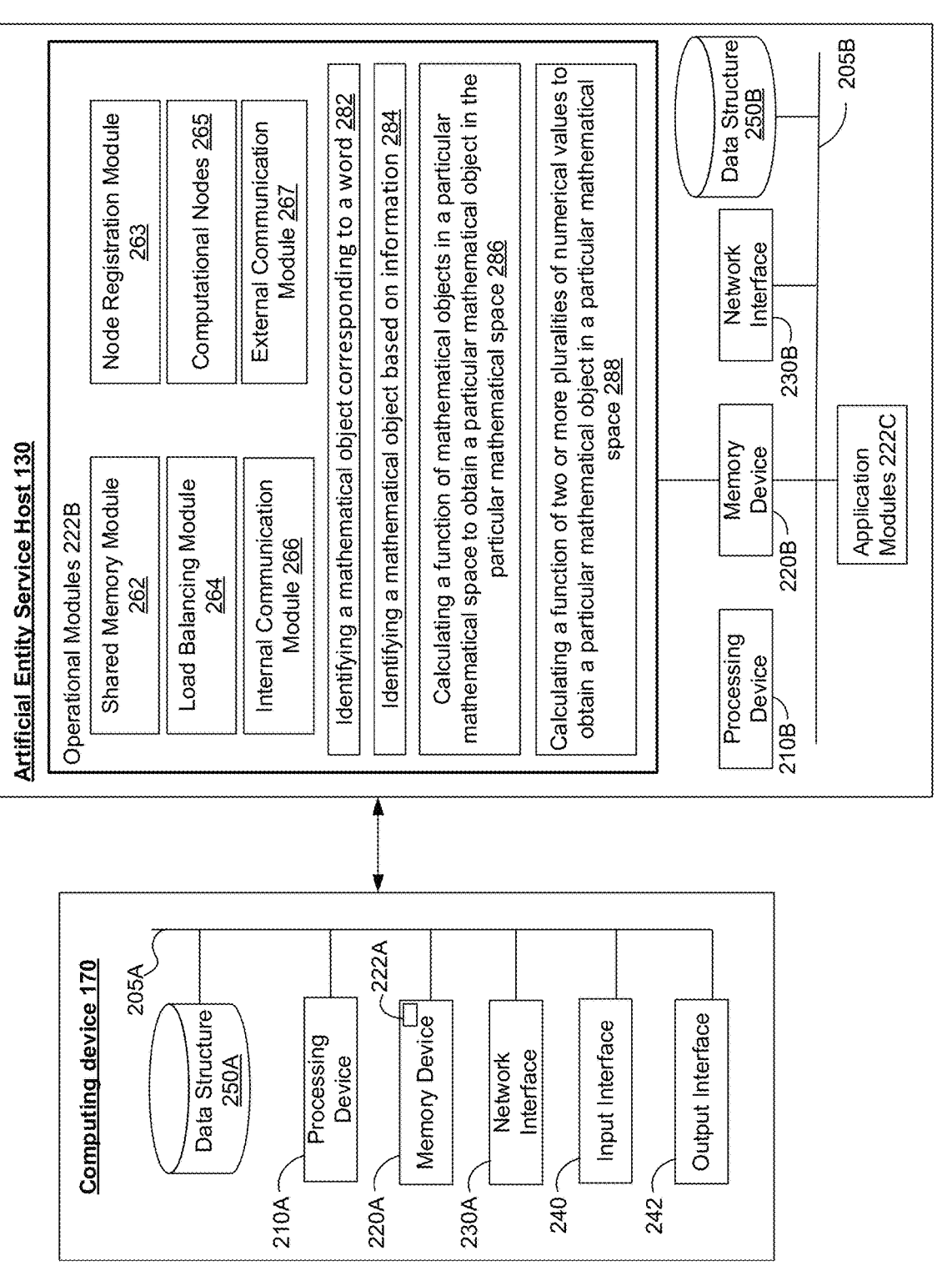
FIG. 2 is a block diagram of an exemplary computing device and exemplary server, consistent with some embodiments of the present disclosure.

FIG. 2 is a block diagram of an exemplary computing device 170 and artificial entity service host 130 that are used for generating and operating artificial entities consistent with some embodiments. Computing device 170 may include a bus 205A (or other communication mechanism) interconnecting subsystems and components for transferring information within computing device 170. For example, bus 205A may interconnect a processing device 210A, a memory device 220A including a memory portion 222A, a network interface 230A, an input interface 240, and a data structure 250A. Artificial entity service host 130 may include a bus 205B (or other communication mechanism) interconnecting subsystems and components for transferring information within artificial entity service host 130. For example, bus 205B may interconnect a processing device

210B, a memory device 220B including a memory portion 222B and application modules 222C, a network interface 230B, and a data structure 250B.

In some embodiments, a processing device 210 (e.g., processing device 210A and processing device 210B) may include at least one processor configured to execute computer programs, applications, methods, processes, or other software to perform embodiments described in the present disclosure. A processing device may be at least one processor, as defined earlier, which may, for example, include a microprocessor such as one manufactured by Intel™. For example, the processing device may include a single core or multiple core processors executing parallel processes simultaneously. In one example, the processing device may be a single core processor configured with virtual processing technologies. The processing device may implement virtual machine technologies or other technologies to provide the ability to execute, control, run, manipulate, store, etc., multiple software processes, applications, programs, etc. In another example, the processing device may include a multiple-core processor arrangement (e.g., dual, quad core, etc.) configured to provide parallel processing functionalities to allow a device associated with the processing device to execute multiple processes simultaneously. It is appreciated that other types of processor arrangements could be implemented to provide the capabilities disclosed herein.

In some embodiments, a memory device 220 (e.g., memory device 220A and memory device 220B) may include memory as describe previously. A memory portion 222 that may contain instructions that when executed by processing device 210, perform one or more of the methods described in more detail herein. A memory device 220 may be further used as a working scratch pad for processing device 210, a temporary storage, and others, as the case may be. Memory device 220 may be a volatile memory such as, but not limited to, random access memory (RAM), or non-volatile memory (NVM), such as, but not limited to, flash memory. Processing device 210 and/or memory device 220 may also include machine-readable media for storing software. The term "software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

In some embodiments, a network interface 230 (e.g., network interface 230A and network interface 230B) may be used for providing connectivity between the different components of system 150. Network interface 230 may provide two-way data communications to a network, such as communications network. In one embodiment, network interface 230 may include an Integrated Services Digital Network (ISDN) card, cellular modem, satellite modem, or a modem to provide a data communication connection over the Internet. As another example, network interface 230 may include a Wireless Local Area Network (WLAN) card. In another embodiment, network interface 230 may include an Ethernet port connected to radio frequency receivers and transmitters and/or optical (e.g., infrared) receivers and transmitters. The specific design and implementation of network interface 230 may depend on the communications network or networks over which computing device 170 is intended to operate. For example, in some embodiments, computing device 170 may include network interface 230 designed to operate over a GSM network, a GPRS network, an EDGE network, a Wi-Fi or WiMAX network, and a Bluetooth network. In any such implementation, network interface 230 may be configured to send and receive electrical, electromagnetic, or optical signals that carry digital data streams or digital signals representing various types of information. In some embodiments, an input interface 240 may be used by computing device 170 to receive input from a variety of input devices, for example, a keyboard, a mouse, a touch pad, a touch screen, one or more buttons, a joystick, a microphone, an image sensor, and any other device configured to detect physical or virtual input. The received input may be in the form of at least one of: text, sounds, speech, hand gestures, body gestures, tactile information, and any other type of physically or virtually input generated by the user. Consistent with one embodiment, input interface 240 may be an integrated circuit that may act as a bridge between processing device 210 and any of the input devices listed above.

In some embodiments, a data structure 250 (e.g., data structure 250A and data structure 250B) may be used for the purpose of storing single data type column-oriented data structures, data elements associated with the data structures, or any other data structures. The terms data structure and database, consistent with the present disclosure, may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, entity-relationship model, a graph, a hypergraph, a matrix, a tensor, and so forth. The data in the data structure may be stored in contiguous or non-contiguous memory. Moreover, a data structure does not require information to be co-located. In some examples, the data stored in data structure 250 may include an accessibility profile associated with one or more website users. While illustrated in FIG. 2 as a single device, it is to be understood that data structure 250A or data structure 250B may include multiple devices either collocated or distributed.

In addition, as illustrated in FIG. 2, memory portion 222B may contain software modules to execute processes consistent with the present disclosure. In particular, memory device 220B may include a shared memory module 262, a node registration module 263, a load balancing module 264, one or more computational nodes 265, an internal communication module 266, an external communication module 267, and a database access module (not shown). Modules 262-288 may contain software instructions for execution by at least one processor (e.g., processing device 210B) associated with server 133. Shared memory module 262, node registration module 263, load balancing module 264, computational node 265, and external communication module 267 may cooperate to perform various operations consistent with the present disclosure.

Shared memory module 262 may allow information sharing between artificial entity service host 130 and other components of system 150. In some embodiments, shared memory module 262 may be configured to enable processing device to access, retrieve, and store data. For example, using shared memory module 262, processing device 210B may perform at least one of: executing software programs stored on memory device 220B, data structure 250A, or data structure 250B; storing information in memory device 220B, data structure 250A, or data structure 250B; or retrieving information from memory device 220B, data structure 250A, or data structure 250B.

Node registration module 263 may be configured to track the availability of one or more computational nodes 265. In some examples, node registration module 263 may be implemented as: a software program, such as a software program executed by one or more computational nodes 265, a hardware solution, or a combined software and hardware solution. In some implementations, node registration module 263 may communicate with one or more computational nodes 265, for example, using internal communication module 266. In some examples, one or more computational nodes 265 may notify node registration module 263 of their status, for example, by sending messages: at startup, at shutdown, at constant intervals, at selected times, in response to queries received from node registration module 263, or at any other determined times. In some examples, node registration module 263 may query about the status of one or more computational nodes 265, for example, by sending messages: at startup, at constant intervals, at selected times, or at any other determined times.

Load balancing module 264 may be configured to divide the workload among one or more computational nodes 265. In some examples, load balancing module 264 may be implemented as: a software program, such as a software program executed by one or more of the computational nodes 265, a hardware solution, or a combined software and hardware solution. In some implementations, load balancing module 264 may interact with node registration module 263 in order to obtain information regarding the availability of one or more computational nodes 265. In some implementations, load balancing module 264 may communicate with one or more computational nodes 265, for example, using internal communication module 266. In some examples, one or more computational nodes 265 may notify load balancing module 264 of their status, for example, by sending messages: at startup, at shutdown, at constant intervals, at selected times, in response to queries received from load balancing module 264, or at any other determined times. In some examples, load balancing module 264 may query about the status of one or more computational nodes 265, for example, by sending messages: at startup, at constant intervals, at pre-selected times, or at any other determined times.

Internal communication module 266 may be configured to receive and/or to transmit information from one or more components of remote server 133. For example, control signals and/or synchronization signals may be sent and/or received through internal communication module 266. In one embodiment, input information for computer programs, output information of computer programs, and/or intermediate information of computer programs may be sent and/or received through internal communication module 266. In another embodiment, information received though internal communication module 266 may be stored in memory device 220B, in data structure 250B, or other memory device in system 150. For example, information retrieved from data structure 212A may be transmitted using internal communication module 266. In another example, input data may be received using internal communication module 266 and stored in data structure 212B.

External communication module 267 may be configured to receive and/or to transmit information from one or more components of system 150. For example, control signals may be sent and/or received through external communication module 267. In one embodiment, information received through external communication module 267 may be stored in memory device 220B, in data structures 250A and 250B, and on any memory device in the system 150. In another embodiment, information retrieved from data structure 250B may be transmitted using external communication module 267 to computing device 170.

In some examples, module 282 may comprise identifying a mathematical object in a particular mathematical space. The mathematical object may correspond to and/or be determined based on a specific word. In one example, the mathematical object may be determined based on the specific word. For example, a function or an injective function mapping words to mathematical object in the particular mathematical space may be used based on the specific word to obtain the mathematical object corresponding to the specific word. For example, a word2vec or a Global Vectors for Word Representation (GloVe) algorithm may be used to obtain the function. In another example, a word embedding algorithm may be used to obtain the function.

In some examples, module 284 may comprise identifying a mathematical object in a particular mathematical space based on particular information. For example, the particular information may be or include a word, and module 284 may use module 282 to identify the mathematical object based on the word. In another example, the particular information may be or include the mathematical object, and module 284 may simply access the particular information to obtain the mathematical object. In yet another example, the particular information may be or include a numerical value, and module 284 may calculate a function of the numerical value to obtain the mathematical object. Some non-limiting examples of such function may include a linear function, a non-linear function, a polynomial function, an exponential function, a logarithmic function, a continuous function, a discontinuous function, and so forth. In some examples, the particular information may be or include at least one sentence in a natural language, and module 284 may use a text embedding algorithm to obtain the mathematical object. In some examples, module 284 may use a machine learning model to analyze the particular information to determine the mathematical object. The machine learning model may be a machine learning model trained using training examples to determine mathematical objects based on information. An example of such training example may include sample information, together with a label indicative of a mathematical object.

In some examples, module 286 may comprise calculating a function of two mathematical objects in a particular mathematical space to obtain a particular mathematical object in the particular mathematical space. In one example, module 286 may comprise calculating a function of a plurality of mathematical objects (such as two mathematical objects, three mathematical objects, four mathematical objects, more than four mathematical objects, etc.) in a particular mathematical space to obtain a particular mathematical object in the particular mathematical space. In one example, module 286 may comprise calculating a function of at least one mathematical object (such as a single mathematical object, two mathematical objects, three mathematical objects, four mathematical objects, more than four mathematical objects, etc.) in a particular mathematical space and/or at least one numerical value (such as a single numerical value, two numerical values, three numerical values, four numerical values, more than four numerical values, etc.) to obtain a particular mathematical object in the particular mathematical space. In one example, the particular mathematical object may correspond to a particular word. Some non-limiting examples of such function may include a linear function, a non-linear function, a polynomial function, an exponential function, a logarithmic function, a continuous function, a discontinuous function, and so forth. In one example, the particular word may be determined based on the particular mathematical object. For example, the injective function described in relation to module 282 may be used to determine the particular word corresponding to the particular mathematical object.

In some examples, module 288 may comprise calculating a function of two or more pluralities of numerical values to obtain a particular mathematical object in a particular mathematical space. The particular mathematical object may correspond to a particular word. Some non-limiting examples of such function may include a linear function, a non-linear function, a polynomial function, an exponential function, a logarithmic function, a continuous function, a discontinuous function, and so forth. In one example, the particular word may be determined based on the particular mathematical object. For example, the injective function described in relation to module 282 may be used to determine the particular word corresponding to the particular mathematical object.

In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recurrent neural network algorithms, linear machine learning models, non-linear machine learning models, ensemble algorithms, and so forth. For example, a trained machine learning algorithm may comprise an inference model, such as a predictive model, a classification model, a data regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters may be set manually by a person or automatically by an process external to the machine learning algorithm (such as a hyper parameter search algorithm), and the parameters of the machine learning algorithm may be set by the machine learning algorithm based on the training examples. In some implementations, the hyper-parameters may be set based on the training examples and the validation examples, and the parameters may be set based on the training examples and the selected hyper-parameters. For example, given the hyper-parameters, the parameters may be conditionally independent of the validation examples.

In some embodiments, trained machine learning algorithms (also referred to as machine learning models and trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value corresponding to the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value corresponding to an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs, for example in the cases described below. Some non-limiting examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the an artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, generative models may be configured to generate new content, such as textual content, visual content, auditory content, graphical content, and so forth. In some examples, generative models may generate new content without input. In other examples, generative models may generate new content based on an input. In one example, the new content may be fully determined from the input, where every usage of the generative model with the same input will produce the same new content. In another example, the new content may be associated with the input but not fully determined from the input, where every usage of the generative model with the same input may product a different new content that is associated with the input. In some examples, a generative model may be a result of training a machine learning generative algorithm with training examples. An example of such training example may include a sample input, together with a sample content associated with the sample input. Some non-limiting examples of such generative models may include Deep Generative Model (DGM), Generative Adversarial Network model (GAN), auto-regressive model, Variational AutoEncoder (VAE), transformers based generative model, artificial neural networks based generative model, hard-coded generative model, and so forth.

A Large Language Model (LLM) is a generative language model with a large number of parameters (usually billions or more) trained on large corpus of unlabeled data (usually trillions of words or more) in a self-supervised learning scheme and/or a semi-supervised learning scheme. While models trained using a supervised learning scheme with label data are fitted to the specific tasks they were trained for, LLM can handle wide range of tasks that the model was never specifically trained for, including ill-defined tasks. It is common to provide LLM with instructions in natural language, sometimes referred to as prompts. For example, to cause a LLM to count the number of people that objected to a proposed plan in a meeting, one might use the following prompt, 'Please read the meeting minutes, please identify those who objected to the plan proposed by Mr. Smith at the beginning of the meeting.

Please list their names, and count them.' Further, after receiving a response from the LLM, it is common to refine the task or to provide subsequent tasks in natural language. For example, 'Also count for each of these speakers the number of words said', 'Of these speakers, could you please identify who is the leader?' or 'Please summarize the main objections'. LLM may generate textual outputs in natural language, or in a desired structured format, such as a table or a formal language (such as a programming language, a digital file format, and so forth). In many cases, a LLM may be part of a multimodal model (or a foundation model), also referred to as multimodal LLM, allowing the model to analyze both textual inputs as well as other kind of inputs (such as images, videos, audio, sensor data, telemetries, and so forth) and/or to generate both textual outputs as well as other kinds of outputs (such as images, videos, audio, telemetries, and so forth).

Some non-limiting examples of audio data may include audio recordings, audio stream, audio data that includes speech, audio data that includes music, audio data that includes ambient noise, digital audio data, analog audio data, digital audio signals, analog audio signals, mono audio data, stereo audio data, surround audio data, audio data captured using at least one audio sensor, audio data generated artificially, and so forth. In one example, audio data may be generated artificially from textual content, for example using text-to-speech algorithms. In another example, audio data may be generated using a generative machine learning model. In some embodiments, analyzing audio data (for example, by the methods, steps and modules described herein) may comprise analyzing the audio data to obtain a preprocessed audio data, and subsequently analyzing the audio data and/or the preprocessed audio data to obtain the desired outcome. One of ordinary skill in the art will recognize that the followings are examples, and that the audio data may be preprocessed using other kinds of preprocessing methods. In some examples, the audio data may be preprocessed by transforming the audio data using a transformation function to obtain a transformed audio data, and the preprocessed audio data may comprise the transformed audio data. For example, the transformation function may comprise a multiplication of a vectored time series representation of the audio data with a transformation matrix. For example, the transformation function may comprise convolutions, audio filters (such as low-pass filters, high-pass filters, band-pass filters, all-pass filters, etc.), linear functions, nonlinear functions, and so forth. In some examples, the audio data may be preprocessed by smoothing the audio data, for example using Gaussian convolution, using a median filter, and so forth. In some examples, the audio data may be preprocessed to obtain a different representation of the audio data. For example, the preprocessed audio data may comprise: a representation of at least part of the audio data in a frequency domain; a Discrete Fourier Transform of at least part of the audio data; a Discrete Wavelet Transform of at least part of the audio data; a time/frequency representation of at least part of the audio data; a spectrogram of at least part of the audio data; a log spectrogram of at least part of the audio data; a Mel-Frequency Spectrum of at least part of the audio data; a sonogram of at least part of the audio data; a periodogram of at least part of the audio data; a representation of at least part of the audio data in a lower dimension; a lossy representation of at least part of the audio data; a lossless representation of at least part of the audio data; a time order series of any of the above; any combination of the above; and so forth. In some examples, the audio data may be preprocessed to extract audio features from the audio data. Some non-limiting examples of such audio features may include: auto-correlation; number of zero crossings of the audio signal; number of zero crossings of the audio signal centroid; MP3 based features; rhythm patterns; rhythm histograms; spectral features, such as spectral centroid, spectral spread, spectral skewness, spectral kurtosis, spectral slope, spectral decrease, spectral roll-off, spectral variation, etc.; harmonic features, such as fundamental frequency, noisiness, anharmonicity, harmonic spectral deviation, harmonic spectral variation, tristimulus, etc.; statistical spectrum descriptors; wavelet features; higher level features; perceptual features, such as total loudness, specific loudness, relative specific loudness, sharpness, spread, etc.; energy features, such as total energy, harmonic part energy, noise part energy, etc.; temporal features; and so forth. In some examples, analyzing the audio data may include calculating at least one convolution of at least a portion of the audio data, and using the calculated at least one convolution to calculate at least one resulting value and/or to make determinations, identifications, recognitions, classifications, and so forth.

In some embodiments, analyzing audio data (for example, by the methods, steps and modules described herein) may comprise analyzing the audio data and/or the preprocessed audio data using one or more rules, functions, procedures, artificial neural networks, speech recognition algorithms, speaker recognition algorithms, speaker diarization algorithms, audio segmentation algorithms, noise cancelling algorithms, source separation algorithms, inference models, and so forth. Some non-limiting examples of such inference models may include: an inference model preprogrammed manually; a classification model; a data regression model; a result of training algorithms, such as machine learning algorithms and/or deep learning algorithms, on training examples, where the training examples may include examples of data instances, and in some cases, a data instance may be labeled with a corresponding desired label and/or result; and so forth.

Some non-limiting examples of image data may include one or more images, grayscale images, color images, series of images, 2D images, 3D images, videos, 2D videos, 3D videos, frames, footages, or data derived from other image data. In some embodiments, analyzing image data (for example by the methods, steps and modules described herein) may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

In some embodiments, analyzing image data (for example by the methods, steps and modules described herein) may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth. In some embodiments, analyzing image data (for example by the methods, steps and modules described herein) may comprise analyzing pixels, voxels, point cloud, range data, etc. included in the image data.

A convolution may include a convolution of any dimension. A one-dimensional convolution is a function that transforms an original sequence of numbers to a transformed sequence of numbers. The one-dimensional convolution may be defined by a sequence of scalars. Each particular value in the transformed sequence of numbers may be determined by calculating a linear combination of values in a subsequence of the original sequence of numbers corresponding to the particular value. A result value of a calculated convolution may include any value in the transformed sequence of numbers. Likewise, an n-dimensional convolution is a function that transforms an original n-dimensional array to a transformed array. The n-dimensional convolution may be defined by an n-dimensional array of scalars (known as the kernel of the n-dimensional convolution). Each particular value in the transformed array may be determined by calculating a linear combination of values in an n-dimensional region of the original array corresponding to the particular value. A result value of a calculated convolution may include any value in the transformed array. In some examples, an image may comprise one or more components (such as color components, depth component, etc.), and each component may include a two dimensional array of pixel values. In one example, calculating a convolution of an image may include calculating a two dimensional convolution on one or more components of the image. In another example, calculating a convolution of an image may include stacking arrays from different components to create a three dimensional array, and calculating a three dimensional convolution on the resulting three dimensional array. In some examples, a video may comprise one or more components (such as color components, depth component, etc.), and each component may include a three dimensional array of pixel values (with two spatial axes and one temporal axis). In one example, calculating a convolution of a video may include calculating a three dimensional convolution on one or more components of the video. In another example, calculating a convolution of a video may include stacking arrays from different components to create a four dimensional array, and calculating a four dimensional convolution on the resulting four dimensional array. In some examples, audio data may comprise one or more channels, and each channel may include a stream or a one-dimensional array of values. In one example, calculating a convolution of audio data may include calculating a one dimensional convolution on one or more channels of the audio data. In another example, calculating a convolution of audio data may include stacking arrays from different channels to create a two dimensional array, and calculating a two dimensional convolution on the resulting two dimensional array.

Some non-limiting examples of a mathematical object in a mathematical space may include a mathematical point in the mathematical space, a group of mathematical points in the mathematical space (such as a region, a manifold, a mathematical subspace, etc.), a mathematical shape in the mathematical space, a numerical value, a vector, a matrix, a tensor, a function, and so forth. Another non-limiting example of a mathematical object is a vector, wherein the dimension of the vector may be at least two (for example, exactly two, exactly three, more than three, and so forth). Some non-limiting examples of a phrase may include a phrase of at least two words, a phrase of at least three words, a phrase of at least five words, a phrase of more than ten words, and so forth.

Aspects of this disclosure may provide a technical solution to the challenging technical problem of providing accessible experiences to web users with disabilities. The technical solution may be implemented in hardware, in software (including in one or more signal processing and/or application specific integrated circuits), in firmware, or in any combination thereof, executable by one or more processors, alone, or in various combinations with each other. Specifically, disclosed embodiments include methods, systems, devices, and computer-readable media. For ease of discussion, system 150 is described above, however, a personal skilled in the art would recognize that the disclosed details may equally apply to methods, devices, and computer-readable media. Specifically, some aspects of disclosed embodiments may be implemented as operations or program codes in a non-transitory computer-readable medium. The operations or program codes can be executed by at least one processor. Non-transitory computer-readable media, as described herein, may be implemented as any combination of hardware, firmware, software, or any medium capable of storing data that is readable by any computing device with a processor for performing methods or operations represented by the stored data. In the broadest sense, the example methods are not limited to particular physical or electronic instrumentalities, but rather may be accomplished using many differing instrumentalities. In some embodiments, the disclosed methods may be implemented by processing device 210 of computing device 170, server 133, and/or server 133. In other embodiments, the non-transitory computer-readable medium may be implemented as part the memory portion 222 of memory device 220 that may contain the instructions to be executed by processing device 210. The instructions may cause processing device 210 corresponding to the at least one processor to perform operations consistent with the disclosed embodiments.

Figure 3B:
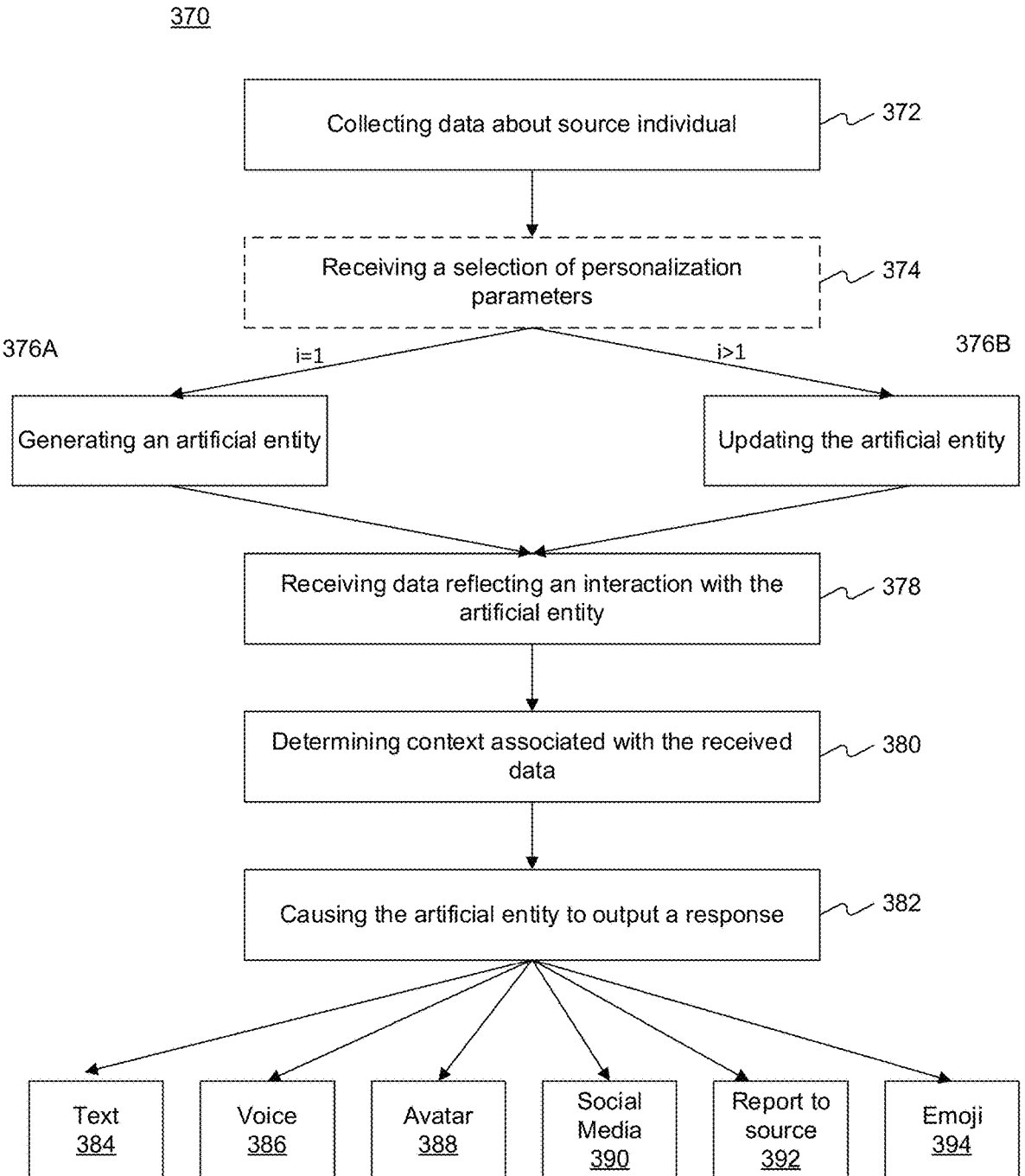
FIG. 3B is a flowchart of an example process for generating and operating artificial entities, consistent with some embodiments of the present disclosure.

FIG. 3B is a flowchart of an exemplary process 370 for generating and operating artificial entities, according to some embodiments of the present disclosure. In some embodiments, the process may be executed by different components of system 150. For example, some steps of process 370 may be implemented by a processing device within artificial entity service host 130 and/or a processing device within computing device 170. For purposes of illustration, in the following description, reference is made to certain components of system 150. It will be appreciated, however, that other implementations are possible and that any combination of components or devices may be utilized to implement the steps of the exemplary process. It will also be readily appreciated that the illustrated process can be altered to modify the order of steps, delete steps, or further include additional steps, such as steps directed to optional embodiments.

Process 370 begins when the processing device 210 collects data about the source individual 100 (step 372), such as input data 102. After collecting the data, the processing device 210 may receive a selection of personalization parameters (optional step 374). This selection enables better customization of the artificial entity. If this is the first time, the processing device 210 generates the artificial entity 110 (step 376A) based on the collected data and the received personalization parameters. If it is not the first time, the processing device 210 updates the artificial entity 110 (step 376B) using the collected data and the received personalization parameters. Thereafter, the processing device 210 may receive data reflecting an interaction with the artificial entity (step 378). Examples of the received data include text input: providing a prompt or a question is one of the simplest triggers, prompting the artificial entity to generate a response based on the text input it receives. Keywords and phrases: the artificial entity can be programmed to respond when specific keywords or phrases are detected in the input, making responses more relevant to the context provided by the user. User commands: explicit commands like "tell me," "explain," or "define" can trigger the artificial entity to generate informative responses, indicating that the user is seeking specific information. Questions: asking a question, especially one that ends with a question mark, often prompts the artificial entity to provide an answer, engaging it in a conversational mode. Direct address: addressing the artificial entity directly, like starting a sentence with "hello," signals the artificial entity to pay attention and respond to the user's input. Emotional context: emotional keywords or phrases like "happy," "sad," "excited," etc., prompt the artificial entity to generate responses that match the emotional tone. Contextual prompts: referring to previous parts of the conversation or using context to trigger a response creates a coherent and contextually relevant conversation. Specific topics: mentioning a specific topic, field, or subject triggers the artificial entity to provide information or engage in a conversation related to that topic. User intent: analyzing the user's intent based on the input triggers tailored responses. For instance, if the artificial entity detects that the user is looking for recommendations, it generates suggestions. Multi-turn conversation: engaging in a back-and-forth conversation prompts the artificial entity to continue generating responses in a conversational manner. Structured queries: inputting structured queries, such as database-like commands, triggers the artificial entity to retrieve specific information based on the query. Sentiment analysis: the artificial entity detects the sentiment of the user's input and generates responses that match the emotional tone detected. Language style: if the user employs a specific language style (e.g., formal, informal, technical), the artificial entity adjusts its responses accordingly. Time and date references: mentioning specific times, dates, or time-related queries triggers responses related to scheduling, events, or historical information. Requests for assistance: if the user seeks help, advice, or assistance, the artificial entity generates responses to fulfill these requests.

Upon receiving data reflecting an interaction with the artificial entity, process 370 may continue when processing device 210 determine context associated with the received data (step 380). For example, context 112 may be determined from the received data. Thereafter, processing device 210 may cause artificial entity 110 to output a response (step 382). Example types of response may include text 384, voice 386, avatar reaction 388, social media 390, reports to source individual 392, emoji 394.

The following detailed description provides a comprehensive explanation of a system and method for creating and managing an artificial entity associated with an individual. In one example, the artificial entity may be a digital clone, which is a replicated version of a person's digital data and characteristics, which can represent a person that is alive or deceased. The digital clone is capable of learning behavior patterns, fields of interest, relationships, speech attributes, and other characteristics of the source individual from various data sources and using this information to generate text, update its profile, and interact with users in a manner that mimics the source individual.

In one aspect of the disclosure, methods, systems, and software are provided for using artificial entities as representative of source individuals in their absence. The operations include receiving information associated with the source individual, generating an artificial entity to act as a surrogate for the source individual, receiving a query from a reference individual addressed to the artificial entity, anticipating how the source individual would answer the query, and causing the artificial entity to output a response to the query using the anticipated manner. The system can anticipate the manner based on an analysis of the received information, including speech patterns, audio or video recordings, and context associated with the query.

The system can also determine a timeline of the source individual, access a legacy letter created by the source individual, receive feedback from relatives of a deceased source individual, and update settings of the artificial entity based on the feedback. Additionally, the system can determine a replicated persona of the source individual, analyze a reaction of the reference individual to the response to the query, and update the artificial entity based on the reaction and associated closeness weights for the reference individual. The system can be used to provide responses to queries when the source individual is away, deceased, or otherwise unavailable.

Figure 4:
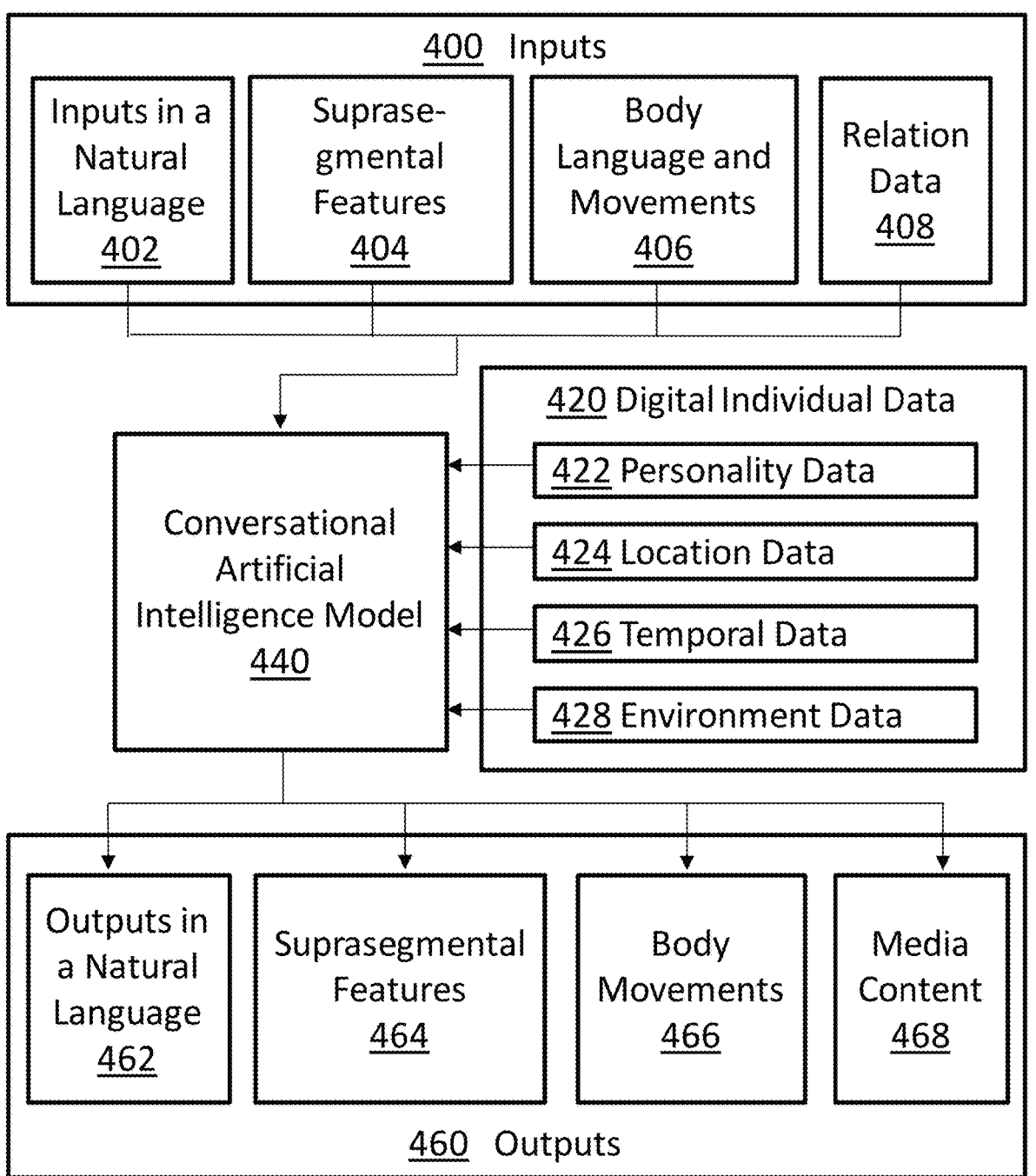
FIG. 4 is a block diagram illustrating some possible flows of information, consistent with some embodiments of the present disclosure.

FIG. 4 is a block diagram illustrating some possible flows of information, consistent with some embodiments of the present disclosure. In this example, inputs 400 may comprise at least one of inputs in a natural language 402, suprasegmental features 404, body language and/or body movements 406, or relation data 408. In other examples, inputs 400 may include other type of information. In one example, inputs 400 or any of its components may comprise information encoded in a digital format and/or in a digital signal. In some examples, input in a natural language 402 may be received using or as described in relation to step 604, step 612, step 1004, step 1404, and/or step 1804. In one example, input in a natural language 402 may be received from a character (such as the first character of step 602 and/or step 604, the second character of step 610 and/or step 612, a different character, and so forth) and/or from an entity (such as the entity of step 1004 and/or step 1404 and/or step 1804, a different entity, and so forth). In one example, the input in a natural language 402 may be a textual input in the natural language. In another example, the input in a natural language 402 may be an audible verbal input in the natural language. In one example, receiving the input in a natural language 402 may comprise reading the input from memory, may comprise receiving the input from an external computing device (for example, using a digital communication device), may comprise capturing the input (for example, using speech recognition, using a microphone, using an audio sensor, etc.), may comprise receiving the input from the character and/or the entity (for example, using a user interface, using a keyboard, using speech recognition, using a microphone, using an audio sensor, etc.), and so forth. In one example, the input in a natural language 402 may be included in audio data (for example, the audio data may be received by step 1404, the audio data received by step 1804, different audio data, and so forth). In one example, receiving the audio data may comprise reading the audio data from memory, may comprise receiving the audio data from an external computing device (for example, using a digital communication device), may comprise capturing the audio data (for example, using a microphone, using an audio sensor, etc.), may comprise receiving the audio data from the entity, and so forth. In some examples, suprasegmental features 404 may be suprasegmental features associated with at least part of audio data. In one example, different groups of suprasegmental features of suprasegmental features 404 may be associated with different parts of the audio data, for example as described below in relation to step 1404. In some examples, receiving an indication of suprasegmental features 404 may comprise reading the indication from memory, may comprise receiving the indication from an external computing device (for example, using a digital communication device), may comprise determining the indication by analyzing audio data (for example, as described below in relation to step 1404), may comprise receiving the indication from the character and/or the entity (for example, using a user interface, using a keyboard, using audio analysis, using a microphone, using an audio sensor, etc.), and so forth. For example, audio data (such as audio data including the input in a natural language 402, a different audio data, etc.) may be analyzed using Natural Language Processing (NLP) to determine the suprasegmental features 404. In one example, suprasegmental features 404 may be or include at least one of intonation, stress, pitch, rhythm, tempo, loudness or prosody. In some examples, body language and/or body movements 406 may be associated with a body associated with the character and/or the entity associated with the inputs in natural language 402 and/or suprasegmental features 404. For example, the body may be a physical body, such as a robot, a humanoid robot, a non-humanoid robot, a unipedal robot, a bipedal robot, a tripedal robot, a quadruped robot, a pentapedal robot, a hexapod robot, a robot with more than six legs, and so forth. In another example, the body may be a virtual body. In one example, the body language and/or the body movement 406 may be associated with a portion of the body (for example, affecting at least the portion, or limited to the portion). For example, such portion may include a hand, arm, head, face, torso, leg, a portion of any of the above, or a combination of any of the above. In some examples, the body language and/or body movements 406 may be depicted in image data (for example, in the image data received by step 1805, in different image data). In one example, the image data may be analyzed to detect and/or identify the body language and/or the body movements and/or the portion, for example using visual pose recognition algorithms or using visual motion detection algorithms. In one example, receiving an indication of the body language and/or the body movements 406 may comprise reading the indication from memory, may comprise receiving the indication from an external computing device (for example, using a digital communication device), may comprise determining the indication by analyzing image data (for example, as described below in relation to step 1804), may comprise receiving the indication from the character and/or the entity (for example, using a user interface, using a keyboard, using audio analysis, using a microphone, using an audio sensor, etc.), and so forth. In one example, body language and/or body movements 406 may be concurrent with at least part of the input in a natural language 402 and/or a usage of the at least part of the suprasegmental features 404. In another example, body language and/or body movements 406 may be non-simultaneous with the input in a natural language 402 and/or the usage of suprasegmental features 404. In one example, body language and/or body movements 406 may be associated with at least one of a gesture, a facial expression change, a posture change, a limb movement, a head movement or an eye movement. In one example, body language and/or body movements 406 may convey at least one of a positive reaction, negative reaction, engagement, show of interest, agreement, respect, disagreement, skepticism, disinterest, boredom, discomfort, uncertainty, confusion or neutrality. In one example, body movements 406 may indicate at least one of a direction, a physical object, a virtual object or a motion pattern. In one example, body movements 406 may include a plurality of sub-movements. For example, two sub-movements may occur at least partly simultaneously. In another example, two sub-movements may be non-simultaneous. In some examples, relation data 408 may be associated with a relation between a digital character and another character, or with a relation between two entities. For example, relation data 408 may be or include the digital data record associated with a relation between a digital character and another character described below. For example, relation data 408 may be or include the first digital data record accessed by step 602 and/or the second digital data record accessed by step 610. In one example, relation data 408 may be associated with a relation between, on one side, a character or an entity associated with at least one of 402, 404, or 406 (for example, a character or an entity producing at least one of 402, 404, or 406), and from the other side, a character, an entity or a personality associated with conversational artificial intelligence model 440 (such as the specific digital character of step 602 and/or step 610, the personality of step 1002, personality 422, and so forth). For example, each such character or entity may be a human individual, may be a digital character, may be a digital fictional character, and so forth.

In some examples, digital individual data 420 may comprise at least one of personality data 422, location data 424, temporal data 426, or environment data 428. In some examples, personality data 422 may be or include the digital data record accessed by step 1002. In one example, personality data 422 may be associated with a human individual, such as biographical information, biometric information, health information, demographical information, contact information, financial information, employment information, educational information, personal preferences, personal traits, information based on digital footprint, social information (such as a social graph, information related to social connections, information related to social interactions, etc.), information based on historic conversations involving the human individual, information based on historic behavior pattern associated with the human individual, and so forth. For example, outputs 460 may be associated with an attempt to imitate or clone the human individual, may be an artificial intelligence agent of the human individual, and so forth. In another example, personality data 422 may be not be associated with any human individual, and/or outputs 460 may not be associated with such attempt. In yet another example, personality data 422 may be associated with an artificial persona. In an additional example, personality data 422 may be associated with a fictional persona. In yet another example, personality data 422 may be associated with a character or an entity. In an additional example, personality data 422 may be associated with a conversational artificial intelligence model, or usage of a conversational artificial intelligence model. In one example, personality data 422 may include information associated with a persona, such as biographical information, biometric information, health information, demographical information, contact information, financial information, employment information, educational information, personal preferences, personal traits, social information (such as a social graph, information related to social connections, information related to social interactions, etc.), information based on historic conversations involving the persona, information based on historic behavior pattern associated with the persona, and so forth. In some examples, location data 424 may be or include data (for example, digital data) associated with or indicative of a spatial location and/or a spatial orientation, for example of a character or an entity or a persona associated with a conversational artificial intelligence model. In one example, the spatial location and/or the spatial orientation may be spatial location and/or spatial orientation at a specific time frame. For example, the time frame may be associated with a communication and/or an interaction with the character or the entity or the persona, for example with an action of the character or the entity or the persona (such as producing speech, moving, etc.), with an action (such as an articular or a utterance, a movement, etc.) directed at the character or the entity or the persona, and so forth. In one example, location data 424 may be or include at least one of coordinates in a coordinates system, a direction in a coordinates system, an absolute location, an absolute direction, a relative location relative to another object (for example, a part of a body of a person, an animate object, an inanimate object, etc.), a relative orientation relative to another object (for example, a part of a body of a person, an animate object, an inanimate object, etc.), a physical location, a spatial orientation in a physical environment, a location in a virtual environment, a spatial orientation in a virtual environment, and so forth. In one example, location data 424 may be (or may be based on) data captured using at least one sensor. Some non-limiting examples of such sensor may include at least one of a location data, a movement sensor, an acceleration sensor, and so forth (such as a GPS sensor, an indoor location sensor, an accelerometer, a gyroscope, an image sensor with an ego-motion algorithm and/or an ego-localization algorithm, and so forth). In one example, location data 424 may be associated with at least one of an exact point, a region, a moving location, or a trajectory. In one example, location data 424 may be a semantically defined (such as a room, a building, an address, a category of places, and so forth). In one example, location data 424 may be read from memory, may be received from an external computing device (for example, using a digital communication device), may be determined by analyzing sensor data, may comprise receiving the indication from an individual (for example, using a user interface, using a keyboard, using audio analysis, using a microphone, using an audio sensor, etc.), and so forth. In some examples, temporal data 426 may be or include data (for example, digital data) associated with or indicative of a point in time or a time frame. For example, the point in time or the time frame may be associated with a communication and/or an interaction with the character or the entity or the persona, for example with an action of the character or the entity or the persona (such as producing speech, moving, etc.), with an action (such as an articular or a utterance, a movement, etc.) directed at the character or the entity or the persona, and so forth. In one example, the point in time or the time frame may be specified in a common time system or relative to another event. In one example, the point in time or the time frame may be semantically defined (such as 'when she arrives', 'after dinner', and so forth). In one example, temporal data 426 may be captured using at least one sensor (such as a clock). In one example, temporal data 426 may be read from memory, may be received from an external computing device (for example, using a digital communication device), may be determined by analyzing sensor data, may comprise receiving the indication from an individual (for example, using a user interface, using a keyboard, using audio analysis, using a microphone, using an audio sensor, etc.), and so forth. In some examples, environment data 428 may be or include data (for example, digital data) associated with or indicative of a state of an environment, for example at a specific time frame, for example of objects in the environment at the specific time frame, of events occurring in the environment during the specific time frame, of scenery, of entities (or characters or people) in the environment at the specific time frame, of spatial relations among such objects and/or entities during the specific time frame, of temporal relations among such events during the specific time frame, and so forth. For example, environment data 428 may be associated with an environment defined based on location data 424 and/or during a time-frame defined based on temporal data 426. In one example, environment data 428 may be associated with an environment associated with a communication and/or an interaction with the character or the entity or the persona. In one example, environment data 428 may be indicative of or include a layout or a map of the environment. In one example, environment data 428 may be based on data captured from the environment (for example, may be based on image data captured using an image sensor from the environment, may be based on audio data captured using an audio sensor from the environment, may be based on a 3D structure of at least part of the environment captured using a sensor, and so forth). In one example, environment data 428 may be read from memory, may be received from an external computing device (for example, using a digital communication device), may be determined by analyzing sensor data, may comprise receiving the indication from an individual (for example, using a user interface, using a keyboard, using audio analysis, using a microphone, using an audio sensor, etc.), and so forth.

In some examples, conversational artificial intelligence model 440 may be or include the conversational artificial intelligence model accessed by step 1001. A conversational artificial intelligence model may refer to a computer-implemented system or method designed to engage in human-like dialogue or interactions. Such interactions may encompass both verbal and non-verbal communication. Such models may utilize advanced algorithms, often incorporating machine learning, deep learning techniques, and/or natural language (NLP) algorithms, to understand, interpret, generate, and respond to inputs in a manner that simulates natural human interactions. Such models may be trained on extensive datasets that capture various forms of human communication, enabling it to participate in dynamic interactions across different mediums and contexts. In one example, such conversational artificial intelligence model may be or include an artificial neural network configured to analyze inputs (such as inputs 400) and/or individual data (such as digital individual data 420) to generate outputs (such as outputs 460). In one example, conversational artificial intelligence model 440 may be or include a LLM or a multimodal LLM. For example, conversational artificial intelligence model 440 may use the LLM or the multimodal LLM with a suitable textual prompt, for example as described herein. In one example, conversational artificial intelligence model 440 may be or include a generative model configured to generate outputs 460 (or any of its components) based on inputs 400 (or any of its components) and/or digital individual data 420 (or any of its components).

In some examples, outputs 460 may comprise at least one of outputs in a natural language 462, suprasegmental features 464, body movements 466, or media content 468. In other examples, outputs 460 may include other type of information. In one example, outputs 460 or any of its components may comprise information encoded in a digital format and/or in a digital signal to cause or to enable to cause such output(s). In some examples, outputs in a natural language 462 may include a response to an input (for example, to inputs 400) generated by step 606 and/or step 614 and/or step 1006 and/or step 1406 and/or step 1806. In some examples, outputs in a natural language 462 may be provided by step 608 and/or step 616 and/or step 1008, for example to a digital character or to an entity. In one example, outputs in a natural language 462 may be or include a textual output in the natural language. In another example, outputs in a natural language 462 may be or include an audible speech output in the natural language. In one example, outputs in a natural language 462 may include words and/or non-verbal sounds. In some examples, outputting outputs in a natural language 462 may comprise storing the input in a digital memory, may comprise transmitting the output to an external computing device (for example, using a digital communication device), may comprise generating speech output (for example, using audio speakers, using audio rendering, using text-to-speech algorithms, etc.), may comprise providing the output to the character and/or the entity (for example, using a user interface, using audio speakers, using a display device, etc.), and so forth. The natural language of outputs 462 may be the natural language of inputs 402, may be a different natural language, and so forth. In some examples, suprasegmental features 464 may be suprasegmental features associated with at least part of audio data. In one example, different groups of suprasegmental features of suprasegmental features 464 may be associated with different parts of the audio data, for example as described below. In some examples, suprasegmental features 464 may be determined by step 706 and/or step 714 and/or step 1106 and/or step 1506 and/or step 1906. In some examples, suprasegmental features 464 may be used (for example, when generating audible output, when outputting 462, during communication with a character or an entity, during an interaction with a character or an entity, and so forth), for example using step 708 and/or step 716 and/or step 1108. In one example, suprasegmental features 464 may be or include at least one of intonation, stress, pitch, rhythm, tempo, loudness or prosody. In some examples, body movements 466 may be associated with a body associated with a persona associated with conversational artificial intelligence model 440 and/or with a persona associated with digital individual data 420 and/or body including at least one output device configured to output outputs in a natural language 462, for example using suprasegmental features 464. For example, the body may be a physical body, such as a robot, a humanoid robot, a non-humanoid robot, a unipedal robot, a bipedal robot, a tripedal robot, a quadruped robot, a pentapedal robot, a hexapod robot, a robot with more than six legs, and so forth. In another example, the body may be a virtual body. In one example, body movements 466 may be associated with a portion of the body (for example, affecting at least the portion, or limited to the portion). For example, such portion may include a hand, arm, head, face, torso, leg, a portion of any of the above, or a combination of any of the above. In one example, body movements 466 may be determined by step 906 and/or step 914 and/or step 1306 and/or step 1706 and/or step 2106. In one example, digital signals may be generated, and the generated digital signals may be configured to cause a specific portion of a specific body to undergo body movements 466, for example using step 908 and/or step 916 and/or step 1308. In one example, body movements 466 may be concurrent with at least part of the outputs in a natural language 462 and/or a usage of at least part of the suprasegmental features 464. In another example, body movements 466 may be non-simultaneous with outputs in a natural language 462 and/or a usage of suprasegmental features 464. In one example, body movements 466 may be associated with at least one of a gesture, a facial expression change, a posture change, a limb movement, a head movement or an eye movement. In one example, body movements 466 may convey at least one of a positive reaction, negative reaction, engagement, show of interest, agreement, respect, disagreement, skepticism, disinterest, boredom, discomfort, uncertainty, confusion or neutrality. In one example, body movements 466 may indicate at least one of a direction, a physical object, a virtual object or a motion pattern. In one example, body movements 466 may include a plurality of sub-movements. For example, two sub-movements may occur at least partly simultaneously. In another example, two sub-movements may be non-simultaneous. In some examples, media content 468 may include media contents generated, for example in response to an input (for example, to inputs 400), by step 806 and/or step 814 and/or step 1206 and/or step 1606 and/or 2006. In some examples, media content 468 may be used (for example, when generating audible output, when outputting 462, during communication with a character or an entity, during an interaction with a character or an entity, and so forth), for example using step 808 and/or step 816 and/or step 1208. In one example, media content 468 may include an audio content, for example audio content that includes articulation of outputs in natural language 462, for example based on suprasegmental features 464. In one example, media content 468 may include a visual content (such as an image or a video), for example a visual content depicting a character or a digital avatar saying outputs in natural language 462 and/or performing body movements 466. In one example, outputs 1160 or any or its components may be based on inputs 400 or any of its components and/or on digital individual data 420 or any of its components.

FIG. 5 is a flowchart of an exemplary process 500 for using conversational artificial intelligence, consistent with some embodiments of the present disclosure. In this example, process 500 may comprise accessing a conversational artificial intelligence model (step 1001); accessing digital individual data (step 502), the digital individual data may include at least one of personality data, location data, temporal data, or environment data; receiving from an entity an input (step 504), the input may include at least one of an input in a natural language, an indication of suprasegmental features, an indication of body movement, or relation data; using the conversational artificial intelligence model to analyze the input and/or the digital individual data to determine a desired reaction to the input (step 506), the desired reaction may include at least one of a generated response in the natural language, usage of desired suprasegmental features, desired movements, or generated media content; and causing the desired reaction (step 508). In other examples, process 500 may include additional steps or fewer steps. For example, step 502 may be omitted from the process. In another example, step 504 may be omitted from the process. In other examples, one or more steps of process 600 may be executed in a different order and/or one or more groups of steps may be executed simultaneously.

In some examples, step 502 may comprise accessing digital individual data. In one example, step 502 may access digital individual data 420, for example as described above. In one example, the digital individual data accessed by step 502 may include at least one of personality data, location data, temporal data, or environment data. In one example, the digital individual data accessed by step 502 may include a digital data record associated with a personality (such as personality data 422), and step 502 may comprise step 1002. In one example, the digital individual data accessed by step 502 may include digital information indicative of a location (such as location data 424), and step 502 may comprise receiving and/or generating the digital information, for example as described above. In one example, the digital individual data accessed by step 502 may include digital information indicative of a point in time and/or a time frame (such as temporal data 426), and step 502 may comprise receiving and/or generating the digital information, for example as described above. In one example, the digital individual data accessed by step 502 may include digital information indicative of a state of an environment (such as environment data 428), and step 502 may comprise receiving and/or generating the digital information, for example as described above.

In some examples, step 504 may comprise receiving from an entity an input. In one example, step 504 may receive inputs 400, for example as described above. In one example, the input received by step 504 may include at least one of an input in a natural language, an indication of suprasegmental features, an indication of body movement, or relation data. In one example, the input received by step 504 may include an input in a natural language (such as inputs in a natural language 402), and step 504 may comprise step 604 and/or step 612 and/or step 1004 and/or step 1404 and/or step 1804. In one example, the input received by step 504 may include an indication of suprasegmental features (such as suprasegmental features 404, the first and/or second suprasegmental features of step 1404, etc.), and step 504 may comprise step 1404. In one example, the input received by step 504 may include an indication of body movement and/or an indication of body pose (such as body language and movements 406, the particular movement of step 1805, etc.), and step 504 may comprise step 1805. In one example, the input received by step 504 may include digital data record associated with a relation between two entities (such as relation data 408, a digital data record associated with the relation, the first digital data record of step 602, the second digital data record of step 610, etc.), and step 504 may comprise step 602 and/or step 610.

In some examples, step 506 may comprise using the conversational artificial intelligence model to analyze the input received by step 504 and/or the digital individual data accessed by step 502 to determine a desired reaction to the input. In one example, the desired reaction may include at least one of a generated response in a natural language (such as the natural language of step 504, a different natural language, etc.), usage of desired suprasegmental features, desired movements, or a generated media content. In one example, the desired reaction determined by step 506 may include a response in the natural language (such as outputs in a natural language 462), and step 506 may comprise step 606 and/or step 614 and/or step 1006 and/or step 1406 and/or step 1806. In one example, the desired reaction determined by step 506 may include usage of desired suprasegmental features (for example, usage of suprasegmental features 464), and step 506 may comprise determining the desired suprasegmental features using step 706 and/or step 714 and/or step 1106 and/or step 1506 and/or step 1906. In one example, the desired reaction determined by step 506 may include desired movements (such as body movements 464), and step 506 may comprise step 906 and/or step 914 and/or step 1306 and/or step 1706 and/or 2106. In one example, the desired reaction determined by step 506 may include a generated media content (such as generated media content 468), and step 506 may comprise step 806 and/or step 814 and/or step 1206 and/or step 1606 and/or step 2006. In some examples, the desired reaction determined by step 506 and/or outputs 460 (or any part thereof), may be based on inputs 400 and/or digital individual data 420 (or any part thereof). In some examples, a conversational artificial intelligence model may be or include a multimodal LLM, and step 506 may use the multimodal LLM to analyze the input received by step 504 and/or the digital individual data accessed by step 502 to determine a desired reaction to the input. For example, the multimodal LLM may be used with a suitable textual prompt, such as 'what would your reaction to {a textual representation of the input in a natural language}, when it was said with these {a textual description of the suprasegmental features}, when the body language is {a textual description of the body movements, body pose and/or body language}, when your relation with the other speaker is {a textual description of information from the relation data}, when your personality is {a textual representation of information from the personality data}, when your location is {a textual representation of information from the location data}, when it was said at {a textual representation of information from the temporal data}, and when your surroundings includes {a textual representation of information from the environment data}}'. In some examples, a conversational artificial intelligence model may be or include a machine learning model, and step 506 may use the machine learning model to analyze the input received by step 504 and/or the digital individual data accessed by step 502 and/or additional information to determine a desired reaction to the input. The machine learning model may be a machine learning model trained using training examples to determine reactions to inputs (such as inputs 400), optionally based on individual data (such as digital individual data 420). An example of such training example may include a sample input together with a sample digital individual data and/or sample additional information, together with a sample reaction.

FIG. 6 is a flowchart of an exemplary process 600 for personalization of conversational artificial intelligence, consistent with some embodiments of the present disclosure. In this example, process 600 may comprise accessing a first digital data record associated with a relation between a specific digital character and a first character (step 602); receiving from the first character a first input in a natural language (step 604); using a conversational artificial intelligence model to analyze the first digital data record and the first input to generate a first response in the natural language, the first response is a response to the first input (step 606); providing the first response to the first character (step 608); accessing a second digital data record associated with a relation between the specific digital character and a second character (step 610), the second character differs from the first character; receiving from the second character a second input in the natural language (step 612), the second input conveys a substantially same meaning as the first input; using the conversational artificial intelligence model to analyze the second digital data record and the second input to generate a second response in the natural language, the second response is a response to the second input (step 614), the second input conveys a substantially same meaning as the first input; and providing the second response to the second character (step 616). In other examples, process 600 may include additional steps or fewer steps. In other examples, one or more steps of process 600 may be executed in a different order and/or one or more groups of steps may be executed simultaneously. In one example, the first input and the first response may be part of a conversation between the specific digital character and the first character that does not involve the second character, and/or the second input and the second response may be part of a conversation between the specific digital character and the second character that does not involve the first character. In another example, the first input, the first response, the second input and the second response may be part of a group conversation between the specific digital character, the first character and the second character. In some examples, a group conversation between the specific digital character, the first character and the second character may include an in-person conversation, a conference voice call, a video conference, an extended reality conference, and so forth.

In some examples, a system for personalization of conversational artificial intelligence may include at least one processing unit configured to perform process 600. In one example, the system may further comprise at least one audio sensor, the first input may be a first audible verbal input, the second input may be a second audible verbal input, the receiving the first input by step 604 may include capturing the first audible verbal input using the at least one audio sensor, and the receiving the second input by step 612 may include capturing the second audible verbal input using the at least one audio sensor. In one example, the system may further comprise at least one audio speaker, the first response may be a first audible verbal response, the second response may be a second audible verbal response, the providing the first response to the first character by step 608 may include generating the first audible verbal response using the at least one audio speaker, and the providing the second response to the second character by step 616 may include generating the second audible verbal response using the at least one audio speaker. In some examples, a method for personalization of conversational artificial intelligence may include performing process 600. In some examples, a non-transitory computer readable medium may store computer implementable instructions that when executed by at least one processor may cause the at least one processor to perform operations for personalization of conversational artificial intelligence, and the operations may include the steps of process 600.

In some examples, a digital data record associated with a relation between a digital character and another character may be accessed. For example, step 602 may comprise accessing a first digital data record associated with a relation between a specific digital character and a first character. In another example, step 610 may comprise accessing a second digital data record associated with a relation between the specific digital character and a second character. In one example, the second character of step 610 may differ from the first character of step 602. In another example, the second character of step 610 and the first character of step 602 may be the same character. In some examples, accessing such digital data record may comprise reading at least part of the digital data record from memory, may comprise accessing at least part of the digital data record via an external computing device (for example, using a digital communication device), may comprise accessing at least part of the digital data record in a database (for example, based on at least one of the two characters), may comprise generating at least part of the digital data record (for example, based on other information, based on historic conversations between the two characters, based on social media data, based on a social graph, etc.), and so forth. For example, at least part of the digital data record may be included in at least one artificial neuron, for example in at least one artificial neuron of an artificial neural network included in a conversational artificial intelligence model (such as the conversational artificial intelligence model accessed by step 1001, the conversational artificial intelligence model used by step 606, the conversational artificial intelligence model used by step 614, a different conversational artificial intelligence model, and so forth). In some examples, the relation between the digital character the other character may be a social relation, and the digital data record may be associated with the relation between the digital character and the other character. For example, the relation between the specific digital character and the first character may be a social relation, and the first digital data record accessed by step 602 may be associated with the social relation between the specific digital character and the first character. In another example, the relation between the specific digital character and the second character may be a social relation, and the second digital data record accessed by step 610 may be associated with the social relation between the specific digital character and the second character. In one example, the relation between the specific digital character and the first character and the relation between the specific digital character and the second character may be different social relations.

In some examples, a digital data record associated with a relation between a digital character and another character may be based on at least one historic conversation between the digital character and the other character. For example, the first digital data record accessed by step 602 may be based on at least one historic conversation between the specific digital character and the first character, and/or the second digital data record accessed by step 610 may be based on at least one historic conversation between the specific digital character and the second character. For example, a LLM may be used to analyze a record of the at least one historic conversation (for example with a suitable textual prompt, such as 'read the following conversations and determine the type and degree of relation between the two participants') and generate and/or update at least part of the digital data record. In another example, a machine learning model may be used to analyze the at least one historic conversation and generate and/or update at least part of the digital data record. The machine learning model may be a machine learning model trained using training examples to generate digital data records based on historic conversations. An example of such training example may include a record of a sample historic conversation, together with a label indicative of information associated with a relation between participants of the sample historic conversation.

In some examples, a digital data record associated with a relation between a digital character and another character may be based on a frequency of meetings between the digital character and the other character. For example, the first digital data record accessed by step 602 may be based on frequency of meetings between the specific digital character and the first character, and/or the second digital data record accessed by step 610 may be based on frequency of meetings between the specific digital character and the second character. For example, a higher frequency of meetings may indicate a higher degree of relation. In some examples, a digital data record associated with a relation between a digital character and another character may be based on an analysis of a social graph including both the digital character and the other character. For example, the first digital data record accessed by step 602 may be based on an analysis of a social graph including both the specific digital character and the first character, and/or the second digital data record accessed by step 610 may be based on an analysis of a social graph including both the specific digital character and the second character. In some examples, a digital data record associated with a relation between a digital character and another character may be based on locations of meetings between the digital character and the other character. For example, the first digital data record accessed by step 602 may be based on locations of meetings between the specific digital character and the first character, and/or the second digital data record accessed by step 610 may be based on locations of meetings between the specific digital character and the second character. For example, when the meetings occur at an office, the digital data record may identify the type of relation as professional, while when the meetings occur at home of one of the participants, the digital data record may identify the type of relation as personal. In some examples, a digital data record associated with a relation between a digital character and another character may be based on types of meetings between the digital character and the other character. For example, the first digital data record accessed by step 602 may be based on types of meetings between the specific digital character and the first character, and/or the second digital data record accessed by step 610 may be based on types of meetings between the specific digital character and the second character. For example, when the meetings are digital remote meetings, the digital data record may identify the type of relation as online, when the meetings are in person meetings, the digital data record may identify the type of relation as in person.

In some examples, an input may be received from a character and/or from an entity. In one example, the input may be an input in a natural language. In another example, the input may be an input in a formal language. In one example, the input may be a textual input. In one example, the input may be an audible verbal input in the natural language. For example, step 604 may comprise receiving from the first character of step 602 a first input in a natural language. In another example, step 612 may comprise receiving from the second character of step 610 a second input in a natural language (for example, in the natural language of step 604, in a different natural language, and so forth). In yet another example, step 1004 may comprise receiving from an entity an input in a natural language. In one example, the second input received by step 612 may convey a substantially same meaning as the first input received by step 604. In another example, the second input received by step 612 may convey a different meaning than the first input received by step 604. In one example, the second input received by step 612 may include same words as the first input received by step 604. In another example, the second input received by step 612 may include different words than the first input received by step 604. In one example, the first input received by step 604 may be an audible verbal input and the second input received by step 612 may be a textual input. In one example, the first input received by step 604 may be a first audible verbal input and the second input received by step 612 may be a second audible verbal input. In one example, the first input received by step 604 may be a first textual input and the second input received by step 612 may be a second textual input. For example, the second textual input may be textually identical to the first textual input. In one example, receiving such input may comprise reading the input from memory, may comprise receiving the input from an external computing device (for example, using a digital communication device), may comprise capturing the input (for example, using speech recognition, using a microphone, using an audio sensor, etc.), may comprise receiving the input from the character and/or the entity (for example, using a user interface, using a keyboard, using speech recognition, using a microphone, using an audio sensor, etc.), and so forth.

In some examples, a conversational artificial intelligence model (such as the conversational artificial intelligence model accessed by step 1001, a different conversational artificial intelligence model, etc.) may be used to analyze a digital data record (such as a digital data record associated with a relation between two characters) and an input (such as an input in a natural language received from one of the two characters) to generate a response. In one example, the generated response may be in a natural language (such as the natural language of step 604 and/or step 610, in a different natural language, and so forth). In another example, the response may be in a formal language. In one example, the generated response may be a response to the input. In another example, the generated response may be a response to a different input. For example, step 606 may comprise using a conversational artificial intelligence model (such as the conversational artificial intelligence model accessed by step 1001, the conversational artificial intelligence model accessed by step 614, a different conversational artificial intelligence model, etc.) to analyze the first digital data record accessed by step 602 and the first input received by step 604 to generate a first response in a natural language (such as the natural language of step 604, in a different natural language, and so forth). The first response may be a response to the first input received by step 604. In another example, step 614 may comprise using a conversational artificial intelligence model (such as the conversational artificial intelligence model accessed by step 1001, the conversational artificial intelligence model accessed by step 606, a different conversational artificial intelligence model, etc.) to analyze the second digital data record accessed by step 610 and the second input received by step 612 to generate a second response in a natural language (such as the natural language of step 612, the natural language of step 606, in a different natural language, and so forth). In one example, the second response generated by step 614 may be a response to the second input. In another example, the second response generated by step 614 may be a response to a different input. In one example, the second response generated by step 614 may differ from the first response generated by step 606. In another example, the second response generated by step 614 and the first response generated by step 606 may be identical. In one example, the second response generated by step 614 may convey a different meaning than the first response generated by step 606. In another example, the second response generated by step 614 may convey a substantially same meaning as the first response generated by step 606. In one example, the second response generated by step 614 may include different words than the first response generated by step 606. In another example, the second response generated by step 614 may include same words as the first response generated by step 606. In one example, the first response generated by step 606 may be an audible verbal response and the second response generated by step 614 may be a textual response. In one example, the first response generated by step 606 may be a first audible verbal response and the second response generated by step 614 may be a second audible verbal response. In one example, the first response generated by step 606 may be a first textual response and the second response generated by step 614 may be a second textual response. For example, the second textual response may be textually different from the first textual response. In another example, the second textual response may be textually identical to the first textual response. In one example, a conversational artificial intelligence model may be or include a LLM, the LLM may be used to analyze a textual representation of information from the digital data record and a textual representation of the input (for example with a suitable textual prompt, such as 'respond to this input . . . received from a person, when your relation with this person is as follows . . . ') to generate the response. In another example, a conversational artificial intelligence model may be or include a machine learning model, and the machine learning model may be used to analyze the digital data record and/or the input and/or additional information to generate the response. The machine learning model may be a machine learning model trained using training examples to generate responses to inputs based on digital data records and/or additional information. An example of such training example may include a sample input together with a sample digital data record and/or sample additional information, together with a sample response.

In some examples, specific information associated with the specific digital character of process 600 and/or process 700 and/or process 800 and/or process 900 may be accessed. For example, the specific information may be read from memory, may be received from an external device (for example, using a digital communication device), may be generated based on other information, may be received from an individual (for example, via a user interface), and so forth. Further, a conversational artificial intelligence model may be used to analyze the specific information, a digital data record (such as a digital data record associated with a relation between the specific digital character and another character, the first digital data record accessed by step 602, the second digital data record accessed by step 610, etc.) and an input (such as an input received from a character, the first input received by step 604, the second input received by step 612, etc.) to generate a response. For example, step 606 may comprise using the conversational artificial intelligence model to analyze the specific information, the first digital data record accessed by step 602 and the first input received by step 604 to generate the first response in the natural language. In another example, step 614 may comprise using the conversational artificial intelligence model to analyze the specific information, the second digital data record accessed by step 610 and the second input received by step 612 to generate the second response in the natural language. For example, a conversational artificial intelligence model may be or include a LLM, the LLM may be used to analyze a textual representation of specific information, a textual representation of information from the digital data record and the input (for example with a suitable textual prompt, such as 'respond to this input . . . received from a person, when your relation with this person is as follows . . . , and when you are as follows . . . ') to generate the response. In another example, a conversational artificial intelligence model may be or include a machine learning model as described above, and the machine learning model may be used as described above with the specific information as additional information to generate the response. In some examples, the specific information may include a specific detail, wherein the first response generated by step 606 may be indicative of the specific detail, and/or wherein the second response generated by step 614 may not be indicative of the specific detail. Some non-limiting examples of such specific detail may include a biographical detail of the specific digital character, a detail know to the specific digital character, a detail associated with a specific subject matter, and so forth. In one example, the second response generated by step 614 may be contradictive of the specific detail. For example, the specific detail may a secret, the first character may be a confidant of the specific digital character, the second character may be an adversary of the specific digital character, each one of the first input and the second input may include 'how do you want to go about these deliberations?', the first response may include 'the ace up my sleeve is an eye witness that no one else knows about', and the second response may include 'why won't we start with your description of what happened that morning'.

In some examples, the second response generated by step 614 may differ from the first response generated by step 606 in a language register, for example based on a difference between the second digital data record and the first digital data record, based on a difference in types of relation between the participants of the conversations, based on a different in degrees of relation between the participants of the conversations, and so forth. For example, each one of the first and second inputs may be or include 'The price depends on the exact specification of the computer', the first response may be in a formal language register (for example, the first response may be or include 'I appreciate your prompt response to my inquiry and look forward to further discussing the matter at your earliest convenience.'), and the second response may be in an informal language register (for example, the second response may be or include 'Thanks for getting back to me quickly! Let's chat more about it whenever you have time.'). In some examples, the first response generated by step 606 may include at least one detail not included in the second response generated by step 614, for example based on a difference between the second digital data record and the first digital data record, based on a difference in types of relation between the participants of the conversations, based on a different in degrees of relation between the participants of the conversations, and so forth. For example, each one of the first and second inputs may be or include 'Why are you so sad?', the first response may indicate the specific reason for the sadness (for example, the first response may be or include 'My wife just left me'), and the second response may avoid the specific detail and give a general reason (for example, the second response may be or include 'There are some challenges in my personal life, it's been affecting my mood'). In some examples, the second response generated by step 614 may differ from the first response generated by step 606 in an empathy level, for example based on a difference between the second digital data record and the first digital data record, based on a difference in types of relation between the participants of the conversations, based on a different in degrees of relation between the participants of the conversations, and so forth. For example, each one of the first and second inputs may be or include 'We missed you at the gathering', the first response may be of a natural empathy level ((for example, the first response may be or include 'I couldn't make it due to prior commitments'), and the second response may be empathetic (for example, the second response may be or include 'I really wanted to be there, but I had prior commitments that I couldn't change. I hope everyone had a wonderful time, and I regret not being able to join'). In some examples, the second response generated by step 614 may differ from the first response generated by step 606 in a politeness level, for example based on a difference between the second digital data record and the first digital data record, based on a difference in types of relation between the participants of the conversations, based on a different in degrees of relation between the participants of the conversations, and so forth. For example, each one of the first and second inputs may be or include 'I can't do that', the first response may be more polite than the second response (for example, 'I understand it might be challenging, but it's very important. Could I help?' vs. 'Come on, we need this done'). In some examples, the second response generated by step 614 may differ from the first response generated by step 606 in a formality level, for example based on a difference between the second digital data record and the first digital data record, based on a difference in types of relation between the participants of the conversations, based on a different in degrees of relation between the participants of the conversations, and so forth. For example, each one of the first and second inputs may be or include 'Any plans?' and the first response may be more formal than the second response (for example, 'I was wondering if you might be free to join me for a drive?' vs. 'Are you down for a drive?'). In some examples, the second response generated by step 614 may differ from the first response generated by step 606 in an intimacy level, for example based on a difference between the second digital data record and the first digital data record, based on a difference in types of relation between the participants of the conversations, based on a different in degrees of relation between the participants of the conversations, and so forth. For example, each one of the first and second inputs may be or include 'Any plans?' and the first response may be more intimate than the second response (for example, 'I was hoping to cuddle and watch a movie' vs. 'I was thinking of watching a movie. Wants to join?') In some examples, the first response generated by step 606 may serve a first goal of the specific digital character, the second response generated by step 614 may serve a second goal of the specific digital character, and the second goal may differ from the first goal based on a difference between the second digital data record and the first digital data record, based on a difference in types of relation between the participants of the conversations, based on a different in degrees of relation between the participants of the conversations, and so forth. For example, each one of the first and second inputs may be or include a mistake, the first goal may be to encourage self-correction (for example, a teacher telling a student, 'Maybe take another look. Does anything seem off?') and the second goal may be to avoid further mistakes (for example, a boss telling a subordinate, 'Next time, have someone more experienced review your work before we discuss it').

In some examples, a digital data record (such as a digital data record associated with a relation between the two characters) may be analyzed to identify a particular mathematical object in the mathematical space, for example using module 284. Further, a convolution of a fragment of an input (such as an input in a natural language received from one of two characters participating in a conversation, an audible verbal input, a visual input, etc.) may be calculated to obtain a particular numerical result value. Further, a function of the particular numerical result value and the particular mathematical object may be calculated to obtain a calculated mathematical object in the mathematical space, for example using module 286. Further, a response may be generated based on the calculated mathematical object. For example, a conversational artificial intelligence model may be or include a machine learning model as described above, and the machine learning model may be used as described above with the calculated mathematical object as additional information to generate the response. In another example, the calculated mathematical object may correspond to a specific word (for example, as described in relation to step 286), and the specific word may be included in the generated response. In one example, step 606 may analyze the first digital data record accessed by step 602 to identify a first mathematical object in a mathematical space, calculate a convolution of a fragment of the first input received by step 604 to obtain a first numerical result value, calculate a function of the first numerical result value and the first mathematical object to obtain a third mathematical object in the mathematical space, and base the generation of the first response on the third mathematical object. In another example, step 614 may analyze the second digital data record accessed by step 610 to identify a second mathematical object in the mathematical space, calculate a convolution of a fragment of the second input received by step 612 to obtain a second numerical result value, calculate a function of the second numerical result value and the second mathematical object to obtain a fourth mathematical object in the mathematical space, and base the generation of the second response on the fourth mathematical object.

In some examples, a specific mathematical object in a mathematical space may be identified, wherein the specific mathematical object may correspond to at least part of an input (for example, to a word included in an input in a natural language received from one of two characters participating in a conversation, to a utterance included in the input, to a plurality of audio samples included in the input, etc.), for example using module 282 and/or module 284.

Further, a digital data record (such as a digital data record associated with a relation between the two characters) may be analyzed to identify a particular mathematical object in the mathematical space, for example using module 284. Further, a function of the specific mathematical object and the particular mathematical object may be calculated to obtain a calculated mathematical object in the mathematical space, wherein the calculated mathematical object may correspond to a particular word (for example, in the natural language), for example using module 286. Further, the particular word may be included in a generated response to the input. For example, process 600 may identify a specific mathematical object in a mathematical space, wherein the specific mathematical object may correspond to a common part or a common word included in both the first input received by step 604 and in the second input received by step 610, for example using module 282 and/or module 284. Further, step 606 may analyze the first digital data record accessed by step 602 to identify a first mathematical object in the mathematical space, for example using module 284. Further, step 614 may analyze the second digital data record accessed by step 610 to identify a second mathematical object in the mathematical space, for example using module 284. In one example, the second mathematical object may differ from the first mathematical object. In another example, the first and second mathematical objects may be identical. Further, step 606 may calculate a function of the specific mathematical object and the first mathematical object to obtain a third mathematical object in the mathematical space, wherein the third mathematical object may correspond to a first word in the natural language, for example using module 286. Further, step 606 may include the first word in the generated first response. Further, step 614 may calculate a function of the specific mathematical object and the second mathematical object to obtain a fourth mathematical object in the mathematical space, wherein the fourth mathematical object may correspond to a second word in the natural language, for example using module 286. In one example, the second word may differ from the first word. In another example, the first and second words may be the same word. In one example, the fourth mathematical object may differ from the third mathematical object. In another example, the third and fourth mathematical objects may be identical. Further, step 614 may include the second word in the generated second response.

In some examples, a response may be provided to a character and/or an entity. For example, step 608 may comprise providing the first response generated by step 606 to the first character of step 602. In another example, step 616 may comprise providing the second response generated by step 614 to the second character of step 610. In yet another example, step 1008 may comprise providing the response generated by step 1006 to the entity of step 1004. In an additional example, step 1008 may comprise providing the response generated by step 1406 to the entity of step 1404. In yet another example, step 1008 may comprise providing the response generated by step 1806 to the entity of step 1804 and/or step 1805. For example, providing a response may comprise presenting the response visual (and/or causing the response to be presented visually), may comprise outputting the response (and/or causing the response to be outputted) audibly (for example using a text to speech algorithm), may comprise outputting the response (and/or causing the response to be outputted) via a personal computing device associated with the character and/or the entity (such as a smartphone), may comprise storing the response in a memory (for example, to be accessed by the character and/or the entity), may comprise generating and/or transmitting a digital signal encoding the response, and so forth. In some examples, the response may be provided via an email, via an instant messaging app, via a user interface, via an animated avatar, via a humanoid robot, via a voice call, via a video call, and so forth.

In some examples, the first character of process 600 and/or process 700 and/or process 800 and/or process 900 may be a human individual and the second character of process 600 and/or process 700 and/or process 800 and/or process 900 may be a digital character. In some examples, the first character of process 600 and/or process 700 and/or process 800 and/or process 900 may be a first human individual and the second character of process 600 and/or process 700 and/or process 800 and/or process 900 may be a second human individual. In one example, the second human individual may differ from the first human individual. In another example, the second human individual and the first human individual may be the same human individual. In some examples, the first character of process 600 and/or process 700 and/or process 800 and/or process 900 may be a first digital character and the second character of process 600 and/or process 700 and/or process 800 and/or process 900 may be a second digital character. In one example, the second digital character may differ from the first digital character. In another example, the second digital character and the first digital character may be the same digital character. In some examples, when a character (such as the first character of process 600, the second character of process 600, a different character, etc.) is a human individual, the providing a response to the character (such as the providing the first response to the first character by step 608, the providing the second response to the second character by step 616, the providing a response to a different human individual, etc.) may include presenting the response to the character (for example, visually, audibly, textually, graphically, and so forth). In some examples, when a character (such as the first character of process 600, the second character of process 600, a different character, etc.) is a digital character, the providing a response to the character (such as the providing the first response to the first character by step 608, the providing the second response to the second character by step 616, the providing a response to a different human individual, etc.) may include generating and/or transmitting a digital signal encoding the second response.

In some examples, the specific digital character of process 600 and/or process 700 and/or process 800 and/or process 900 may be associated with a specific human individual, the first digital data record accessed by step 602 may be associated with a relation between the specific human individual and the first character of step 602, and/or the second digital data record accessed by step 610 may be associated with a relation between the specific human individual and the second character of step 610. For example, the specific digital character of process 600 and/or process 700 and/or process 800 and/or process 900 may be a digital clone of the specific human individual. In another example, the specific digital character of process 600 and/or process 700 and/or process 800 and/or process 900 may be a digital agent of the specific human individual. In some examples, the specific digital character of process 600 and/or process 700 and/or process 800 and/or process 900 may not be associated with any human individual, may not be a digital clone of a human individual, may not be a digital agent of a human individual, and so forth. In some examples, the specific digital character of process 600 and/or process 700 and/or process 800 and/or process 900 may be an artificial intelligence agent of the specific human individual. In some examples, each of the first and second digital data records (accessed by step 602 and step 610) may be based or include information on at least one of past interactions of the specific human individual and/or the artificial intelligence agent of the specific human individual with the respective character (such as frequency of the interactions, timing of the interactions, durations of the interactions, communication mediums used for the interactions, locations of the specific human individual and/or the respective character during the interactions, content of conversations, other participants in the interactions, emotional impact of the interactions, etc.), a type of relation between the specific human individual and the respective character, a degree of relation between the specific human individual with the respective character, and so forth.

In some examples, the first response generated by step 606 may be indicative of a specific detail, and/or the second response generated by step 614 may not be indicative of the specific detail. In one example, the first response may state the specific detail, and the second response may not. In another example, the first response may state a particular detail different from the specific detail that is indicative of the specific detail, and the second response may not state the particular detail. In yet another example, the second response generated by step 614 may contradictive of the specific detail. In some examples, the first response generated by step 606 may be indicative of a biographical detail of the specific digital character, and the second response generated by step 614 may not be indicative of the biographical detail. In one example, the second response is contradictive of the biographical detail. In some examples, the first response generated by step 606 may be indicative of a detail known to the specific digital character, and the second response generated by step 614 may not be indicative of the detail known to the specific digital character. In one example, the second response may be contradictive of the detail known to the specific digital character. In one example, the first input may be indicative of a desire of the first character to be exposed to the detail known to the specific digital character, the second input may be indicative of a desire of the second character to be exposed to the detail known to the specific digital character, and the generated second response may be indicative of a refusal to share the detail with the second character. For example, each one of the first and second inputs may be or include 'What is your annual income?', the first response may specify the annual income, and the second response may not specify the annual income. In one example, the second response may be or include 'I prefer not to disclose my income'. In another example, the second response may specify an annual income different from the actual annual income (for example, significant lower, significant higher, and so forth). In some examples, the first response generated by step 606 may be indicative of a detail associated with a specific subject matter, and the second response generated by step 614 may not be indicative of the detail associated with the specific subject matter. In one example, the generated second response may be contradictive of the detail associated with the specific subject matter. In another example, the generated second response may not be indicative of any detail associated with the specific subject matter. In yet another example, the first digital data record accessed by step 602 may be indicative of a first at least one subject matter previously discussed between the specific digital character and the first character, the second digital data record accessed by step 610 may be indicative of a second at least one subject matter previously discussed between the specific digital character and the second character, and the specific subject matter may correlate with the first at least one subject matter more than with the second at least one subject matter. For example, the correlation may be measured based on a similarity function between subject matters. In another example, the specific subject matter may be included in the first at least one subject matter and may not be part of the second at least one subject matter.

In some examples, the first digital data record accessed by step 602 may be indicative of a first type of relation. The first type of relation may be associated with the relation between the specific digital character and the first character. Further, the second digital data record accessed by step 610 may be indicative of a second type of relation. The second type of relation may be associated with the relation between the specific digital character and the second character. In one example, the second type of relation may differ from the first type of relation. In another example, the second type of relation and the first type of relation may be identical. In some examples, the first and second types of relations may be types of social relations. Some non-limiting examples of such types of relations may include a family relationship, a relation between a parent and a child, a relation between a grandparent and a grandchild, a relation between siblings, a friendship, frenemies, an online friendship, a long-distance relationship, a romantic relationship, a boyfriend-girlfriend relationship, spouses, life partners, colleagues, a professional relationship, co-workers, work associates, business partners, a personal relationship, casual friends, strangers, a mentor-mentee relationship, a teacher-student relationship, a coach-athlete relationship, classmates, study partners, a counselor-client relationship, a therapist-patient relationship, neighbors, teammates, a landlord-tenant relationship, a service provided and customer relationship, travel buddies, workout buddies, and so forth. In some examples, the generation of the first response by step 606 may be based on the first type of relation, and/or the generation of the second response by step 614 may be based on the second type of relation. In one example, the second response generated by step 606 may differ from the first response generated by step 614 based on a difference between the second type of relation and the first type of relation. In one example, the generated second response may differ from the generated first response in a language register based on the difference between the second type of relation and the first type of relation. In another example, the generated first response may include at least one detail not included in the generated second response based on the difference between the second type of relation and the first type of relation.

In yet another example, the generated second response may differ from the generated first response in an empathy level based on the difference between the second type of relation and the first type of relation. For example, the first type of relation may be a romantic relationship, the second type of relation may be a doctor-patient relationship, each one of the first and second inputs may be or include 'What hurts?', the first response may be indicative of a feeling that hurts (for example, the first response may be or include 'What hurts is feeling disconnect between us lately'), and the second response may be indicative of a physical discomfort (for example, the second response may be or include 'I've been experiencing sharp pain in my lower back'). In some example, the determination of the first desired at least one suprasegmental feature by step 706 may be based on the first type of relation, and/or the determination of the second desired at least one suprasegmental feature by step 714 may be based on the second type of relation. In one example, the second desired at least one suprasegmental feature determined by step 706 may differ from the first desired at least one suprasegmental feature determined by step 714 based on a difference between the second type of relation and the first type of relation. In one example, the second desired at least one suprasegmental feature determined by step 706 may differ from the first desired at least one suprasegmental feature determined by step 714 in at least one of intonation, stress, pitch, rhythm, tempo, loudness or prosody, based on a difference between the second type of relation and the first type of relation. In one example, the second desired at least one suprasegmental feature determined by step 706 may be configured to convey a different emotion from the first desired at least one suprasegmental feature determined by step 714, based on a difference between the second type of relation and the first type of relation. In one example, the second desired at least one suprasegmental feature determined by step 706 may be configured to convey a different intent (such as asking a question, making a statement, giving a command or express uncertainty) from the first desired at least one suprasegmental feature determined by step 714, based on a difference between the second type of relation and the first type of relation. In one example, the second desired at least one suprasegmental feature determined by step 706 may be configured to convey a different level of empathy from the first desired at least one suprasegmental feature determined by step 714, based on a difference between the second type of relation and the first type of relation. In one example, the second desired at least one suprasegmental feature determined by step 706 may be configured to convey confidence and the first desired at least one suprasegmental feature determined by step 714 may be configured to convey uncertainty, based on a difference between the second type of relation and the first type of relation. In one example, the second desired at least one suprasegmental feature determined by step 706 may be configured to convey engagement and the first desired at least one suprasegmental feature determined by step 714 may be configured to convey detachment, based on a difference between the second type of relation and the first type of relation. In one example, the second desired at least one suprasegmental feature determined by step 706 may be configured to convey interest and the first desired at least one suprasegmental feature determined by step 714 may be configured to convey boredom, based on a difference between the second type of relation and the first type of relation. In one example, based on the first type of relation being a friendship and the second type of relation being a professional relationship, the first desired at least one suprasegmental feature may be configured to convey closeness and the second desired at least one suprasegmental feature may be configured not to convey closeness. For example, the first desired at least one suprasegmental feature may include a greater range of pitch variation, lower volume and/or less rigid intonation compared to the second desired at least one suprasegmental feature. In another example, based on the first type of relation being adversaries, and the second type of relation being a friendly relationship, the first desired at least one suprasegmental feature may include less pitch variation, higher volume, faster speech rate, and/or descending intonation in statements compared to the second desired at least one suprasegmental feature. In some examples, the generation of the first media content by step 806 may be based on the first type of relation, and/or the generation of the second media content by step 814 may be based on the second type of relation. In one example, the second media content generated by step 814 may differ from the first media content generated by step 806 based on the second type of relation being different from the first type of relation. In one example, the second media content generated by step 814 may differ from the first media content generated by step 806 in a formality level based on the second type of relation being different from the first type of relation. For example, the first type of relation may be a professional relationship, the second type of relation may be a close friendship, the first media content may depict individuals in elegant attire, and the second media content may depict individuals in casual wear. In one example, the second media content generated by step 814 may differ from the first media content generated by step 806 in an intimacy level based on the second type of relation being different from the first type of relation. For example, the first type of relation may be a professional relationship, the second type of relation may be spouses, the first media content may depict an individual in a meeting room, and the second media content may depict an individual in a bedroom. In one example, the second media content generated by step 814 may differ from the first media content generated by step 806 in a style based on the second type of relation being different from the first type of relation. For example, the first type of relation may be a romantic relationship, the second type of relation may be a close friendship, the first media content may be in a romantic or intimate style (such as a drawing with soft lines, gentle shadings and/or romantic scenery), and the second media content may be in a playful or whimsical (such as a visual with caricatures, exaggerated features, and/or cartoonish elements). In one example, the second media content generated by step 814 may differ from the first media content generated by step 806 in an empathy level based on the second type of relation being different from the first type of relation. For example, the first type of relation may be a romantic relationship, the second type of relation may be acquaintances, the first media content may include a warm and/or expressive voice to convey empathy, and the second media content may include a flat and/or monotone voice to avoid conveying empathy. In one example, the first media content generated by step 806 may be a first artificially generated visual content depicting the specific digital character and the first character, the second media content generated by step 814 may be a second artificially generated visual content depicting the specific digital character and the second character, and a distance between the specific digital character and the first character in the first artificially generated visual content may differ from a distance between the specific digital character and the second character in the second artificially generated visual content based on the second type of relation being different from the first type of relation. For example, the first type of relation may be a romantic relationship, the second type of relation may be acquaintances, and the distance between in the first artificially generated visual content may be shorter than the distance in the second artificially generated visual content. In one example, the first media content generated by step 806 may be a first artificially generated visual content depicting the specific digital character and the first character, the second media content generated by step 814 may be a second artificially generated visual content depicting the specific digital character and the second character, and a spatial orientation of the specific digital character relative to the first character in the first artificially generated visual content may differ from a spatial orientation of the specific digital character relative to the second character in the second artificially generated visual content based on the second type of relation being different from the first type of relation. For example, the first type of relation may be a romantic relationship, the second type of relation may be acquaintances, the spatial orientation in the first artificially generated visual content may correspond to the specific digital character looking at the first character eyes, and the spatial orientation in the second artificially generated visual content may correspond to the specific digital character not looking at the second character eyes. In one example, the first media content generated by step 806 may be a first artificially generated visual content depicting the specific digital character, the second media content generated by step 814 may be a second artificially generated visual content depicting the specific digital character, and an appearance of the specific digital character in the first artificially generated visual content may differ from an appearance of the specific digital character in the second artificially generated visual content based on the second type of relation being different from the first type of relation. For example, the first type of relation may be a romantic relationship, the second type of relation may be co-workers, the first artificially generated visual content may depict the specific digital character in an intimate and/or seductive dress, and the second artificially generated visual content may depict the specific digital character in a formal dress. In one example, the first media content generated by step 806 may be a first artificially generated visual content depicting the specific digital character, the second media content generated by step 814 may be a second artificially generated visual content depicting the specific digital character, and a movement of at least part of a body of the specific digital character in the first artificially generated visual content may differ from a movement of the at least part of the body of the specific digital character in the second artificially generated visual content based on the second type of relation being different from the first type of relation. For example, the first type of relation may be a romantic relationship, the second type of relation may be acquaintances, the movement in the first artificially generated visual content may be associated with a hug or a kiss, and the movement in the second artificially generated visual content may be associated with a hand-shake or a hand-waving. In one example, the first media content generated by step 806 may be a first artificially generated audible content that includes speech of the specific digital character directed to the first character, the second media content generated by step 814 may be a second artificially generated audible content that includes speech of the specific digital character directed to the second character, and a voice characteristic of a voice of the specific digital character may differ between the first artificially generated audible content and the second artificially generated audible content based on the second type of relation being different from the first type of relation. For example, the first type of relation may be a romantic relationship, the second type of relation may be acquaintances, the voice of the specific digital character in the first artificially generated audible content may be a warm and/or expressive voice, and the voice of the specific digital character in the second artificially generated audible content may be a flat and/or monotone voice. In some examples, the determination of the first desired movement by step 906 may be based on the first type of relation, and/or the determination of the second desired movement by step 914 may be based on the second type of relation. For example, the second desired movement may differ from the first desired movement based on the second type of relation being different from the first type of relation, for example as described below.

In some examples, the first digital data record accessed by step 602 may be indicative of a first degree of relation. The first degree of relation may be associated with the relation between the specific digital character and the first character. Further, the second digital data record accessed by step 610 may be indicative of a second degree of relation. The second degree of relation may be associated with the relation between the specific digital character and the second character. In one example, the second degree of relation may differ from the first degree of relation. In another example, the second degree of relation and the first degree of relation may be the same. For example, the first degree of relation may be 'close friends' and the second degree of relation may be 'casual friends'. In another example, the first degree of relation may be 'first-degree family link' (such as parents and children) and the second degree of relation may be 'second-degree family link' (such as grandparents and grandchildren). In some examples, the generation of the first response by step 606 may be based on the first degree of relation, and/or the generation of the second response by step 614 may be based on the second degree of relation. In one example, the generated second response may differ from the generated first response based on a difference between the second degree of relation and the first degree of relation. In one example, the generated second response may differ from the generated first response in a language register based on the difference between the second degree of relation and the first degree of relation. In another example, the generated first response may include at least one detail not included in the generated second response based on the difference between the second degree of relation and the first degree of relation. In yet another example, the generated second response may differ from the generated first response in an empathy level based on the difference between the second degree of relation and the first degree of relation. For example, the first degree of relation may be 'close friends', the second degree of relation may be 'casual friends', each one of the first and second inputs may be or include 'How are you?', the first response may be indicative of a recent hardship (for example, the first response may be or include 'I just found out that I've cancer'), and the second response may not be indicative of the recent hardship (for example, the second response may be or include 'Thank you. How are you?'). In some examples, the determination of the first desired at least one suprasegmental feature by step 706 may be based on the first degree of relation, and/or the determination of the second desired at least one suprasegmental feature by step 714 may be based on the second degree of relation. The second desired at least one suprasegmental feature may differ from the first desired at least one suprasegmental feature based on a difference between the second degree of relation and the first degree of relation. In one example, the second desired at least one suprasegmental feature determined by step 706 may differ from the first desired at least one suprasegmental feature determined by step 714 in at least one of intonation, stress, pitch, rhythm, tempo, loudness or prosody, based on a difference between the second degree of relation and the first degree of relation. In one example, the second desired at least one suprasegmental feature determined by step 706 may be configured to convey a different emotion from the first desired at least one suprasegmental feature determined by step 714, based on a difference between the second degree of relation and the first degree of relation. In one example, the second desired at least one suprasegmental feature determined by step 706 may be configured to convey a different intent (such as asking a question, making a statement, giving a command or express uncertainty) from the first desired at least one suprasegmental feature determined by step 714, based on a difference between the second degree of relation and the first degree of relation. In one example, the second desired at least one suprasegmental feature determined by step 706 may be configured to convey a different level of empathy from the first desired at least one suprasegmental feature determined by step 714, based on a difference between the second degree of relation and the first degree of relation. In one example, the second desired at least one suprasegmental feature determined by step 706 may be configured to convey confidence and the first desired at least one suprasegmental feature determined by step 714 may be configured to convey uncertainty, based on a difference between the second degree of relation and the first degree of relation. In one example, the second desired at least one suprasegmental feature determined by step 706 may be configured to convey engagement and the first desired at least one suprasegmental feature determined by step 714 may be configured to convey detachment, based on a difference between the second degree of relation and the first degree of relation. In one example, the second desired at least one suprasegmental feature determined by step 706 may be configured to convey interest and the first desired at least one suprasegmental feature determined by step 714 may be configured to convey boredom, based on a difference between the second degree of relation and the first degree of relation. In one example, the first degree of relation may be 'close friends', the second degree of relation may be 'casual friends', the first desired at least one suprasegmental feature may be configured to convey closeness and the second desired at least one suprasegmental feature may be configured not to convey closeness. For example, the first desired at least one suprasegmental feature may include a greater range of pitch variation, lower volume and/or less rigid intonation compared to the second desired at least one suprasegmental feature. In some examples, the generation of the first media content by step 806 may be based on the first degree of relation, the generation of the second media content by step 814 may be based on the second degree of relation. In one example, the generated second media content may differ from the generated first media content based on the second degree of relation being different from the first degree of relation. In one example, the second media content generated by step 814 may differ from the first media content generated by step 806 in a formality level based on the second degree of relation being different from the first degree of relation. For example, the first degree of relation may be higher than the second degree of relation (for example, close friends vs. acquaintances), and as a result the first media content may be less formal than the second media content (for example, the first media content may depict individuals in casual wear and the second media content may depict individuals in elegant attire). In one example, the second media content generated by step 814 may differ from the first media content generated by step 806 in an intimacy level based on the second degree of relation being different from the first degree of relation. For example, the first degree of relation may be higher than the second degree of relation (for example, close friends vs. acquaintances), and as a result the first media content may be more intimate than the second media content (for example, the first media content may include soft lighting and the second media content may include harsh lighting). In one example, the second media content generated by step 814 may differ from the first media content generated by step 806 in a style based on the second degree of relation being different from the first degree of relation. For example, the first degree of relation may be higher than the second degree of relation (for example, close friends vs. acquaintances), and as a result the first media content may include handwritten text and the second media content may include typed text. In one example, the second media content generated by step 814 may differ from the first media content generated by step 806 in an empathy level based on the second degree of relation being different from the first degree of relation. For example, the first degree of relation may be higher than the second degree of relation (for example, close friends vs. acquaintances), and as a result the first media content may be associated with higher empathy level than the second media content (for example, the first media content may depict subtle smiles and/or soft eyes, while the second media content may depict neutral facial expressions). In one example, the first media content generated by step 806 may be a first artificially generated visual content depicting the specific digital character and the first character, the second media content generated by step 814 may be a second artificially generated visual content depicting the specific digital character and the second character, and a distance between the specific digital character and the first character in the first artificially generated visual content may differ from a distance between the specific digital character and the second character in the second artificially generated visual content based on the second degree of relation being different from the first degree of relation. For example, the first degree of relation may be higher than the second degree of relation (for example, close friends vs. acquaintances), and as a result the distance in the first artificially generated visual content may be shorter than the distance in the second artificially generated visual content. In one example, the first media content generated by step 806 may be a first artificially generated visual content depicting the specific digital character and the first character, the second media content generated by step 814 may be a second artificially generated visual content depicting the specific digital character and the second character, and a spatial orientation of the specific digital character relative to the first character in the first artificially generated visual content may differ from a spatial orientation of the specific digital character relative to the second character in the second artificially generated visual content based on the second degree of relation being different from the first degree of relation. For example, the first degree of relation may be higher than the second degree of relation (for example, close friends vs. acquaintances), and as a result the spatial orientation in the first artificially generated visual content may correspond to the specific digital character looking at the first character, and the spatial orientation in the second artificially generated visual content may correspond to the specific digital character not looking at the second character. In one example, the first media content generated by step 806 may be a first artificially generated visual content depicting the specific digital character, the second media content generated by step 814 may be a second artificially generated visual content depicting the specific digital character, and an appearance of the specific digital character in the first artificially generated visual content may differ from an appearance of the specific digital character in the second artificially generated visual content based on the second degree of relation being different from the first degree of relation. For example, the first degree of relation may be higher than the second degree of relation (for example, close friends vs. acquaintances), and as a result the first artificially generated visual content may depict the specific digital character in a sloppy outfit, and the second artificially generated visual content may depict the specific digital character in a suit. In one example, the first media content generated by step 806 may be a first artificially generated visual content depicting the specific digital character, the second media content generated by step 814 may be a second artificially generated visual content depicting the specific digital character, and a movement of at least part of a body of the specific digital character in the first artificially generated visual content may differ from a movement of the at least part of the body of the specific digital character in the second artificially generated visual content based on the second degree of relation being different from the first degree of relation. For example, the first degree of relation may be higher than the second degree of relation (for example, close friends vs. acquaintances), and as a result the movement in the first artificially generated visual content may be associated with a hug or a kiss, and the movement in the second artificially generated visual content may be associated with a hand-shake or a hand-waving. In one example, the first media content generated by step 806 may be a first artificially generated audible content that includes speech of the specific digital character directed to the first character, the second media content generated by step 814 may be a second artificially generated audible content that includes speech of the specific digital character directed to the second character, and a voice characteristic of a voice of the specific digital character may differ between the first artificially generated audible content and the second artificially generated audible content based on the second degree of relation being different from the first degree of relation. For example, the first degree of relation may be higher than the second degree of relation (for example, close friends vs. acquaintances), and as a result the voice of the specific digital character in the first artificially generated audible content may be a warm and/or expressive voice, and the voice of the specific digital character in the second artificially generated audible content may be a flat and/or monotone voice. In some examples, the determination of the first desired movement by step 906 may be based on the first degree of relation, and/or the determination of the second desired movement by step 914 may be based on the second degree of relation. For example, the second desired movement may differ from the first desired movement based on the second degree of relation being different from the first degree of relation, for example as described below.

In some examples, the first input received by step 604 may include a reference to a specific detail, the second input received by step 612 may include the reference to the specific detail, the first response generated by step 606 may refer to the specific detail, and the second response generated by step 614 may include no reference to the specific detail. In one example, the difference between the first and second response with regard to the specific detail may be based on a difference between the first digital data record accessed by step 602 and the second digital data record accessed by step 610, may be based on a difference in types of relation between the participants of the conversations, may be based on a different in degrees of relation between the participants of the conversations, and so forth. For example, each one of the first and second input may include 'Have you heard that Sarah got married to John', the first response may be 'You know that I secretly loved John for years, but I'm happy for them', and the second response may ignore that involvement of John in the engagement (for example, 'Weddings always make me happy'), for example when the relation between the specific digital character and the first character is more intimate than the relation between the specific digital character and the second character.

In some examples, the first input received by step 604 may include a specific question, the second input received by step 612 may include the specific question, the first response generated by step 606 and the second response generated by step 614 may include different answers to the specific question based on a difference between the second digital data record accessed by step 610 and the first digital data record accessed by step 602, based on a difference in types of relation between the participants of the conversations, based on a different in degrees of relation between the participants of the conversations, and so forth. For example, each one of the first and second input may include the question 'Why are you so sad?', the first response may indicate the specific reason for the sadness (for example, the first response may be or include 'My wife just left me'), and the second response may avoid the specific detail and give a general reason (for example, the second response may be or include 'There are some challenges in my personal life, it's been affecting my mood'), for example when the relation between the specific digital character and the first character is more intimate than the relation between the specific digital character and the second character. In some examples, the first input received by step 604 may include a specific question, the second input received by step 612 may include the specific question, the first response generated by step 606 may include an answer to the specific question, and the second response generated by step 614 may include no answer to the specific question, for example, based on a difference between the second digital data record accessed by step 610 and the first digital data record accessed by step 602, based on a difference in types of relation between the participants of the conversations, based on a different in degrees of relation between the participants of the conversations, and so forth. For example, each one of the first and second input may include the question 'Why don't you have kids yet?', the first response may indicate the specific reason (such as, 'We are trying for over a year without success'), and the second response may include no answer to the question (such as, 'Speaking of kids, have you visited your nephew recently? How is he doing?'), for example when the relation between the specific digital character and the first character is a doctor-patient relationship and the relation between the specific digital character and the second character is a friendly relationship.

In some examples, the first input received by step 604 may include a specific mistake, the second input received by step 612 may include the specific mistake, the first response generated by step 606 may refer to the specific mistake (for example, the first response may include a correction associated with the specific mistake, may indicate the specific mistake, and so forth), and the second response generated by step 614 may include no reference to the specific mistake, for example, based on a difference between the second digital data record accessed by step 610 and the first digital data record accessed by step 602, based on a difference in types of relation between the participants of the conversations, based on a different in degrees of relation between the participants of the conversations, and so forth. For example, each one of the first and second inputs may include 'Benjamin Franklin is my favorite US president, as he was both a president and a scientist', the first response may be or include 'Benjamin Franklin was one of the founding fathers, but he never become president', and the second response may be or include 'My favorite is George Washington', for example when the relation between the specific digital character and the first character is a teacher-student relationship and the relation between the specific digital character and the second character is a friendly relationship.

In some examples, the first input received by step 604 may be a response to a first output provided to the first character before the first input is received, the second input received by step 612 may be a response to a second output provided to the second character before the second input is received. In one example, the first output may convey a substantially same meaning as the second output, may be identical to the second output, may include same words as the second output, may be textually identical to the second output, may convey a different meaning than the second output, may differ from the second output, may include different words than the second output, may be textually different than the second output, and so forth. In another example, the first output may differ from the second output (for example, textually). Further, the first output may include a reference to a specific detail, and the second output may include the reference to the specific detail. Further, no one of the first and second inputs may include any reference to the specific detail. Further, the first response generated by step 606 may include another reference to the specific detail, and the second response generated by step 614 may include no reference to the specific detail, for example based on a difference between the second digital data record accessed by step 610 and the first digital data record accessed by step 602, based on a difference in types of relation between the participants of the conversations, based on a different in degrees of relation between the participants of the conversations, and so forth. For example, each one of the first and second outputs may include 'you have a midterm exam tomorrow', each one of the first and second inputs may include 'I'm going to John's birthday party', the first response may be or include 'You must study for this midterm exam you have tomorrow, you can't go', and the second response may be or include 'I won't be able to join', for example, when the relation between the specific digital character and the first character is a parent-child relationship and the relation between the specific digital character and the second character is a friendly relationship.

In some examples, the first input received by step 604 may be a response to a first output provided to the first character before the first input is received, and the second input received by step 612 may be a response to a second output provided to the second character before the second input is received, for example as described above. Further, the first output may include a specific question, and the second output includes the specific question. Further, no one of the first and second inputs may include any answer to the specific question. Further, the first response generated by step 606 may include a reference to the specific question, and the second response generated by step 614 may include no reference to the specific question, for example based on a difference between the second digital data record accessed by step 610 and the first digital data record accessed by step 602, based on a difference in types of relation between the participants of the conversations, based on a different in degrees of relation between the participants of the conversations, and so forth. For example, each one of the first and second outputs may include 'How was your math test today?', each one of the first and second inputs may include 'I hit a home run!', the first response may be or include 'Don't change the subject, how was your test?', and the second response may be or include 'That's wonderful!', for example, when the relation between the specific digital character and the first character is a parent-child relationship and the relation between the specific digital character and the second character is a friendly relationship.

In some examples, the first digital data record accessed by step 602 may indicate that a third character is a common acquaintance of the specific digital character and the first character. Further, the second digital data record accessed by step 610 may not indicate that the third character is a common acquaintance of the specific digital character and the second character (for example, the second digital data record may indicates that the third character is not a common acquaintance of the specific digital character and the second character, the second digital data record may be mute about the third character, and so forth). The first response generated by step 606 may include a reference to the third character, and/or the second response generated by step 614 may include no reference to the third character. For example, each one of the first and second inputs may be or include 'How was your visit to Vancouver?', the third character may be John, the first response may be or include 'I was surprised to meet John on the flight', and the second response may be or include 'Cold but fun'.

In some examples, the first digital data record accessed by step 602 may indicate that both the specific digital character and the first character are affiliated with a specific institute, and the second digital data record accessed by step 610 may not indicate not indicate that the second character is affiliated with the specific institute. Further, the generation of the first response by step 606 may be based on the specific institute, and the generation of the second response by step 614 may not be based on the specific institute. For example, the specific institute may be a school that both the specific digital character and the first character attended, may be an army unit that both the specific digital character and the first character were in, may be a workplace (historic and/or current) that is common to both the specific digital character and the first character, and so forth. In one example, the generated first response may include a reference to the specific institute, and the generated second response may include no reference to the specific institute. In another example, the generated first response may include a phrase associated with the specific institute (such as a motto, a citation from a text associated with the specific institute, and so forth), and the generated second response may not include the phrase. In one example, the specific institute may be the Marines, each one of the first and second inputs may be or include 'I heard that you visited John's widow. How was that?', the first response may be or include 'Yeah, I did. It was tough, you know, but semper fi, its part of it', and the second response may be or include 'Yeah, it was difficult, but I wanted to be there for her'.

In some examples, the first digital data record accessed by step 602 may indicate that both the specific digital character and the first character are associated with a specific event, and the second digital data record accessed by step 610 may not indicate that the second character is associated with the specific event. Further, the generation of the first response by step 606 may be based on the specific event, and the generation of the second response by step 614 may not be based on the specific event. In one example, the specific event may be a specific prospective event. For example, the first response may include a plan for a common activity of the specific digital character and the first character associated with the specific prospective event, and the second response may include no plan associated with the specific prospective event. In another example, the specific event may be a specific historic event. For example, the first response may include a reference to an incident that occurred during specific historic event, and the second response may include no reference to incidents that occurred during specific historic event. In one example, specific event may be a planned trip to Italy, each one of the first and second inputs may be or include 'I want to hear your opinion on the new project', the first response may be or include 'Let's discuss this on the flight to Italy', and the second response may be or include 'Let's find a time to discuss this'.

In some examples, the first response generated by step 606 may treat the first input received by step 604 as a humoristic remark and the second response generated by step 614 may treat the second input received by step 612 as an offensive remark, for example based on a difference between the second digital data record accessed by step 610 and the first digital data record accessed by step 602, based on a difference in types of relation between the participants of the conversations, based on a different in degrees of relation between the participants of the conversations, and so forth. In some examples, the first response generated by step 606 may treat the first input as a friendly remark and the second response generated by step 614 may treat the second input as an offensive remark, for example based on a difference between the second digital data record accessed by step 610 and the first digital data record accessed by step 602, based on a difference in types of relation between the participants of the conversations, based on a different in degrees of relation between the participants of the conversations, and so forth. For example, each one of the first and second inputs may be or include 'your singing is starting a new genre called unconventional ear torture', the first response may be 'I'm giving everyone a free concert, you're welcome for the unforgettable experience', and the second response may be 'That's harsh! You can leave it that's not to your taste', for example, when the relation between the specific digital character and the first character is a close friendship, and the specific digital character and the second character are strangers.

FIG. 7 is a flowchart of an exemplary process 700 for personalization of voice characteristics via conversational artificial intelligence, consistent with some embodiments of the present disclosure. In this example, process 700 may comprise accessing a first digital data record associated with a relation between a specific digital character and a first character (step 602); receiving from the first character a first input in a natural language (step 604); using a conversational artificial intelligence model to analyze the first digital data record and the first input to determine a first desired at least one suprasegmental feature (step 706); using the first desired at least one suprasegmental feature to generate an audible speech output during a communication of the specific digital character with the first character (step 708); accessing a second digital data record associated with a relation between the specific digital character and a second character (step 610), the second character differs from the first character; receiving from the second character a second input in the natural language (step 612), the second input conveys a substantially same meaning as the first input; using the conversational artificial intelligence model to analyze the second digital data record and the second input to determine a second desired at least one suprasegmental feature (step 714), the second desired at least one suprasegmental feature differs from the first desired at least one suprasegmental feature; and using the second desired at least one suprasegmental feature to generate an audible speech output during a communication of the specific digital character with the second character (step 716). In other examples, process 700 may include additional steps or fewer steps. In other examples, one or more steps of process 700 may be executed in a different order and/or one or more groups of steps may be executed simultaneously. In some examples, the first desired at least one suprasegmental feature determined by step 706 may include at least one of intonation, stress, pitch, rhythm, tempo, loudness or prosody. In some examples, the second desired at least one suprasegmental feature determined by step 714 may include at least one of intonation, stress, pitch, rhythm, tempo, loudness or prosody. In some examples, the first desired at least one suprasegmental feature determined by step 706 may differ from the second desired at least one suprasegmental feature determined by step 714 in at least one of intonation, stress, pitch, rhythm, tempo, loudness or prosody. In one example, the communication of the specific digital character with the first character (of step 708) may not involve the second character, and/or the communication of the specific digital character with the second character (of step 716) may not involve the first character. In another example, the communication of the specific digital character with the first character (of step 708) and the communication of the specific digital character with the second character (of step 716) may be part of a group conversation between the specific digital character, the first character and the second character.

In some examples, a system for personalization of voice characteristics via conversational artificial intelligence may include at least one processing unit configured to perform process 700. In one example, the system may further comprise at least one audio sensor, the first input may be a first audible verbal input, the second input may be a second audible verbal input, the receiving the first input by step 604 may include capturing the first audible verbal input using the at least one audio sensor, and the receiving the second input by step 612 may include capturing the second audible verbal input using the at least one audio sensor. In one example, the system may further comprise at least one audio speaker, the generation of each one of the audible speech outputs (by step 708 and step 716) may include generating the respective audible speech output using the at least one audio speaker. In some examples, a method for personalization of voice characteristics via conversational artificial intelligence may include performing process 700. In some examples, a non-transitory computer readable medium may store computer implementable instructions that when executed by at least one processor may cause the at least one processor to perform operations for personalization of voice characteristics via conversational artificial intelligence, and the operations may include the steps of process 700.

In some examples, a conversational artificial intelligence model (such as the conversational artificial intelligence model accessed by step 1001, a different conversational artificial intelligence model, etc.) may be used to analyze a digital data record (such as a digital data record associated with a relation between two characters) and an input (such as an input in a natural language received from one of the two characters) to determine a desired at least one suprasegmental feature. For example, step 706 may comprise using a conversational artificial intelligence model (such as the conversational artificial intelligence model accessed by step 1001, the conversational artificial intelligence model accessed by step 714, a different conversational artificial intelligence model, etc.) to analyze the first digital data record accessed by step 602 and the first input received by step 604 to determine a first desired at least one suprasegmental feature. In another example, step 714 may comprise using a conversational artificial intelligence model (such as the conversational artificial intelligence model accessed by step 1001, the conversational artificial intelligence model accessed by step 706, a different conversational artificial intelligence model, etc.) to analyze the second digital data record accessed by step 610 and the second input received by step 612 to determine a second desired at least one suprasegmental feature. In one example, the second desired at least one suprasegmental feature determined by step 714 may differ from the first desired at least one suprasegmental feature determined by step 706. In another example, the second desired at least one suprasegmental feature determined by step 714 and the first desired at least one suprasegmental feature determined by step 706 may be identical. For example, a conversational artificial intelligence model may be or include a LLM, the LLM may be used to analyze a textual representation of information from the digital data record and a textual representation of the input (for example with a suitable textual prompt, such as 'what suprasegmental features should be used when responding to this input . . . received from a person, when your relation with this person is as follows . . . ') to determine the desired at least one suprasegmental feature. In another example, a conversational artificial intelligence model may be or include a machine learning model, and the machine learning model may be used to analyze the digital data record and the input to determine the desired at least one suprasegmental feature. The machine learning model may be a machine learning model trained using training examples to determine desired suprasegmental features based on inputs and/or digital data records and/or additional information. An example of such training example may include a sample input together with a sample digital data record and/or sample additional information, together with one or more sample desired suprasegmental features.

In some examples, a digital data record (such as a digital data record associated with a relation between the two characters) may be analyzed to identify a particular mathematical object in the mathematical space, for example using module 284. Further, a convolution of a fragment of an input (such as an input in a natural language received from one of two characters participating in a conversation, an audible verbal input, a visual input, etc.) may be calculated to obtain a particular numerical result value. Further, a function of the particular numerical result value and the particular mathematical object may be calculated to obtain a calculated mathematical object in the mathematical space, for example using module 286. Further, a determination of desired at least one suprasegmental feature may be based on the calculated mathematical object. For example, a conversational artificial intelligence model may be or include a machine learning model as described above, and the machine learning model may be used as described above with the calculated mathematical object as additional information to determine the desired at least one suprasegmental feature. In another example, when the calculated mathematical object includes a specific numerical value, one desired at least one suprasegmental feature may be determined, and when the calculated mathematical object does not include the specific numerical value, a different desired at least one suprasegmental feature may be determined. In one example, step 706 may analyze the first digital data record accessed by step 602 to identify a first mathematical object in a mathematical space, calculate a convolution of a fragment of the first input received by step 604 to obtain a first numerical result value, calculate a function of the first numerical result value and the first mathematical object to obtain a third mathematical object in the mathematical space, and base the determination of the first desired at least one suprasegmental feature on the third mathematical object. In another example, step 714 may analyze the second digital data record accessed by step 610 to identify a second mathematical object in the mathematical space, calculate a convolution of a fragment of the second input received by step 612 to obtain a second numerical result value, calculate a function of the second numerical result value and the second mathematical object to obtain a fourth mathematical object in the mathematical space, and base the determination of the second desired at least one suprasegmental feature on the fourth mathematical object.

In some examples, a specific mathematical object in a mathematical space may be identified, wherein the specific mathematical object may correspond to a common word or a common part included in both the first input received by step 604 and in the second input received by step 610, for example using module 282 and/or module 284. Further, a digital data record may be analyzed to identify a particular mathematical object in the mathematical space, for example using module 284. Further, a function of the specific mathematical object and the particular mathematical object may be calculated to obtain a calculated mathematical object, for example using module 286. Further, a determination of a desired at least one suprasegmental feature may be based on the calculated mathematical object. For example, when the calculated mathematical object includes a particular numerical value, it may be determined that a particular suprasegmental feature is desired, and when the calculated mathematical object does not include particular numerical value, it may be determined that a particular suprasegmental feature is not desired. In another example, a conversational artificial intelligence model may be or include a machine learning model as described above, and the machine learning model may be used as described above with the calculated mathematical object as additional information to determine the desired at least one suprasegmental feature. For example, step 706 may analyze the first digital data record accessed by step 602 to identify a first mathematical object in the mathematical space (for example using module 284), may calculate a function of the specific mathematical object and the first mathematical object to obtain a third mathematical object in the mathematical space (for example using module 286), and may base the determination of the first desired at least one suprasegmental feature on the third mathematical object. In another example, step 714 may analyze the second digital data record accessed by step 610 to identify a second mathematical object in the mathematical space (for example using module 284), may calculate a function of the specific mathematical object and the second mathematical object to obtain a fourth mathematical object in the mathematical space (for example using module 286), and may base the determination of the second desired at least one suprasegmental feature on the fourth mathematical object. For example, to determine desired at least one suprasegmental feature based on a selected mathematical object, the machine learning model may be used as described above with the selected mathematical object as the additional information. In another example, when the selected mathematical object includes a particular numerical value, one desired at least one suprasegmental feature may be determined, and when the selected mathematical object does not include the particular numerical value, a different desired at least one suprasegmental feature may be determined.

In some examples, specific information associated with the specific digital character of process 700 may be accessed, for example as described above. Further, a conversational artificial intelligence model may be used to analyze the specific information, a digital data record (such as a digital data record associated with a relation between the specific digital character and another character, the first digital data record accessed by step 602, the second digital data record accessed by step 610, etc.) and an input (such as an input received from a character, the first input received by step 604, the second input received by step 612, etc.) to determine a desired at least one suprasegmental feature. For example, step 706 may use the conversational artificial intelligence model to analyze the specific information, the first digital data record accessed by step 602 and the first input received by step 604 to determine the first desired at least one suprasegmental feature. In another example, step 714 may use the conversational artificial intelligence model to analyze the specific information, the second digital data record accessed by step 610 and the second input received by step 612 to determine the second desired at least one suprasegmental feature. For example, a conversational artificial intelligence model may be or include a LLM, the LLM may be used to analyze a representation of specific information, a textual representation of information from the digital data record and a textual representation of the input (for example with a suitable textual prompt, such as 'what suprasegmental features should be used when responding to this input . . . received from a person, when your relation with this person is as follows . . . , and when you are as follows . . . ') to determine the desired at least one suprasegmental feature. In another example, a conversational artificial intelligence model may be or include a machine learning model as described above, and the machine learning model may be used as described above with the specific information as additional information to determine the desired at least one suprasegmental feature.

In some examples, an indication of a characteristic of an ambient noise may be obtained, wherein the ambient noise is associated with a communication of the specific digital character with another character. For example, an indication of a characteristic of a first ambient noise may be obtained, wherein the first ambient noise is associated with the communication of the specific digital character with the first character (of step 708). In another example, an indication of a characteristic of a second ambient noise may be obtained, wherein the second ambient noise is associated with the communication of the specific digital character with the second character (of step 716). For example, audio data captured using at least one audio sensor during the communication of the specific digital character with the other character may be analyzed to determine the characteristic of the ambient noise. In another example, the indication of the characteristic of the ambient noise may be read from memory, may be received from an external computing device (for example, using a digital communication device), may be received from an individual (for example, via a user interface), and so forth. Some non-limiting examples of such characteristic of an ambient noise may include frequency range, intensity, temporal variation, source diversity, spatial distribution, harmonic content, and so forth. In some examples, a determination of a desired at least one suprasegmental feature may be based, additionally or alternatively, on a characteristic of an ambient noise. For example, step 706 may further base the determination of the first desired at least one suprasegmental feature on the characteristic of the first ambient noise. In another example, step 714 may further base the determination of the second desired at least one suprasegmental feature on the characteristic of the second ambient noise. For example, a conversational artificial intelligence model may be or include a LLM, the LLM may be used to analyze a textual representation of the characteristic of the ambient noise, a textual representation of information from the digital data record and a textual representation of the input (for example with a suitable textual prompt, such as 'what suprasegmental features should be used when responding to this input . . . received from a person, when your relation with this person is as follows . . . , and when the ambient noise is . . . ') to determine the desired at least one suprasegmental feature. In another example, a conversational artificial intelligence model may be or include a machine learning model as described above, and the machine learning model may be used as described above with the characteristic of the ambient noise as additional information to determine the desired at least one suprasegmental feature. In one example, when the characteristic of the ambient noise is high intensity, the desired at least one suprasegmental feature may include a higher volume, and when the characteristic of the ambient noise is a low intensity, the desired at least one suprasegmental feature may include a lower volume. In another example, when the characteristic of the ambient noise is high frequency range, the desired at least one suprasegmental feature may include a higher pitch and/or frequency modulation in speech (for example, to enhance intelligibility), and when the characteristic of the ambient noise is lower frequency range, the desired at least one suprasegmental feature may include a lower pitch and/or emphasis on lower frequencies (for example, to ensure clarity and contrast against the background noise).

In some examples, a desired at least one suprasegmental feature may be used to generate an audible speech output during a desired timeframe (for example, during a communication of a digital character with another character, during a communication with an entity, and so forth). For example, step 708 may comprise using the first desired at least one suprasegmental feature determined by step 706 to generate an audible speech output during a communication of the specific digital character (of step 602 and/or step 610 and/or step 716) with the first character (of step 602 and/or step 604). In another example, step 716 may comprise using the second desired at least one suprasegmental feature determined by step 714 to generate an audible speech output during a communication of the specific digital character (of step 602 and/or step 610 and/or step 708) with the second character (of step 610 and/or step 612). In yet another example, step 1108 may comprise using a desired at least one suprasegmental feature (such as the desired at least one suprasegmental feature determined by step 1106, the desired at least one suprasegmental feature determined by step 1506, a different desired at least one suprasegmental feature, etc.) to generate an audible speech output during a communication with the entity. For example, the generated audible speech output may include an articulation (for example, of one or more utterances, of one or more words, of one or more non-verbal sounds, of a response, of the response generated as described above in relation to step 606 and/or step 614, etc.) based on the desired at least one suprasegmental feature. In one example, an expressive text-to-speech algorithm may be used to generate the audible speech output based on the desired at least one suprasegmental feature and/or a textual content in a natural language. In another example, a machine learning model may be used to generate articulations based on the desired at least one suprasegmental feature and/or a textual content in a natural language. The machine learning model may be a machine learning model trained using training examples to generate articulation based on texts and desired suprasegmental features and/or textual contents. An example of such training example may include a sample content and a sample desired suprasegmental feature, together with a sample audible articulation of the sample content based on the sample desired suprasegmental feature.

In some examples, the generation of the audible speech output during the communication of the specific digital character with the first character (by step 708) and the generation of the audible speech output during the communication of the specific digital character with the second character (by step 716) may be at least partly simultaneous. For example, the different generated audible speech outputs may be outputted using different audio speakers in different environments, may be outputted using different personal audio systems (such as wearable personal audio systems, headphones, earphones, earbuds, etc.), and so forth. In some examples, the generation of the audible speech output during the communication of the specific digital character with the first character (by step 708) and the generation of the audible speech output during the communication of the specific digital character with the second character (by step 716) may be asynchronous. For example, the different generated audible speech outputs may be outputted using the same audio speaker at different times. In one example, the generation of the audible speech output during the communication of the specific digital character with the second character (by step 716) may start after the generation of the audible speech output during the communication of the specific digital character with the first character (by step 708) was completed.

In some examples, the usage of suprasegmental features may be configured to convey emotions, such as happiness, sadness, anger, surprise, fear, boredom, confusion, excitement, and so forth. For example, to convey happiness, a higher pitch, faster speech rate, and/or bouncy rhythm may be used. In another example, to convey sadness, a lower pitch, slower speech rate, and/or drawn-out vowels may be used. In yet another example, to convey anger, an increased volume, stronger stress, and/or a faster, choppier rhythm may be used. In an additional example, to convey surprise, a raised pitch at the end of a sentence may be used. In another example, to convey fear, a shaky voice, breathy speech, and/or a whisper may be used. In yet another example, to convey boredom, a monotonous pitch and/or slow, drawn-out rhythm may be used. In an additional example, to convey confusion, a rising pitch at the end of statements or a hesitant, halting rhythm may be used. In another example, to convey excitement, a rising pitch throughout a sentence, increased volume, and/or a faster speech rate may be used. In some examples, the usage of the first desired at least one suprasegmental feature by step 708 may be configured to convey a particular emotion, and the usage of the second desired at least one suprasegmental feature by step 716 may not be configured to convey the particular emotion. In one example, the usage of the second desired at least one suprasegmental feature by step 716 may be configured to convey an emotion different from the particular emotion.

In some examples, the usage of suprasegmental features may be configured to convey intent (for example, to communicative goal the specific digital character has behind the utterance), such as asking a question, making a statement, giving a command, expressing uncertainty, and so forth. For example, to convey an intent of asking a question, the pitch may rise at the end of the question. In another example, to convey an intent of making a statement, a slight drop in pitch at the end of the statement may be used. In yet another example, to convey an intent of giving a command, a stronger emphasis may be given to selected words, for example by increasing pitch and/or volume on the selected words. In an additional example, to convey an intent of expressing uncertainty, a wavering pitch and/or a slower, more drawn-out speaking style, may be used. In some examples, the usage of the first desired at least one suprasegmental feature by step 708 may be configured to convey a particular intent, and the usage of the second desired at least one suprasegmental feature by step 716 may not be configured to convey the particular intent. In one example, the usage of the second desired at least one suprasegmental feature by step 716 may be configured to convey an intent different from the particular intent.

In some examples, the usage of the first desired at least one suprasegmental feature by step 708 may be configured to convey confidence, and/or the usage of the second desired at least one suprasegmental feature by step 716 may be configured to convey uncertainty. In one example, to convey confidence, a moderate pace of speaking, a moderate volume, a steady pitch with slight variations, and/or a clear intonation may be used. In one example, to convey uncertainty, a rising pitch at an end of a sentence or a statement, softer volume, a non-moderate pace of speaking, and/or an upward inflection at the end of a sentence may be used. In some examples, the usage of the first desired at least one suprasegmental feature by step 708 may be configured to convey engagement in the communication of the specific digital character with the first character, and/or the usage of the second desired at least one suprasegmental feature by step 716 may be configured to convey detachment. In one example, to convey engagement in the communication, a higher pitch may be used to signal interest and excitement. In one example, to convey detachment, a flat, monotone pitch, low volume, slow speaking pace, and/or a monotonous rhythm may be used. In some examples, the usage of the first desired at least one suprasegmental feature by step 708 may be configured to convey interest, and/or the usage of the second desired at least one suprasegmental feature by step 716 may be configured to convey boredom. In one example, to convey interest and/or enthusiasm and/or curiosity, a slightly higher pitch than usual. In one example, to convey interest and/or enthusiasm and/or curiosity, a monotone pitch may be avoided. In one example, to convey interest and/or openness to further information or elaboration, the pitch and/or intonation may be raised at end of a phrase, even in a statement. In one example, to convey interest and/or show excitement about specific detail, the volume may be raised slightly and/or stress and/or volume may be varied. In one example, to convey boredom, a flat monotone pitch, a downward inflection at an end of a phrase, a monotone intonation, a monotone rhythm, and/or low volume may be used. In some examples, the usage of the first desired at least one suprasegmental feature by step 708 may be configured to convey empathy, and the usage of the second desired at least one suprasegmental feature by step 716 may not be configured to convey empathy. For example, to convey empathy, a softer tone, a gentle inflection, a slower speaking rate, and/or mirroring the speaker's pitch may be used. Further, to avoid conveying empathy, a firmer tone, a stronger inflection, and/or a faster speaking rate may be used. In one example, to convey sarcasm, an exaggerated pitch contours or a slow, monotone delivery may be used. In another example, to convey secrecy, a lowered pitched and/or hushed tone may be used. In yet another example, to convey authority, a strong, steady rhythm and a deep, confident pitch may be used. In an additional example, to convey flirtation, a breathy voice, a higher pitch, and/or slower, drawn-out vowels may be used. In another example, to convey intoxication, a slow, slurred speech rate with imprecise pronunciation may be used. In another example, to convey teasing, a playful tone, with a sing-song rhythm and light stress on certain words may be used.

In some examples, the first desired at least one suprasegmental feature determined by step 706 may include a first group of one or more suprasegmental features and a second group of one or more suprasegmental features (the second group of one or more suprasegmental features may differ from the first group of one or more suprasegmental features), and the audible speech output generated by step 708 during the communication of the specific digital character with the first character may include an articulation of a first part based on the first group of one or more suprasegmental features and an articulation of a second part based on the second group of one or more suprasegmental features. In one example, the first part may include at least a particular word articulated based on the first group of one or more suprasegmental features, and the second part may include at least the particular word articulated based on the second group of one or more suprasegmental features. In one example, the first part may include at least a particular word articulated based on the first group of one or more suprasegmental features, and the second part may include at least a non-verbal sound articulated based on the second group of one or more suprasegmental features. In one example, the first part may include at least a first non-verbal sound articulated based on the first group of one or more suprasegmental features, the second part may include at least a second non-verbal sound articulated based on the second group of one or more suprasegmental features, and the second non-verbal sound may differ from the first non-verbal sound. In one example, the first part may include at least a first word articulated based on the first group of one or more suprasegmental features, the second part may include at least a second word articulated based on the second group of one or more suprasegmental features, and the second word may differ from the first word. For example, the conversational artificial intelligence model may be used to analyze the first digital data record and the first input to determine the first word and the second word, for example as described above in relation to process 600 and/or step 606. Further, the conversational artificial intelligence model may be used to analyze the first digital data record and the first input to associate the first word with the first group of one or more suprasegmental features and to associate the second word with the second group of one or more suprasegmental features. For example, the conversational artificial intelligence model may be used to analyze the first digital data record and the first word (for example, as described above, replacing the input with the first word) to determine the first group of one or more suprasegmental features, and may be used to analyze the first digital data record and the second word (for example, as described above, replacing the input with the second word) to determine the second group of one or more suprasegmental features, and step 706 may include in the determined first desired at least one suprasegmental feature both the first and second groups. Additionally or alternatively, the second desired at least one suprasegmental feature determined by step 714 may include a third group of one or more suprasegmental features and a fourth group of one or more suprasegmental features, the audible speech output generated by step 716 during the communication of the specific digital character with the second character may include an articulation of a first portion based on the third group of one or more suprasegmental features and an articulation of a second portion based on the fourth group of one or more suprasegmental features, the third group of one or more suprasegmental features may differ from the first group of one or more suprasegmental features, the fourth group of one or more suprasegmental features may differ from the second group of one or more suprasegmental features, and the fourth group of one or more suprasegmental features may differ from the third group of one or more suprasegmental features. In one non-limiting example, the first part may include at least a first word articulated based on the first group of one or more suprasegmental features, the second part may include at least a second word articulated based on the second group of one or more suprasegmental features, the first portion may include at least the first word articulated based on the third group of one or more suprasegmental features, the second portion may include the second word articulated based on the fourth group of one or more suprasegmental features, and the second word may differ from the first word.

FIG. 8 is a flowchart of an exemplary process 800 for personalization of media content generation via conversational artificial intelligence, consistent with some embodiments of the present disclosure. In this example, process 800 may comprise accessing a first digital data record associated with a relation between a specific digital character and a first character (step 602); receiving from the first character a first input in a natural language (step 604); using a conversational artificial intelligence model to analyze the first digital data record and the first input to generate a first media content (step 806); using the first media content in a communication of the specific digital character with the first character (step 808); accessing a second digital data record associated with a relation between the specific digital character and a second character (step 610), the second character differs from the first character; receiving from the second character a second input in the natural language (step 612), the second input conveys a substantially same meaning as the first input; using the conversational artificial intelligence model to analyze the second digital data record and the second input to generate a second media content (step 814), the second media content differs from the first media content; and using the second media content in a communication of the specific digital character with the second character (step 816). In other examples, process 800 may include additional steps or fewer steps. In other examples, one or more steps of process 800 may be executed in a different order and/or one or more groups of steps may be executed simultaneously. In one example, the first input may be indicative of a desire of the first character to obtain a first at least one media content, and wherein the second input may be indicative of a desire of the second character to obtain a second at least one media content. For example, each one of the first and second inputs may include 'Do you have a picture of us from back then?' In another example, each one of the first and second inputs may include 'Please generate a video of the two of us in a trip to New York'. In one example, the generated first media content may include a reaction of the specific digital character to the first input, and/or the generated second media content may include a reaction of the specific digital character to the second input. For example, a reaction to an input included in a media content may include at least one of a depiction of a gesture reacting to the input, a facial expression reacting to the input, or an audible verbal response to the input. In one example, the communication of the specific digital character with the first character (of step 808) may not involve the second character, and/or the communication of the specific digital character with the second character (of step 816) may not involve the first character. In another example, the communication of the specific digital character with the first character (of step 808) and the communication of the specific digital character with the second character (of step 816) may be part of a group conversation between the specific digital character, the first character and the second character.

In some examples, a system for personalization of media content generation via conversational artificial intelligence may include at least one processing unit configured to perform process 800. In one example, the system may further comprise at least one audio sensor, the first input may be a first audible verbal input, the second input may be a second audible verbal input, the receiving the first input by step 604 may include capturing the first audible verbal input using the at least one audio sensor, and the receiving the second input by step 612 may include capturing the second audible verbal input using the at least one audio sensor. In one example, the system may further comprise at least one visual presentation device, the first media content generated by step 806 may include a first visual content, the second media content generated by step 814 may include a second visual content, the using the first media content by step 808 may include using the at least one visual presentation device to present the first visual content, and the using the second media content by step 816 may include using the at least one visual presentation device to present the second visual content. In one example, the system may further comprise at least one audio speaker, the first media content generated by step 806 may include a first audible content, and the second media content generated by step 814 may include a second audible content, the using the first media content by step 808 may include outputting the first audible content using the at least one audio speaker, and the using the second media content by step 816 may include outputting the second audible content using the at least one audio speaker. In some examples, a method for personalization of media content generation via conversational artificial intelligence may include performing process 800. In some examples, a non-transitory computer readable medium may store computer implementable instructions that when executed by at least one processor may cause the at least one processor to perform operations for personalization of media content generation via conversational artificial intelligence, and the operations may include the steps of process 800.

In some examples, a conversational artificial intelligence model (such as the conversational artificial intelligence model accessed by step 1001, a different conversational artificial intelligence model, etc.) may be used to analyze a digital data record (such as a digital data record associated with a relation between two characters) and an input (such as an input in a natural language received from one of the two characters) to generate a media content. For example, step 806 may comprise using a conversational artificial intelligence model (such as the conversational artificial intelligence model accessed by step 1001, the conversational artificial intelligence model accessed by step 814, a different conversational artificial intelligence model, etc.) to analyze the first digital data record accessed by step 602 and the first input received by step 604 to generate a first media content. In another example, step 814 may comprise using a conversational artificial intelligence model (such as the conversational artificial intelligence model accessed by step 1001, the conversational artificial intelligence model accessed by step

806, a different conversational artificial intelligence model, etc.) to analyze the second digital data record accessed by step 610 and the second input received by step 612 to generate a second media content. In one example, the second media content determined by step 814 may differ from the first media content determined by step 806. In another example, the second media content determined by step 814 may be identical to the first media content determined by step 806. For example, a conversational artificial intelligence model may be or include a multimodal LLM, the multimodal LLM may be used to analyze a textual representation of information from the digital data record and a textual representation of the input (for example with a suitable textual prompt, such as 'generate a {type of the desired media content} in response to this input {a textual representation of the input} received from a person, when your relation with this person is as follows {a textual representation of information included in the digital data record}') to generate the media content. In another example, a conversational artificial intelligence model may be or include a machine learning model, and the machine learning model may be used to analyze the digital data record and the input to generate the media content. The machine learning model may be a machine learning model trained using training examples to generate contents based on inputs and/or digital data records and/or additional information. An example of such training example may include a sample input together with a sample digital data record and/or sample additional information, together with a sample media content. In one example, the first media content generated by step 806 may be a first visual content, and the second media content generated by step 814 may be a second visual content. In another example, the first media content generated by step 806 may be a first audible content, and the second media content generated by step 814 may be a second audible content. In yet another example, the first media content generated by step 806 may be a visual content, and the second media content generated by step 814 may be an audible content. Some non-limiting examples of such visual contents may include an image, a series of images, a video, a video frame, a 2D visual content, a 3D visual content, an illustration, a grayscale visual content, a color visual content, and so forth. Some non-limiting examples of such audible contents may include audio stream, audio track of a video, audio content that includes speech, audio content that includes music, audio content that includes ambient noise, digital audio data, analog audio data, digital audio signals, analog audio signals, mono audio content, stereo audio content, surround audio content, and so forth. In some example, the first media content generated by step 806 may include a specific non-verbal sound, and the second media content generated by step 814 may not include the specific non-verbal sound. In some examples, the first media content generated by step 806 may include a specific visual symbol, and the second media content generated by step 814 may not include the specific visual symbol.

In some examples, a digital data record (such as a digital data record associated with a relation between the two characters) may be analyzed to identify a particular mathematical object in the mathematical space, for example using module 284. Further, a convolution of a fragment of an input (such as an input in a natural language received from one of two characters participating in a conversation, an audible verbal input, a visual input, etc.) may be calculated to obtain a particular numerical result value. Further, a function of the particular numerical result value and the particular mathematical object may be calculated to obtain a calculated mathematical object in the mathematical space, for example using module 286. Further, a generation of a media content may be based on the calculated mathematical object. For example, a conversational artificial intelligence model may be or include a machine learning model as described above, and the machine learning model may be used as described above with the calculated mathematical object as additional information to generate the media content. In another example, when the calculated mathematical object includes a specific numerical value, one media content may be generated, and when the calculated mathematical object does not include the specific numerical value, a different media content may be generated. In one example, step 806 may analyze the first digital data record accessed by step 602 to identify a first mathematical object in a mathematical space, calculate a convolution of a fragment of the first input received by step 604 to obtain a first numerical result value, calculate a function of the first numerical result value and the first mathematical object to obtain a third mathematical object in the mathematical space, and base the generation of the first media content on the third mathematical object. In another example, step 714 may analyze the second digital data record accessed by step 610 to identify a second mathematical object in the mathematical space, calculate a convolution of a fragment of the second input received by step 612 to obtain a second numerical result value, calculate a function of the second numerical result value and the second mathematical object to obtain a fourth mathematical object in the mathematical space, and base the generation of the first media content on the fourth mathematical object.

In some examples, a specific mathematical object in a mathematical space may be identified, wherein the specific mathematical object may correspond to a common word or a common part included in both the first input received by step 604 and in the second input received by step 610, for example using module 282 and/or module 284. Further, a digital data record may be analyzed to identify a particular mathematical object in the mathematical space, for example using module 284. Further, a function of the specific mathematical object and the particular mathematical object may be calculated to obtain a calculated mathematical object, for example using module 286. Further, the generation of a media content may be based on the calculated mathematical object. For example, when the calculated mathematical object includes a particular numerical value, a particular element (such as a particular visual element, a particular sound, etc.) may be included in the generated media content, and when the calculated mathematical object does not include particular numerical value, the particular element may not be included in the generated media content. In another example, a conversational artificial intelligence model may be or include a machine learning model as described above, and the machine learning model may be used as described above with the calculated mathematical object as additional information to generate the media content. For example, step 806 may analyze the first digital data record accessed by step 602 to identify a first mathematical object in the mathematical space (for example using module 284), may calculate a function of the specific mathematical object and the first mathematical object to obtain a third mathematical object in the mathematical space (for example using module 286), and may base the generation of the first media content on the third mathematical object. In another example, step 814 may analyze the second digital data record accessed by step 610 to identify a second mathematical object in the mathematical space (for example using module 284), may calculate a function of the specific mathematical object and the second mathematical object to obtain a fourth mathematical object in the mathematical space (for example using module 286), and may base the generation of the second media content on the fourth mathematical object. For example, to generate a media content based on a selected mathematical object, the machine learning model may be used as described above with the selected mathematical object as the additional information. In another example, the selected mathematical object may be used a seed for a generative model generating the media content.

In some examples, specific information associated with the specific digital character of process 800 may be accessed, for example as described above. Further, a conversational artificial intelligence model may be used to analyze the specific information, a digital data record (such as a digital data record associated with a relation between the specific digital character and another character, the first digital data record accessed by step 602, the second digital data record accessed by step 610, etc.) and an input (such as an input received from a character, the first input received by step 604, the second input received by step 612, etc.) to generate a media content. For example, step 806 may use the conversational artificial intelligence model to analyze the specific information, the first digital data record accessed by step 602 and the first input received by step 604 to generate the first media content. In another example, step 814 may use the conversational artificial intelligence model to analyze the specific information, the second digital data record accessed by step 610 and the second input received by step 612 to generate the second media content. For example, a conversational artificial intelligence model may be or include a multimodal LLM, the multimodal LLM may be used to analyze a textual representation of specific information, a textual representation of information from the digital data record and a textual representation of the input (for example with a suitable textual prompt, such as 'generate a {type of the desired media content} in response to this input {a textual representation of the input} received from a person, when your relation with this person is as follows {a textual representation of information included in the digital data record}, and when you are as follows {a textual representation of information included in the specific information}') to generate the media content. In another example, a conversational artificial intelligence model may be or include a machine learning model as described above, and the machine learning model may be used as described above with the specific information as additional information to generate the media content.

In some examples, the second media content generated by step 814 may differ from the first media content generated by step 806 in a formality level, for example based on the second digital data record accessed by step 610 being different from the first digital data record accessed by step 602. For example, the first media content may depict individuals in casual wear and the second media content may depict individuals in elegant attire to convey a higher level of formality in the second media content. In another example, the first media content may include speech in a casual language register and the second media content may include speech in a formal language register to convey a higher level of formality in the second media content. In some examples, the second media content generated by step 814 may differ from the first media content generated by step 806 in an intimacy level, for example based on the second digital data record accessed by step 610 being different from the first digital data record accessed by step 602. For example, the first media content may include soft lighting and the second media content may include harsh lighting to convey a higher level of intimacy in the first media content. In another example, the first media content may include speech in a lower pitch and/or slow speech rate (for example, to simulate a seductive voice) and the second media content may include the speech in a higher pitch and/or faster speech rate to convey a higher level of intimacy in the first media content. In some examples, the second media content generated by step 814 may differ from the first media content generated by step 806 in a style, for example based on the second digital data record accessed by step 610 being different from the first digital data record accessed by step 602. For example, the first media content may be in a cartoonish style and the second media content may be in a realistic style. In some examples, the second media content generated by step 814 may differ from the first media content generated by step 806 in an empathy level, for example based on the second digital data record accessed by step 610 being different from the first digital data record accessed by step 602. For example, the first media content may depict subtle smiles and/or soft eyes, while the second media content may depict neutral facial expressions. In another example, the first media content may include speech with a softer tone, a gentle inflection and/or a slower speaking rate than the second media content to convey a higher level of empathy. In some examples, the first media content generated by step 806 may be a first artificially generated visual content depicting the specific digital character and the first character, the second media content generated by step 814 may be a second artificially generated visual content depicting the specific digital character and the second character, and a distance between the specific digital character and the first character in the first artificially generated visual content may differ from a distance between the specific digital character and the second character in the second artificially generated visual content, for example based on the second digital data record accessed by step 610 being different from the first digital data record accessed by step 602. In some examples, the first media content generated by step 806 may be a first artificially generated visual content depicting the specific digital character and the first character, the second media content generated by step 814 may be a second artificially generated visual content depicting the specific digital character and the second character, and a spatial orientation of the specific digital character relative to the first character in the first artificially generated visual content may differ from a spatial orientation of the specific digital character relative to the second character in the second artificially generated visual content, for example based on the second digital data record accessed by step 610 being different from the first digital data record accessed by step 602. In some examples, the first media content generated by step 806 may be a first artificially generated visual content depicting the specific digital character, the second media content generated by step 814 may be a second artificially generated visual content depicting the specific digital character, and an appearance of the specific digital character in the first artificially generated visual content may differ from an appearance of the specific digital character in the second artificially generated visual content, for example based on the second digital data record accessed by step 610 being different from the first digital data record accessed by step 602. In some examples, the first media content generated by step 806 may be a first artificially generated visual content depicting the specific digital character, the second media content generated by step 814 may be a second artificially generated visual content depicting the specific digital character, and a movement of at least part of a body of the specific digital character in the first artificially generated visual content may differ from a movement of the at least part of the body of the specific digital character in the second artificially generated visual content, for example based on the second digital data record accessed by step 610 being different from the first digital data record accessed by step 602. For example, step 806 may use step 906 to determine a first desired movement of the at least part of a body of the specific digital character, and may generate the first media content that depicts the first desired movement (for example, using a template video creation model, using a text to video model with a suitable textual prompt, such as 'generate a video of an avatar of the specific digital character where the at least part of a body undergoes {a textual description of the first desired movement}', and so forth), and step 814 may use step 914 to determine a second desired movement of the at least part of a body of the specific digital character, and may generate the second media content that depicts the second desired movement (for example, as described above in relation to the first media content). In some examples, the first media content generated by step 806 may be a first artificially generated audible content that includes speech of the specific digital character directed to the first character, the second media content generated by step 814 may be a second artificially generated audible content that includes speech of the specific digital character directed to the second character, and a voice characteristic of a voice of the specific digital character may differ between the first artificially generated audible content and the second artificially generated audible content, for example based on the second digital data record accessed by step 610 being different from the first digital data record accessed by step 602. For example, step 806 may use step 706 to determine a first desired at least one suprasegmental feature, and may generate the first media content that includes speech of the specific digital character directed to the first character with the first desired at least one suprasegmental feature (for example, as described above in relation to step 708, or using a text to speech algorithm), and step 814 may use step 714 to determine a second desired at least one suprasegmental feature, and may generate the second media content that includes speech of the specific digital character directed to the second character with the second desired at least one suprasegmental feature (for example, as described above in relation to the first media content).

In some examples, a media content may be used in a communication of a digital character with another character. For example, step 808 may comprise using the first media content generated by step 806 in a communication of the specific digital character (of step 602 and/or step 610 and/or step 816) with the first character (of step 602 and/or step 604). In another example, step 816 may comprise using the second media content generated by step 814 in a communication of the specific digital character (of step 602 and/or step 610 and/or step 808) with the second character (of step 610 and/or step 612). For example, the media content may be presented (for example, visually, audibly, textually, etc.) and/or outputted (for example, digitally, to a memory, to an external device, via an output device, via an email, via an instant message, etc.) during the communication. In another example, a digital signal encoding the media content (for example, in a lossless format, in a lossy format, in a compressed format, in a non-compressed format, etc.) may be generated during the communication. The digital signal may be stored in memory and/or transmitted using a digital communication device during the communication. The digital signal may be configured to cause the presentation of the media content during the communication.

In some examples, the using the first media content in the communication of the specific digital character with the first character by step 808 and the using the second media content in the communication of the specific digital character with the second character by step 816 may be at least partly simultaneous. For example, the different media contents may be outputted using different output devices in different environments, may be outputted using different personal computing devices (such as wearable personal computing devices, personal mobile computing devices, personal computers, etc.), and so forth. In some examples, the using the first media content in the communication of the specific digital character with the first character by step 808 and the using the second media content in the communication of the specific digital character with the second character by step 816 may be asynchronous. For example, the different media contents may be outputted using the same output device at different times. In one example, the using the second media content in the communication of the specific digital character with the second character by step 816 may start after the using the first media content in the communication of the specific digital character with the first character by step 808 was completed.

In some examples, when a character (such as the first character of process 800, the second character of process 800, a different character, etc.) is a human individual, the using the media content in the communication of the specific digital character with the character (for example, by step 808 and/or step 816) may include presenting the media content to the character (for example, visually, audibly, textually, etc.) during the communication. In some examples, when a character (such as the first character of process 800, the second character of process 800, a different character, etc.) is a digital character, the using the media content in the communication of the specific digital character with the character (for example, by step 808 and/or step 816) may include generating a digital signal encoding the media content (for example, in a lossless format, in a lossy format, in a compressed format, in a non-compressed format, etc.) and/or outputting the media content (for example, digitally, to a memory, to an external device, via an output device, via an email, via an instant message, etc.) during the communication. For example, the first character of process 800 may be a human individual, the second character of process 800 may be a digital character, the using the first media content (by step 808) in the communication of the specific digital character with the first character may include presenting the first media content to the first character, and the using the second media content (by step 816) in the communication of the specific digital character with the second character may include generating a digital signal encoding the second media content.

In some examples, audible speech output may be generated during the communication of the specific digital character with the first character (for example, as described above in relation to step 708), the generated audible speech output may include an articulation of a first part and an articulation of a second part, the first media content generated by step 806 may include a first portion of a visual content and a second portion of the visual content, and the using the first media content by step 808 may include outputting the first portion of the visual content simultaneously with the articulation of the first part, and outputting the second portion of the visual content simultaneously with the articulation of the second part. In one example, the first part may include at least a first articulation of a particular word, and the second part may include at least a second articulation of the particular word. In one example, the first part may include at least an articulation of a particular word, and the second part may include at least an articulation of a non-verbal sound. In one example, the first part may include at least an articulation of a first non-verbal sound, the second part may include at least an articulation of a second non-verbal sound, and the second non-verbal sound may differ from the first non-verbal sound. In one example, the first part may include at least a first articulation of a particular non-verbal sound, and the second part may include at least a second articulation of the particular non-verbal sound. In one example, the first part may include at least a first word, the second part may include at least a second word, and the second word may differ from the first word. For example, step 806 may use the conversational artificial intelligence model to analyze the first digital data record accessed by step 602 and the first input received by step 604 to determine a first word and a second word (for example, as described above in relation to step 606), the first part may include at least the determined first word, and the second part may include at least the determined second word. Further, step 806 may use the conversational artificial intelligence model to analyze the first digital data record accessed by step 602 and the first input received by step 604 to associate the first word with the first portion of the visual content and to associate the second word with the second portion of the visual content. For example, the conversational artificial intelligence model may include a machine learning model trained using training examples to associated different words with different portions of visual contents based on textual inputs and/or data records. An example of such training example may include a sample data record associated with a sample character, a sample input from the sample character, a sample visual content and a sample sequence of words (for example, audible sequence, textual sequence, a sentence, etc.), together with a label indicative of an association of a first sample portion of the sample visual content with a first sample word of the sample sequence of words and an association of a second sample portion of the sample visual content with a second sample word of the sample sequence of words. Step 806 may use the trained machine learning model to analyze the first digital data record accessed by step 602 and the first input received by step 604 to associate the first word with the first portion of the visual content and to associate the second word with the second portion of the visual content.

In some examples, the first digital data record accessed by step 602 may indicate that a third character is a common acquaintance of the specific digital character and the first character, the second digital data record accessed by step 610 may not indicate that the third character is a common acquaintance of the specific digital character and the second character, the first media content generated by step 806 may include an indication of the third character, and the second media content generated by step 814 may include no reference to the third character. For example, wherein the second digital data record may indicates that the third character is not a common acquaintance of the specific digital character and the second character. Some non-limiting examples of such indication of the third character in the first media content generated by step 806 may include a depiction of the third character, a name of the third character, etc. For example, the first media content generated by step 806 may be a first artificially generated visual content depicting the specific digital character, the first character and the third character, and the second media content generated by step 814 may be a second artificially generated visual content that includes no depiction of the third character. In another example, the first media content generated by step 806 may be a first artificially generated audible content that includes voice associated with the specific digital character, voice associated with the first character and voice associated with the third character, and the second media content generated by step 814 may be a second artificially generated audible content that includes no voice associated with the third character. For example, each one of the first and second inputs may be or include 'How was your visit to Vancouver?', the first media content may depict the specific digital character with the third character in Vancouver, and the second media content may depict the specific digital character but not the third character (in Vancouver). In another example, each one of the first and second inputs may be or include 'My birthday is today', the first media content may include the specific digital character and the third character congratulating the first character, and the second media content may include the specific digital character but not the third character (congratulating the second character).

In some examples, the first digital data record accessed by step 602 may indicate that both the specific digital character and the first character are affiliated with a specific institute, and the second digital data record accessed by step 610 may not indicate that the second character is affiliated with the specific institute. Further, the generation of the first media content by step 806 may be based on the specific institute, and/or the generation of the second media content by step 814 may not be based on the specific institute. For example, the specific institute may be a school that both the specific digital character and the first character attended, may be an army unit that both the specific digital character and the first character were in, may be a workplace (historic or current) that is common to both the specific digital character and the first character, and so forth. For example, each one of the first and second inputs may be or include 'How young have we been when we meet', the first media content may depict the specific digital character and/or the first character in apparel associated with the specific institute (such as uniforms, shirts with a logo and/or a slogan and/or a visual associated with the specific institute, etc.), and the second media content may not depict any apparel associated with the specific institute. In another example, each one of the first and second inputs may be or include 'Do you remember the time we participated in that ceremony?', the first media content may include a music associated with the specific institute (such as an anthem, or a song), and the second media content may not include any music associated with the specific institute.

In some examples, the first digital data record accessed by step 602 may indicate that both the specific digital character and the first character are associated with a specific event, and the second digital data record accessed by step 610 may not indicate that the second character is associated with the specific event. Further, the generation of the first media content by step 806 may be based on the specific event, and/or the generation of the second media content by step 814 may not be based on the specific event. In one example, the specific event may be a specific prospective event. For example, each one of the first and second inputs may be or include 'We should get together', the specific prospective event may be set to take place at a specific venue, the first media content may include a map of the specific venue with a visual indication of a suggested meeting location, and the second media content may not include any map of the specific venue. In one example, the specific event may be a specific historic event. For example, the first media content may be or include media captured during the specific historic event (or a simulation of such media), and the second media content may include no media captured during the specific historic event and/or no simulation of such media.

FIG. 9 is a flowchart of an exemplary process 900 for personalization of body movements via conversational artificial intelligence, consistent with some embodiments of the present disclosure. In this example, process 900 may comprise accessing a first digital data record associated with a relation between a specific digital character and a first character (step 602); receiving from the first character a first input in a natural language (step 604); using a conversational artificial intelligence model to analyze the first digital data record and the first input to determine a first desired movement for a first portion of a specific body (step 906), the specific body is associated with the specific digital character; generating first digital signals, the first digital signals are configured to cause the first portion of the specific body to undergo the first desired movement during an interaction of the specific digital character with the first character (step 908); accessing a second digital data record associated with a relation between the specific digital character and a second character (step 610), the second character differs from the first character; receiving from the second character a second input in the natural language (step 612), the second input conveys a substantially same meaning as the first input; using the conversational artificial intelligence model to analyze the second digital data record and the second input to determine a second desired movement for a second portion of the specific body (step 914), the second desired movement differs from the first desired movement; and generating second digital signals, the second digital signals are configured to cause the second portion of the specific body to undergo the second desired movement during an interaction of the specific digital character with the second character (step 916). In other examples, process 900 may include additional steps or fewer steps. In other examples, one or more steps of process 900 may be executed in a different order and/or one or more groups of steps may be executed simultaneously. In one example, the first portion and the second portion may be identical or substantially the same portion of the specific body (for example, the first portion and the second portion may be a part of a hand of the specific body, may be a part of an arm of the specific body, may be a part of a head of the specific body, may be a part of a face of the specific body, may be a part of a torso of the specific body, may be a part of a leg of the specific body, and so forth). In another example, the first portion and the second portion may have no part in common. In yet another example, the first portion and the second portion may have at least some but not all parts in common. In an additional example, each one of the first portion and the second portion may include a respective at least one of a hand, arm, head, face, torso or leg of the specific body. In yet another example, each one of the first portion and the second portion may include a respective at least part of at least one of a hand, arm, head, face, torso or leg of the specific body. In one example, the interaction of the specific digital character with the first character (of step 908) may not involve the second character, and the interaction of the specific digital character with the second character (of step 916) may not involve the first character. In another example, the interaction of the specific digital character with the first character (of step 908) and the interaction of the specific digital character (of step 916) with the second character may be part of a group conversation between the specific digital character, the first character and the second character.

In some examples, a system for personalization of body movements via conversational artificial intelligence may include at least one processing unit configured to perform process 900. In one examples, the system may further comprise the specific body of process 900. For example, the specific body may include the at least one processing unit. In another example, the at least one processing unit may be external to the specific body. In one example, the specific body may include one or more actuators (such as motors and/or servos configured to cause motions to different parts of the specific body). The first digital signals generated by step 908 may be configured to control the one or more actuators to cause the first portion of the specific body to undergo the first desired movement during the interaction of the specific digital character with the first character, for example as described above. The second digital signals generated by step 916 may be configured to control the one or more actuators to cause the second portion of the specific body to undergo the second desired movement during the interaction of the specific digital character with the second character, for example as described above. In one example, the system may further comprise at least one audio sensor, the first input may be a first audible verbal input, the second input may be a second audible verbal input, the receiving the first input by step 604 may include capturing the first audible verbal input using the at least one audio sensor, and the receiving the second input by step 612 may include capturing the second audible verbal input using the at least one audio sensor. In some examples, a method for personalization of body movements via conversational artificial intelligence may include performing process 900. In some examples, a non-transitory computer readable medium may store computer implementable instructions that when executed by at least one processor may cause the at least one processor to perform operations for personalization of body movements via conversational artificial intelligence, and the operations may include the steps of process 900.

In some examples, the specific body of process 900 may be a visual depiction of a body of the specific digital character. In some examples, the specific body of process 1300 may be a visual depiction of a body associated with the personality. In some examples, the specific body of process 1700 may be a visual depiction of a body. In some examples, the specific body of process 2100 may be a visual depiction of a body associated with the conversational artificial intelligence model. In one example, the visual depiction of the body may be an image, a series of images, a video, a visual projection, a hologram and/or a visual simulation of the body. In one example, the visual depiction of the body may be two-dimensional, may be three-dimensional, and so forth. In one example, the visual depiction may depict movements of the body. In one example, the visual depiction may be from a selected angle. In one example, the visual depiction may be a visual depiction of a human body, may be a visual depiction of a non-human body, may be a visual depiction of a body of a mythological creator, may be a visual depiction of an animal body, may be a visual depiction of an imaginary body, may be a visual depiction of a realistic body, may be a visual depiction of a non-realistic body, and so forth. In one example, the visual depiction may be displayed on a screen (such as a television screen, a computer screen, a screen of a tablet, a screen of a smartphone, a screen of a smartwatch a touchscreen, a non-touch screen, and so forth).

In one example, the visual depiction may be displayed in an extended reality environment, for example via a wearable and/or personal extended reality appliance. In some examples, the specific body of process 900 may be a physical body of the specific digital character and/or the specific body of process 1300 may be a physical body associated with the personality and/or the specific body of process 1700 may be a physical body and/or the specific body of process 2100 may be a physical body associated with the conversational artificial intelligence model. In some examples, the specific body of process 900 may be a robot associated with the specific digital character. In some examples, the specific body of process 1300 may be a robot associated with the personality. In some examples, the specific body of process 1700 may be a robot. In some examples, the specific body of process 2100 may be a robot (for example, a robot associated with the conversational artificial intelligence model). For example, the specific body may be a humanoid robot (for example, a humanoid robot associated with the specific digital character and/or the personality and/or the conversational artificial intelligence model), may be a non-humanoid robot (for example, a non-humanoid robot associated with the specific digital character and/or the personality and/or the conversational artificial intelligence model), may be a unipedal robot, may be a bipedal robot, may be a tripedal robot, may be a quadruped robot, may be a pentapedal robot, may be a hexapod robot, may be a robot with more than six legs, and so forth.

In some examples, a conversational artificial intelligence model (such as the conversational artificial intelligence model accessed by step 1001, a different conversational artificial intelligence model, etc.) may be used to analyze a digital data record (such as a digital data record associated with a relation between two characters) and/or an input (such as an input in a natural language received from one of the two characters, received from the entity, etc.) to determine a desired movement for a specific portion of a specific body. For example, the specific body may be associated with the specific digital character, may be associated with a different digital character, may be associated with the personality, may be associated with the conversational artificial intelligence model, and so forth. In one example, step 1306 may comprise using a conversational artificial intelligence model (such as the conversational artificial intelligence model accessed by step 1001, the conversational artificial intelligence model of step 914, a different conversational artificial intelligence model, etc.) to analyze the input received by step 1004 and/or the digital data record accessed by step 1002 to determine a desired movement for a specific portion of a specific body associated with the personality. In another example, step 906 may comprise using a conversational artificial intelligence model (such as the conversational artificial intelligence model accessed by step 1001, the conversational artificial intelligence model of step 914, a different conversational artificial intelligence model, etc.) to analyze the first digital data record accessed by step 602 and the first input received by step 604 to determine a first desired movement for a first portion of a specific body. In yet another example, step 914 may comprise using a conversational artificial intelligence model (such as the conversational artificial intelligence model accessed by step 1001, the conversational artificial intelligence model of step 906, a different conversational artificial intelligence model, etc.) to analyze the second digital data record accessed by step 610 and the second input received by step 612 to determine a second desired movement for a second portion of the specific body. In one example, the second desired movement determined by step 914 may differ from the first desired movement determined by step 906. In another example, the second desired movement determined by step 914 and the first desired movement determined by step 906 may be substantially the same movement. In one example, the desired movement (such as the first desired movement determined by step 906, the second desired movement determined by step 914, the desired movement determined by step 1306, the desired movement determined by step 1706, the desired movement determined by step 2106, a different desired movement, etc.) may be configured to cause the specific body to perform at least one of a gesture, a facial expression change, a posture change, a limb movement, a head movement or an eye movement. In one example, a conversational artificial intelligence model may be or include a LLM, the LLM may be used to analyze a textual representation of information from the digital data record and a textual representation of the input (for example with a suitable textual prompt, such as 'what is a likely movement in response to this input {a textual representation of the input} received from a person, when your relation with this person is as follows {a textual representation of information included in the digital data record}') to determine the desired movement for the specific portion of the specific body. In another example, a conversational artificial intelligence model may be or include a machine learning model, and the machine learning model may be used to analyze the digital data record and the input to determine the desired movement for the specific portion of the specific body. The machine learning model may be a machine learning model trained using training examples to determine desired movements based on inputs and/or digital data records and/or additional information. An example of such training example may include a sample input together with a sample digital data record and/or sample additional information, together with a sample desired movement.

In some examples, the second desired movement determined by step 914 may differ from the first desired movement determined by step 906. In one example, the first desired movement determined by step 906 may differ from the second desired movement determined by step 914 in at least one of direction or speed of motion. In one example, the first desired movement determined by step 906 may differ from the second desired movement determined by step 914 in timing (for example, in a motion initiation time, in a motion completion time, in an arrival time to a selected position, and so forth). In one example, the first desired movement determined by step 906 may include a first plurality of sub-movements, the second desired movement determined by step 914 may include a second plurality of sub-movements. Further, the first plurality and the second plurality of sub-movements may be identical, and the first desired movement may differ from the second desired movement in a sequence of the sub-movements. In one example, the first desired movement determined by step 906 may be configured to cause the specific body to perform a gesture, and the second desired movement determined by step 914 may be configured to cause the specific body to produce a facial expression. In another example, the first desired movement determined by step 906 may be configured to cause the specific body to perform a first gesture, the second desired movement determined by step 914 may be configured to cause the specific body to perform a second gesture, and the second gesture may differ from the first gesture. In yet another example, the first desired movement determined by step 906 may be configured to cause the specific body to produce a first facial expression, the second desired movement determined by step 914 may be configured to cause the specific body to produce a second facial expression, and the second facial expression may differ from the first facial expression. In one example, the gesture may be a gesture of at least part of the specific portion of the specific body, may be a gesture involving at least part of the specific portion of the specific body and another portion of the specific body, may be a gesture of another portion of the specific body, and so forth. Some non-limiting examples of such gesture may include hand gestures (such as thumbs-up, thumbs-down, peace sign, pointing, waving, clapping, fist bump, stop gesture, handshake, etc.), facial expressions (such as smile, frown, raised eyebrows, wrinkled nose, eye rolling, etc.), head movements (such as nodding, shaking head, tilting head, head down, head up, etc.), arms and hands positioning (such as crossed arms, open arms, hands in pockets, hands on hips, touching face, etc.), posture (such as slouching, leaning forward, leaning back, etc.), legs positioning (such as crossed legs, bouncing leg, etc.), and so forth.

Some non-limiting examples of a desired movement configured to cause the specific body to perform a gesture may include waving a hand (for example, for a waving gesture to associated with greeting or saying goodbye), raising a thumb upwards (for example, for a thumbs up gesture indicating approval or success), raising the index and middle fingers while keeping the other fingers folded (for example, for a peace sign gesture), forming a circle with the thumb and index finger while extending the other fingers (for example, for an okay sign gesture), striking the palms of the hands together (for example, for clapping gesture), raising shoulders (for example, for a shrugging gesture to indicate ignorance or indifference), folding the arms across the chest (for example, for a crossing arms gesture to indicate defensiveness or discomfort), moving the head up and down (for example, for a nodding gesture), moving the head side to side (for example, for a shaking head gesture), placing one leg over the other (for example, for a crossing legs gesture, indicating relaxation), repeatedly striking the ground with the foot (for example, for a tapping foot gesture, indicating impatient), and so forth. Some non-limiting examples of such facial expression may include smile, frown, raised eyebrows, wrinkled nose, eye rolling, and so forth. Some non-limiting examples of a desired movement configured to cause the specific body to produce a facial expression may include raising the corners of the mouth (for example, for a smiling expression), lowering the corners of the mouth (for example, for a frowning expression), closing one eye while keeping the other eye open (for example, for a winking expression), lifting the eyebrows (for example, for a raising eyebrows expression), and so forth.

In some examples, the determined desired movement for the specific portion of the specific body (such as the first desired movement for the first portion determined by step 906, the second desired movement for the second portion determined by step 914, the desired movement for the specific portion determined by step 1306, the desired movement for the specific portion determined by step 1706, etc.) may include and/or be indicative of at least one of (at least two of, at least three of, at least four of, at least five of, etc.) a desired end position for the specific portion, a desired end spatial orientation for the specific portion, a desired arrival time of the specific portion to the desired end position, a desired intermediate position for the specific portion, a desired intermediate spatial orientation for the specific portion, a desired arrival time of the specific portion to the desired intermediate position, a desired intermediate velocity of the specific portion, a desired intermediate speed of the specific portion, a desired intermediate movement direction of the specific portion, a desired intermediate acceleration of the specific portion, or a trajectory. Such trajectory may include a series of such positions and/or spatial orientations and/or arrival times and/or velocities and/or speeds and/or directions and/or accelerations. Such desired positions, spatial orientations, velocities, speeds, directions and/or acceleration may be absolute in a fixed coordinate system, may be relative to a selected external object, may be relative to another portion of the specific body, may be relative to a selected portion of a body associated with the first or second character, and so forth. Such desired positions may be exact positions, may be areas of acceptable positions, and so forth. Such desired spatial orientations may be exact orientations, may be ranges of acceptable orientations, and so forth. Such desired velocities may be exact velocities, may be ranges of acceptable velocities, and so forth. Such desired speeds may be exact speeds, may be ranges of acceptable speeds, and so forth. Such desired directions may be exact direction, may be ranges of acceptable directions, and so forth. Such desired accelerations may be exact acceleration, may be ranges of acceptable accelerations, and so forth. Such desired arrival time may be an absolute time, may be relative to another event, and so forth. Such desired arrival time may be an exact time, may be a timeframe, and so forth. In some examples, the first desired movement determined by step 906 may be a desired movement relative to a first fixed coordinate system, and/or the second desired movement determined by step 914 may be a desired movement relative to a second fixed coordinate system. For example, the first and second fixed coordinate systems may be the same fixed coordinate system, may be different fixed coordinate systems, and so forth. An example of such fixed coordinate system may include the earth coordinate system, a building, a room, and so forth. In some examples, the first desired movement determined by step 906 may be a desired movement relative to a first moving object, and/or the second desired movement determined by step 914 may be a desired movement relative to a second moving object. For example, the first and second moving objects may be the same moving object, may be different moving objects, and so forth. For example, the first and/or second moving object may be a different portion of the specific body. In another example, the first moving object may be a portion of a body associated with the first character, and/or the second moving object may be a portion of a body associated with the second character. In an additional example, the first moving object may be a moving object held by the first character, and/or the second moving object may be a moving object held by the second character. In yet another example, the first and/or second moving object may be a moving object not connected with a body of any character. In some examples, the desired movement determined by step 1306 and/or step 1706 may be a desired movement relative to a fixed coordinate system. An example of such fixed coordinate system may include the earth coordinate system, a building, a room, and so forth. In some examples, the desired movement determined by step 1306 and/or step 1706 and/or step 2106 may be a desired movement relative to a moving object. For example, the moving object may be a different portion of the specific body. In another example, the moving object may be a portion of a body associated with the entity. In an additional example, the moving object may be a moving object held by the entity. In yet another example, the moving object may be a moving object not connected with the specific body and/or with a body of the entity.

In some examples, a digital data record (such as a digital data record associated with a relation between the two characters) may be analyzed to identify a particular mathematical object in the mathematical space, for example using module 284. Further, a convolution of a fragment of an input (such as an input in a natural language received from one of two characters participating in a conversation, an audible verbal input, a visual input, etc.) may be calculated to obtain a particular numerical result value. Further, a function of the particular numerical result value and the particular mathematical object may be calculated to obtain a calculated mathematical object in the mathematical space, for example using module 286. Further, a determination of a desired movement may be based on the calculated mathematical object. For example, a conversational artificial intelligence model may be or include a machine learning model as described above, and the machine learning model may be used as described above with the calculated mathematical object as additional information to determine the desired movement. In another example, one or more parameters of the desired movement may be a function of the calculated mathematical object. In one example, step 906 may analyze the first digital data record accessed by step 602 to identify a first mathematical object in a mathematical space, calculate a convolution of a fragment of the first input received by step 604 to obtain a first numerical result value, calculate a function of the first numerical result value and the first mathematical object to obtain a third mathematical object in the mathematical space, and base determination of the first desired movement on the third mathematical object. In another example, step 914 may analyze the second digital data record accessed by step 610 to identify a second mathematical object in the mathematical space, calculate a convolution of a fragment of the second input received by step 612 to obtain a second numerical result value, calculate a function of the second numerical result value and the second mathematical object to obtain a fourth mathematical object in the mathematical space, and base the determination of the second desired movement on the fourth mathematical object.

In some examples, a specific mathematical object in a mathematical space may be identified, wherein the specific mathematical object may correspond to a common word or a common part included in both the first input received by step 604 and in the second input received by step 610, for example using module 282 and/or 284. Further, a digital data record may be analyzed to identify a particular mathematical object in the mathematical space, for example using module 284. Further, a function of the specific mathematical object and the particular mathematical object to obtain a calculated mathematical object, for example using module 286. Further, a determination of a desired movement may be based on the calculated mathematical object. For example, when the calculated mathematical object includes a particular numerical value, one desired movement may be determined, and when the calculated mathematical object does not include the particular numerical value, a different desired movement may be determined (for example, different in at least one of a direction, length, speed or timing). In another example, a conversational artificial intelligence model may be or include a machine learning model as described above, and the machine learning model may be used as described above with the calculated mathematical object as additional information to determine the desired movement. For example, step 906 may analyze the first digital data record accessed by step 602 to identify a first mathematical object in the mathematical space (for example using module 284), may calculate a function of the specific mathematical object and the first mathematical object to obtain a third mathematical object in the mathematical space (for example using module 286), and may base the determination of the first desired movement on the third mathematical object. In another example, step 914 may analyze the second digital data record accessed by step 610 to identify a second mathematical object in the mathematical space (for example using module 284), may calculate a function of the specific mathematical object and the second mathematical object to obtain a fourth mathematical object in the mathematical space (for example using module 286), and may base the determination of the second desired movement on the fourth mathematical object. For example, to determine desired movement based on a selected mathematical object, the machine learning model may be used as described above with the selected mathematical object as the additional information. In another example, when the selected mathematical object includes a particular numerical value, one desired movement may be determined, and when the selected mathematical object does not include the particular numerical value, a different desired movement may be determined.

In some examples, specific information associated with the specific digital character of process 900 may be accessed, for example as described above. Further, a conversational artificial intelligence model may be used to analyze the specific information, a digital data record (such as a digital data record associated with a relation between two characters) and an input (such as an input in a natural language received from one of the two characters) to determine the a desired movement. For example, step 906 may use the conversational artificial intelligence model to analyze the specific information, the first digital data record accessed by step 602 and the first input received by step 604 to determine the first desired movement. In another example, step 914 may use the conversational artificial intelligence model to analyze the specific information, the second digital data record accessed by step 610 and the second input received by step 612 to determine the second desired movement. For example, a conversational artificial intelligence model may be or include a multimodal LLM, the multimodal LLM may be used to analyze a textual representation of specific information, a textual representation of information from the digital data record and a textual representation of the input (for example with a suitable textual prompt, such as 'what is a likely movement in response to this input {a textual representation of the input} received from a person, when your relation with this person is as follows {a textual representation of information included in the digital data record}, and when you are as follows {a textual representation of information included in the specific information}') to determine the desired movement. In another example, a conversational artificial intelligence model may be or include a machine learning model as described above, and the machine learning model may be used as described above with the specific information as additional information to determine the desired movement.

In some examples, the second desired movement determined by step 914 may be associated with a different level of formality than the first desired movement determined by step 906, for example based on a difference between the second digital data record accessed by step 610 and the first digital data record accessed by step 602, based on a type of relation associated with the relation between the specific digital character and the first character being different from a type of relation between the specific digital character and the second character, based on a degree of relation associated with the relation between the specific digital character and the first character being different from a degree of relation between the specific digital character and the second character, and so forth. For example, the first desired movement may be associated with a high-five and the second desired movement may be associated with a handshake (and thereby associated with a higher level of formality), for example when the relation between the specific digital character and the first character is a friendship and the relation between the specific digital character and the second character is business-related, or when the relation between the specific digital character and the first character is closer than the relation between the specific digital character and the second character. In some examples, the second desired movement determined by step 914 may be associated with a different style than the first desired movement determined by step 906, for example based on a difference between the second digital data record accessed by step 610 and the first digital data record accessed by step 602, based on a type of relation associated with the relation between the specific digital character and the first character being different from a type of relation between the specific digital character and the second character, based on a degree of relation associated with the relation between the specific digital character and the first character being different from a degree of relation between the specific digital character and the second character, and so forth. For example, the first desired movement may be more expansive, light and/or dynamic (for example, to convey joyfulness) and the second desired movement may be more contracted, slow and/or heavy (for example, to convey tiredness), for example when the relation between the specific digital character and the first character is a friendship and the relation between the specific digital character and the second character is frenemies, or when the relation between the specific digital character and the first character is closer than the relation between the specific digital character and the second character. In some examples, the second desired movement determined by step 914 may be associated with a different level of empathy than the first desired movement determined by step 906, for example based on a difference between the second digital data record accessed by step 610 and the first digital data record accessed by step 602, based on a type of relation associated with the relation between the specific digital character and the first character being different from a type of relation between the specific digital character and the second character, based on a degree of relation associated with the relation between the specific digital character and the first character being different from a degree of relation between the specific digital character and the second character, and so forth. For example, the first desired movement may be associated with neutral facial expression and the second desired movement may be associated with expressive and/or reflective facial expression to convey a higher level of empathy, for example when the relation between the specific digital character and the first character is co-workers and the relation between the specific digital character and the second character is friends, or when the relation between the specific digital character and the second character is closer than the relation between the specific digital character and the first character. In some examples, the first desired movement determined by step 906 may serve a first goal of the specific digital character, the second desired movement determined by step 914 may serve a second goal of the specific digital character. In one example, the second goal may differ from the first goal, for example based on a difference between the second digital data record accessed by step 610 and the first digital data record accessed by step 602, based on a type of relation associated with the relation between the specific digital character and the first character being different from a type of relation between the specific digital character and the second character, based on a degree of relation associated with the relation between the specific digital character and the first character being different from a degree of relation between the specific digital character and the second character, and so forth. For example, the first desired movement may serve a goal of showing empathy to the first character (for example, via expressive and/or reflective facial expression, via a gentle touch, etc.), and the second desired movement may serve a goal of showing indifference (for example, via facial expression or body posture), for example when the relation between the specific digital character and the first character is a friendship and the relation between the specific digital character and the second character is frenemies, or when the relation between the specific digital character and the first character is closer than the relation between the specific digital character and the second character. In some examples, the first desired movement determined by step 906 may be configured to cause a physical contact between the specific body and the first character (for example, based on the first digital data record accessed by step 602, based on a type of relation associated with the relation between the specific digital character and the first character, based on a degree of relation associated with the relation between the specific digital character and the first character, and so forth), and/or the second desired movement determined by step 914 may be configured not to cause a physical contact between the specific body and the second character (for example, based on the second digital data record accessed by step 610, based on a type of relation associated with the relation between the specific digital character and the second character, based on a degree of relation associated with the relation between the specific digital character and the second character, and so forth), for example when the relation between the specific digital character and the first character is a friendship and the relation between the specific digital character and the second character is co-workers, or when the relation between the specific digital character and the first character is closer than the relation between the specific digital character and the second character.

In some examples, the first digital data record accessed by step 602 may indicate that both the specific digital character and the first character are affiliated with a specific institute, and the second digital data record accessed by step 610 may not indicate that the second character is affiliated with the specific institute. Further, the first desired movement determined by step 906 may be associated with the specific institute, and the second desired movement determined by step 914 may not be associated with the specific institute. For example, the first desired movement may be associated with a gesture associated with the specific institute, and the second desired movement may not be associated with the gesture. For example, the specific institute may be a university and the gesture may be a university salute, the specific institute may be a military institute (such as a military academy, a military unit, etc.) and the gesture may be a military salute, the specific institute may be a fraternal organization and the gesture may be a secret handshake or a secret gesture, the specific institute may be boy or girl scouts and the gesture may be the scout sign, the specific institute may be a religious organization like a church or temple and the gesture may be associated with prayer (such as folding hands, bowing, or making the sign of the cross), the specific institute may be a fraternity or a sorority and the gesture may be a sign or a gesture used by members to identify themselves or show affiliation, the specific institute may be a sport team and the gesture may be a secret hand signal used to communicate discreetly between team members, and so forth.

In some examples, a conversational artificial intelligence model may be used to analyze a digital data record (such as a digital data record associated with a relation between two characters) and/or an input (such as an input in a natural language received from one of the two characters) to determine a portion of a body (such as a portion of the specific body of process 900, a different body, and so forth). For example, step 906 may use the conversational artificial intelligence model to analyze the first digital data record accessed by step 602 and/or the first input received by step 604 to determine the first portion of the specific body. In another example, step 914 may use the conversational artificial intelligence model to analyze the second digital data record accessed by step 610 and/or the second input received by step 612 to determine the second portion of the specific body. In one example, a conversational artificial intelligence model may be or include a LLM, step 906 may use the LLM to analyze a textual representation of information from the digital data record and a textual representation of the input (for example with a suitable textual prompt, such as 'what portion of the body to move in response to this input {a textual representation of the input} received from a person, when your relation with this person is as follows {a textual representation of information included in the digital data record}?') to determine the portion of the body. In another example, a conversational artificial intelligence model may be or include a machine learning model, and step 906 may use the machine learning model to analyze the digital data record and the input to determine the portion of the body. The machine learning model may be a machine learning model trained using training examples to determine portions of bodies based on inputs and/or digital data records and/or additional information. An example of such training example may include a sample input together with a sample digital data record and/or sample additional information, together with a label indicative of a sample portion of a sample body. In one example, the additional information may include any additional information mentioned in relation to the determination of the desired movement, such as specific information associated with the specific digital character, a calculated mathematical object, and so forth.

In some examples, digital signals may be generated. The generated digital signals may be configured to cause a specific portion of a specific body to undergo a desired movement, for example during a desired timeframe. For example, step 908 may comprise generating first digital signals, and the first digital signals may be configured to cause the first portion of the specific body (of step 906) to undergo the first desired movement (determined by step 906), for example during an interaction of the specific digital character (of process 900) with the first character (of step 602 and/or step 604). In another example, step 916 may comprise generating second digital signals, and the second digital signals may be configured to cause the second portion of the specific body (of step 914) to undergo the second desired movement (determined by step 916), for example during an interaction of the specific digital character (of process 900) with the second character (of step 610 and/or step 612). In yet another example, step 1308 may comprise generating digital signals, and the digital signals may be configured to cause the desired movement determined by step 1306 to the specific portion of the specific body during an interaction with the entity of step 1004. In an additional example, step 1308 may comprise generating digital signals, and the digital signals may be configured to cause the desired movement determined by step 1706 to the specific portion of the specific body during an interaction with the entity of step 1404. In yet another example, step 1308 may comprise generating digital signals, and the digital signals may be configured to cause the desired movement determined by step 2106 to the specific portion of the specific body during an interaction with the entity of step 1804 and/or step 1805. In one example, the generated digital signals may include one or more commands that when executed (for example, by a computing device, by an electronic controller, etc.) causes the specific portion of the specific body to undergo the desired movement. For example, a command may be configured to trigger a selected at least one actuator (such as a motor or a servo) to act. In one example, the generated digital signals may indicate or encode one or more of a selected at least one actuator, a timing for the selected at least one actuator to act, a duration of the action of the selected at least one actuator, a magnitude associated with the action of the selected at least one actuator, a direction associated with the action of the selected at least one actuator, and so forth. In one example, the generated digital signals may be transmitted to a selected at least one actuator to cause the selected at least one actuator to act. In another example, the generated digital signals may be provided to a Digital-to-Analog Convertor to cause a generation of analog signals configured to cause the selected at least one actuator to act. In yet another example, the generated digital signals may be provided to a computing device, and the computing device may be configured to cause the selected at least one actuator to act in response to the generated digital signals. In one example, the generated digital signals may trigger an action of a first actuator, and may trigger an action of a second actuator after the action of the first actuator is completed. In another example, the generated digital signals may trigger an action of a first actuator and an action of a second actuator, and the actions of the first and second actuators may be at least partly simultaneous. In yet another example, the generated digital signals may trigger a first action of a particular actuator, and may trigger a second action of the particular actuator after the completion of the first action. In one example, a first portion of the generated digital signals may be used to trigger a first one or more actions of a first one or more actuators, and feedbacks and/or results associated with the first one or more actions may be received (such as positions, tactile inputs, and so forth). Further, a second portion of the digital signals may be generated based on the received feedbacks and/or results associated with the first one or more actions. Further, the second portion of the generated digital signals may be used to trigger a second one or more actions of a second one or more actuators. For example, the second one or more actuators may have no actuator in common with the first one or more actuators, may have at least one but not all actuators in common with the first one or more actuators, may be identical to the first one or more actuators, and so forth. The second one or more actions may be triggered after the completion of the first one or more actions, may be triggered before the first one or more actions are completed, and so forth. In one example, the generated digital signals may be associated with a proportional control of the actuators and/or of the specific portion of the specific body. In another example, the generated digital signals may be associated with a model predictive control of the actuators and/or of the specific portion of the specific body.

In some examples, image data captured during a selected timeframe from an environment of the specific body may be received. In one example, the received image data may be image data captured using at least one image sensor included in the specific body. In another example, the received image data may be image data captured using at least one image sensor positioned in the environment outside the specific body. For example, the image data may be captured using at least one image sensor from the environment, may be read from memory, may be received from an external computing device (for example, via a digital communication device), and so forth. In another example, the specific body may be a virtual body (for example, a depiction of the specific body in a virtual environment), the environment of the specific body may be a virtual environment, and the image data may be captured from the virtual environment using a virtual camera. Further, the image data may be analyzed to generate digital signals, such as digital signals configured to cause a specific portion of the specific body to undergo a desired movement, for example during a desired timeframe. For example, step 908 may comprise receiving first image data captured during the interaction of the specific digital character with the first character from an environment of the specific body, and analyzing the first image data to generate the first digital signals. In another example, step 916 may comprise receiving second image data captured during the interaction of the specific digital character with the second character from the environment of the specific body, and analyzing the second image data to generate the second digital signals. In yet another example, step 1308 may comprise receiving image data captured during the interaction with the entity from an environment of the specific body, and analyzing the image data to generate the respective digital signals. For example, a convolution of at least part of the received image data may be calculated to obtain a numerical result value, and the generation of the digital signals may be based on the numerical result value. For example, the generated digital signals may be or include a function of the numerical result value. Some non-limiting examples of such function may include a linear function, a non-linear function, a polynomial function, an exponential function, a logarithmic function, a continuous function, a discontinuous function, and so forth. In another example, the analysis of the image data may detect an object in the environment, the object may potentially obstruct with the desired movement, and the generated digital signals may include an adjustment to avert the potentially obstruction. In yet another example, the desired movement may be associated with a specific object in the environment, the analysis of the image data may detect the specific object and/or to determine one or more properties of the specific object, and the generated digital signals may be based on the determined one or more properties of the specific object. Some non-limiting examples of such properties may include location, spatial orientation, size, texture, color, type, motion, acceleration, and so forth. In an additional example, the analysis of the image data may determine layout data associated with at least part of an environment of the specific body (for example, using a visual 3D reconstruction algorithm, using a SLAM algorithm, and so forth), and the generated digital signals may be based on an analysis of the layout data, for example as described below.

In some examples, layout data associated with at least part of an environment of the specific body may be received. For example, the layout data may be determined based on an analysis of image data captured from the environment of the specific body as described above, may be read from memory, may be received from an external computing device (for example, via a digital communication device), and so forth. Further, the layout data may be analyzed to generate digital signals, such as digital signals configured to cause a specific portion of the specific body to undergo a desired movement, for example during a desired timeframe. For example, step 908 may comprise receiving first layout data associated with a first at least part of an environment of the specific body, and analyzing the first layout data to generate the first digital signals. In another example, step 916 may comprise receiving second layout data associated with a second at least part of an environment of the specific body, and analyzing the second layout data to generate the second digital signals. In yet another example, step 1308 may comprise receiving layout data associated with at least part of an environment of the specific body (of process 1300, of process 1700, and/or of process 2100), and analyzing the layout data to generate the respective digital signals. For example, the layout data may be analyzed using a machine learning model to generate the digital signals. The machine learning model may be a machine learning model trained using training examples to generate digital data based on layouts. An example of such training example may include sample layout data associated with a sample layout and a sample indication associated with a sample desired movement, together with sample digital signals configured to cause the sample desired movement in the sample layout. In another example, the layout data may indicate a potentially obstruction to the desired movement, and the generated digital signals may include an adjustment to avert the potentially obstruction.

In some examples, audible speech output may be generated during the interaction of the specific digital character with the first character (for example as described above in relation to step 708), the generated audible speech output may include an articulation of a first part and an articulation of a second part, the first desired movement determined by step 906 may include a first sub-movement and a second sub-movement, and the first digital signals generated by step 908 may be configured to cause the first portion of the specific body to undergo the first sub-movement simultaneously with the articulation of the first part, and to cause the first portion of the specific body to undergo the second sub-movement simultaneously with the articulation of the second part. For example, the first digital signals generated by step 908 may include a first fragment configured to cause the first portion of the specific body to undergo the first sub-movement and a second fragment configured to cause the first portion of the specific body to undergo the second sub-movement, and step 908 may generate the first fragment simultaneously with the articulation of the first part and may generate the second fragment simultaneously with the articulation of the second part. In another example, the first digital signals generated by step 908 may include information associating the first sub-movement with the first part and associating the second sub-movement with the second part. In one example, the first part may include at least a first articulation of a particular word, and/or the second part may include at least a second articulation of the particular word. In another example, the first part may include at least an articulation of a particular word, and/or the second part may include at least an articulation of a non-verbal sound. In yet another example, the first part may include at least an articulation of a first non-verbal sound, and the second part may include at least an articulation of a second non-verbal sound (the second non-verbal sound may differ from the first non-verbal sound, the first and second non-verbal sounds may be the same non-verbal sound, and so forth). In an additional example, the first part may include at least a first articulation of a particular non-verbal sound, and/or the second part may include at least a second articulation of the particular non-verbal sound. In one example, the first part may include at least a first word, and the second part may include at least a second word (the second word may differ from the first word, the first and second words may be the same word, and so forth). For example, step 906 may use the conversational artificial intelligence model to analyze the first digital data record accessed by step 602 and the first input received by step 604 to determine a first word and a second word (for example, as described above in relation to step 606), the first part may include at least the determined first word, and the second part may include at least the determined second word. Further, step 906 may use the conversational artificial intelligence model to analyze the first digital data record accessed by step 602 and the first input received by step 604 to associate the first word with the first sub-movement and to associate the second word with the second sub-movement. For example, the conversational artificial intelligence model may include a machine learning model trained using training examples to associated different words with different sub-movements based on textual inputs and/or data records. An example of such training example may include a sample data record associated with a sample character, a sample input from the sample character, a sample group of sub-movements and a sample sequence of words (for example, audible sequence, textual sequence, a sentence, etc.), together with a label indicative of an association of a first sample sub-movement of the group with a first sample word of the sample sequence of words and an association of a second sample sub-movement of the group with a second sample word of the sample sequence of words. Step 906 may use the trained machine learning model to analyze the first digital data record accessed by step 602 and the first input received by step 604 to associate the first word with the first sub-movement and to associate the second word with the second sub-movement.

In some examples, the first input received by step 604 may be indicative of a desire of the first character for the specific digital character to perform a first manipulation of a particular object, and/or the second input received by step 612 may be indicative of a desire of the second character for the specific digital character to perform a second manipulation of the particular object. In one example, the first manipulation and the second manipulation may be the same manipulation of the particular object. In another example, the first manipulation and the second manipulation may be different manipulations of the particular object. Further, the first desired movement determined by step 906 may be configured to cause the first manipulation of the particular object, and/or the second desired movement determined by step 914 may not be configured to cause the second manipulation of the particular object. For example, the first desired movement may include a physical contact with the particular object to cause the first manipulation of the particular object. In another example, the first desired movement may include a physical contact with the particular object (for example, to cause the first manipulation of the particular object), and the second desired movement may include no physical contact with the particular object. In yet another example, the first desired movement may include a physical contact with a specific object (different from the particular object) to cause the first manipulation of the particular object, and no physical contact with the particular object. For example, particular object may be a light bulb, the first and second manipulation may include turning off the light bulb, and the specific object may be a switch controlling the light bulb. Further, it may be determined whether to perform a specific manipulation of the particular object based on a digital data record (such as a digital data record associated with a relation between two characters) and/or an input (such as an input in a natural language received from one of the two characters). For example, step 906 may, based on the first digital data record and the first input, determining to perform the first manipulation of the particular object. In another example, step 914 may, based on the second digital data record and the second input, determining not to perform the second manipulation of the particular object. For example, the input may be indicative of a desire of a particular character for the other character to perform a manipulation of a particular object, when the digital data record indicates that the relation is of a first type (such as friends, family members, partners, etc.), it may be determined to perform the specific manipulation, and when the digital data record indicates that the relation is of a second type (such as frenemies, strangers, etc.), it may be determined not to perform the specific manipulation. In another example, the input may be indicative of a desire of a particular character for the other character to perform a manipulation of a particular object, when the digital data record indicates that the relation is of a first degree of relation (for example, above a selected threshold of closeness), it may be determined to perform the specific manipulation, and when the digital data record indicates that the relation is of a second degree of relation (for example, below a selected threshold of closeness), it may be determined not to perform the specific manipulation. In yet another example, the digital data record may be a specific record, when the input is indicative of a desire of a particular character for the other character to perform a manipulation of a particular object, it may be determined to perform the specific manipulation, and when the input is not indicative of a desire of a particular character for the other character to perform a manipulation of a particular object, it may be determined not to perform the specific manipulation. In some examples, process 900 may further comprise, after the second portion of the specific body undergoes the second desired movement, receiving from the first character of process 900 a third input in a natural language (for example, in the natural language of step 604, in the natural language of step 612, in a different natural language, and so forth), for example as described above in relation to step 604 and/or step 612; based on the third input, determining to perform the second manipulation of the particular object (for example, as described above); and generating third digital signals, the third digital signals may be configured to cause a third portion of the specific body to undergo a movement configured to cause the second manipulation of the particular object during the interaction of the specific digital character with the second character (for example as described herein in relation to step 908 and/or step 916). For example, third portion of the specific body may be the same as the second portion, may be the same as the first portion, may be different from the first portion and/or the second portion, and so forth. In another example, the determination to perform the second manipulation of the particular object may be further based on the second digital data record, for example as described above. In one example, the determination to perform the second manipulation of the particular object may be further based on the first digital data record, for example as described above. For example, each one of the first and second inputs may include 'bring me the book', the first desired movement may be configured to deliver the book to the first character, the second desired movement may be configured not to deliver the book to the second character, the third input may include 'bring her the book' or 'go ahead', and the third digital signals may be configured to cause a portion of the specific body to undergo a movement configured to deliver the book to the second character. In another example, each one of the first and second inputs may include 'unlock the door', the first desired movement may be configured to unlock the door, the second desired movement may be configured not to unlock the door, the third input may include 'obey him', and the third digital signals may be configured to cause a portion of the specific body to undergo a movement configured to unlock the door. In some examples, process 900 may further comprise, after the second portion of the specific body undergoes the second desired movement, receiving from the second character of process 900 a third input in a natural language (for example, in the natural language of step 604, in the natural language of step 612, in a different natural language, and so forth), for example as described above in relation to step 604 and/or step 612; based on the second digital data record and the third input, determining to perform the second manipulation of the particular object (for example, as described above); and generating third digital signals, the third digital signals may be configured to cause a third portion of the specific body to undergo a movement configured to cause the second manipulation of the particular object during the interaction of the specific digital character with the second character (for example as described herein in relation to step 908 and/or step 916). For example, third portion of the specific body may be the same as the second portion, may be the same as the first portion, may be different from the first portion and/or the second portion, and so forth. In another example, the determination to perform the second manipulation of the particular object may be further based on the second digital data record, for example as described above. In one example, the determination to perform the second manipulation of the particular object may be further based on the first digital data record, for example as described above. For example, each one of the each one of the first and second inputs may include 'turn the device off', the first desired movement may be configured to turn the device off, the second desired movement may be configured not to turn the device off, the third input may include 'I'm serious' or 'it's an emergency!', and the third digital signals may be configured to cause a portion of the specific body to undergo a movement configured to turn the device off. In some examples, the desire of the first character for the specific digital character to perform the first manipulation of the particular object may be a desire of the first character for the specific digital character to bring the particular object to the first character, the desire of the second character for the specific digital character to perform the second manipulation of the particular object may be a desire of the second character for the specific digital character to bring the particular object to the second character, the first desired movement determined by step 906 may be configured to bring the particular object to the first character, and the second desired movement determined by step 914 may not be configured to bring the particular object to the second character. In some examples, the desire of the first character for the specific digital character to perform the first manipulation of the particular object may be a desire of the first character for the specific digital character to change a state of the particular object to a particular state, the desire of the second character for the specific digital character to perform the second manipulation of the particular object may be a desire of the second character for the specific digital character to change the state of the particular object to the particular state, the first desired movement determined by step 906 may be configured to change the state of the particular object to the particular state, and the second desired movement determined by step 914 may not be configured to change the state of the particular object to the particular state. For example, the particular object may be an electrical device with an off-state and an on-state. Some non-limiting examples of such electrical device may include a light bulb, a light switch, a television, a computer, a smartphone, and so forth. In another example, the particular object may be an object with an open-state and a closed-state. Some non-limiting examples of such object may include a door, a window, a valve, a gate, and so forth.

FIG. 10 is a flowchart of an exemplary process 1000 for individualization of conversational artificial intelligence, consistent with some embodiments of the present disclosure. In this example, process 1000 may comprise accessing a conversational artificial intelligence model (step 1001); accessing a digital data record associated with a personality (step 1002); receiving from an entity an input in a natural language (step 1004); using the conversational artificial intelligence model to analyze the input and the digital data record to generate a response in the natural language, the response is a response to the input, the response is based on the personality and the input (step 1006); and providing the response to the entity (step 1008). In other examples, process 1000 may include additional steps or fewer steps. In other examples, one or more steps of process 1000 may be executed in a different order and/or one or more groups of steps may be executed simultaneously.

In some examples, a system for individualization of conversational artificial intelligence may include at least one processing unit configured to perform process 1000. In one example, the system may further comprise at least one audio sensor, the input received by step 1004 may be an audible verbal input, and the receiving the input by step 1004 may include capturing the audible verbal input using the at least one audio sensor. In one example, the system may further comprise at least one audio speaker, the response generated by step 1006 may be an audible verbal response, and the providing the response by step 1008 may include generating the audible verbal response using the at least one audio speaker. In some examples, a method for individualization of conversational artificial intelligence may include performing process 1000. In some examples, a non-transitory computer readable medium may store computer implementable instructions that when executed by at least one processor may cause the at least one processor to perform operations for individualization of conversational artificial intelligence, and the operations may include the steps of process 1000.

In some examples, the entity of process 1000 and/or 1100 and/or 1200 and/or 1300 and/or 1400 and/or 1500 and/or 1600 and/or 1700 and/or 1800 and/or 1900 and/or 2000 and/or 2100 may be a human individual, may be a digital character, may be a digital fictional character, and so forth. In some examples, the personality of process 1000 and/or process 1100 and/or process 1200 and/or process 1300 may be associated with a human individual. For example, a persona or a digital character associated with the personality may be a digital clone of the human individual, may be a digital agent of the human individual, may be an artificial intelligence agent of the human individual, and so forth. In one example, the response generated by step 1006 and/or provided by step 1008 may be associated with a desire to imitate the human individual. In another example, the usage of the desired at least one suprasegmental feature to generate the audible speech output by step 1108 may be associated with a desire to imitate the human individual. In yet another example, a media content (such as the media content generated by step 1206, the media content generated by step 1606, the media content used by step 1208, etc.) may be associated with a desire to imitate the human individual (for example, to imitate a visual appearance of the human individual, to imitate a behavior of the human individual, to imitate speech of the human individual, and so forth). In some examples, the personality of process 1000 and/or process 1100 and/or process 1200 and/or process 1300 may not be associated with any human individual. In some examples, a persona or a digital character associated with the personality of process 1000 and/or process 1100 and/or process 1200 and/or process 1300 may not be a digital clone of a human individual, may not be a digital agent of a human individual, and so forth. In some examples, the personality of process 1000 and/or process 1100 and/or process 1200 and/or process 1300 may be associated with an artificial persona. In some examples, the personality of process 1000 and/or process 1100 and/or process 1200 and/or process 1300 may be associated with a fictional persona.

In some examples, step 1001 may comprise accessing a conversational artificial intelligence model. For example, accessing the conversational artificial intelligence model may comprise reading at least part of the conversational artificial intelligence model from memory, may comprise accessing at least part of the conversational artificial intelligence model via an external computing device (for example, using a digital communication device), may comprise accessing at least part of the conversational artificial intelligence model in a database, may comprise generating at least part of the conversational artificial intelligence model (for example, by training a machine learning model using training examples, by fine-tuning another conversational artificial intelligence model, etc.), and so forth.

In some examples, step 1002 may comprise accessing a digital data record associated with a personality. For example, accessing such digital data record may comprise reading at least part of the digital data record from memory, may comprise accessing at least part of the digital data record via an external computing device (for example, using a digital communication device), may comprise accessing at least part of the digital data record in a database (for example, based on an indication of the personality and/or on an indication of a persona associated with the personality), may comprise generating at least part of the digital data record (for example, based on other information, based on historic conversations associated with the personality and/or with a persona associated with the personality, based on historic behavior pattern associated with the personality and/or with a persona associated with the personality, based on social media data associated with the personality and/or with a persona associated with the personality, based on a social graph associated with the personality and/or with a persona associated with the personality, etc.), and so forth. In some examples, the digital data record accessed by step 1002 may be associated with human individual (for example, the personality may be associated with the human individual as described below). Further, the digital data record accessed by step 1002 may be based or include information associated with the human individual, such as biographical information, biometric information, health information, demographical information, contact information, financial information, employment information, educational information, personal preferences, personal traits, information based on digital footprint, social information (such as a social graph, information related to social connections, information related to social interactions, etc.), information based on historic conversations involving the human individual, information based on historic behavior pattern associated with the human individual, and so forth. In one example, at least part of the digital data record may be included in at least one artificial neuron, for example in at least one artificial neuron of an artificial neural network included in a conversational artificial intelligence model (such as the conversational artificial intelligence model accessed by step 1001, a different conversational artificial intelligence model, and so forth).

In some examples, a digital data record associated with a personality (such as the digital data record accessed by step 1002) may be based on at least one historic conversation involving a persona associated with the personality. For example, a LLM may be used to analyze a record of the at least one historic conversation (for example with a suitable textual prompt, such as 'read the following conversations and determine personality traits of {a specific persona}') and generate and/or update at least part of the digital data record. In another example, a machine learning model may be used to analyze the at least one historic conversation and generate and/or update at least part of the digital data record. The machine learning model may be a machine learning model trained using training examples to generate digital data records based on historic conversations. An example of such training example may include a record of a sample historic conversation, together with a label indicative of information associated with a personality of a persona taking part in the sample historic conversation. In some examples, a digital data record associated with a personality (such as the digital data record accessed by step 1002) may be based on at least one historic behavior pattern of a persona associated with the personality. For example, a LLM may be used to analyze a textual description of the at least one historic behavior pattern (for example with a suitable textual prompt, such as 'List likely personality traits of a person that {a textual description of the at least one historic behavior pattern}') and generate and/or update at least part of the digital data record. In another example, a machine learning model may be used to analyze the at least one historic behavior pattern and generate and/or update at least part of the digital data record. The machine learning model may be a machine learning model trained using training examples to generate digital data records based on behavior patterns. An example of such training example may include an indication of a sample behavior pattern, together with a label indicative of information associated with a personality of a sample persona associated with the sample behavior pattern.

In some examples, step 1006 may comprise using a conversational artificial intelligence model (such as the conversational artificial intelligence model accessed by step 1001, a different conversational artificial intelligence model, etc.) to analyze an input (such as an input in a natural language, an input received from an entity, an input in a natural language received from an entity, the input received by step 1004, the input received by step 604, the input received by step 612, a different input, etc.) and a digital data record (such as a digital data record associated with a personality, the digital data record accessed by step 1002, a different digital data record, etc.) to generate a response. In one example, the response may be in a natural language (such as the natural language of step 1004, a different natural language, etc.). In another example, the response may be in a formal language. In one example, the response may be a response to the input. In another example, the generated response may be a response to a different input. In one example, the response may be based on the personality and/or the input. In one example, the response may be an audible verbal response, for example an audible verbal response in the natural language. In another example, the response may be a textual response, for example a textual response in the natural language. In one example, a conversational artificial intelligence model may be or include a LLM, and step 1006 may use the LLM to analyze a textual representation of the input and/or a textual representation of information from the digital data record (for example with a suitable textual prompt, such as 'respond to this input {a textual representation of the input} received from a person, when your personality is as follows {a textual representation of information from the digital data record}') to generate the response. In another example, a conversational artificial intelligence model may be or include a machine learning model, and step 1006 may use the machine learning model to analyze the digital data record and/or the input and/or additional information to generate the response. The machine learning model may be a machine learning model trained using training examples to generate responses to inputs based on digital data records and/or additional information. An example of such training example may include a sample input together with a sample digital data record and/or sample additional information, together with a sample response. In some examples, step 1006 may identify a first mathematical object in a mathematical space, wherein the first mathematical object may correspond to at least part of the input received by step 1004 (for example, to a word included in the input, to a utterance included in the input, to a plurality of audio samples included in the input, etc.), for example using module 282 and/or module 284. Further, step 1006 may analyze the digital data record accessed by step 1002 to identify a second mathematical object in the mathematical space, for example using module 284. Further, step 1006 may calculate a function of the first mathematical object and the second mathematical object to obtain a third mathematical object in the mathematical space, wherein the third mathematical object may correspond to a specific word in the natural language, for example using module 286. Further, step 1006 may include the specific word in the generated response.

In some examples, the digital data record accessed by step 1002 may include or be indicative of a biographical detail associated with the personality and/or with a persona associated with the personality. Some non-limiting examples of such biographical detail may include name, birthdate, birthplace, family background, education, career, achievements, awards, influences, mentors, personal traits, significant life events, hobbies, interests, and so forth. Further, the response generated by step 1006 may be based on the biographical detail. For example, the biographical detail may indicate that a persona associated with the personality attended specific schools, the input may include 'Where did you learn to do that?', when the specific schools includes MIT, the response may be 'second year at MIT', and when the specific schools includes no higher education, the response may be 'on the job training'. In some examples, the digital data record accessed by step 1002 may include or be indicative of a specific detail know to a persona associated with the personality. Further, the response generated by step 1006 may be based on the specific detail. For example, the input may include 'Sarah flew to the conference', when the specific detail is that Sarah is engaged to John, the response may be 'Did John go with her?', and when the specific detail is that Sarah is single, the response may be 'I hope she meets someone special while she is there'. In some examples, the digital data record accessed by step 1002 may indicate that a persona associated with the personality knows that a specific detail is known to the entity. Further, the response generated by step 1006 may be based on the persona knowing that the specific detail is known to the entity. For example, the specific detail may be that John is terminally ill, the input may include 'John is acting so weird', when the persona knows that the specific detail is known to the entity, the response may include 'well, I'm sure you understand why', and when the persona does not know that the specific detail is known to the entity, the response may include 'I'm sure he has his reasons, let's give him some slack'. In some examples, the digital data record accessed by step 1002 may indicate that a persona associated with the personality knows that a specific detail is unknown to the entity. Further, the response generated by step 1006 may be based on the persona knowing that the specific detail is unknown to the entity. For example, the specific detail may be that the entity's spouse is arranging a party for the entity's birthday, the input may be 'I'm taking a day off tomorrow', when the persona knows that the specific detail is unknown to the entity, the response may include no reference to the surprise party (such as, 'okay'), and when the persona does not know that the specific detail is unknown to the entity, the response may include a reference to the surprise party (such as, 'I know, I'll see you at your birthday party!').

In some examples, the input received by step 1004 may be indicative of a desire of the entity to be exposed to a specific detail. Further, based on the personality, the response generated by step 1006 may be contradictive of the specific detail. For example, the input may be 'So who left whom?', when the digital data record accessed by step 1002 indicates that the personality is deceitfulness and/or that a persona associated with the personality is inclined to deceive the entity, the response may be deceiving (such as, 'I left him'), and when the digital data record accessed by step 1002 does not indicates that, the response may be truthful (such as, 'He left me, I never saw it coming'). In some examples, the input received by step 1004 may include a question. Further, a level of details in an answer to the question in the response generated by step 1006 may be based on the personality. For example, the input may include 'How are your parents doing?', when the digital data record accessed by step 1002 indicates that the personality is talkative, the response may include 'My father is becoming senile, which is really hard on me, but my mother keeps him together, so I guess we have that to be thankful for', and when the digital data record accessed by step 1002 indicates that the personality is untalkative, the response may include 'Old'. In some examples, the input received by step 1004 may include a question. Further, based on the personality, the response generated by step 1006 may ignore the question. For example, the input may include 'This place is amazing! How could you afford that?', when the digital data record accessed by step 1002 indicates that the personality is reserved, private and/or prefers not to disclose financial details, the response may change the subject and/or ignore the question (such as, 'have you seen the second bedroom?' or 'have you tried the snacks?'), and when the digital data record accessed by step 1002 indicates that the personality is transparent and/or open about financial details, the response may include an answer to the question (such as, 'I've been saving for quite some time'). In some examples, the input received by step 1004 may include a mistake. In one example, based on the personality, the response generated by step 1006 may ignore the mistake. In another example, based on the personality, the response generated by step 1006 may refer to the mistake (for example, may correct the mistake). For example, the input may include 'We need to be careful not to fall off the edge of the earth', when the digital data record accessed by step 1002 indicates that the personality is easygoing and patient, the response may ignore the outlandish statement (such as, 'We just go out to the street'), and when the digital data record accessed by step 1002 indicates that the personality is confrontational, the response may correct the mistake (such as, 'The Earth is a sphere, so there's no edge to fall off of').

In some examples, a subject matter may be selected based on the personality (of step 1002 and/or step 1006) and/or the input received by step 1004. In one example, the response generated by step 1006 may include information related to a subject matter. In another example, the response generated by step 1006 may include an example relevant to the input and related to a subject matter. For example, the input may be 'How are you?', when the digital data record accessed by step 1002 indicates an interest in geology, the response may include 'Like the tectonic plates, moving slowly towards a subduction zone', and when the digital data record accessed by step 1002 indicates an interest in western history, the response may include 'Like the Roman empire, slowly moving into oblivion'. In some examples, the response generated by step 1006 may include information related to a person. Further, the person may be selected based on the personality (of step 1002 and/or step 1006) and/or the input received by step 1004. For example, the input may be 'How can you endure all this and still fight for your cause?', when the digital data record accessed by step 1002 indicates an interest in eastern history, the response may include 'Like Mahatma Gandhi, I know that perseverance guarantees success', and when the digital data record accessed by step 1002 indicates an interest in technology, the response may include 'Like Nikola Tesla, I believe that relentless dedication pave the path to success'. In some examples, the response generated by step 1006 may include information related to an event. Further, the event may be selected based on the personality (of step 1002 and/or step 1006) and/or the input received by step 1004. For example, the input may be 'Have you ever been to Geneva?', the digital data record accessed by step 1002 may indicate that a persona associated with the personality attended a specific event in Geneva, and the response may include 'I visited it for the {specific event}, but I was so busy that I barely saw the city'. In some examples, the response generated by step 1006 may include information related to an institute. Further, the institute may be selected based on the personality (of step 1002 and/or step 1006) and/or the input received by step 1004. For example, the input may be 'How did you end up with such a strict routine?', when the digital data record accessed by step 1002 may indicate that a persona associated with the personality attended a boarding school, the response may include 'that goes back all the way to {a specific boarding school}', and when the digital data record accessed by step 1002 may indicate that a persona associated with the personality served in the army, the response may include 'I picked it up when serving in the army'. In some examples, the response generated by step 1006 may be in a language register selected based on the personality (of step 1002 and/or step 1006) and/or the input received by step 1004. For example, the input may be in a casual language register 'Hey, what's up with that thing over there?', when the digital data record accessed by step 1002 indicates that the personality tends to mirror language registers, the response may be in the same language register (such as 'Oh, that? It's just an old bike someone left behind'), and when the digital data record accessed by step 1002 indicates that the personality tends to keep a formal language register, the response may be in a formal language register (such as, 'This is an abandoned bicycle that appears to have been left unattended for some time').

In some examples, the response generated by step 1006 may be associated with a particular emotion, the particular emotion is selected based on the personality (of step 1002 and/or step 1006) and/or the input received by step 1004. In one example, the digital data record accessed by step 1002 may be indicative of a tendency for emotional reactions associated with the personality (for example, a general tendency to be specific emotional reactions, a tendency to specific emotional reactions in a specific context, etc.), and step 1006 may select the particular emotion based on the tendency and the input. For example, the input may be 'You didn't get the job', when the digital data record accessed by step 1002 indicates that the personality tends to anxiety, the response may include 'Oh no! I've been so worried about this, and now it feels like all my fears are coming true', and when the digital data record accessed by step 1002 indicates that the personality tends to be easily shamed, 'Oh no! That's so embarrassing'. In some examples, the response generated by step 1006 may be associated with a level of empathy selected based on the personality (of step 1002 and/or step 1006) and/or the input received by step 1004. In one example, the digital data record accessed by step 1002 may be indicative of a tendency to be empathetic associated with the personality (for example, a general tendency to be empathetic, a tendency to be empathetic in a specific context, etc.), and step 1006 may select the level of empathy based on the tendency and the input. For example, the input may be 'I lost my mother at a young age', when the digital data record accessed by step 1002 indicates that the personality tends to be empathetic to orphanhood, the response may include 'I'm so sorry for your loss. If you ever need to talk, I'm here', and when the digital data record accessed by step 1002 indicates that the personality tends to be non-empathetic to orphanhood, the response may include 'That's unfortunate'. In some examples, the response generated by step 1006 may be associated with a level of self-assurance. Further, step 1006 may select the level of self-assurance based on the personality (of step 1002 and/or step 1006) and/or the input received by step 1004. Some non-limiting examples of such level of self-assurance may include confidence, uncertainty, etc. In one example, the digital data record accessed by step 1002 may be indicative of a tendency for self-assurance associated with the personality (for example, a general tendency for self-assurance, a tendency for self-assurance in a specific context, etc.), and step 1006 may select the level of empathy based on the tendency and the input. For example, the digital data record accessed by step 1002 may specify a function mapping inputs to levels of self-assurance (or to tendencies for different levels of self-assurance when faced with a specific input), and step 1006 may use the function and the input to select the level of self-assurance. For example, the digital data record may indicate that the personality tends to be more confident when discussing physics than when discussing chemistry. When the input is indicative of a physics question (such as, 'Do you believe that dark matter is composed of particles?'), the selected level of self-assurance may be higher than when the input is indicative of a chemical question (such as, 'What is the best method for synthesizing ammonia?'), the response to the former may be a confident response (such as, 'Of course it does! Why wouldn't there be particles that do not interact with light?'), and the response to the latter may convey a lack of confident (such as, 'Ah . . . from Nitrogen and Hydrogen? Maybe you should ask somebody else'). In some examples, the response generated by step 1006 may be associated with a level of formality. Further, step 1006 may select the level of formality based on the personality (of step 1002 and/or step 1006) and/or the input received by step 1004. In one example, the digital data record accessed by step 1002 may be indicative of a tendency for formality associated with the personality (for example, a general tendency for formality, a tendency for formality in a specific context, etc.), and step 1006 may select the level of formality based on the tendency and the input. For example, the digital data record accessed by step 1002 may specify a function mapping inputs to levels of formality (or to tendencies for different levels of formality when faced with a specific input), and step 1006 may use the function and the input to select the level of formality. For example, the digital data record may indicate that the personality tends to be more formal when discussing taxation than when discussing investment strategies. When the input is indicative of a taxation question (such as, 'What are the implications of the recent changes to the capital gains tax rates?'), the selected level of formality may be higher than when the input is indicative of an investment strategy question (such as, 'Where should I invest my money?'), the response to the former may be more formal (such as, 'For understanding of the recent changes to capital gains tax rates and their implications, it is strongly recommended to consult with a certified public accountant or a qualified tax advisor'), and the response to the latter may be less formal (such as, 'I just put my money into treasury bonds').

In some examples, the input received by step 1004 may be a response to an output provided to the entity before the input is received, and the output may include a reference to a specific detail. In one example, the input may include no reference to the specific detail, and, based on the personality (of step 1002 and/or step 1006), the response generated by step 1006 may include another reference to the specific detail. In another example, the input may include no reference to the specific detail, and, based on the personality (of step 1002 and/or step 1006), the response generated by step 1006 may include no reference to the specific detail. For example, the output may include 'Your behavior was shameful', the input may include 'Everything is so green! It makes me want to start hiking. Do you enjoy hiking?', when the digital data record accessed by step 1002 indicates that the personality is assertive, the response may include 'We can talk about hiking later. Right now, I want to address what happened earlier. Your behavior was unacceptable, and we need to discuss it', and when the digital data record accessed by step 1002 indicates that the personality is accommodating and/or conflict-avoidant, the response may include, 'Yeah, hiking can be really refreshing. I love being out in nature and exploring new trails'. In some examples, the input received by step 1004 may be a response to an output provided to the entity before the input is received, and the output may include a specific question. In one example, the input includes no answer to the specific question, and, based on the personality (of step 1002 and/or step 1006), the response generated by step 1006 may include a reference to the specific question. In another example, the input includes no answer to the specific question, and, based on the personality (of step 1002 and/or step 1006), the response generated by step 1006 may include no reference to the specific question. For example, the output may include 'What's your cost estimate?', the input may include, 'I'm really busy', when the digital data record accessed by step 1002 indicates that the personality is assertive and/or goal-oriented, the response may include 'I understand that, but I must insist, what's the cost estimate', and when the digital data record accessed by step 1002 indicates that the personality is understanding and/or flexible, the response may include 'No worries'.

In some examples, the digital data record accessed by step 1002 may be indicative of a level associated with a personality trait associated with the personality. Further, the response generated by step 1006 may be based on the input received by step 1004 and/or on the level associated with the personality trait. For example, a conversational artificial intelligence model may be or include a LLM, and step 1006 may use the LLM to analyze a textual representation of the input and/or a textual indication of the level associated with the personality trait (for example with a suitable textual prompt, such as 'respond to this input {a textual representation of the input} received from a person, when you have {a textual indication of the level associated with the personality trait}') to generate the response. In another example, a conversational artificial intelligence model may be or include a machine learning model, as described above, and step 1006 may use the machine learning model to analyze the input and/or the level associated with the personality trait (for example, using the level as additional information as described above) to generate the response. In one non-limiting example, the personality trait may be at least one of imaginative, curious, adventurous, intellectual, organized, disciplined, reliable, hardworking, efficient, outgoing, energetic, talkative, assertive, enthusiastic, kind, compassionate, cooperative, trusting, altruistic, anxious, fearful, angry, depressed, moody, honest, humble, dependable, resilient, optimistic, pessimistic, empathetic, creative, passionate, charming, diplomatic or ambitious. In one example, the input may be indicative of a problem, the response may be indicative of a solution to the problem, and the solution may be based on the level associated with the personality trait. In another example, the input may be indicative of a question, the response may be indicative of an answer to the question, and the answer may be based on the level associated with the personality trait. In yet another example, the input may be indicative of a specific detail, the response may include a reaction to the specific detail, and the reaction to the specific detail may be based on the level associated with the personality trait. In an additional example, a length of the response may be based on the input and the level associated with the personality trait (for example, the personality trait may be 'talkative', and when the level is higher, the response may be longer). In yet another example, the input may be indicative of a suggestion, step 1006 may determine whether to accept or reject the suggestion based on the level associated with the personality trait, and may base the generation of the response on the determination of whether to accept or reject the suggestion. For example, the determination may be made by the conversational artificial intelligence model based on an analysis of the input and/or the level associated with the personality trait (for example, with a suitable textual prompt, such as 'would you accept or reject the suggestion in {a textual representation of the input}, when you have {a textual indication of the level associated with the personality trait}'). In another example, a classification algorithm may be used to analyze the input and the level associated with the personality trait to determine whether to accept (one class) or reject (another class) the suggestion. The classification algorithm may be a machine learning model trained using training examples. In one example, the response may be indicative of whether the suggestion is accepted or rejected. In another example, the response may be motivated on whether the suggestion is accepted or rejected, but not indicative of it.

In some examples, the digital data record accessed by step 1002 may be indicative of a level associated with a personality trait associated with the personality, for example as described above. Further, the response generated by step 1006 may be based on the input received by step 1004 and/or on the level associated with the personality trait, for example as described above. In one example, the personality trait may be 'imaginative', the input may be indicative of a problem, the response may be indicative of a solution to the problem, and the solution may be based on the level associated with the personality trait. For example, the input may include 'Any clue on why our sales have declined?', when the level is high, the response may be imaginative (such as, 'Maybe it is tied to a larger narrative of societal change, like a new trend that we are missing'), and when the level is low, the response may be unimaginative (such as, 'Maybe because people just aren't buying as much'). In one example, the personality trait may be 'imaginative', the input may be indicative of a question, the response may be indicative of an answer to the question, and the answer may be based on the level associated with the personality trait. For example, the input may include the question, 'What place you would like to visit?', when the level is high, the answer may be imaginative (such as, 'Saturn's rings!'), and when the level is low, the answer may be unimaginative (such as, 'New York, I love this little coffee bar on William Street'). In one example, the personality trait may be 'curious', the input may be indicative of a question, the response may be indicative of an answer to the question, and the answer may be based on the level associated with the personality trait. For example, the input may include the question, 'Have you ever wondered what it would be like to live in a different country?', when the level is high, the answer may demonstrate curiosity (such as, 'Sure! I often wonder what it would be like to be part of another culture'), and when the level is low, the answer may demonstrate incuriosity (such as, 'Not really'). In one example, the personality trait may be 'curious', the input may be indicative of a specific detail unknown to a persona associated with the personality, the response may include a reaction to the specific detail, and the reaction to the specific detail may be based on the level associated with the personality trait. For example, the input may include 'I found out why John and Marry separated', when the level is high, the answer may demonstrate curiosity (such as, 'What happened? Tell me everything!'), and when the level is low, the answer may demonstrate incuriosity (such as, 'I'm sure they would like us to respect their privacy'). In one example, the personality trait may be 'adventurous', the input may be indicative of a suggestion, the response may include a reaction to the suggestion, and the reaction may be based on the level associated with the personality trait. For example, the input may include 'A new rock climbing gym just opened', when the level is high, the reaction may be adventurous (such as, 'Let's try it!'), and when the level is low, the reaction may be unadventurous (such as, 'Rock climbing sounds intense, let's go to our usual coffee bar instead'). In one example, the personality trait may be 'intellectual'. For example, the input may include 'I'm reading "The Catcher in the Rye" again', when the level is high, the answer may demonstrate an intellectual interest in the book (such as, 'Caulfield is such an interesting character!'), and when the level is low, the answer may demonstrate a lack of intellectual interest (such as, 'Is that a thick book?'). In one example, the personality trait may be 'organized', the input may be indicative of a specific detail, the response may include a reaction to the specific detail, and the reaction to the specific detail may be based on the level associated with the personality trait. For example, the input may include 'I'm struggling with the homework assignment', when the level is high, the response may demonstrate a high level of organization (such as, 'I've completed the first two questions, and will answer the last question later today'), and when the level is low, the response may demonstrate a lack of organization (such as, 'I totally forgot about it. When is it due?'). In one example, the personality trait may be 'disciplined', the input may be indicative of a suggestion, the response may include a reaction to the suggestion, and the reaction may be based on the level. For example, the input may include 'They have the best ice-cream in town', when the level is high, the reaction may demonstrate self-control (such as 'I'm on a diet, I'm not supposed to eat for the next three hours. Let's get back here tonight'), and when the level is low, the reaction may demonstrate a lack of self-control (such as 'I'm on a diet, I'm not supposed to eat for the next three hours, but I can't resist a good ice-cream'). In one example, the personality trait may be 'reliable', the input may be indicative of a question, the response may be indicative of an answer to the question, and the answer may be based on the level associated with the personality trait. For example, the input may include the question, 'Where is the summary you promised? I've to present it in a few minutes', when the level is high, the answer may demonstrate reliability (such as, 'Here it is'), and when the level is low, the answer may demonstrate unreliability (such as, 'Ah, I decided not to do it. I apologize for not updating you sooner').

In one example, based on the personality (of step 1002 and/or step 1006), the response generated by step 1006 may refer to the input received by step 1004 as a humoristic remark. In another example, based on the personality (of step 1002 and/or step 1006), the response generated by step 1006 may refer to the input received by step 1004 as an offensive remark. In yet another example, based on the personality (of step 1002 and/or step 1006), the response generated by step 1006 may refer to the input received by step 1004 as a friendly remark. For example, the input may include 'I didn't expect you to finish that project so quickly', when the personality is witty, confident and/or high in extraversion, the response may refer to the input as a humoristic remark (such as, 'Well, I do have my moments of brilliance!'), when the personality is insecure, sensitive and/or low in self-esteem, the response may refer to the input as an offensive remark (such as, 'Why? Did you think I wasn't capable of it?'), and when the personality is friendly and/or cooperative, the response may refer to the input as a friendly remark (such as, 'Thanks! I worked really hard on it. Glad you noticed'). In some examples, the response may convey a selected reaction to the input. Further, the selected reaction may be based on the personality (of step 1002 and/or step 1006) and/or the input received by step 1004. For example, the selected reaction to the input may be or include at least one of a positive reaction, negative reaction, engagement, show of interest, agreement, respect, disagreement, skepticism, disinterest, boredom, discomfort, uncertainty, confusion or neutrality. For example, the input may include 'We should adopt a new decision making process to improve our workflow', when the personality is confident and/or adaptable, the selected reaction may be an agreement (for example, the response may be 'Absolutely! We should always try to improve our workflow'), and when the personality is conservative, the selected reaction may be a disagreement (for example, the response may be 'We don't need a new process, our current system has worked well so far').

In some examples, the input received by step 1004 may include a verb, and the response generated by step 1006 may be based on the personality (of step 1002 and/or step 1006) and the verb. For example, the input may be either 'Any clue on why our sales have declined?' or 'Any clue on why our sales have increased?' When the verb is 'declined' and the personality is highly imaginative, the response may include 'Maybe it is tied to a larger narrative of societal change, like a new trend that we are missing', when the verb is 'declined' and the personality is only slightly imaginative, the response may include 'Maybe because people just aren't buying as much', when the verb is 'increased' and the personality is highly imaginative, the response may include 'Maybe we were mentioned on social media by a celebrity?', and when the verb is 'increased' and the personality is only slightly imaginative, the response may include 'Maybe because people are just buying more'. In some examples, the input received by step 1004 may include an adjective, and the response generated by step 1006 may be based on the personality (of step 1002 and/or step 1006) and the adjective. For example, the input may be either 'What's the best trip destination?' or 'What's the worst trip destination?', and a response of an extrovert may include 'Anywhere with a lively nightlife, like Las Vegas' or 'Anywhere without a lively nightlife, like a remote quite village', respectively. Conversely, a response of an introvert may include 'A quite place, like a remote village' or 'A crowded, noisy city, like New York', respectively.

FIG. 11 is a flowchart of an exemplary process 1100 for individualization of voice characteristics via conversational artificial intelligence, consistent with some embodiments of the present disclosure. In this example, process 1100 may comprise accessing a conversational artificial intelligence model (step 1001); accessing a digital data record associated with a personality (step 1002); receiving from an entity an input in a natural language (step 1004); using the conversational artificial intelligence model to analyze the input and the digital data record to determine a desired at least one suprasegmental feature (step 1106), the desired at least one suprasegmental feature is based on the personality and the input; and using the desired at least one suprasegmental feature to generate an audible speech output during a communication with the entity (step 1108). In other examples, process 1100 may include additional steps or fewer steps. In other examples, one or more steps of process 1100 may be executed in a different order and/or one or more groups of steps may be executed simultaneously. In some examples, process 1100 may further comprise step 1006 described above. Further, step 1108 may use the response generated by step 1006 and the desired at least one suprasegmental feature to generate the audible speech output during the communication with the entity, as described herein.

In some examples, a system for individualization of voice characteristics via conversational artificial intelligence may include at least one processing unit configured to perform process 1100. In one example, the system may further comprise at least one audio sensor, the input received by step 1004 may be an audible verbal input, and the receiving the input by step 1004 may include capturing the audible verbal input using the at least one audio sensor. In one example, the system may further comprise at least one audio speaker, and the generation of the audible speech output by step 1108 may include generating the audible speech output using the at least one audio speaker. In some examples, a method for individualization of voice characteristics via conversational artificial intelligence may include performing process 1100. In some examples, a non-transitory computer readable medium may store computer implementable instructions that when executed by at least one processor may cause the at least one processor to perform operations for individualization of voice characteristics via conversational artificial intelligence, and the operations may include the steps of process 1100.

In some examples, step 1106 may comprise using a conversational artificial intelligence model (such as the conversational artificial intelligence model accessed by step 1001, a different conversational artificial intelligence model, etc.) to analyze an input (such as an input in a natural language, an input received from an entity, an input in a natural language received from an entity, the input received by step 1004, the input received by step 604, the input received by step 612, a different input, etc.) and a digital data record (such as a digital data record associated with a personality, the digital data record accessed by step 1002, a different digital data record, etc.) to determine a desired at least one suprasegmental feature. The desired at least one suprasegmental feature may be based on the personality and/or the input. In one example, a conversational artificial intelligence model may be or include a LLM, and step 1106 may use the LLM to analyze a textual representation of the input and/or a textual representation of information from the digital data record (for example with a suitable textual prompt, such as 'what suprasegmental features should be used when responding to this input {a textual representation of the input} received from a person, when your personality is as follows {a textual representation of information from the digital data record}') to determine the desired at least one suprasegmental feature. In another example, a conversational artificial intelligence model may be or include a machine learning model, and step 1106 may use the machine learning model to analyze the digital data record and/or the input and/or additional information to determine the desired at least one suprasegmental feature. The machine learning model may be a machine learning model trained using training examples to determine suprasegmental features based on inputs and/or digital data records and/or additional information. An example of such training example may include a sample input together with a sample digital data record and/or sample additional information, together with a label indicative of a sample selection of one or more suprasegmental features. In some examples, step 1106 may identify a first mathematical object in a mathematical space, wherein the first mathematical object may correspond to at least part of the input received by step 1004 (for example, to a word included in the input, to a utterance included in the input, to a plurality of audio samples included in the input, etc.), for example using module 282 and/or module 284. Further, step 1106 may analyze the digital data record accessed by step 1002 to identify a second mathematical object in the mathematical space, for example using module 284. Further, step 1106 may calculate a function of the first mathematical object and the second mathematical object to obtain a third mathematical object in the mathematical space, for example using module 286. Further, step 1106 may base the determination of the desired at least one suprasegmental feature on the third mathematical object, for example as described above.

In some examples, the digital data record accessed by step 1002 may include a biographical detail associated with the personality and/or with a persona associated with the personality. Some non-limiting examples of such biographical detail may include name, birthdate, birthplace, family background, education, career, achievements, awards, influences, mentors, personal traits, significant life events, hobbies, interests, and so forth. Further, the determination of the desired at least one suprasegmental feature by step 1106 may be based on the biographical detail. For example, the biographical detail may indicate that a persona associated with the personality is associated with a specific region or social background, an accent may be determined based on the specific region and/or social background, and the desired at least one suprasegmental feature may include features determined based on the accent, such as stress, intonation, pitch, tone and/or juncture. In some examples, the digital data record accessed by step 1002 may include a specific detail know to a persona associated with the personality. Further, the determination of the desired at least one suprasegmental feature by step 1106 may be based on the persona knowing the specific detail. For example, the input received by step 1004 may include 'I wonder what Sarah and John are fighting about? They are so mysterious', the specific detail may be the reason for the fight, the response of the persona to the input may hide the truth (such as, 'I've no idea'), when the personality is a confident personality, the desired at least one suprasegmental feature for the articulation of the response may include steady tone and rhythm, and when the personality is a nervous personality, the desired at least one suprasegmental feature for the articulation of the response may include rapid pacing, irregular intonation patterns and/or frequent pauses. In some examples, the digital data record accessed by step 1002 may indicate that a persona associated with the personality knows that a specific detail is known to the entity (of step 1004 and/or step 1108). Further, the determination of the desired at least one suprasegmental feature by step 1106 may be based on the persona knowing that the specific detail is known to the entity. For example, the input received by step 1004 may include a statement that the persona knows that the entity knows to be untrue based on the knowledge of the specific detail, when the personality is empathetic, the desired at least one suprasegmental feature may include low speech rate and/or peaceful voice to create a safe place for the entity to reveal the truth, and when the personality is aggressive, the desired at least one suprasegmental feature may include higher speech rate and/or sharp intonation to convey discomfort or frustration with the dishonesty. In some examples, the digital data record accessed by step 1002 may indicate that a persona associated with the personality knows that a specific detail is unknown to the entity (of step 1004 and/or step 1108). Further, the determination of the desired at least one suprasegmental feature by step 1106 may be based on the persona knowing that the specific detail is unknown to the entity. For example, the specific detail known to the persona and unknown to the entity may be that the entity is betrayed by the entity's spouse, the input received by step 1004 may include a positive statement about the entity's spouse (such as, 'My wife is the best!'), the response may hide the specific detail (for example, 'That's wonderful to hear'), when the personality is compassionate, the desired at least one suprasegmental feature may include a rising intonation at the end and/or higher pitch, and when the personality is anxious, the desired at least one suprasegmental feature may include a wavering tone and/or variable pitch.

In some examples, the desired at least one suprasegmental feature determined by step 1106 may include at least one of intonation, stress, pitch, rhythm, tempo, loudness or prosody. In some examples, the desired at least one suprasegmental feature determined by step 1106 may include a desired intonation, the desired intonation may be based on the personality (of step 1002 and/or step 1106) and/or the input received by step 1104, and the audible speech output generated by step 1108 may be based on the desired intonation. For example, the audible speech output may include an articulation (for example, of at least one word, of at least one non-verbal sound, etc.) in the desired intonation. For example, an extravert may tend to use lively and/or dynamic intonations, while an agreeable persona may tend to use soft and/or gentle intonations. In some examples, the desired at least one suprasegmental feature determined by step 1106 may include a desired stress, the desired stress may be based on the personality (of step 1002 and/or step 1106) and/or the input received by step 1104, and the audible speech output generated by step 1108 may be based on the desired stress. For example, the audible speech output may include an articulation (for example, of at least one word, of at least one non-verbal sound, etc.) with the desired stress (for example, placing emphasizes on specific syllables or words selected based on the desired stress). For example, a persona associated with the personality may be associated with a specific geographical region, and the desired stress may be selected based on the specific geographical region. In some examples, the desired at least one suprasegmental feature determined by step 1106 may include a desired pitch, the desired pitch may be based on the personality (of step 1002 and/or step 1106) and/or the input received by step 1104, and the audible speech output generated by step 1108 may be based on the desired pitch. For example, the audible speech output may include an articulation (for example, of at least one word, of at least one non-verbal sound, etc.) in the desired pitch. For example, a persona associated with the personality may be associated with a specific age and/or a specific gender and/or a specific medical history, and the desired pitch may be selected based on the specific age and/or the specific gender and/or the specific medical history. In some examples, the desired at least one suprasegmental feature determined by step 1106 may include a desired rhythm, the desired rhythm may be based on the personality (of step 1002 and/or step 1106) and/or the input received by step 1104, and the audible speech output generated by step 1108 may be based on the desired rhythm. For example, the audible speech output may include an articulation (for example, of at least one word, of at least one non-verbal sound, etc.) in the desired rhythm. For example, an extravert may tend to use fast-paced and/or energetic rhythm with frequent changes in intonation, while a conscientiousness personality may tend to use a more measured rhythm with clear enunciation and regular pauses. In some examples, the desired at least one suprasegmental feature determined by step 1106 may include a desired tempo, the desired tempo may be based on the personality (of step 1002 and/or step 1106) and/or the input received by step 1104, and the audible speech output generated by step 1108 may be based on the desired tempo. For example, the audible speech output may include an articulation (for example, of at least one word, of at least one non-verbal sound, etc.) in the desired tempo. For example, an extravert may tend to a fast speech tempo, while an introvert may tend to a slow speech tempo. In some examples, the desired at least one suprasegmental feature determined by step 1106 may include a desired loudness, the desired loudness may be based on the personality (of step 1002 and/or step 1106) and/or the input received by step 1104, and the audible speech output generated by step 1108 may be based on the desired loudness. For example, the audible speech output may include an articulation (for example, of at least one word, of at least one non-verbal sound, etc.) in the desired loudness. For example, an extravert may tend to a louder while an introvert may tend to speak more softly. In some examples, the desired at least one suprasegmental feature determined by step 1106 may include a desired prosody, the desired prosody may be based on the personality (of step 1002 and/or step 1106) and/or the input received by step 1104, and the audible speech output generated by step 1108 may be based on the desired prosody. For example, the audible speech output may include an articulation (for example, of at least one word, of at least one non-verbal sound, etc.) in the desired prosody. For example, a shy personality may tend to a softer volume, slower speech rate and/or monotonous speech, while an optimistic personality may tend to a cheerful intonation and/or higher pitch.

In some examples, the communication with the entity of step 1108 may include providing a response to the entity. In one example, the response may be in a natural language (such as the natural language of step 1004, a different natural language, etc.). In another example, the response may be in a formal language. In one example, the response may be a response to the input. In another example, the generated response may be a response to a different input. In one example, the response may be based on the personality (of step 1002 and/or step 1106) and/or the input received by step 1004. In one example, the response may be an audible verbal response, for example an audible verbal response in the natural language. For example, process 1100 may further comprise using a conversational artificial intelligence model (such as the conversational artificial intelligence model accessed by step 1001, a different conversational artificial intelligence model, etc.) to analyze an input (such as an input in a natural language, an input received from an entity, an input in a natural language received from an entity, the input received by step 1004, the input received by step 604, the input received by step 612, a different input, etc.) and/or a digital data record (such as a digital data record associated with a personality, the digital data record accessed by step 1002, a different digital data record, etc.) to generate a response in a natural language (such as the natural language of step 1004, a different natural language, and so forth), for example using step 1006; and/or providing the response to the entity of process 1100 (step 1008). For example, providing the response may include using the desired at least one suprasegmental feature to generate an audible speech output including an articulation of the response during a communication with the entity, for example as described above. In one example, the determination of the desired at least one suprasegmental feature by step 1106 may be based on at least one word included in the response. For example, when a specific word is included in the response, the desired at least one suprasegmental feature may include a specific suprasegmental feature, and when the specific word is not included in the response, the specific suprasegmental feature may not be included in the desired at least one suprasegmental feature. In one example, the response may be in a specific language register, and the determination of the desired at least one suprasegmental feature by step 1106 may be based on the specific language register. For example, when the language register is formal, a first desired at least one suprasegmental feature may be determined, and when the language register is casual, a second desired at least one suprasegmental feature may be determined. The second desired at least one suprasegmental feature may differ from the first desired at least one suprasegmental feature.

In some examples, the usage (by step 1108) of the desired at least one suprasegmental feature determined by step 1106 may be configured to convey a particular emotion. Further, step 1106 may select the particular emotion based on the personality (of step 1002 and/or step 1106) and/or the input received by step 1004. In one example, the digital data record accessed by step 1002 may be indicative of a tendency for emotional reactions associated with the personality (for example, a general tendency to be specific emotional reactions, a tendency to specific emotional reactions in a specific context, etc.), and the particular emotion may be selected based on the tendency and the input. For example, the digital data record accessed by step 1002 may specify a function mapping inputs to emotional reactions (or to tendencies for different emotional reactions when faced with a specific input), and step 1106 may use the function and the input to select the particular emotion. For example, the digital data record may indicate that the personality tends to be curious when faced with an adult's illness and compassionate when faced with a child's illness. When the input is indicative of an adult's illness (such as, 'My mother hasn't been feeling well'), the particular emotion may be curiosity, the response may be 'Does she have any specific symptoms?', and the desired at least one suprasegmental feature may include rising intonation at the end of the sentence and/or a higher pitch range with frequent pitch changes. On the other hand, when the input is indicative of a child's illness (such as, 'My daughter hasn't been feeling well'), the particular emotion may be compassion, the response may be 'You must be worried, how can I help?', and the desired at least one suprasegmental feature may include soothing intonation and/or moderately high pitch.

In some examples, the usage (by step 1108) of the desired at least one suprasegmental feature determined by step 1106 may be configured to convey a particular intent. Some non-limiting examples of such intent may include asking a question, making a statement, giving a command, or expressing uncertainty. Further, step 1106 may select the particular intent based on the personality (of step 1002 and/or step 1106) and/or the input received by step 1004. For example, the input may include 'Did he just stole that?', when the personality is trusting, the response may include an articulation of 'No' with suprasegmental features that include relatively stable pitch and/or a faster speech rate (for example, as part of 'No, he didn't'), and when the personality is cautious, the response may include an articulation of 'No' with suprasegmental features that include a rising pitch and/or a slower speech rate (for example, as part of 'No? Did he?').

In some examples, the usage (by step 1108) of the desired at least one suprasegmental feature determined by step 1106 may be configured to convey a level of empathy. Further, step 1106 may select the level of empathy based on the personality (of step 1002 and/or step 1106) and/or the input received by step 1004. In one example, the digital data record accessed by step 1002 may be indicative of a tendency to be empathetic associated with the personality (for example, a general tendency to be empathetic, a tendency to be empathetic in a specific context, etc.), and the level of empathy may be selected based on the tendency and the input. For example, the digital data record accessed by step 1002 may specify a function mapping inputs to levels of empathy (or to tendencies for different levels of empathy when faced with a specific input), and step 1106 may use the function and the input to select the level of empathy. For example, the digital data record may indicate that the personality tends to be more empathetic to cats than to dogs. When the input is indicative of a cat (such as, 'Look at this adorable cat'), the selected level of empathy may be higher than when the input is indicative of a dog (such as, 'Look at this adorable dog'), the response to either may include the same word (such as 'Yeah'), but when dealing with the cat the desired at least one suprasegmental feature may include a rising intonation at the end of the word, and when dealing with the dog the desired at least one suprasegmental feature may include a flat intonation.

In some examples, the usage (by step 1108) of the desired at least one suprasegmental feature determined by step 1106 may be configured to convey a level of self-assurance. Some non-limiting examples of such level of self-assurance may include confidence, uncertainty, and so forth. Further, step 1106 may select the level of self-assurance based on the personality (of step 1002 and/or step 1106) and/or the input received by step 1004. In one example, the digital data record accessed by step 1002 may be indicative of a tendency for self-assurance associated with the personality (for example, a general tendency to self-assurance, a tendency to self-assurance in a specific context, etc.), and the level of self-assurance may be selected based on the tendency and the input, for example as described above in relation to step 1006. For example, the digital data record may indicate that the personality tends to be more confident when dealing with coffee-makers than with printers. When the input is indicative of a coffee-maker (such as, 'Can you help me with the coffee-maker?'), the selected level of self-assurance may be higher than when the input is indicative of a printer (such as, 'Can you help me with the printer?'), the response to either may include the same word (such as 'Sure'), but when dealing with the coffee-maker the desired at least one suprasegmental feature may include slightly higher pitch and/or rising intonation towards the end of the word, and when dealing with printer the desired at least one suprasegmental feature may include lower fluctuating pitch and/or a flat or falling intonation.

In some examples, the usage (by step 1108) of the desired at least one suprasegmental feature determined by step 1106 may be configured to convey a level of formality. Further, step 1106 may select the level of formality based on the personality (of step 1002 and/or step 1106) and/or the input received by step 1004, for example as described above in relation to step 1006. In one example, the digital data record accessed by step 1002 may be indicative of a tendency for formality associated with the personality (for example, a general tendency to formality, a tendency to formality in a specific context, etc.), and the level of formality may be selected based on the tendency and the input, for example as described above in relation to step 1006. For example, the digital data record may indicate that the personality tends to be more formal when discussing taxation than when discussing investment strategies. When the input is indicative of a taxation question (such as, 'What are the implications of the recent changes to the capital gains tax rates?'), the selected level of formality may be higher, and the desired at least one suprasegmental feature may include moderated pitch, slower speech rate, and/or clear stress patterns. When the input is indicative of an investment strategy question (such as, 'Where should I invest my money?'), the selected level of formality may be lower, and the desired at least one suprasegmental feature may include wider pitch range with more variations, faster speech rate, and/or irregular stress patterns.

In some examples, the digital data record accessed by step 1002 may be indicative of a level associated with a personality trait associated with the personality, for example as described above. Further, the desired at least one suprasegmental feature determined by step 1106 may be based on the input received by step 1004 and/or on the level associated with the personality trait. For example, a conversational artificial intelligence model may be or include a LLM, and step 1106 may use the LLM to analyze a textual representation of the input and/or a textual indication of the level associated with the personality trait (for example with a suitable textual prompt, such as 'what suprasegmental features should be used when responding to this input {a textual representation of the input} received from a person, when you have {a textual indication of the level associated with the personality trait}') to determine the desired at least one suprasegmental feature. In another example, a conversational artificial intelligence model may be or include a machine learning model, as described above, and step 1106 may use the machine learning model to analyze the input and/or the level associated with the personality trait (for example, using the level as additional information as described above) to determine the desired at least one suprasegmental feature. In some examples, the input may be indicative of a suggestion, step 1106 may determine whether to accept or reject the suggestion based on the level associated with the personality trait (for example, as described above in relation to step 1006), and may base the determination of the desired at least one suprasegmental feature on the determination of whether to accept or reject the suggestion. For example, the personality trait may be 'adventurous', the input may include 'Let's try skydiving', a response to the input may include the word 'skydiving', when the level is high, the response may be 'Skydiving!' and the desired at least one suprasegmental feature may convey enthusiasm (for example, using stress to emphasize the first syllable 'sky-', starting with a higher pitch to express excitement, and/or elongating the first syllable 'sky-'), and when the level is low, the response may be 'Skydiving?' and the desired at least one suprasegmental feature may convey unadventurous (for example, using stress to emphasize the second syllable '-div', using lower pitch, and/or keeping the duration of all syllable short). In one example, the desired at least one suprasegmental feature may be indicative of whether the suggestion is accepted or rejected.

In some examples, step 1106 may determine whether to dismiss the input received by step 1004 based on the personality (for example, based on a level associated with the personality trait, based on a tendency associated with the personality, based on information included in the digital data record accessed by step 1002, and so forth). For example, a classification algorithm may be used to analyze the input and information associated with the personality (such as information included in the digital data record accessed by step 1002) to determine whether to dismiss (one class) or not to dismiss (another class) the input. The classification algorithm may be a machine learning model trained using training examples. Further, step 1106 may base the determination of the desired at least one suprasegmental feature on the determination of whether to dismiss the input. For example, the input may be indicative of a suggestion, step

1106 may determine whether to dismiss the suggestion (i.e., accept or reject it) as described above, and may base the determination of the desired at least one suprasegmental feature on the determination of whether to dismiss the input as described above. In one example, the desired at least one suprasegmental feature may be indicative of whether the input is dismissed.

In one example, the usage (by step 1108) of the desired at least one suprasegmental feature determined by step 1106 may be configured to convey reacting to the input received by step 1004 as a humoristic remark. In another example, the usage (by step 1108) of the desired at least one suprasegmental feature determined by step 1106 may be configured to convey reacting to the input received by step 1004 as an offensive remark. In yet another example, the usage (by step 1108) of the desired at least one suprasegmental feature determined by step 1106 may be configured to convey reacting to the input received by step 1004 as a friendly remark. For example, the input may include 'I didn't expect you to finish that project so quickly', a response to the input may include the word 'yes', when the personality is witty, confident and/or high in extraversion, the response may refer to the input as a humoristic remark (such as, 'Yes, I do have my moments of brilliance! Unfortunately, not in this project . . . '), when the personality is insecure, sensitive and/or low in self-esteem, the response may refer to the input as an offensive remark (such as, 'Yes, you didn't. Did you think I wasn't capable of it?'), and when the personality is friendly and/or cooperative, the response may refer to the input as a friendly remark (such as, 'Yes, I worked really hard on it. Glad you noticed'). In the humoristic remark case, the desired at least one suprasegmental feature for the articulation of the word 'Yes' in the response may include a high-rising intonation and/or longer articulation to suggest an ironic voice. In the offensive remark case, the desired at least one suprasegmental feature for the articulation of the word 'Yes' in the response may include growl-like pitch and longer articulation to convey taking offense. In the friendly remark case, the desired at least one suprasegmental feature for the articulation of the word 'Yes' in the response may include a higher pitch and gently falling intonation to convey gratitude. In some examples, the usage (by step 1108) of the desired at least one suprasegmental feature determined by step 1106 may be configured to convey a selected reaction to the input received by step 1004. Further, the selected reaction may be based on the personality and/or the input. For example, the selected reaction to the input may be or include at least one of a positive reaction, negative reaction, engagement, show of interest, agreement, respect, disagreement, skepticism, disinterest, boredom, discomfort, uncertainty, confusion or neutrality. For example, the input may include 'We should adopt a new decision making process to improve our workflow', when the personality is confident and/or adaptable, the selected reaction may be an agreement (for example, the desired at least one suprasegmental feature may include a rising intonation and/or a slightly higher and more stable pitch), and when the personality is conservative, the selected reaction may be a disagreement (for example, the desired at least one suprasegmental feature may include a falling intonation and/or a lower or varying pitch).

In some examples, process 1100 may further comprise obtaining an indication of a characteristic of an ambient noise. In one example, audio data may be analyzed to determine the characteristic of an ambient noise, for example using a classification algorithm to classify the ambient noise to one or a plurality of classes, using an artificial neural network, using a pattern recognition algorithm, using a trained machine learning model, and so forth. For example, the audio data may be captured using at least one audio sensor (for example, from an environment associated with the communication with the entity of step 1108). In another example, the audio data may be associated with a virtual environment (for example, a virtual environment associated with the communication with the entity of step 1108), and may be received digitally and/or generated. In yet another example, the audio data may be received by step 1404. In an additional example, the audio data may be received by step 1804. Some non-limiting examples of such characteristic of an ambient noise may include frequency range, intensity, temporal variation, source diversity, spatial distribution, harmonic content, and so forth. Further, the determination of the desired at least one suprasegmental feature by step 1106 may be further based on the characteristic of the ambient noise. For example, a conversational artificial intelligence model may be or include a machine learning model as described above, and step 1106 may use the machine learning model as described above with the characteristic of the ambient noise as additional information to determine the desired at least one suprasegmental feature.

In some examples, the desired at least one suprasegmental feature determined by step 1106 and/or by step 1506 and/or step 1906 may include at least a first group of one or more suprasegmental features and a second group of one or more suprasegmental features. Further, the audible speech output generated during the communication with the entity by step 1108 may include at least an articulation of a first part (also referred to as a first fragment) based on the first group of one or more suprasegmental features and an articulation of a second part (also referred to as a second fragment) based on the second group of one or more suprasegmental features. For example, step 1108 may generate the articulation of the first part based on the first group of one or more suprasegmental features as described above, and may generate the articulation of the second part based on the second group of one or more suprasegmental features as described above. In one example, the first part may include at least a first articulation of a particular word, and the second part may include at least a second articulation of the particular word. In another example, the first part may include at least an articulation of a particular word, and the second part may include at least an articulation of a non-verbal sound. In yet another example, the first part may include at least an articulation of a first non-verbal sound, the second part may include at least an articulation of a second non-verbal sound, and the second non-verbal sound may differ from the first non-verbal sound. In an additional example, the first part may include at least a first articulation of a particular non-verbal sound, and the second part may include at least a second articulation of the particular non-verbal sound. In some examples, the first part may include at least a first word, the second part may include at least a second word, and the second word may differ from the first word. For example, process 1100 may further comprise using a conversational artificial intelligence model (such as the conversational artificial intelligence model accessed by step 1001, a different conversational artificial intelligence model, etc.) to analyze a digital data record (such as a digital data record associated with a personality, the digital data record accessed by step 1002, a different digital data record, etc.) and/or an input (such as an input in a natural language, an input received from an entity, an input in a natural language received from an entity, the input received by step 1004, the input received by step 604, the input received by step 612, a different input, etc.) to determine the first word and/or the second word (for example as described above in relation to process 1000 and/or step 1006), and using the conversational artificial intelligence model to analyze the digital data record and the input to associate the first word with the first group of one or more suprasegmental features and/or to associate the second word with the second group of one or more suprasegmental features. For example, the conversational artificial intelligence model may be or include a LLM, and step 1106 may comprise the LLM to analyze a textual representation of the input and/or a textual representation of information from the digital data record (for example with a suitable textual prompt, such as 'what suprasegmental features should be used for the word {respective first or second word} when responding to this input {a textual representation of the input} received from a person, when your personality is as follows {a textual representation of information from the digital data record}') to determine the associations. In some examples, the desired at least one suprasegmental feature determined by step 1106 may include a plurality of groups, each group of the plurality may include respective one or more suprasegmental features. Further, the audible speech output generated during the communication with the entity by step 1108 may include, for each group, an articulation of a respective part based on the respective group of one or more suprasegmental features. For example, step 1108 may generate the articulation of each part based on the respective group of one or more suprasegmental features, for example as described above. Each part may include at least one of a respective word, a respective non-verbal sound, or a respective utterance.

FIG. 12 is a flowchart of an exemplary process 1200 for individualization of media content generation via conversational artificial intelligence, consistent with some embodiments of the present disclosure. In this example, process 1200 may comprise accessing a conversational artificial intelligence model (step 1001); accessing a digital data record associated with a personality (step 1002); receiving from an entity an input in a natural language (step 1004); using the conversational artificial intelligence model to analyze the input and the digital data record to generate a media content (step 1206), the media content is based on the personality and the input; and using the media content in a communication with the entity (step 1208). In other examples, process 1200 may include additional steps or fewer steps. In other examples, one or more steps of process 1200 may be executed in a different order and/or one or more groups of steps may be executed simultaneously. In one example, the media content may be a visual content, (such as an image, video clip, video stream, drawing, illustration, realistic visual content, non-realistic visual content, 2D visual content, 3D visual content, and so forth). In another example, the media content may be an audible content (such as audio files, audio stream, realistic audible content, non-realistic audible content, and so forth). In yet another example, the media content may include both a visual content and an audible content. In an additional example, the media content may be a multimedia content. In some examples, the input received by step 1004 may be indicative of a desire of the entity to obtain at least one media content.

In some examples, a system for individualization of media content generation via conversational artificial intelligence may include at least one processing unit configured to perform process 1200. In one example, the system may further comprise at least one audio sensor, the input received by step 1004 may be an audible verbal input, and the receiving the input by step 1004 may include capturing the audible verbal input using the at least one audio sensor. In one example, the system may further comprise at least one visual presentation device, the media content generated by step 1206 may include a visual content, and the using the media content by step 1208 may include using the at least one visual presentation device to present the visual content. In one example, the system may further comprise at least one visual presentation device, the media content generated by step 1206 may include an audible content, and the using the media content by step 1208 may include outputting the audible content using the at least one audio speaker. In some examples, a method for individualization of media content generation via conversational artificial intelligence may include performing process 1200. In some examples, a non-transitory computer readable medium may store computer implementable instructions that when executed by at least one processor may cause the at least one processor to perform operations for individualization of media content generation via conversational artificial intelligence, and the operations may include the steps of process 1200.

In some examples, step 1206 may comprise using a conversational artificial intelligence model (such as the conversational artificial intelligence model accessed by step 1001, a different conversational artificial intelligence model, etc.) to analyze an input (such as an input in a natural language, an input received from an entity, an input in a natural language received from an entity, the input received by step 1004, the input received by step 604, the input received by step 612, a different input, etc.) and/or a digital data record (such as a digital data record associated with a personality, the digital data record accessed by step 1002, a different digital data record, etc.) to generate a media content. The media content may be based on the personality and/or the input. In one example, a conversational artificial intelligence model may be or include a multimodal LLM, and step 1206 may use the LLM to analyze a textual representation of the input and/or a textual representation of information from the digital data record (for example with a suitable textual prompt, such as 'generate a {desired type of media content} for {type of intendent usage} in a communication with an individual, when responding to this input {a textual representation of the input} received from the individual, when your personality is as follows {a textual representation of information from the digital data record}') to generate the media content. In another example, a conversational artificial intelligence model may be or include a machine learning model, and step 1206 may use the machine learning model to analyze the digital data record and/or the input and/or additional information to generate the media content. The machine learning model may be a machine learning model trained using training examples to generate media contents based on inputs and/or digital data records and/or additional information. An example of such training example may include a sample input together with a sample digital data record and/or sample additional information, together with a sample desired media content. In some examples, step 1206 may identify a first mathematical object in a mathematical space, wherein the first mathematical object may correspond to at least part of the input received by step 1004 (for example, to a word included in the input, to a utterance included in the input, to a plurality of audio samples included in the input, etc.), for example using module 282 and/or module 284. Further, step 1206 may analyze the digital data record to identify a second mathematical object in the mathematical space, for example using module 284. Further, step 1206 may calculate a function of the first mathematical object and the second mathematical object to obtain a third mathematical object in the mathematical space, for example using module 286. Further, step 1206 may base the generation of the media content on the third mathematical object. For example, at least one pixel value of the media content may be a function of the third mathematical object. In another example, at least one audio sample value may be a function of the third mathematical object.

In some examples, process 1200 may further comprise using a conversational artificial intelligence model (such as the conversational artificial intelligence model accessed by step 1001, a different conversational artificial intelligence model, etc.) to analyze an input (such as an input in a natural language, an input received from an entity, an input in a natural language received from an entity, the input received by step 1004, the input received by step 604, the input received by step 612, a different input, etc.) and/or a digital data record (such as a digital data record associated with a personality, the digital data record accessed by step 1002, a different digital data record, etc.) to generate a response in a natural language (such as the natural language of step 1004, a different natural language, and so forth), for example using step 1006. The response may be a response to the input. The response may be based on the personality and/or the input. Further, step 1206 may use the response to generate the media content. For example, step 1206 may generate audible speech as described above in relation to process 1000 and/or process 1100, and may include the generated audible speech in the media content. In another example, the response may include textual response, and step 1206 may include a visual representation of the textual response.

In some examples, process 1200 may further comprise using a conversational artificial intelligence model (such as the conversational artificial intelligence model accessed by step 1001, a different conversational artificial intelligence model, etc.) to analyze an input (such as an input in a natural language, an input received from an entity, an input in a natural language received from an entity, the input received by step 1004, the input received by step 604, the input received by step 612, a different input, etc.) and/or a digital data record (such as a digital data record associated with a personality, the digital data record accessed by step 1002, a different digital data record, etc.) to determine a desired at least one suprasegmental feature, for example using step 1106. The desired at least one suprasegmental feature may be based on the personality and/or the input. Further, step 1206 may use the desired at least one suprasegmental feature to generate an audible speech in the media content. For example, step 1206 may use the desired at least one suprasegmental feature to generate an audible speech as described above in relation to process 1100, and may include the generated audible speech in the media content.

In some examples, process 1200 may further comprise using a conversational artificial intelligence model (such as the conversational artificial intelligence model accessed by step 1001, a different conversational artificial intelligence model, etc.) to analyze an input (such as an input in a natural language, an input received from an entity, an input in a natural language received from an entity, the input received by step 1004, the input received by step 604, the input received by step 612, a different input, etc.) and/or a digital data record (such as a digital data record associated with a personality, the digital data record accessed by step 1002, a different digital data record, etc.) to determine a desired movement for a specific portion of a specific body, for example using step 1106. The specific body may be associated with the personality. The desired movement may be based on the personality and/or the input. Further, step 1206 may use the desired movement for the specific portion of the specific body to generate a visual depiction of the desired movement to the specific portion of the specific in the media content, for example as described below in relation to step 1306.

In some examples, step 1208 may comprise using a media content (such as the media content generated by step 1206, the media content generated by step 1606, the media content generated by step 2006, a different media content, and so forth) in a communication with an entity (such as the entity of step 1004, the entity of step 1404, the entity of step 1804 and/or step 1805, a different entity, and so forth). For example, the media content may be presented (for example, visually, audibly, textually, etc.) and/or outputted (for example, digitally, to a memory, to an external device, via an output device, via an email, via an instant message, etc.) during the communication with the entity. In another example, a digital signal encoding the media content (for example, in a lossless format, in a lossy format, in a compressed format, in a non-compressed format, etc.) may be generated during the communication. The digital signal may be stored in memory and/or transmitted using a digital communication device during the communication. The digital signal may be configured to cause the presentation of the media content during the communication. In one example, the entity may be a human individual, and the using the media content in the communication with the entity by step 1208 may include presenting the media content to the human individual.

In some examples, a media content (such as the media content generated by step 1206 and/or used by step 1208) may include a verbal component selected based on the personality and the input. In one example, the verbal component may include one or more words, and the one or more words may be selected based on the personality and the input, for example using step 1006. In one example, the media content may include a visual representation of the verbal component, for example as a visual representation of a textual content. In another example, the media content may include an audible representation of the verbal component, for example as an audio data that includes speech. For example, the audible representation may be associated with at least one suprasegmental feature. For example, the at least one suprasegmental feature may be selected based on the personality and the input, for example using step 1106. Further, the audible representation may be generated using step 1108. In some examples, the media content (such as the media content generated by step 1206 and/or used by step 1208) may include a non-verbal sound selected based on the personality and the input. For example, the non-verbal sound may be associated with at least one suprasegmental feature. For example, the at least one suprasegmental feature may be selected based on the personality and the input, for example using step 1106, and/or may be generated using step 1108. Further, the non-verbal sound may be generated using step 1108. In some examples, the media content (such as the media content generated by step 1206 and/or used by step 1208) may include a visual symbol selected based on the personality and the input. For example, a conversational artificial intelligence model may be or include a multimodal LLM, and step 1206 may use the LLM to analyze a textual representation of the input and/or a textual representation of information from the digital data record (for example with a suitable textual prompt, such as 'generate a {type of visual symbol} for {type of intendent usage} in a communication with an individual, when responding to this input {a textual representation of the input} received from the individual, when your personality is as follows {a textual representation of information from the digital data record}') to generate the visual symbol. Some non-limiting examples of such visual symbol may include emoji, visual signs, visual symbols, icons, and so forth.

In some examples, the usage of the media content by step 1208 may be configured to convey a particular emotion. For example, the media content may include a response in a natural language associated with the particular emotion, may include speech with at least one suprasegmental feature configured to convey the particular emotion, may include a visualization of movement of a body configured to convey the particular emotion, and so forth. Further, step 1206 may select the particular emotion based on the personality (of step 1002 and/or step 1206) and/or the input received by step 1004. In one example, the digital data record accessed by step 1002 may be indicative of a tendency for emotional reactions associated with the personality (for example, a general tendency to be specific emotional reactions, a tendency to specific emotional reactions in a specific context, etc.), and step 1206 may select the particular emotion based on the tendency and the input, for example as described above in relation to step 1106. In some examples, the usage of the media content by step 1208 may be configured to convey a level of empathy. For example, the media content may include a response in a natural language associated with the level of empathy, may include speech with at least one suprasegmental feature configured to convey the level of empathy, may include a visualization of movement of a body configured to convey the level of empathy, and so forth. Further, step 1206 may select the level of empathy based on the personality (of step 1002 and/or step 1206) and/or the input received by step 1004. In one example, the digital data record accessed by step 1002 may be indicative of a tendency to be empathetic associated with the personality (for example, a general tendency to be empathetic, a tendency to be empathetic in a specific context, etc.), and step 1206 may select the level of empathy based on the tendency and the input, for example as described above in relation to step 1106. In some examples, the usage of the media content by step 1208 may be configured to convey a level of self-assurance. For example, the media content may include a response in a natural language associated with the level of self-assurance, may include speech with at least one suprasegmental feature configured to convey the level of self-assurance, may include a visualization of movement of a body configured to convey the level of self-assurance, and so forth. Further, step 1206 may select the level of self-assurance based on the personality (of step 1002 and/or step 1206) and/or the input received by step 1004. Some non-limiting examples of such level of self-assurance may include confidence, uncertainty, etc. In one example, the digital data record accessed by step 1002 may be indicative of a tendency for self-assurance associated with the personality (for example, a general tendency for self-assurance, a tendency for self-assurance in a specific context, etc.), and step 1206 may select the level of self-assurance based on the tendency and the input, for example as described above in relation to step 1006. In some examples, the usage of the media content by step 1208 may be configured to convey a level of formality. For example, the media content may include a response in a natural language associated with the level of formality, may include speech with at least one suprasegmental feature configured to convey the level of formality, may include a visualization of movement of a body configured to convey the level of formality, and so forth. Further, step 1106 may select the level of formality based on the personality (of step 1002 and/or step 1106) and/or the input received by step 1004, for example as described above in relation to step 1006. In one example, the digital data record accessed by step 1002 may be indicative of a tendency for formality associated with the personality (for example, a general tendency to formality, a tendency to formality in a specific context, etc.), and the level of formality may be selected based on the tendency and the input. In some examples, the usage of the media content by step 1208 may be configured to convey a particular intent. For example, the media content may include speech with at least one suprasegmental feature configured to convey the particular intent, for example as described above in relation to step 1106. Further, step 1106 may select the particular intent based on the personality (of step 1002 and/or step 1106) and/or the input received by step 1004. Some non-limiting examples of such intent may include asking a question, making a statement, giving a command, or expressing uncertainty.

In some examples, the media content generated by step 1206 and/or used by step 1208 may be associated with a style. Further, step 1106 may select the style is selected based on the personality (of step 1002 and/or step 1106) and/or the input received by step 1004. Some non-limiting examples of such style may include realistic, fantasy, anime, specific artistic style (such as cubistic, figurative, minimalist, geometric, etc.), specific era (such as 19-th century, colonial, etc.), and so forth. For example, the input may include 'draw me a sheep', when the personality is detail-oriented, the generated media content may depict a realistic sheep, and when the personality is intuitive, the generated media content may depict an abstract representation of a sheep. In another example, the media content may include a visualization of movement of a body associated with the style, and so forth. In some examples, the media content generated by step 1206 and/or used by step 1208 may be an artificially generated visual content. Further, step 1206 may select an illumination parameter associated with the artificially generated visual content based on the personality (of step 1002 and/or step 1106) and/or the input received by step 1004. Some non-limiting examples of such illumination parameter may include number of light sources, a position and/or a direction associated with a light source, ambient illumination parameters, and so forth. For example, the input may include 'draw me a portrait', when the personality is associated with the goth subculture, the generated media content may have low illumination, and when the personality is associated with the psychedelic subculture, the generated media content may have high intensity illumination. In some examples, the media content generated by step 1206 and/or used by step 1208 may be an artificially generated visual content depicting at least one object of a particular group of objects. Further, step 1206 may select the particular group based on the personality (of step 1002 and/or step 1106) and/or the input received by step 1004. For example, the input may include 'draw me an upper deck of a futuristic ship', when the personality is optimistic, the particular group of objects may include objects associated with a cruise vacation (such as deck chairs, towel animals, and so forth), and when the personality is militaristic, the particular group of objects may include objects associated with a warship (such as laser guns, radar, and so forth). In some examples, the media content generated by step 1206 and/or used by step 1208 may be an artificially generated visual content depicting at least one object with a particular characteristic. Further, step 1206 may select the particular characteristic based on the personality (of step 1002 and/or step 1106) and/or the input received by step 1004. Some non-limiting examples of such particular characteristic may include size, color, texture, shape, type, orientation, appearance, quantity, movement, and so forth. For example, the input may include 'show me your car', when the personality has a big family, the media content may depict a minivan, and when the personality is a single urban person, the media content may depict a subcompact car. In some examples, the media content generated by step 1206 and/or used by step 1208 may be an artificially generated visual content depicting two objects. In one example, step 1206 may select a distance between the two objects in the artificially generated visual content based on the personality (of step 1002 and/or step 1106) and/or the input received by step 1004. In another example, step 1206 may select a spatial orientation between the two objects in the artificially generated visual content based on the personality (of step 1002 and/or step 1106) and/or the input received by step 1004. For example, the two objects may be an avatar associated with the personality speaking with an avatar of another person, when the personality is autistic, the distance between the two avatars may be shorter than what is socially acceptable and the spatial orientation of the avatar associated with the personality may correspond to avoiding eye contact, and when the personality is neurotypical, the distance between the two avatars may be a socially acceptable distance and the spatial orientation of the avatar associated with the personality may enable eye contact.

In some examples, audible speech output may be generated during the communication with the entity (for example, as described above in relation to step 1108), the generated audible speech output may include an articulation of a first part and an articulation of a second part, the media content generated by step 1206 may include a first portion of a visual content and a second portion of the visual content, and the using the media content by step 1208 may include outputting the first portion of the visual content simultaneously with the articulation of the first part, and outputting the second portion of the visual content simultaneously with the articulation of the second part. In one example, the first part may include at least a first articulation of a particular word, and the second part may include at least a second articulation of the particular word. In one example, the first part may include at least an articulation of a particular word, and the second part may include at least an articulation of a non-verbal sound. In one example, the first part may include at least an articulation of a first non-verbal sound, the second part may include at least an articulation of a second non-verbal sound, and the second non-verbal sound may differ from the first non-verbal sound. In one example, the first part may include at least a first articulation of a particular non-verbal sound, and the second part may include at least a second articulation of the particular non-verbal sound. In one example, the first part may include at least a first word, the second part may include at least a second word, and the second word may differ from the first word. For example, step 1206 may use the conversational artificial intelligence model accessed by step 1001 to analyze the digital data record accessed by step 1002 and the input received by step 1004 to determine a first word and a second word (for example, as described above in relation to step 1006), the first part may include at least the determined first word, and the second part may include at least the determined second word. Further, step 1206 may use the conversational artificial intelligence model accessed by step 1001 to analyze the
digital data record accessed by step 1002 and the input
received by step 1004 to associate the first word with the first
portion of the visual content and to associate the second
word with the second portion of the visual content. For
example, the conversational artificial intelligence model
may include a machine learning model trained using training
examples to associated different words with different por-
tions of visual contents based on textual inputs and/or data
records. An example of such training example may include
a sample data record associated with a sample personality, a
sample input from a sample entity, a sample visual content
and a sample sequence of words (for example, audible
sequence, textual sequence, a sentence, etc.), together with
a label indicative of an association of a first sample portion
of the sample visual content with a first sample word of the
sample sequence of words and an association of a second
sample portion of the sample visual content with a second
sample word of the sample sequence of words. Step 1206
may use the trained machine learning model to analyze the
digital data record accessed by step 1002 and the input
received by step 1004 to associate the first word with the first
portion of the visual content and to associate the second
word with the second portion of the visual content.

FIG. 13 is a flowchart of an exemplary process 1300 for
individualization of body movements via conversational
artificial intelligence, consistent with some embodiments of
the present disclosure. In this example, process 1300 may
comprise accessing a conversational artificial intelligence
model (step 1001); accessing a digital data record associated
with a personality (step 1002); receiving from an entity an
input in a natural language (step 1004); using the conver-
sational artificial intelligence model to analyze the input and
the digital data record to determine a desired movement for
a specific portion of a specific body (step 1306), the specific
body is associated with the personality, the desired move-
ment is based on the personality and the input; and gener-
ating digital signals (step 1308), the digital signals are
configured to cause the desired movement to the specific
portion of the specific body during an interaction with the
entity. In other examples, process 1300 may include addi-
tional steps or fewer steps. In other examples, one or more
steps of process 1300 may be executed in a different order
and/or one or more groups of steps may be executed
simultaneously. In one example, the personality may be
associated with a human individual, and the desired move-
ment may be associated with a desire to imitate the human
individual. In another example, the personality may not be
associated with a specific human individual. In one example,
the specific portion may include at least one of a hand, arm,
head, face, torso or leg of the specific body. In another
example, the specific portion may include at least part of a
hand, an arm, a head, a face, a torso, or a leg of the specific
body.

In some examples, a system for individualization of body
movements via conversational artificial intelligence may
include at least one processing unit configured to perform
process 1300. In one examples, the system may further
comprise the specific body of process 1300. For example,
the specific body may include the at least one processing
unit. In another example, the at least one processing unit
may be external to the specific body. In one example, the
specific body may include one or more actuators (such as
motors and/or servos configured to cause motions to differ-
ent parts of the specific body). The digital signals generated
by step 1308 may be configured to control the one or more
actuators to cause the specific portion of the specific body to undergo the desired movement during the interaction with
the entity, for example as described herein. In one example,
the system may further comprise at least one audio sensor,
the input received by step 1004 may be an audible verbal
input, and the receiving the input by step 1004 may include
capturing the audible verbal input using the at least one
audio sensor. In some examples, a method for individual-
ization of body movements via conversational artificial
intelligence may include performing process 1300. In some
examples, a non-transitory computer readable medium may
store computer implementable instructions that when
executed by at least one processor may cause the at least one
processor to perform operations for individualization of
body movements via conversational artificial intelligence,
and the operations may include the steps of process 1300.

In some examples, step 1306 may comprise using a
conversational artificial intelligence model (such as the
conversational artificial intelligence model accessed by step
1001, a different conversational artificial intelligence model,
etc.) to analyze an input (such as an input in a natural
language, an input received from an entity, an input in a
natural language received from an entity, the input received
by step 1004, the input received by step 604, the input
received by step 612, a different input, etc.) and/or a digital
data record (such as a digital data record associated with a
personality, the digital data record accessed by step 1002, a
different digital data record, etc.) to determine a desired
movement for a specific portion of a specific body. The
specific body may be associated with a personality (such as
the personality of step 1002, a different personality, and so
forth). The desired movement may be based on the person-
ality and/or the input. In one example, a conversational
artificial intelligence model may be or include a multimodal
LLM, and step 1306 may use the LLM to analyze a textual
representation of the input and/or a textual representation of
information from the digital data record (for example with a
suitable textual prompt, such as 'what is a likely movement
in response to this input {a textual representation of the
input}, when your personality is as follows {a textual
representation of information from the digital data record}')
to determine the desired movement for the specific portion
of the specific body. In another example, a conversational
artificial intelligence model may be or include a machine
learning model, and step 1306 may use the machine learning
model to analyze the digital data record and/or the input
and/or additional information to determine the desired
movement for the specific portion of the specific body. The
machine learning model may be a machine learning model
trained using training examples to determine desired move-
ments based on inputs and/or digital data records and/or
additional information. An example of such training
example may include a sample input together with a sample
digital data record and/or sample additional information,
together with a sample desired movement. In some
examples, step 1306 may identify a first mathematical object
in a mathematical space, wherein the first mathematical
object may correspond to at least part of the input received
by step 1004 (for example, to a word included in the input,
to a utterance included in the input, to a plurality of audio
samples included in the input, etc.), for example using
module 282 and/or module 284. Further, step 1306 may
analyze the digital data record to identify a second math-
ematical object in the mathematical space, for example using
module 284. Further, step 1306 may calculate a function of
the first mathematical object and the second mathematical
object to obtain a third mathematical object in the math-
ematical space, for example using module 286. Further, step

1306 may base the determination of the desired movement on the third mathematical object. For example, when the third mathematical object includes a particular numerical value, one desired movement may be determined, and when the third mathematical object does not include the particular numerical value, a different desired movement may be determined (for example, different in at least one of a direction, length, speed or timing). In another example, the third mathematical object may be used as the additional information when using the machine learning model as described above.

In some examples, step 1306 may further comprise using a conversational artificial intelligence model (such as the conversational artificial intelligence model accessed by step 1001, a different conversational artificial intelligence model, etc.) to analyze an input (such as an input in a natural language, an input received from an entity, an input in a natural language received from an entity, the input received by step 1004, the input received by step 604, the input received by step 612, a different input, etc.) and/or a digital data record (such as a digital data record associated with a personality, the digital data record accessed by step 1002, a different digital data record, etc.) to select the specific portion of the specific body. In one example, a conversational artificial intelligence model may be or include a multimodal LLM, and step 1306 may use the LLM to analyze a textual representation of the input and/or a textual representation of information from the digital data record (for example with a suitable textual prompt, such as 'what portion of your body is likely to move in response to this input {a textual representation of the input}, when your personality is as follows {a textual representation of information from the digital data record}') to select the specific portion of the specific body. In another example, a conversational artificial intelligence model may be or include a machine learning model, and step 1306 may use the machine learning model to analyze the digital data record and/or the input and/or additional information to select the specific portion of the specific body. The machine learning model may be a machine learning model trained using training examples to select portions of a body based on inputs and/or digital data records and/or additional information. An example of such training example may include a sample input together with a sample digital data record and/or sample additional information, together with a sample desired selection of a portion of a sample body for movement.

In some examples, the desired movement determined by step 1306 may be configured to cause the specific body to perform a gesture, for example as described above. The gesture may be based on the personality (of step 1002 and/or step 1306) and/or the input received by step 1004. For example, the input may be 'which one is you favorite?', and the gesture may be a pointing gesture directed to a favorite item selected based on the personality. In some examples, the desired movement determined by step 1306 may be configured to cause the specific body to produce a facial expression, for example as described above. The facial expression may be based on the personality (of step 1002 and/or step 1306) and/or the input received by step 1004. For example, the input may be 'Nice haircut—did you do it yourself', when the personality is easygoing, the facial expression may include a smile to show that the input is conceived as a humoristic remark, and when the personality has low self-esteem and/or is in a bad mood, the facial expression may include frowning and/or narrowed eyebrows to show that the input is conceived as an offensive remark.

In some examples, the digital data record accessed by step 1002 may include a biographical detail associated with the personality. Further, the desired movement determined by step 1306 may be based on the biographical detail. For example, the input received by step 1004 may include 'Do you want some soup?', when the biographical detail indicates that the personality resides in India, the desired movement may include a head bobble to indicate a positive answer, and when the biographical detail indicates that the personality resides in the United States, the desired movement may include a head nod to indicate a positive answer. In another example, the input may include 'Please stand over there', when the biographical detail indicates that the personality is associated with a younger persona, the desired movement may be associated with a faster motion towards the destination, and when the biographical detail indicates that the personality is associated with an older persona, the desired movement may be associated with a slower motion towards the destination.

In some examples, the digital data record accessed by step 1002 may include an indication that a specific detail is known to a persona associated with the personality. Further, the desired movement determined by step 1306 may be based on the persona knowing the specific detail. For example, the input received by step 1004 may include 'Have you heard about Bob?', when the digital data record indicates that the persona knows that Bob's wife has passed away, the desired movement may be associated with solemnity and/or sadness (for example, when the personality is extroverted, the desired movement may be configured to result in lowered eyebrows and/or eyes looking downward, and when the personality is introverted, the desired movement may be configured to result in slight downturn of the mouth or a gentle furrowing of the brows), and when the digital data record does not indicate that the persona knows the news, the desired movement may be associated with curiosity (for example, raised eyebrows and/or wide eyes). In some examples, the digital data record accessed by step 1002 may include an indication that a persona associated with the personality knows that a specific detail is known to the entity. Further, the desired movement determined by step 1306 may be based on the persona knowing that the specific detail is known to the entity. For example, the input received by step 1004 may include a statement that the persona knows that the entity knows to be untrue based on the knowledge of the specific detail, when the personality is empathetic, the desired movement may be associated with open body language and/or encouraging smiles to create a safe place for the entity to reveal the truth, and when the personality is aggressive, the desired movement may be associated with furrowed brows and/or tight jaw to convey displeasure or suspicion. In some examples, the digital data record accessed by step 1002 may include an indication that a persona associated with the personality knows that a specific detail is unknown to the entity. Further, the desired movement determined by step 1306 may be based on the persona knowing that the specific detail is unknown to the entity. For example, the specific detail known to the persona and unknown to the entity may be that the entity is betrayed by the entity's spouse, the input received by step 1004 may include a positive statement about the entity's spouse (such as, 'My wife is the best!'), the response may hide the specific detail (for example, 'That's wonderful to hear'), when the personality is compassionate, the desired movement may be associated with a gentle smile and/or an open posture, and when the personality is anxious, the desired movement may be associated with a stilted smile and/or a tense posture.

In some examples, the desired movement determined by step 1306 may be associated a level of formality. The level of formality may be selected based on the personality (of step 1002 and/or step 1306) and/or the input received by step 1004. In one example, the digital data record accessed by step 1002 may be indicative of a tendency for formality associated with the personality (for example, a general tendency to formality, a tendency to formality in a specific context, etc.), and the level of formality may be selected based on the tendency and the input, for example as described above in relation to step 1006. For example, the digital data record may indicate that the personality tends to be more formal when discussing taxation than when discussing investment strategies. When the input is indicative of a taxation question (such as, 'What are the implications of the recent changes to the capital gains tax rates?'), the selected level of formality may be higher, and the desired movement may be associated with a more formal posture (for example, upright sitting). When the input is indicative of an investment strategy question (such as, 'Where should I invest my money?'), the selected level of formality may be lower, and the desired movement may be associated with a less formal posture (for example, relaxed and leaning back slightly).

In some examples, the desired movement determined by step 1306 may be associated a style. The style may be selected based on the personality (of step 1002 and/or step 1306) and/or the input received by step 1004. For example, the input may include 'show us a representation of sadness', when the digital data record accessed by step 1002 indicates that a persona associated with the personality is a professional ballet dancer, the desired movement may include fluid movements (such as gentle arabesques, soft plies, and/or graceful port de bras), and when the digital data record accessed by step 1002 indicates that the persona associated with the personality is a professional jazz dancer, the desired movement may include sharp contrasts (such as sudden changes in direction, quick footwork, and/or dynamic gestures).

In some examples, the desired movement determined by step 1306 may be associated a level of empathy. The level of empathy may be selected based on the personality (of step 1002 and/or step 1306) and/or the input received by step 1004. In one example, the digital data record accessed by step 1002 may be indicative of a tendency to be empathetic associated with the personality (for example, a general tendency to be empathetic, a tendency to be empathetic in a specific context, etc.), and the level of empathy may be selected based on the tendency and the input, for example as described above in relation to step 1106. For example, when the level of empathy is high, the desired movement determined by step 1306 may be associated with warm smiles and/or active listening, and when the level of empathy is low, the desired movement may be associated with minimal facial expressions and/or inexpressiveness.

In some examples, the desired movement determined by step 1306 may be associated a level of self-assurance. The level of self-assurance may be based on the personality (of step 1002 and/or step 1306) and/or the input received by step 1004. Some non-limiting examples of such level of self-assurance may include confidence, uncertainty, and so forth. In one example, the digital data record accessed by step 1002 may be indicative of a tendency for self-assurance associated with the personality (for example, a general tendency for self-assurance, a tendency for self-assurance in a specific context, etc.), and step 1306 may select the level of self-assurance based on the tendency and the input, for example as described above in relation to step 1006. For example, when the level of self-assurance is high, the desired movement determined by step 1306 may be associated with purposeful gestures and/or a shoulders back posture, and when the level of self-assurance is low, the desired movement may be associated with fidgets and/or a slouching posture.

In some examples, the desired movement determined by step 1306 may be configured to create a selected distance between at least part the specific body and at least part of a body associated with the entity. Further, the distance may be selected based on the personality (of step 1002 and/or step 1306) and/or the input received by step 1004. For example, the selected distance may be or may be associated with an interpersonal distance. In another example, the selected distance may be the minimal distance between the two bodies. In one example, the desired movement may be configured to move the at least part the specific body away from the at least part of the body associated with the entity (for example, when the selected distance is longer than the current physical distance). In another example, the desired movement may be configured to move the at least part the specific body towards the at least part of the body associated with the entity (for example, when the selected distance is shorted than the current physical distance). In some examples, the desired movement determined by step 1306 may be configured to create a selected spatial orientation between at least part the specific body and at least part of a body associated with the entity. Further, the spatial orientation may be selected based on the personality (of step 1002 and/or step 1306) and/or the input received by step 1004. Some non-limiting examples of such spatial orientation may include spatial orientation associated with gaze or head direction (such as, looking directly at the entity, looking down, looking to the left of the entity, looking to the right of the entity, and so forth), spatial orientation associated with body or torso direction (such as facing the entity, directed away for the entity, directed to left or right of the entity, and so forth). In one example, the desired movement may be configured to move the at least part the specific body to create the selected spatial orientation with respect to at least part of the body associated with the entity. In one example, the input may be 'Come here', when the personality is autistic, the distance may be shorter than what is socially acceptable and the spatial orientation may correspond to avoiding eye contact, and when the personality is neurotypical, the distance may be a socially acceptable distance and the spatial orientation may enable eye contact.

In one example, the desired movement determined by step 1306 may be configured to cause a physical contact with the entity. In another example, the desired movement determined by step 1306 may be configured to avoid causing a physical contact with the entity. For example, the input received by step 1004 may indicate a distress of the entity, when the personality is empathetic, the desired movement may be associated with a gentle touch on an arm, shoulder and/or back of the entity, and when the personality is non-empathetic, the desired movement may be associated with no physical contact with the entity. In some examples, the digital data record accessed by step 1002 may indicate that a persona associated with the personality is affiliated with a specific institute. Further, and the desired movement determined by step 1306 may be associated with the specific institute. For example, the input received by step 1004 may include 'Promise?', the response may include 'I promise', when the specific institute is the scouts, the desired movement may be associated with a scout salute, and when the specific institute is a religious institute, the desired movement may be associated with crossing the fingers over the chest. In some examples, the desired movement determined by step 1306 may serve a goal of a persona associated with the personality. Further, the goal may be based on the digital data record accessed by step 1002. Some non-limiting examples of such goal may include non-verbal communication (and the desired movement may be associated with body language, gestures, facial expression, and so forth), moving objects, manipulating an object, moving an object, changing a state of an object, changing posture, creating physical contact (for example, with an object, with the entity, etc.), avoiding physical contact (for example, with an object, with the entity, etc.), and so forth. For example, the input received by step 1004 may include 'eat something', when the digital data record indicates an affinity for apples, the desired movement may be associated with picking an apple, and when the digital data record indicates an affinity for oranges, the desired movement may be associated with picking an orange.

In some examples, the input received by step 1004 may be indicative of a desire of the entity for a persona associated with the personality to perform a particular manipulation of a particular object. Further, step 1306 may determine whether to perform the particular manipulation of the particular object based on the digital data record accessed by step 1002 and/or the input. For example, the input may include 'Please bring me something to eat', when the personality is a nurturer personality, a response may include 'Sure' and step 1306 may determine to provide an apple, and when the personality is an introverted less conscientious personality, the response may include 'Grab something yourself' and step 1306 may determine not to provide any food. In one example, step 1306 may determine to perform the particular manipulation of the particular object based on the digital data record and/or the input, and in response to the determination to perform the particular manipulation, the desired movement determined by step 1306 may be configured to cause the particular manipulation of the particular object. In another example, step 1306 may determine not to perform the particular manipulation of the particular object based on the digital data record and/or the input, and, in response to the determination not to perform the particular manipulation, the desired movement may be configured not to cause the particular manipulation of the particular object. For example, a conversational artificial intelligence model may be or include a multimodal LLM, and step 1306 may use the LLM to analyze a textual representation of the input and/or a textual representation of information from the digital data record (for example with a suitable textual prompt, such as 'would you perform {the particular manipulation of the particular object} in response to this input {a textual representation of the input}, when your personality is as follows {a textual representation of information from the digital data record}') to determine whether to perform the particular manipulation of the particular object. In another example, a conversational artificial intelligence model may be or include a classification model, and step 1306 may use the classification model to classify the digital data record and/or the input to a class of a plurality of classes, wherein one class of the plurality corresponds to determining to perform the particular manipulation of the particular object, and another class of the plurality corresponds to determining not to perform the particular manipulation of the particular object. In one example, the particular manipulation may be or include bringing the particular object to the entity. In one example, the particular manipulation may be or include changing a state of the particular object to a particular state. For example, the particular object may be a device (such as an electric device, a mechanical device, etc.) with an off-state and an on-state, and the particular manipulation may include changing the state from the off-state to the on-state or changing the state from the on-state to the off-state. In another example, the particular object may be an object with an open-state and a closed-state (such as a door, a gate, a window, a container, a lock, etc.), and the particular manipulation may include changing the state from the open-state to the closed-state or changing the state from the closed-state to the open-state. In one example, a desired movement configured to cause the particular manipulation of the particular object may include a physical contact with the particular object to cause the particular manipulation to the particular object. For example, the input may be 'Please close the window', the particular object may be a window, the particular manipulation may include closing the window, and the desired movement may include gripping the window and sliding or pushing it to close it. In one example, a desired movement configured to cause the particular manipulation of the particular object may include a physical contact with a specific object to cause the particular manipulation to the particular object, and no physical contact with the particular object. For example, the input may be 'Please turn the light off', the particular object may be a light fixture, the particular manipulation may include turning the light fixture off, and the desired movement may include physical contact with a switch controlling the light fixture and no physical contact with the light fixture.

In one example, based on the personality, the desired movement determined by step 1306 may be configured to convey that a persona associated with the personality perceives the input received by step 1004 as a humoristic remark. In another example, based on the personality, the desired movement determined by step 1306 may be configured to convey that a persona associated with the personality perceives the input received by step 1004 as an offensive remark. In yet another example, based on the personality, the desired movement determined by step 1306 may be configured to convey that a persona associated with the personality perceives the input received by step 1004 as a friendly remark. For example, the input may include 'I didn't expect you to finish that project so quickly', when the personality is witty, confident and/or high in extraversion, the desired movement may convey that the input is perceived as a humoristic remark (for example, as smiling), when the personality is insecure, sensitive and/or low in self-esteem, the desired movement may convey that the input is perceived as an offensive remark (for example, as frowning, crossing arms, tense jaw, and so forth), and when the personality is friendly and/or cooperative, the desired movement may convey that the input is perceived as a friendly remark (for example, nodding, open posture, and so forth).

In some examples, the desired movement determined by step 1306 may be configured to convey a selected reaction to the input. Further, the selected reaction may be based on the personality (of step 1002 and/or step 1306) and/or the input received by step 1004. For example, the selected reaction to the input may be or include at least one of a positive reaction, negative reaction, engagement, show of interest, agreement, respect, disagreement, skepticism, disinterest, boredom, discomfort, uncertainty, confusion or neutrality. For example, the input may include 'We should adopt a new decision making process to improve our workflow', when the personality is confident and/or adaptable, the selected reaction may be an agreement (for example, the desired movement may be associated with nodding), and when the personality is conservative, the selected reaction may be a disagreement (for example, the desired movement may be associated with shaking head and/or frowning).

In some examples, audible speech output may be generated during the interaction with the entity (for example, as described in relation to step 1108), the generated audible speech output may include an articulation of a first part (also referred to as a first fragment) and an articulation of a second part (also referred to as a second fragment), and the desired movement determined by step 1306 and/or step 1706 and/or step 2106 may include a first sub-movement and a second sub-movement. Further, the digital signals generated by step 1308 may be configured to cause the specific portion of the specific body to undergo the first sub-movement simultaneously with the articulation of the first part, and/or to cause the specific portion of the specific body to undergo the second sub-movement simultaneously with the articulation of the second part. For example, the digital signals generated by step 1308 may include a first segment configured to cause the specific portion of the specific body to undergo the first sub-movement and a second segment configured to cause the specific portion of the specific body to undergo the second sub-movement, and step 1308 may generate the first segment simultaneously with the articulation of the first part and/or may generate the second segment simultaneously with the articulation of the second part. In another example, the digital signals generated by step 1308 may include information associating the first sub-movement with the first part and/or associating the second sub-movement with the second part. In one example, the first part may include at least a first articulation of a particular word, and/or the second part may include at least a second articulation of the particular word. In another example, the first part may include at least an articulation of a particular word, and/or the second part may include at least an articulation of a non-verbal sound. In yet another example, the first part may include at least an articulation of a first non-verbal sound, and/or the second part may include at least an articulation of a second non-verbal sound (the second non-verbal sound may differ from the first non-verbal sound, the first and second non-verbal sounds may be the same non-verbal sound, and so forth). In an additional example, the first part may include at least a first articulation of a particular non-verbal sound, and/or the second part may include at least a second articulation of the particular non-verbal sound. In one example, the first part may include at least a first word, and the second part may include at least a second word (the second word may differ from the first word, the first and second words may be the same word, and so forth). For example, step 1306 may use the conversational artificial intelligence model to analyze the digital data record and/or the input to determine the first word and the second word (for example, as described above in relation to step 1006), the first part may include at least the determined first word, and the second part may include at least the determined second word. Further, step 1306 may use the conversational artificial intelligence model to analyze the digital data record and/or the input to associate the first word with the first sub-movement and to associate the second word with the second sub-movement, for example as described above in relation to step 906.

In some examples, the digital data record accessed by step 1002 may be indicative of a level associated with a personality trait associated with the personality, for example as described above. Further, the desired movement determined by step 1306 may be based on the input received by step

1004 and/or on the level associated with the personality trait. For example, a conversational artificial intelligence model may be or include a LLM, and step 1306 may use the LLM to analyze a textual representation of the input and/or a textual indication of the level associated with the personality trait (for example with a suitable textual prompt, such as 'what is a likely movement in response to this input {a textual representation of the input}, when you have {a textual indication of the level associated with the personality trait}') to determine the desired movement. In another example, a conversational artificial intelligence model may be or include a machine learning model, as described above, and step 1306 may use the machine learning model to analyze the input and/or the level associated with the personality trait (for example, using the level as additional information as described above) to determine the desired movement. In one example, the personality trait may be at least one of imaginative, curious, adventurous, intellectual, organized, disciplined, reliable, hardworking, efficient, outgoing, energetic, talkative, assertive, enthusiastic, kind, compassionate, cooperative, trusting, altruistic, anxious, fearful, angry, depressed, moody, honest, humble, dependable, resilient, optimistic, pessimistic, empathetic, creative, passionate, charming, diplomatic or ambitious. In some examples, the input received by step 1004 may be indicative of a suggestion, and step 1306 may determine whether to accept or reject the suggestion based on the level associated with the personality trait (for example, as described above in relation to step 1006), and may base the determination of the desired movement on the determination of whether to accept or reject the suggestion. For example, the personality trait may be 'adventurous', the input may include 'Let's try skydiving', a response to the input may include the word 'skydiving', when the level is high, the response may be 'Skydiving!' and the desired movement may convey enthusiasm (for example, the desired movement may be associated with smiling, nodding and/or leaning forward), and when the level is low, the response may be 'Skydiving?' and the desired movement may convey unadventurous (for example, the desired movement may be associated with neutral face, shaking head and/or closed posture). In one example, the desired movement may be indicative of whether the suggestion is accepted or rejected. In another example, the desired movement may be motivated on whether the suggestion is accepted or rejected, but not indicative of it. In some examples, step 1306 may determine an emotional reaction to the input received by step 1004 based on the level, and step 1306 may base the determination of the desired movement on the determined emotional reaction. For example, the determination of the emotional reaction may be made by the conversational artificial intelligence model based on an analysis of the input and/or the level associated with the personality trait (for example, with a suitable textual prompt, such as 'what emotional reaction you would have to {a textual representation of the input}, when you have {a textual indication of the level associated with the personality trait}'). In another example, a classification algorithm may be used to analyze the input and the level associated with the personality trait to determine the emotional reaction (for example, each class may correspond to a different emotional reaction). The classification algorithm may be a machine learning model trained using training examples. In one example, the desired movement may be indicative of the emotional reaction. For example, the input may include 'You are the best!', when the personality is extroverted and confident, the emotional reaction may be pride and the desired movement may be associated with a genuine smile and open shoulders, and when the personality is introverted and humble, the emotional reaction may be embarrassment and/or modesty, and the desired movement may be associated with a soft smile and/or looking down.

FIG. 14 is a flowchart of an exemplary process 1400 for using perceived voice characteristics in conversational artificial intelligence, consistent with some embodiments of the present disclosure. In this example, process 1400 may comprise accessing a conversational artificial intelligence model (step 1001); receiving audio data (step 1404), the audio data includes an input from an entity in a natural language, the input includes at least a first part and a second part, the first part is associated with a first at least one suprasegmental feature, the second part is associated with a second at least one suprasegmental feature, the second part differs from the first part, the second at least one suprasegmental feature differs from the first at least one suprasegmental feature; using the conversational artificial intelligence model to analyze the audio data to generate a response in the natural language to the input (step 1406), the response is based on the first at least one suprasegmental feature and the second at least one suprasegmental feature; and providing the generated response to the entity (step 1008). In other examples, process 1400 may include additional steps or fewer steps. In other examples, one or more steps of process 1400 may be executed in a different order and/or one or more groups of steps may be executed simultaneously. In one example, the response generated by step 1406 may be configured to imitate a human individual. In another example, the response generated by step 1406 may not be associated with a specific human individual. In some examples, process 1400 may further comprise step 1506 described below. The desired at least one suprasegmental feature determined by step 1506 may be based on the first at least one suprasegmental feature and/or the second at least one suprasegmental feature. The desired at least one suprasegmental feature determined by step 1506 may differ from the first at least one suprasegmental feature and/or the second at least one suprasegmental feature. Further, step 1008 may use the response generated by step 1406 and/or the desired at least one suprasegmental feature determined by step 1506 to generate an audible speech output during a communication with the entity, as described in relation to step 1108. The generated audible speech output may include at least an articulation of a specific word (for example, a specific word included in the generated response), and the articulation of the specific word in the generated audible speech output may be based on the desired at least one suprasegmental feature. In some examples, process 1400 may further comprise step 1706 described below. The desired movement determined by step 1706 may be based on the first at least one suprasegmental feature and/or the second at least one suprasegmental feature. Further, process 1400 may further comprise step 1308 described above. In one example, the interaction with the entity may include generating an audible speech output, for example an audible speech output generated by step 1108. The generated audible speech output may include at least an articulation of a specific word, and the digital signals generated by step 1308 may be configured to cause the desired movement during the articulation of the specific word, for example as described herein.

In some examples, a system for using perceived voice characteristics in conversational artificial intelligence may include at least one processing unit configured to perform process 1400. In one example, the system may further comprise at least one audio sensor, and the receiving the audio data by step 1404 may include capturing the audio data using the at least one audio sensor. In one example, the system may further comprise at least one visual presentation device, and the providing the generated response to the entity by step 1008 may include using the at least one visual presentation device to visually present a textual representation of the response. In another example, the system may further comprise at least one audio speaker, and the providing the generated response to the entity by step 1008 may include generating an audible speech output using the at least one audio speaker. In some examples, a method for using perceived voice characteristics in conversational artificial intelligence may include performing process 1400. In some examples, a non-transitory computer readable medium may store computer implementable instructions that when executed by at least one processor may cause the at least one processor to perform operations for using perceived voice characteristics in conversational artificial intelligence, and the operations may include the steps of process 1400.

In some examples, step 1404 may comprise receiving audio data. The audio data may include an input from an entity in a natural language. In one example, the input may include one or more (such as one, two, three, four, five, more than five) parts, and each part may be associated with a respective at least one suprasegmental feature. For example, the input may include at least a first part and a second part. The first part may be associated with a first at least one suprasegmental feature. The second part may be associated with a second at least one suprasegmental feature. The second part may differ from the first part. The second at least one suprasegmental feature may differ from the first at least one suprasegmental feature. In one example, the first part and second part may have no portion in common. In another example, the first part may include at least one portion not included in the second part. In yet another example, the second part may include at least one portion not included in the first part. In an additional example, the first part and second part may have a common portion. In one example, receiving the audio data may comprise reading the audio data from memory, may comprise receiving the audio data from an external computing device (for example, using a digital communication device), may comprise capturing the audio data (for example, using a microphone, using an audio sensor, etc.), may comprise receiving the audio data from the entity, and so forth. In some examples, the first at least one suprasegmental feature of step 1404 may include at least one of intonation, stress, pitch, rhythm, tempo, loudness or prosody. In some examples, the second at least one suprasegmental feature of step 1404 may include at least one of intonation, stress, pitch, rhythm, tempo, loudness or prosody. In some examples, the first at least one suprasegmental feature of step 1404 may differ from the second at least one suprasegmental feature of step 1404 in at least one of intonation, stress, pitch, rhythm, tempo, loudness or prosody.

In some examples, at least one audio data fragment (such as at least one fragment of the audio data received by step 1404, at least one fragment of different audio data, etc.) may be analyzed to determine at least one suprasegmental feature. For example, step 1404 may analyze at least one fragment of the audio data (received by step 1404) associated with the first part (of the input included in the audio data) to determine the first at least one suprasegmental feature. In another example, step 1404 may analyze at least one fragment of the audio data associated with the second part (of the input included in the audio data) to determine the second at least one suprasegmental feature. For example, a machine learning mode may be used to analyze the at least one audio data fragment to determine the at least one suprasegmental feature. The machine learning model may be a machine learning model trained using training examples to determine suprasegmental features from audio. An example of such training example may include sample audio data, together with a label indicative of suprasegmental features associated with the audio data.

In some examples, step 1404 may calculate a convolution of a first fragment of the audio data (received by step 1404) associated with the first part (of the input included in the audio data) to obtain a first plurality of numerical result values. Further, step 1404 may calculate a convolution of a second fragment of the audio data associated with the first part to obtain a second plurality of numerical result values. The second fragment may differ from the first fragment (for example, the first and second fragments may have no portion in common, may have some but not all portions in common, and so forth). The second plurality of numerical result values may differ from the first plurality of numerical result values. Further, step 1404 may calculate a convolution of a third fragment of the audio data associated with the second part (of the input included in the audio data) to obtain a third plurality of numerical result values. Further, step 1404 may calculate a convolution of a fourth fragment of the audio data associated with the second part to obtain a fourth plurality of numerical result values. The fourth fragment may differ from the third fragment (for example, the third and fourth fragments may have no portion in common, may have some but not all portions in common, and so forth). The fourth plurality of numerical result values may differ from the third plurality of numerical result values. Further, step 1404 may calculate a function of the first plurality of numerical result values and the second plurality of numerical result values to obtain a first mathematical object in a mathematical space (for example using module 288). Further, step 1404 may calculate a function (which may be the same or different mathematical function as the one used to obtain the first mathematical object) of the third plurality of numerical result values and the fourth plurality of numerical result values to obtain a second mathematical object in the mathematical space (for example using module 288). In some examples, at least one suprasegmental feature may be determined based on a mathematical object. For example, step 1404 may determine the first at least one suprasegmental feature based on the first mathematical object. In another example, step 1404 may determine the second at least one suprasegmental feature based on the second mathematical object. For example, when the mathematical object is in a selected subspace of the mathematical space, the determined at least one suprasegmental feature may include a specific suprasegmental feature, and when the mathematical object is not in the selected subspace of the mathematical space, the determined at least one suprasegmental feature may not include the specific suprasegmental feature. In another example, a data-structure or a rule associating mathematical objects with suprasegmental features may be accessed based on the mathematical object to obtain the at least one suprasegmental feature.

In some examples, step 1406 may comprise using a conversational artificial intelligence model (such as the conversational artificial intelligence model accessed by step 1001, a different conversational artificial intelligence model, etc.) to analyze audio data (such as the audio data received by step 1404, different audio data, etc.) to generate a response to the input. The response may be based on the first at least one suprasegmental feature (of step 1404) and/or the second at least one suprasegmental feature (of step 1404). In one example, the response may be in a natural language (such as the natural language of step 1404, a different natural language, etc.). In another example, the response may be in a formal language. In one example, the response may be an audible verbal response, for example an audible verbal response in the natural language. In another example, the response may be a textual response, for example a textual response in the natural language. In one example, a conversational artificial intelligence model may be or include a multimodal LLM, and step 1406 may use the multimodal LLM to analyze the audio data (for example with a suitable textual prompt, such as 'respond to the input from this audio, considering the different suprasegmental features used in different parts of the audio') to generate the response. In another example, a conversational artificial intelligence model may be or include a machine learning model, and step 1406 may use the machine learning model to analyze the audio data and/or additional information to generate the response. The machine learning model may be a machine learning model trained using training examples to generate responses to audio inputs while considering the different suprasegmental features used in different parts of the audio inputs. An example of such training example may include sample additional information and/or a sample audio input, where different parts of the sample audio input are includes different suprasegmental features, together with a sample response to the sample audio input that is based on the different suprasegmental features. In some examples, step 1406 may calculate a convolution of a fragment of the audio data associated with the first part to obtain a first plurality of numerical result values, may calculate a convolution of a fragment of the audio data associated with the second part to obtain a second plurality of numerical result values, may calculate a function of the first plurality of numerical result values and the second plurality of numerical result values to obtain a specific mathematical object in a mathematical space (for example using module 288), and may base the generation of the response on the specific mathematical object, for example as described above in relation to step 1006. In some examples, step 1406 may analyze the audio data to identify a first mathematical object in a mathematical space based on the first at least one suprasegmental feature (for example, using module 284), may analyze the audio data to identify a second mathematical object in the mathematical space based on the second at least one suprasegmental feature (for example, using module 284), may calculate a function of the first mathematical object and the second mathematical object to obtain a specific mathematical object in the mathematical space (for example, using module 286), and may base the generation of the response on the specific mathematical object, for example as described above in relation to step 1006. In one example, the specific mathematical object may correspond to a specific word in the natural language, and step 1406 may include the specific word in the generated response. In some examples, step 1406 may use the conversational artificial intelligence model to analyze the audio data to select a specific word based on the first at least one suprasegmental feature and/or the second at least one suprasegmental feature, and may include the specific word in the generated response.

In some examples, the first part of the input included in the audio data received by step 1404 may include at least a first word, the second part of the input included in the audio data received by step 1404 may include at least a second word, and the second word may differ from the first word.

Further, the response generated by step 1406 may be further based on the first word and/or the second word. For example, the input may include either 'She didn't steal the money' or 'He didn't steal the car', the first part may include either the word 'She' or 'He', the second part may include either the word 'money' or 'car', when the stress is on the first part (the first at least one suprasegmental feature of step 1404 includes higher pitch, longer duration and/or louder volume than the second), the response may be 'She/He certainly did steal the money/car', and when the stress is on the second part (the second at least one suprasegmental feature of step 1404 includes higher pitch, longer duration and/or louder volume than the first), the response may be 'Well, maybe she/he didn't steal the money/car, but she/he certainly stole something'. In some examples, the first part of the input included in the audio data received by step 1404 may include at least a first non-verbal sound, the second part of the input included in the audio data received by step 1404 may include at least a second non-verbal sound, and the second non-verbal sound may differ from the first non-verbal sound. Further, the response generated by step 1406 may be further based on the first non-verbal sound and/or the second non-verbal sound. In some examples, the first part of the input included in the audio data received by step 1404 may include at least a particular word, and the second part of the input included in the audio data received by step 1404 may include at least a particular non-verbal sound. Further, the response generated by step 1406 may be further based on the first non-verbal sound and/or the second non-verbal sound. For example, a conversational artificial intelligence model may be or include a machine learning model, as described above, and step 1406 may use the machine learning model to analyze the audio data received by step 1404 and/or the words and/or the non-verbal sounds (for example, using the words and/or the non-verbal sounds as additional information as described above) to generate the response.

In some examples, the first at least one suprasegmental feature and/or the second at least one suprasegmental feature (of step 1404) may be associated with a particular emotion of the entity (of step 1404), and the response generated by step 1406 may be further based on the particular emotion. For example, the input included in the audio data received by step 1404 may include 'I see', when the suprasegmental feature includes rising intonation, higher pitch overall, faster pace and/or louder volume, the particular emotion may be surprise, and the response may include 'I didn't know you weren't aware of this', and when the suprasegmental feature includes falling intonation, lower pitch overall, slower pace and/or softer volume, the particular emotion may be disappointment, and the response may include 'I'm sorry it didn't go your way'. In some examples, the first at least one suprasegmental feature and/or the second at least one suprasegmental feature (of step 1404) may be associated with a particular intent of the entity, and the response generated by step 1406 may be further based on the particular intent. Some non-limiting examples of such intent may include asking a question, making a statement, giving a command, or expressing uncertainty. For example, the input included in the audio data received by step 1404 may include 'No', when the suprasegmental feature includes falling intonation, strong stress, lower pitch and/or normal pace, the particular intent may be definitive refusal, and the response may include 'I'm sorry you don't find it in you to go along'; and when the suprasegmental feature includes falling-rising intonation, mild stress, lower pitch and/or slow pace, the particular intent may be reluctant agreement, and the response may include 'I'm proud that you rise to the occasion'. In some examples, the first at least one suprasegmental feature and/or the second at least one suprasegmental feature (of step 1404) may be associated with a particular level of empathy of the entity, and the response generated by step 1406 may be further based on the particular level of empathy. For example, the input included in the audio data received by step 1404 may include 'I understand', when the suprasegmental feature includes falling intonation with a slight rise at the end, balanced stress on both words, medium pitch, moderate pace and/or gentle volume, the particular level of empathy may be high, and the response may be 'Thank you for your support'; and when the suprasegmental feature includes flat intonation, lower pitch, slightly faster pace and/or low volume, the particular level of empathy may be low, and the response may be 'You never support me'. In some examples, the first at least one suprasegmental feature and/or the second at least one suprasegmental feature (of step 1404) may be associated with a particular level of self-assurance of the entity, and the response generated by step 1406 may be further based on the particular level of self-assurance. Some non-limiting examples of such level of self-assurance may include confidence, uncertain, and so forth. For example, the input included in the audio data received by step 1404 may include 'I can', when the suprasegmental feature includes falling intonation, strong stress on 'can', lower pitch, steady pace and/or moderate to loud volume, the particular level of self-assurance may be high, and the response may be 'I knew I could count on you!'; and when the suprasegmental feature includes rising intonation, slight stress on 'can', higher pitch, slower pace and/or softer volume, the particular level of self-assurance may be uncertain (i.e., low), and the response may be 'Believe in yourself, I know you can do it!' In some examples, the first at least one suprasegmental feature and/or the second at least one suprasegmental feature (of step 1404) may be associated with a particular level of formality, and the response generated by step 1406 may be further based on the particular level of formality. For example, the input included in the audio data received by step 1404 may include 'Hello', when the suprasegmental feature includes steady intonation, balanced stress, neutral pitch, slow pace and/or moderate volume, the particular level of formality may be high, and the response may include 'Good morning. How can I assist you?'; and when the suprasegmental feature includes falling intonation, even stress, lower pitch, slow pace and/or soft volume, the particular level of formality may be casual (i.e., low), and the response may include 'Hi. How are you?' For example, a conversational artificial intelligence model may be or include a machine learning model, as described above. Further, step 1406 may analyze the audio data received by step 1404 to determine the particular emotion and/or the particular intent and/or the particular level of empathy and/or the particular level of self-assurance and/or the particular level of formality, for example using NLP algorithms and/or classification algorithms (where each class may be associated with a different emotion, intent, empathy, self-assurance and/or formality). Further, step 1406 may use the machine learning model to analyze the audio data received by step 1404 and/or the particular emotion and/or the particular intent and/or the particular level of empathy and/or the particular level of self-assurance and/or the particular level of formality (for example, using the particular emotion and/or the particular intent and/or the particular level of empathy and/or the particular level of self-assurance and/or the particular level of formality as additional information as described above) to generate the response.

FIG. 15 is a flowchart of an exemplary process 1500 for using perceived voice characteristics to control generated voice characteristics in conversational artificial intelligence, consistent with some embodiments of the present disclosure. In this example, process 1500 may comprise accessing a conversational artificial intelligence model (step 1001); receiving audio data (step 1404), the audio data includes an input from an entity in a natural language, the input includes at least a first part and a second part, the first part is associated with a first at least one suprasegmental feature, the second part is associated with a second at least one suprasegmental feature, the second part differs from the first part, the second at least one suprasegmental feature differs from the first at least one suprasegmental feature; using the conversational artificial intelligence model to analyze the audio data to determine a desired at least one suprasegmental feature (step 1506), the desired at least one suprasegmental feature is based on the first at least one suprasegmental feature and the second at least one suprasegmental feature; and using the desired at least one suprasegmental feature to generate an audible speech output during a communication with the entity (step 1108). In other examples, process 1500 may include additional steps or fewer steps. In other examples, one or more steps of process 1500 may be executed in a different order and/or one or more groups of steps may be executed simultaneously. In some examples, process 1500 may further comprise step 1706 described below. The desired movement determined by step 1706 may be based on the first at least one suprasegmental feature and/or the second at least one suprasegmental feature. Further, process 1500 may further comprise step 1308 described above, for example to cause the desired movement to the specific portion of the specific body during the communication with the entity (of process 1500). In one example, the audible speech output generated by step 1108 may include at least an articulation of a specific word, and the digital signals generated by step 1308 may be configured to cause the desired movement during the articulation of the specific word.

In some examples, a system for using perceived voice characteristics to control generated voice characteristics in conversational artificial intelligence may include at least one processing unit configured to perform process 1500. In one example, the system may further comprise at least one audio sensor, and the receiving the audio data by step 1404 may include capturing the audio data using the at least one audio sensor. In one example, the system may further comprise at least one audio speaker, and the generation of the audible speech output by step 1108 may include generating the audible speech output using the at least one audio speaker. In some examples, a method for using perceived voice characteristics to control generated voice characteristics in conversational artificial intelligence may include performing process 1500. In some examples, a non-transitory computer readable medium may store computer implementable instructions that when executed by at least one processor may cause the at least one processor to perform operations for using perceived voice characteristics to control generated voice characteristics in conversational artificial intelligence, and the operations may include the steps of process 1500.

In some examples, step 1506 may comprise using a conversational artificial intelligence model (such as the conversational artificial intelligence model accessed by step 1001, a different conversational artificial intelligence model, etc.) to analyze audio data (such as the audio data received by step 1404, different audio data, etc.) to determine a desired at least one suprasegmental feature. The desired at least one suprasegmental feature may be based on the first at least one suprasegmental feature (of step 1404) and/or the second at least one suprasegmental feature (of step 1404). In one example, a conversational artificial intelligence model may be or include a multimodal LLM, and step 1506 may use the multimodal LLM to analyze the audio data (for example with a suitable textual prompt, such as 'what suprasegmental features should be used when responding to the input from this audio, considering the different suprasegmental features used in different parts of the audio') to determine the desired at least one suprasegmental feature. In another example, a conversational artificial intelligence model may be or include a machine learning model, and step 1506 may use the machine learning model to analyze the audio data and/or additional information to determine the desired at least one suprasegmental feature. The machine learning model may be a machine learning model trained using training examples to select suprasegmental features for responding to audio inputs while considering the different suprasegmental features used in different parts of the audio inputs. An example of such training example may include sample additional information and/or a sample audio input, where different parts of the sample audio input are includes different suprasegmental features, together with a sample desired suprasegmental feature for responding to the sample audio input that is based on the different suprasegmental features. In some examples, step 1506 may calculate a convolution of a fragment of the audio data associated with the first part to obtain a first plurality of numerical result values, may calculate a convolution of a fragment of the audio data associated with the second part to obtain a second plurality of numerical result values, may calculate a function of the first plurality of numerical result values and the second plurality of numerical result values to obtain a specific mathematical object in a mathematical space (for example using module 288), and may base the determination of the desired at least one suprasegmental feature on the specific mathematical object, for example as described above in relation to step 1106. In some examples, step 1506 may analyze the first at least one suprasegmental feature to identify a first mathematical object in a mathematical space (for example, using module 284), may analyze the second at least one suprasegmental feature to identify a second mathematical object in the mathematical space (for example, using module 284), may calculate a function of the first mathematical object and the second mathematical object to obtain a third mathematical object in the mathematical space (for example, using module 286), and may base the determination of the desired at least one suprasegmental feature on the third mathematical object, for example as described above in relation to step 1106.

In some examples, the desired at least one suprasegmental feature determined by step 1506 may include at least one of intonation, stress, pitch, rhythm, tempo, loudness or prosody. In some examples, the desired at least one suprasegmental feature determined by step 1506 may differ from the first at least one suprasegmental feature (of step 1404) and/or the second at least one suprasegmental feature (of step 1404) in at least one of intonation, stress, pitch, rhythm, tempo, loudness or prosody. In some examples, the desired at least one suprasegmental feature determined by step 1506 may include a desired intonation, the desired intonation may be based on the first at least one suprasegmental feature and/or the second at least one suprasegmental feature, and the audible speech output generated by step 1108 may be based on the desired intonation. For example, the input included in the audio data received by step 1404 may include 'Look at that desert' and the audible speech output of step 1108 may include 'yes'. When the input is said with excitement (for example, rising pitch with emphasis on 'look' and 'desert' and/or a faster pace), the desired intonation may include rising pitch throughout the word ('Yes!') to mirror the excitement; when the input is said with melancholy (for example, falling pitch, light stress on 'look' and 'desert' and/or a slower pace), the desired intonation may include falling pitch to mirror the melancholy ('Ye-es'); and when the input is said with curiosity (for example, rising pitch at the end, stress on 'desert' and/or even pace), the desired intonation may include rising pitch at the end, almost like asking a question ('Yes?'). In some examples, the desired at least one suprasegmental feature determined by step 1506 may include a desired stress, the desired stress may be based on the first at least one suprasegmental feature and/or the second at least one suprasegmental feature, and the audible speech output generated by step 1108 may be based on the desired stress. For example, stress may be the emphasis placed on specific syllables or words during speech. In some examples, the desired at least one suprasegmental feature determined by step 1506 may include a desired pitch, the desired pitch may be based on the first at least one suprasegmental feature and/or the second at least one suprasegmental feature, and the audible speech output generated by step 1108 may be based on the desired pitch. In some examples, the desired at least one suprasegmental feature determined by step 1506 may include a desired rhythm, the desired rhythm may be based on the first at least one suprasegmental feature and the second at least one suprasegmental feature, and the audible speech output generated by step 1108 may be based on the desired rhythm. In some examples, the desired at least one suprasegmental feature determined by step 1506 may include a desired tempo, the desired tempo may be based on the first at least one suprasegmental feature and the second at least one suprasegmental feature, and the audible speech output generated by step 1108 may be based on the desired tempo. In some examples, the desired at least one suprasegmental feature determined by step 1506 may include a desired loudness, the desired loudness may be based on the first at least one suprasegmental feature and/or the second at least one suprasegmental feature, and the audible speech output generated by step 1108 may be based on the desired loudness. In some examples, the desired at least one suprasegmental feature determined by step 1506 may include a desired prosody, the desired prosody may be based on the first at least one suprasegmental feature and/or the second at least one suprasegmental feature, and the audible speech output generated by step 1108 may be based on the desired prosody. In some examples, a data-structure or an algorithm may associate input suprasegmental features with at least one of desired intonations, desired stresses, desired pitches, desired rhythms, desired tempos, desired loudness levels, or desired prosodies. Further, step 1506 may access the data-structure or use the algorithm based on the audio data and/or based on the first at least one suprasegmental feature and/or based on the second at least one suprasegmental feature to select at least one of the desired intonation, the desired stress, the desired pitch, the desired rhythm, the desired tempo, the desired loudness, or the desired prosody. In one example, the data structure may be included in and/or the algorithm may be implemented by at least one artificial neuron, for example in at least one artificial neuron of an artificial neural network included in a conversational artificial intelligence model (such as the conversational artificial intelligence model accessed by step 1001, a different conversational artificial intelligence model, and so forth). In another example, the data structure may be included in a database and/or a memory. In yet another example, the algorithm may be implemented using a programming language.

In some examples, the first part of the input included in the audio data received by step 1404 may include at least a first word, the second part of the input included in the audio data received by step 1404 may include at least a second word, and the second word may differ from the first word. Further, the desired at least one suprasegmental feature determined by step 1506 may be further based on the first word and the second word. For example, the input may include either 'She didn't steal the money' or 'He didn't steal the car', the first part may include either the word 'She' or 'He', the second part may include either the word 'money' or 'car', the audible speech output generated by step 1108 may include the response 'She/he didn't' and the desired at least one suprasegmental feature may convey whether the statement in the input is found believable (for example, falling intonation in the articulation of the word 'didn't' may convey agreement with the statement, while raising intonation in the articulation of the word 'didn't' may convey questioning the statement) based on a knowledge the process has (for example, in a data-structure or a knowledge graph), the identity of the subject ('he' or 'she') and the stolen object ('money' or 'car'). In some examples, the first part of the input included in the audio data received by step 1404 may include at least a first non-verbal sound, the second part of the input included in the audio data received by step 1404 may include at least a second non-verbal sound, and the second non-verbal sound may differ from the first non-verbal sound. Further, the desired at least one suprasegmental feature determined by step 1506 may be further based on the first non-verbal sound and the second non-verbal sound. In some examples, the first part of the input included in the audio data received by step 1404 may include at least a particular word, and the second part of the input included in the audio data received by step 1404 may include at least a particular non-verbal sound. Further, the desired at least one suprasegmental feature determined by step 1506 may be further based on the particular word and the particular non-verbal sound. For example, a conversational artificial intelligence model may be or include a machine learning model, as described above, and step 1506 may use the machine learning model to analyze the audio data received by step 1404 and/or the words and/or the non-verbal sounds (for example, using the words and/or the non-verbal sounds as additional information as described above) to determine the desired at least one suprasegmental feature.

In some examples, the first at least one suprasegmental feature and/or the second at least one suprasegmental feature (of step 1404) may be associated with a particular emotion of the entity (of step 1404), and the desired at least one suprasegmental feature determined by step 1506 may be further based on the particular emotion. For example, the input included in the audio data received by step 1404 may include 'I see', the audible speech output of step 1108 may include 'Is that so?', when the first at least one suprasegmental feature includes rising intonation, higher pitch overall, faster pace and/or louder volume, the particular emotion may be surprise, and the desired at least one suprasegmental feature may include rising intonation and emphasize on the word 'so' to indicate interest; and when the first and/or second at least one suprasegmental feature includes falling intonation, lower pitch overall, slower pace and/or softer volume, the particular emotion may be disappointment, and the desired at least one suprasegmental feature may include falling intonation and emphasize on the word 'is' to convey skepticism. In some examples, the first at least one suprasegmental feature and/or the second at least one suprasegmental feature (of step 1404) may be associated with a particular intent of the entity, and the desired at least one suprasegmental feature determined by step 1506 may be further based on the particular intent. Some non-limiting examples of such intent may include asking a question, making a statement, giving a command, or expressing uncertainty. For example, the input included in the audio data received by step 1404 may include 'No', the audible speech output of step 1108 may include 'Really?', when the first and/or second at least one suprasegmental feature includes falling intonation, strong stress, lower pitch and/or normal pace, the particular intent may be definitive refusal, and the desired at least one suprasegmental feature may include falling intonation to indicate surprise of the refusal; and when the first and/or second at least one suprasegmental feature includes falling-rising intonation, mild stress, lower pitch and/or slow pace, the particular intent may be reluctant agreement, and the desired at least one suprasegmental feature may include rising intonation to suggest seeking confirmation. In some examples, the first at least one suprasegmental feature and/or the second at least one suprasegmental feature (of step 1404) may be associated with a particular level of empathy of the entity, and the desired at least one suprasegmental feature determined by step 1506 may be further based on the particular level of empathy. For example, the input included in the audio data received by step 1404 may include 'I understand', the audible speech output of step 1108 may include 'Thanks you', when the first and/or second at least one suprasegmental feature includes falling intonation with a slight rise at the end, balanced stress on both words, medium pitch, moderate pace and/or gentle volume, the particular level of empathy may be high, and the desired at least one suprasegmental feature may include slightly rising intonation and stress on the word 'you' to express genuine gratitude; and when the first and/or second at least one suprasegmental feature includes flat intonation, lower pitch, slightly faster pace and/or low volume, the particular level of empathy may be low, and the desired at least one suprasegmental feature may include slightly falling intonation and an even stress to convey formality or mild disappointment due to the lack of empathy. In some examples, the first at least one suprasegmental feature and/or the second at least one suprasegmental feature (of step 1404) may be associated with a particular level of self-assurance of the entity, and the desired at least one suprasegmental feature determined by step 1506 may be further based on the particular level of self-assurance. Some non-limiting examples of such level of self-assurance may include confidence, uncertainty, and so forth. For example, the input included in the audio data received by step 1404 may include 'I can', the audible speech output of step 1108 may include 'I think so', when the first and/or second at least one suprasegmental feature includes falling intonation, strong stress on 'can', lower pitch, steady pace and/or moderate to loud volume, the particular level of self-assurance may be high, and the desired at least one suprasegmental feature may include slightly falling intonation to express agreement; and when the first and/or second at least one suprasegmental feature includes rising intonation, slight stress on 'can', higher pitch, slower pace and/or softer volume, the particular level of self-assurance may be uncertain (i.e., low), and the desired at least one suprasegmental feature may include intonation that is rising sharply to express skepticism. In some examples, the first at least one suprasegmental feature and/or the second at least one suprasegmental feature (of step 1404) may be associated with a particular level of formality, and the desired at least one suprasegmental feature determined by step 1506 may be further based on the particular level of formality. For example, the input included in the audio data received by step 1404 may include 'Hello', the audible speech output of step 1108 may include 'How are you?', when the first and/or second at least one suprasegmental feature includes steady intonation, balanced stress, neutral pitch, slow pace and/or moderate volume, the particular level of formality may be high, and the desired at least one suprasegmental feature may include slightly falling intonation and stress on 'you' to maintain the high level of formality; and when the first and/or second at least one suprasegmental feature includes falling intonation, even stress, lower pitch, slow pace and/or soft volume, the particular level of formality may be casual (i.e., low), and the desired at least one suprasegmental feature may include rising intonation and stress on 'how' to match the casual tone. For example, a conversational artificial intelligence model may be or include a machine learning model, as described above. Further, step 1506 may analyze the audio data received by step 1404 to determine the particular emotion and/or the particular intent and/or the particular level of empathy and/or the particular level of self-assurance and/or the particular level of formality, for example as described above in relation to step 1406. Further, step 1506 may use the machine learning model to analyze the audio data received by step 1404 and/or the particular emotion and/or the particular intent and/or the particular level of empathy and/or the particular level of self-assurance and/or the particular level of formality (for example, using the particular emotion and/or the particular intent and/or the particular level of empathy and/or the particular level of self-assurance and/or the particular level of formality as additional information as described above) to determine the desired at least one suprasegmental feature.

In some examples, the audible speech output generated by step 1108 may include a response to the input, for example in a natural language (such as the natural language of step 1404, the natural language of step 1804, a different natural language, etc.) to an input (such as the input of step 1404, the input of step 1804, an input in a natural language, a different input, etc.), for example as described above. In one example, the determination of the desired at least one suprasegmental feature by step 1506 and/or step 1906 may be further based on at least one word included in the response. For example, a conversational artificial intelligence model may be or include a machine learning model, as described herein, and step 1506 and/or step 1906 may use the machine learning model to analyze the audio data (received by step 1404 and/or step 1804) and/or the at least one word (for example, using the at least one word as additional information as described herein) to determine the desired at least one suprasegmental feature. In another example, the input may include 'How are you?', when the response is 'Great!' the desired at least one suprasegmental feature may include high pitch and emphasis on the 'G', and when the response is 'Good' the desired at least one suprasegmental feature may include steady intonation and a slight prolongation of the 'oo' sound. In one example, the response may be in a specific language register, and the determination of the desired at least one suprasegmental feature by step 1506 and/or step 1906 may be further based on the specific language register. For example, a conversational artificial intelligence model may be or include a machine learning model, as described herein, and step 1506 and/or step 1906 may use the machine learning model to analyze the audio data (received by step 1404 and/or step 1804) and/or the specific language register (for example, using the specific language register as additional information as described above) to determine the desired at least one suprasegmental feature. In another example, the input may include a question and the response may include 'Good'. To match the question language register, when the question is in a formal language register, the desired at least one suprasegmental feature may include steady intonation with a falling pitch at the end and/or even stress, and when the question is in an informal language register, the desired at least one suprasegmental feature may include upbeat intonation with rising pitch at the end and/or an emphasize on the 'G'.

FIG. 16 is a flowchart of an exemplary process 1600 for using perceived voice characteristics to control media content generation via conversational artificial intelligence, consistent with some embodiments of the present disclosure. In this example, process 1600 may comprise accessing a conversational artificial intelligence model (step 1001); receiving audio data (step 1404), the audio data includes an input from an entity in a natural language, the input includes at least a first part and a second part, the first part is associated with a first at least one suprasegmental feature, the second part is associated with a second at least one suprasegmental feature, the second part differs from the first part, the second at least one suprasegmental feature differs from the first at least one suprasegmental feature; using the conversational artificial intelligence model to analyze the audio data to generate a media content (step 1606), the media content is based on the first at least one suprasegmental feature and the second at least one suprasegmental feature; and using the media content in a communication with the entity (step 1208). In other examples, process 1600 may include additional steps or fewer steps. In other examples, one or more steps of process 1600 may be executed in a different order and/or one or more groups of steps may be executed simultaneously. In one example, the media content may be a visual content, (such as an image, video clip, video stream, drawing, illustration, realistic visual content, non-realistic visual content, 2D visual content, 3D visual content, and so forth). In another example, the media content may be an audible content (such as audio files, audio stream, realistic audible content, non-realistic audible content, and so forth). In yet another example, the media content may include both a visual content and an audible content. In an additional example, the media content may be a multimedia content. In some examples, the input received by step 1404 may be indicative of a desire of the entity to obtain at least one media content. In some examples, process 1600 may further comprise step 1506 described above. The desired at least one suprasegmental feature determined by step 1506 may be based on the first at least one suprasegmental feature and/or the second at least one suprasegmental feature. Further, step 1606 may use the desired at least one suprasegmental feature determined by step 1506 to generate an audible speech in the media content, for example as described above. In some examples, process 1600 may further comprise step 1706 described below. The desired movement determined by step 1706 may be based on the first at least one suprasegmental feature and/or the second at least one suprasegmental feature. Further, step 1606 may use the desired movement (determined by step 1706) for the specific portion of the specific body to generate a visual depiction of the desired movement to the specific portion of the specific in the media content, for example as described in relation to step 1308.

In some examples, a system for using perceived voice characteristics to control media content generation via conversational artificial intelligence may include at least one processing unit configured to perform process 1600. In one example, the system may further comprise at least one audio sensor, and the receiving the audio data by step 1404 may include capturing the audio data using the at least one audio sensor. In one example, the system may further comprise at least one visual presentation device, the media content generated by step 1606 may include a visual content, and the using the media content by step 1208 may include using the at least one visual presentation device to present the visual content. In one example, the system may further comprise at least one audio speaker, the media content generated by step 1606 may include an audible content, and the using the media content by step 1208 may include outputting the audible content using the at least one audio speaker. In some examples, a method for using perceived voice characteristics to control media content generation via conversational artificial intelligence may include performing process 1600. In some examples, a non-transitory computer readable medium may store computer implementable instructions that when executed by at least one processor may cause the at least one processor to perform operations for using perceived voice characteristics to control media content generation via conversational artificial intelligence, and the operations may include the steps of process 1600.

In some examples, step 1606 may comprise using a conversational artificial intelligence model (such as the conversational artificial intelligence model accessed by step 1001, a different conversational artificial intelligence model, etc.) to analyze audio data (such as the audio data received by step 1404, different audio data, etc.) to generate a media content. The media content may be based on the first at least one suprasegmental feature (of step 1404) and/or the second at least one suprasegmental feature (of step 1404). In one example, a conversational artificial intelligence model may be or include a multimodal LLM, and step 1606 may use the multimodal LLM to analyze the audio data (for example with a suitable textual prompt, such as 'generate a {desired type of media content} for {type of intendent usage} in a communication with an individual, when responding to the input from this audio, considering the different suprasegmental features used in different parts of the audio') to generate the media content. In another example, a conversational artificial intelligence model may be or include a machine learning model, and step 1606 may use the machine learning model to analyze the audio data and/or additional information to generate the media content. The machine learning model may be a machine learning model trained using training examples to generate media contents in response to audio inputs while considering the different suprasegmental features used in different parts of the audio inputs. An example of such training example may include sample additional information and/or a sample audio input, where different parts of the sample audio input are includes different suprasegmental features, together with a sample media content corresponding to the sample audio input. In some examples, step 1606 may calculate a convolution of a fragment of the audio data associated with the first part to obtain a first plurality of numerical result values, may calculate a convolution of a fragment of the audio data associated with the second part to obtain a second plurality of numerical result values, may calculate a function of the first plurality of numerical result values and the second plurality of numerical result values to obtain a specific mathematical object in a mathematical space (for example using module 288), and may base the generation of the media content on the specific mathematical object, for example as described above in relation to step 1206. In some examples, step 1606 may analyze the first at least one suprasegmental feature to identify a first mathematical object in a mathematical space (for example, using module 284), may analyze the second at least one suprasegmental feature to identify a second mathematical object in the mathematical space (for example, using module 284), may calculate a function of the first mathematical object and the second mathematical object to obtain a third mathematical object in the mathematical space (for example, using module 286), and may base the generation of the media content on the third mathematical object, for example as described above in relation to step 1206.

In some examples, the first part of the input included in the audio data received by step 1404 may include at least a first word, the second part of the input included in the audio data received by step 1404 may include at least a second word, and the second word may differ from the first word. Further, the media content generated by step 1606 may be further based on the first word and the second word. In some examples, the first part of the input included in the audio data received by step 1404 may include at least a first non-verbal sound, the second part of the input included in the audio data received by step 1404 may include at least a second non-verbal sound, and the second non-verbal sound may differ from the first non-verbal sound. Further, the media content generated by step 1606 may be further based on the first non-verbal sound and the second non-verbal sound. In some examples, the first part of the input included in the audio data received by step 1404 may include at least a particular word, and the second part of the input included in the audio data received by step 1404 may include at least a particular non-verbal sound. Further, the media content generated by step 1606 may be further based on the particular word and the particular non-verbal sound. For example, a conversational artificial intelligence model may be or include a machine learning model, as described above, and step 1606 may use the machine learning model to analyze the audio data received by step 1404 and/or the words and/or the non-verbal sounds (for example, using the words and/or the non-verbal sounds as additional information as described above) to generate the media content.

In some examples, the first at least one suprasegmental feature and/or the second at least one suprasegmental feature (of step 1404) may be associated with a particular emotion of the entity (of step 1404), and the generation of the media content by step 1606 may be further based on the particular emotion. In some examples, the first at least one suprasegmental feature and/or the second at least one suprasegmental feature (of step 1404) may be associated with a particular intent of the entity, and the generation of the media content by step 1606 may be further based on the particular intent. Some non-limiting examples of such intent may include asking a question, making a statement, giving a command, or expressing uncertainty. In some examples, the first at least one suprasegmental feature and/or the second at least one suprasegmental feature (of step 1404) may be associated with a particular level of empathy of the entity, and the generation of the media content by step 1606 may be further based on the particular level of empathy. the first at least one suprasegmental feature and/or the second at least one suprasegmental feature (of step 1404) may be associated with a particular level of self-assurance of the entity, and the generation of the media content by step 1606 may be further based on the particular level of self-assurance. Some non-limiting examples of such level of self-assurance may include confidence, uncertainty, and so forth. In some examples, the first at least one suprasegmental feature and/or the second at least one suprasegmental feature (of step 1404) may be associated with a particular level of formality, and the generation of the media content by step 1606 may be further based on the particular level of formality. For example, a conversational artificial intelligence model may be or include a machine learning model, as described above. Further, step 1606 may analyze the audio data received by step 1404 to determine the particular emotion and/or the particular intent and/or the particular level of empathy and/or the particular level of self-assurance and/or the particular level of formality, for example as described above in relation to step 1406. Further, step 1606 may use the machine learning model to analyze the audio data received by step 1404 and/or the particular emotion and/or the particular intent and/or the particular level of empathy and/or the particular level of self-assurance and/or the particular level of formality (for example, using the particular emotion and/or the particular intent and/or the particular level of empathy and/or the particular level of self-assurance and/or the particular level of formality as additional information as described above) to generate the media content.

FIG. 17 is a flowchart of an exemplary process 1700 for using perceived voice characteristics to control body movements via conversational artificial intelligence, consistent with some embodiments of the present disclosure. In this example, process 1700 may comprise accessing a conversational artificial intelligence model (step 1001); receiving audio data (step 1404), the audio data includes an input from an entity in a natural language, the input includes at least a first part and a second part, the first part is associated with a first at least one suprasegmental feature, the second part is associated with a second at least one suprasegmental feature, the second part differs from the first part, the second at least one suprasegmental feature differs from the first at least one suprasegmental feature; using the conversational artificial intelligence model to analyze the audio data to determine a desired movement for a specific portion of a specific body (step 1706), the desired movement is based on the first at least one suprasegmental feature and the second at least one suprasegmental feature; and generating digital signals (step 1308), the digital signals are configured to cause the desired movement to the specific portion of the specific body during an interaction with the entity. In other examples, process 1700 may include additional steps or fewer steps. In other examples, one or more steps of process 1700 may be executed in a different order and/or one or more groups of steps may be executed simultaneously. In one example, the desired movement determined by step 1706 may be associated with a desire to imitate a human individual. In another example, the desired movement determined by step 1706 may not be associated with a specific human individual. In some examples, the specific portion of the specific body (of step 1706 and/or step 1308) may include at least part of a hand, an arm, a head, a face, a torso, or a leg of the specific body.

In some examples, a system for using perceived voice characteristics to control body movements via conversational artificial intelligence may include at least one processing unit configured to perform process 1700. In one example, the system may further comprise the specific body of process 1700. For example, the specific body may include the at least one processing unit. In another example, the at least one processing unit may be external to the specific body. In one example, the specific body may include one or more actuators (such as motors and/or servos configured to cause motions to different parts of the specific body). The digital signals generated by step 1308 may be configured to control the one or more actuators to cause the desired movement to the specific portion of the specific body during the interaction with the entity, for example as described herein. In one example, the system may further comprise at least one audio sensor, and the receiving the audio data by step 1404 may include capturing the audio data using the at least one audio sensor. In some examples, a method for using perceived voice characteristics to control body movements via conversational artificial intelligence may include performing process 1700. In some examples, a non-transitory computer readable medium may store computer implementable instructions that when executed by at least one processor may cause the at least one processor to perform operations for using perceived voice characteristics to control body movements via conversational artificial intelligence, and the operations may include the steps of process 1700.

In some examples, step 1706 may comprise using a conversational artificial intelligence model (such as the conversational artificial intelligence model accessed by step 1001, a different conversational artificial intelligence model, etc.) to analyze audio data (such as the audio data received by step 1404, different audio data, etc.) to determine a desired movement for a specific portion of a specific body. The desired movement may be based on the first at least one suprasegmental feature (of step 1404) and/or the second at least one suprasegmental feature (of step 1404). In one example, a conversational artificial intelligence model may be or include a multimodal LLM, and step 1706 may use the multimodal LLM to analyze the audio data (for example with a suitable textual prompt, such as 'what is a likely movement in response to the input from this audio, considering the different suprasegmental features used in different parts of the audio') to determine the desired movement for the specific portion of the specific body. In another example, a conversational artificial intelligence model may be or include a machine learning model, and step 1706 may use the machine learning model to analyze the audio data and/or additional information to determine the desired movement for the specific portion of the specific body. The machine learning model may be a machine learning model trained using training examples to determine desired movements in response to audio inputs while considering the different suprasegmental features used in different parts of the audio inputs. An example of such training example may include sample additional information and/or a sample audio input, where different parts of the sample audio input are includes different suprasegmental features, together with a sample desired movement for responding to the sample audio input. In some examples, step 1706 may calculate a convolution of a fragment of the audio data associated with the first part to obtain a first plurality of numerical result values, may calculate a convolution of a fragment of the audio data associated with the second part to obtain a second plurality of numerical result values, may calculate a function of the first plurality of numerical result values and the second plurality of numerical result values to obtain a specific mathematical object in a mathematical space (for example using module 288), and may base the determination of the desired movement on the specific mathematical object, for example as described above in relation to step 1306. In some examples, step 1706 may analyze the first at least one suprasegmental feature to identify a first mathematical object in a mathematical space (for example, using module 284), may analyze the second at least one suprasegmental feature to identify a second mathematical object in the mathematical space (for example, using module 284), may calculate a function of the first mathematical object and the second mathematical object to obtain a third mathematical object in the mathematical space (for example, using module 286), and may base the determination of the desired movement on the third mathematical object, for example as described above in relation to step 1306.

In some examples, the first part of the input included in the audio data received by step 1404 may include at least a first word, the second part of the input included in the audio data received by step 1404 may include at least a second word, and the second word may differ from the first word. Further, the desired movement determined by step 1706 may be further based on the first word and the second word. In some examples, the first part of the input included in the audio data received by step 1404 may include at least a first non-verbal sound, the second part of the input included in the audio data received by step 1404 may include at least a second non-verbal sound, and the second non-verbal sound may differ from the first non-verbal sound. Further, the desired movement determined by step 1706 may be further based on the first non-verbal sound and the second non-verbal sound. In some examples, the first part of the input included in the audio data received by step 1404 may include at least a particular word, and the second part of the input included in the audio data received by step 1404 may include at least a particular non-verbal sound. Further, the desired movement determined by step 1706 may be further based on the particular word and the particular non-verbal sound. For example, a conversational artificial intelligence model may be or include a machine learning model, as described above, and step 1706 may use the machine learning model to analyze the audio data received by step 1404 and/or the words and/or the non-verbal sounds (for example, using the words and/or the non-verbal sounds as additional information as described above) to determine the desired movement.

In some examples, the first at least one suprasegmental feature and/or the second at least one suprasegmental feature (of step 1404) may be associated with a particular emotion of the entity (of step 1404), and the desired movement determined by step 1706 may be further based on the particular emotion. For example, the input included in the audio data received by step 1404 may include 'I see', when the suprasegmental feature includes rising intonation, higher pitch overall, faster pace and/or louder volume, the particular emotion may be surprise, and the desired movement may be associated with mild smile to acknowledge the surprise and/or raised eyebrows to mirror the surprise; and when the suprasegmental feature includes falling intonation, lower pitch overall, slower pace and/or softer volume, the particular emotion may be disappointment, and the desired movement may be associated with slight frown to show sympathy and/or a comforting gesture (such as a pat on the back). In some examples, the first at least one suprasegmental feature and/or the second at least one suprasegmental feature (of step 1404) may be associated with a particular intent of the entity, and the desired movement determined by step 1706 may be further based on the particular intent. Some non-limiting examples of such intent may include asking a question, making a statement, giving a command, or expressing uncertainty. For example, the input included in the audio data received by step 1404 may include 'No', when the suprasegmental feature includes falling intonation, strong stress, lower pitch and/or normal pace, the particular intent may be definitive refusal, and the desired movement may be associated with lifting eyebrows to show concern and/or tight-lipped smile to mask frustration; and when the suprasegmental feature includes falling-rising intonation, mild stress, lower pitch and/or slow pace, the particular intent may be reluctant agreement, and the desired movement may be associated with soft smile to show empathy and/or gentle touch to offer reassurance. In some examples, the first at least one suprasegmental feature and/or the second at least one suprasegmental feature (of step 1404) may be associated with a particular level of empathy of the entity, and the desired movement determined by step 1706 may be further based on the particular level of empathy. For example, the input included in the audio data received by step 1404 may include 'I understand', when the suprasegmental feature includes falling intonation with a slight rise at the end, balanced stress on both words, medium pitch, moderate pace and/or gentle volume, the particular level of empathy may be high, and the desired movement determined by step 1706 may be associated with warm smile to acknowledge the empathetic understanding and/or relaxed posture to indicate comfort and trust; and when the suprasegmental feature includes flat intonation, lower pitch, slightly faster pace and/or low volume, the particular level of empathy may be low, and the desired movement determined by step 1706 may be associated with furrowed brows to show skepticism and/or tilting the head slightly to one side indicating confusion. In some examples, the first at least one suprasegmental feature and/or the second at least one suprasegmental feature (of step 1404) may be associated with a particular level of self-assurance of the entity, and the desired movement determined by step 1706 may be further based on the particular level of self-assurance. Some non-limiting examples of such level of self-assurance may include confidence, uncertainty, and so forth. For example, the input included in the audio data received by step 1404 may include 'I can', when the suprasegmental feature includes falling intonation, strong stress on 'can', lower pitch, steady pace and/or moderate to loud volume, the particular level of self-assurance may be high, and the desired movement determined by step 1706 may be associated with a firm nod and/or a genuine smile to convey approval; and when the suprasegmental feature includes rising intonation, slight stress on 'can', higher pitch, slower pace and/or softer volume, the particular level of self-assurance may be uncertain (i.e., low), and the desired movement determined by step 1706 may be associated with raised eyebrows to show concern and/or gentle touch to show support. In some examples, the first at least one suprasegmental feature and/or the second at least one suprasegmental feature (of step 1404) may be associated with a particular level of formality, and the desired movement determined by step 1706 may be further based on the particular level of formality. For example, the input included in the audio data received by step 1404 may include 'Hello', when the suprasegmental feature includes steady intonation, balanced stress, neutral pitch, slow pace and/or moderate volume, the particular level of formality may be high, and the desired movement determined by step 1706 may be associated with a handshake; and when the suprasegmental feature includes falling intonation, even stress, lower pitch, slow pace and/or soft volume, the particular level of formality may be casual (i.e., low), and the desired movement determined by step 1706 may be associated with a warm smile. For example, a conversational artificial intelligence model may be or include a machine learning model, as described above. Further, step 1706 may analyze the audio data received by step 1404 to determine the particular emotion and/or the particular intent and/or the particular level of empathy and/or the particular level of self-assurance and/or the particular level of formality, for example as described above in relation to step 1406. Further, step 1706 may use the machine learning model to analyze the audio data received by step 1404 and/or the particular emotion and/or the particular intent and/or the particular level of empathy and/or the particular level of self-assurance and/or the particular level of formality (for example, using the particular emotion and/or the particular intent and/or the particular level of empathy and/or the particular level of self-assurance and/or the particular level of formality as additional information as described above) to determine the desired movement.

In some examples, the desired movement determined by step 1706 may be configured to cause the specific body to perform a gesture, for example as described above. Further, the gesture may be based on the first at least one suprasegmental feature and/or the second at least one suprasegmental feature, for example as described herein. In some examples, the desired movement determined by step 1706 may be configured to cause the specific body to produce a facial expression, for example as described above. Further, the facial expression may be based on the first at least one suprasegmental feature and/or the second at least one suprasegmental feature, for example as described herein. In some examples, the desired movement determined by step 1706 may be configured to create a selected distance between at least part the specific body and at least part of a body associated with the entity, for example as described above. Further, the distance may be based on the first at least one suprasegmental feature and/or the second at least one suprasegmental feature. For example, when the suprasegmental features are associated with friendly tone (such as rising intonation in a greeting) or with intimacy (such as using quiet voice), the selected distance may be shorter, and when the suprasegmental features are associated with aggressive tone (such as a low growling tone) or include stress on negative words, the selected distance may be longer. In some examples, the desired movement determined by step 1706 may be configured to create a selected spatial orientation between at least part the specific body and at least part of a body associated with the entity, for example as described above. Further, the spatial orientation may be based on the first at least one suprasegmental feature and/or the second at least one suprasegmental feature. For example, when the suprasegmental features are associated with an engaging tone (such as, varied intonation and emphasis), the spatial orientation may direct the specific body directly towards the entity, and when the suprasegmental features are associated with lack of excitement (such as, monotone intonation and slowing down pace), the spatial orientation may direct the specific body away from the entity. In some examples, the desired movement determined by step 1706 may serve a goal, for example as described above. Further, the goal may be based on the first at least one suprasegmental feature and/or the second at least one suprasegmental feature. For example, when the suprasegmental features convey sadness (for example, downward pitch, reduced stress, slower pace and/or softer volume), the goal may be to comfort the entity, and the desired movement may be associated with nodding and/or gentle touch; and when the suprasegmental features convey excitement (for example, high and rising pitch, dynamic rhythm, faster pace and/or increased volume), the goal may be to mirror the excitement, and the desired movement may be associated with wide eyes, raised eyebrows, energetic movements, and/or leaning forward. In some examples, a data-structure or an algorithm may associate input suprasegmental features with at least one of desired gesture, desired facial expression, desired distance, desired spatial orientation, or goal. Further, step 1706 may access the data-structure or use the algorithm based on the audio data and/or based on the first at least one suprasegmental feature and/or based on the second at least one suprasegmental feature to select at least one of the gesture, facial expression, distance, spatial orientation, or goal. In one example, the data structure may be included in and/or the algorithm may be implemented by at least one artificial neuron, for example in at least one artificial neuron of an artificial neural network included in a conversational artificial intelligence model (such as the conversational artificial intelligence model accessed by step 1001, a different conversational artificial intelligence model, and so forth). In another example, the data structure may be included in a database and/or a memory. In yet another example, the algorithm may be implemented using a programming language.

In some examples, the desired movement determined by step 1706 and/or step 2106 may be configured to cause a physical contact with the entity. In another example, the desired movement determined by step 1706 and/or step 2106 may be configured to avoid causing a physical contact with the entity. For example, when the first at least one suprasegmental feature and/or the second at least one suprasegmental feature and/or the particular movement indicate a distress of the entity, the desired movement may be associated with a gentle touch on an arm, shoulder and/or back of the entity, and when the first at least one suprasegmental feature and/or the second at least one suprasegmental feature and/or the particular movement do not indicate a distress of the entity, the desired movement may be associated with no physical contact with the entity. In one example, step 1706 may use, based on the first at least one suprasegmental feature and/or the second at least one suprasegmental feature, one or more rules associating suprasegmental features with either creating physical contact or avoiding physical contact to determine whether to determine desired movement that creates physical contact or to determine desired movement that avoids physical contact. In one example, step 2106 may use, based on the particular movement, one or more rules associating movements with either creating physical contact or avoiding physical contact to determine whether to determine a desired movement that creates physical contact or to determine a desired movement that avoids physical contact.

In some examples, the input included in the audio data received by step 1404 may be indicative of a desire of the entity for the specific body to perform a particular manipulation of a particular object, for example as described above in relation to step 1306. In one example, step 1706 may determine to perform the particular manipulation of the particular object based on the first at least one suprasegmental feature and/or the second at least one suprasegmental feature, and in response to the determination, the desired movement determined by step 1706 may be configured to cause the particular manipulation of the particular object. In another example, step 1706 may determine not to perform the particular manipulation of the particular object based on the first at least one suprasegmental feature and/or the second at least one suprasegmental feature, and in response to the determination, the desired movement determined by step 1706 may be configured not to cause the particular manipulation of the particular object. For example, a data-structure or an algorithm may associate input suprasegmental features and/or specific objects and/or specific manipulations of the specific objects with determinations of whether to perform the specific manipulations. Further, step 1706 may access the data-structure or use the algorithm based on the audio data and/or based on the first at least one suprasegmental feature and/or based on the second at least one suprasegmental feature to determine whether to perform the particular manipulation of the particular object. In one example, the data structure may be included in and/or the algorithm may be implemented by at least one artificial neuron, for example in at least one artificial neuron of an artificial neural network included in a conversational artificial intelligence model (such as the conversational artificial intelligence model accessed by step 1001, a different conversational artificial intelligence model, and so forth). In another example, the data structure may be included in a database and/or a memory. In yet another example, the algorithm may be implemented using a programming language. In one example, the particular manipulation may include bringing the particular object to the entity. In another example, the particular manipulation may include changing a state of the particular object to a particular state. For example, the particular object may be a device (such as an electric device, a mechanical device, etc.) with an off-state and an on-state, and the particular manipulation may include changing the state from the off-state to the on-state or changing the state from the on-state to the off-state. In another example, the particular object may be an object with an open-state and a closed-state (such as a door, a gate, a window, a container, a lock, etc.), and the particular manipulation may include changing the state from the open-state to the closed-state or changing the state from the closed-state to the open-state. In one example, the desired movement may include a physical contact with the particular object to cause the particular manipulation to the particular object. In another example, the desired movement may include a physical contact with a specific object to cause the particular manipulation to the particular object, and no physical contact with the particular object. In one example, the entity may be a pupil and the specific body may be associated with a teacher, when the suprasegmental features are associated with a commanding tone (for example, falling intonation, stress on key action words, steady rhythm and/or lower pitch), step 1706 may determine not to perform the particular manipulation of the particular object, and when the suprasegmental features are associated with a polite request (for example, rising or neutral intonation, gentle stress, moderate pace, higher or varied pitch and/or softened articulation), step 1706 may determine to perform the particular manipulation of the particular object.

In some examples, step 1706 may further comprise using a conversational artificial intelligence model (such as the conversational artificial intelligence model accessed by step 1001, a different conversational artificial intelligence model, and so forth) to analyze the first at least one suprasegmental feature and/or the second at least one suprasegmental feature to select the specific portion of the specific body. In one example, a conversational artificial intelligence model may be or include a multimodal LLM, and step 1706 may use the LLM to analyze the audio data (for example with a suitable textual prompt, such as 'what part of your body is likely to move in response to the input from this audio, considering the different suprasegmental features used in different parts of the audio') to select the specific portion of the specific body. In another example, a conversational artificial intelligence model may be or include a machine learning model, and step 1706 may use the machine learning model to analyze the audio data and/or additional information to select the specific portion of the specific body. The machine learning model may be a machine learning model trained using training examples to select portions of a body based on suprasegmental features used in audio data and/or additional information. An example of such training example may include sample audio data including articulation using sample suprasegmental features, together with a sample desired selection of a portion of a sample body for movement.

In some examples, the input included in the audio data received by step 1404 may be perceived, based on the first at least one suprasegmental feature and/or the second at least one suprasegmental feature, as a humoristic remark. In some examples, the input included in the audio data received by step 1404 may be perceived, based on the first at least one suprasegmental feature and/or the second at least one suprasegmental feature, as an offensive remark. In some examples, the input included in the audio data received by step 1404 may be perceived, based on the first at least one suprasegmental feature and/or the second at least one suprasegmental feature, as a friendly remark. For example, the input may include 'Aren't you special'. When the word 'aren't' is lightly stressed with a neutral tone, the word 'you' is lightly stressed with a teasing intonation, and the word 'special' is stressed with a rising and falling intonation, the input may be perceived as a humoristic remark. When the word 'aren't' is strongly stressed with a falling intonation, the word 'you' is strongly stressed with a flat intonation, and the word 'special' is stressed with a harsh intonation, the input may be perceived as an offensive remark. When the words 'aren't' is lightly stressed with a neutral intonation, the word 'you' is lightly stressed with a warm rising intonation, and the word 'special' is stressed with a warm intonation, the input may be perceived as a friendly remark. In another example, a classification algorithm may be used to determine whether to perceive the input included in the audio data received by step 1404 as a humoristic remark, offensive remark, or friendly remark. For example, the classification algorithm may classify the audio data received by step 1404 based on the first at least one suprasegmental feature and/or the second at least one suprasegmental feature to a selected class of a plurality of classes, where each class of the plurality of classes may correspond to a humoristic remark, offensive remark, or friendly remark. In some examples, the response generated by step 1406 may react to the input as a humoristic remark (for example based on the first at least one suprasegmental feature and/or the second at least one suprasegmental feature, as described above). In some examples, the response generated by step 1406 may react to the input as an offensive remark (for example based on the first at least one suprasegmental feature and/or the second at least one suprasegmental feature, as described above). In some examples, the response generated by step 1406 may react to the input as a friendly remark (for example based on the first at least one suprasegmental feature and/or the second at least one suprasegmental feature, as described above). For example, the input may include 'Aren't you special'. To react to the input as a humoristic remark, the response may include 'Oh, you got me!' To react to the input as an offensive remark, the response may include 'Excuse me?' To react to the input as a friendly remark, the response may include 'Thanks! That means a lot!' In some examples, the usage (by step 1108) of the desired at least one suprasegmental feature (determined by step 1506) may be configured to convey reacting to the input as a humoristic remark, and the selection to react to the input as a humoristic remark may be based on the first at least one suprasegmental feature and/or the second at least one suprasegmental feature, for example as described above. In some examples, the usage (by step 1108) of the desired at least one suprasegmental feature (determined by step 1506) may be configured to convey reacting to the input as an offensive remark, and the selection to react to the input as an offensive remark may be based on the first at least one suprasegmental feature and/or the second at least one suprasegmental feature, for example as described above. In some examples, the usage (by step 1108) of the desired at least one suprasegmental feature (determined by step 1506) may be configured to convey reacting to the input as a friendly remark, and the selection to react to the input as a friendly remark may be based on the first at least one suprasegmental feature and/or the second at least one suprasegmental feature, for example as described above. For example, the input may include 'Aren't you special', the audible speech output generated by step 1108 may include the response 'I guess so'. To react to the input as a humoristic remark, the desired at least one suprasegmental feature may include playful intonation with a slight rise at the end, mild stress on 'guess', and smooth rhythm. To react to the input as an offensive remark, the desired at least one suprasegmental feature may include slightly sarcastic falling intonation, strong stress on 'guess', and an abrupt rhythm. To react to the input as a friendly remark, the desired at least one suprasegmental feature may include warm rising and falling intonation, mild stress on both 'I' and 'guess', and smooth rhythm. In some examples, the usage (by step 1208) of the media content generated by step 1606 may be configured to convey reacting to the input as a humoristic remark (for example based on the first at least one suprasegmental feature and/or the second at least one suprasegmental feature, as described above). In some examples, the usage (by step 1208) of the media content generated by step 1606 may be configured to convey reacting to the input as an offensive remark (for example based on the first at least one suprasegmental feature and/or the second at least one suprasegmental feature, as described above). In some examples, the usage (by step 1208) of the media content generated by step 1606 may be configured to convey reacting to the input as a friendly remark (for example based on the first at least one suprasegmental feature and/or the second at least one suprasegmental feature, as described above). In some examples, based on the first at least one suprasegmental feature and/or the second at least one suprasegmental feature, the desired movement determined by step 1706 may be configured to convey reacting to the input as a humoristic remark. In some examples, based on the first at least one suprasegmental feature and/or the second at least one suprasegmental feature, the desired movement determined by step 1706 may be configured to convey reacting to the input as an offensive remark. In some examples, based on the first at least one suprasegmental feature and/or the second at least one suprasegmental feature, the desired movement determined by step 1706 may be configured to convey reacting to the input as a friendly remark. For example, the input may include 'Aren't you special'. To react to the input as a humoristic remark, the desired movement may be associated with a playful smile and/or a light playful eye roll or a friendly wink. To react to the input as an offensive remark, the desired movement may be associated with a raised eyebrow and/or pursed lips. To react to the input as a friendly remark, the desired movement may be associated with a genuine smile and/or a nod of appreciation.

In some examples, step 1404 may further comprise obtaining an indication of a characteristic of an ambient noise, for example as described above in relation to process 1100. Some non-limiting examples of such characteristic of an ambient noise may include frequency range, intensity, temporal variation, source diversity, spatial distribution, harmonic content, and so forth. In one example, step 1406 may further base the response on the characteristic of the ambient noise. In another example, step 1506 may further base the determination of the desired at least one suprasegmental feature on the characteristic of the ambient noise. In yet another example, step 1606 may further base the generation of the media content on the characteristic of the ambient noise. In an additional example, step 1706 may further base the determination of the desired movement on the characteristic of the ambient noise. For example, step 1406 and/or step 1506 and/or step 1606 and/or step 1706 may normalize and/or weigh volume levels associated with the first at least one suprasegmental feature and/or the second at least one suprasegmental feature based on the characteristic of the ambient noise. For example, when loud volume levels associated with the first at least one suprasegmental feature and/or the second at least one suprasegmental feature that may normally (in the present of low or regular ambient noise volume) indicate a specific meaning of the input, may not indicate this specific meaning when the ambient noise is loud.

In some examples, the usage (by step 1108) of the desired at least one suprasegmental feature determined by step 1506 and/or step 1906 may be configured to convey a selected reaction to the input included in the audio data received by step 1404 and/or step 1804. In another example, the usage (by step 1208) of the media content generated by step 1606 and/or step 2006 may be configured to convey a selected reaction to the input included in the audio data received by step 1404 and/or step 1804. In yet another example, the desired movement determined by step 1706 and/or step 2106 may be configured to convey a selected reaction to the input included in the audio data received by step 1404 and/or step 1804. In one example, step 1506 and/or step 1606 and/or step 1706 may select the reaction based on the first at least one suprasegmental feature and/or the second at least one suprasegmental feature. In one example, step 1906 and/or step 2006 and/or step 2106 may select the reaction based on the input included in the audio data received by step 1804 and/or the particular movement of step 1805. For example, the selected reaction to the input may be at least one of a positive reaction, negative reaction, engagement, show of interest, agreement, respect, disagreement, skepticism, disinterest, boredom, discomfort, uncertainty, confusion or neutrality. In some examples, the usage (by step 1108) of the desired at least one suprasegmental feature determined by step 1506 and/or step 1906 may be configured to convey a particular emotion, for example as described above. In another example, the usage (by step 1208) of the media content generated by step 1606 and/or step 2006 may be associated with a particular emotion (for example, determined based on the particular emotion, configured to convey the particular emotion, etc.), for example as described above. In yet another example, the desired movement determined by step 1706 and/or step 2106 may be associated with (for example, determined based on, configured to convey, etc.) a particular emotion, for example as described above. In one example, step 1506 and/or step 1606 and/or step 1706 may select the particular emotion based on the first at least one suprasegmental feature and/or the second at least one suprasegmental feature. For example, the particular emotion may be selected to mirror emotion conveyed by the first at least one suprasegmental feature and/or the second at least one suprasegmental feature. In another example, the input included in the audio data received by step 1404 may include 'Are you sure you don't want any cake?' When the first at least one suprasegmental feature and/or the second at least one suprasegmental feature are associated with a tempting tone (such as high-low pitch, slow pace and/or emphasis on 'cake'), the particular emotion may be desire, and when the first at least one suprasegmental feature and/or the second at least one suprasegmental feature are associated with an accusatory tone (such as flat tone and/or fast speech), the particular emotion may be resentment. In one example, step 1906 and/or step 2006 and/or step 2106 may select the particular emotion based on the input included in the audio data received by step 1804 and/or the particular movement of step 1805. For example, the particular emotion may be selected to mirror emotion conveyed by the input and/or the particular movement. In another example, the input included in the audio data received by step 1804 may include 'Are you sure you don't want any cake?' When the particular movement is associated with a tempting posture (for example, prolonged eye contact, leaning closer, and/or using open body language), the particular emotion may be desire, and when the particular movement is associated with an accusatory posture (for example, narrowing eyes, furrowing brows, and/or crossing arms), the particular emotion may be resentment. In some examples, the usage (by step 1108) of the desired at least one suprasegmental feature determined by step 1506 and/or step 1906 may be configured to convey a particular intent, for example as described above. Some non-limiting examples of such intent may include asking a question, making a statement, giving a command, or expressing uncertainty. In one example, step 1506 may select the particular intent based on the first at least one suprasegmental feature and/or the second at least one suprasegmental feature. For example, when the first at least one suprasegmental feature and/or the second at least one suprasegmental feature conveys that the entity is seeking confirmation, the particular intent may be to offer reassurance, when the first at least one suprasegmental feature and/or the second at least one suprasegmental feature conveys that the entity is over confidence, the particular intent may be to indicate doubt. In another example, the particular intent may be selected to mirror energy conveyed by the first at least one suprasegmental feature and/or the second at least one suprasegmental feature (for example, to create a sense of rapport). In yet another example, the particular intent may be selected to shift the tone conveyed by the first at least one suprasegmental feature and/or the second at least one suprasegmental feature (for example, to lighten the mood). In one example, step 1906 may select the particular intent based on the input included in the audio data received by step 1804 and/or the particular movement of step 1805. For example, when the particular movement conveys that the entity is seeking confirmation, the particular intent may be to offer reassurance, when the particular movement conveys that the entity is over confidence, the particular intent may be to indicate doubt. In another example, the particular intent may be selected to mirror energy conveyed by the particular movement (for example, to create a sense of rapport). In yet another example, the particular intent may be selected to shift the energy level conveyed by the particular movement (for example, to lift the mood). In some examples, the usage (by step 1108) of the desired at least one suprasegmental feature determined by step 1506 and/or step 1906 may be configured to convey a level of empathy, for example as described above. In another example, the usage (by step 1208) of the media content generated by step 1606 and/or step 2006 may be configured to convey a level of empathy, for example as described above. In yet another example, the desired movement determined by step 1706 and/or step 2106 may be associated with a level of empathy (for example, based on the level of empathy, configured to convey the level of empathy, etc.), for example as described above. In one example, step 1506 and/or step 1606 and/or step 1706 may select the level of empathy based on the first at least one suprasegmental feature and/or the second at least one suprasegmental feature. For example, when the first at least one suprasegmental feature and/or the second at least one suprasegmental feature are associated with a sincere tone, the level of empathy may be higher, and when the first at least one suprasegmental feature and/or the second at least one suprasegmental feature are associated with an aggressive tone, the level of empathy may be lower. In one example, step 1906 and/or step 2006 and/or step 2106 may select the level of empathy based on input included in the audio data received by step 1804 and/or the particular movement of step 1805. For example, when the particular movement conveys sincerity (for example, associated with steady eye contact, genuine smiles, nodding, and/or leaning slightly forward), the level of empathy may be higher, and when the particular movement conveys aggression (for example, associated with intense staring, frowning, rigid body, and/or leaning too forward), the level of empathy may be lower. In some examples, the usage (by step 1108) of the desired at least one suprasegmental feature determined by step 1506 and/or step 1906 may be configured to convey a level of self-assurance, for example as described above. In another example, the usage (by step 1208) of the media content generated by step 1606 and/or step 2006 may be configured to convey a level of self-assurance, for example as described above. In yet another example, the desired movement determined by step 1706 and/or step 2106 may be associated with a level of self-assurance, for example as described above. Some non-limiting examples of such level of self-assurance may include confidence, uncertainty, and so forth. In one example, step 1506 and/or step 1606 and/or step 1706 may select the level of self-assurance based on the first at least one suprasegmental feature and/or the second at least one suprasegmental feature. For example, the level of self-assurance may mirror a level of self-assurance associated with the first at least one suprasegmental feature and/or the second at least one suprasegmental feature (for example, the confidence of the entity may induce confidence in others). In one example, step 1906 and/or step 2006 and/or step 2106 may select the level of self-assurance based on the input included in the audio data received by step 1804 and/or the particular movement of step 1805. For example, the level of self-assurance may mirror a level of self-assurance associated with the particular movement (for example, the confidence of the entity may induce confidence in others). In some examples, the usage (by step 1108) of the desired at least one suprasegmental feature determined by step 1506 and/or step 1906 may be configured to convey a level of formality, for example as described above. In another example, the usage (by step 1208) of the media content generated by step 1606 and/or step 2006 may be configured to convey a level of formality, for example as described above. In yet another example, the desired movement determined by step 1706 and/or step 2106 may be associated with a level of formality, for example as described above. In one example, step 1506 and/or step 1606 and/or step 1706 may select the level of formality based on the first at least one suprasegmental feature and/or the second at least one suprasegmental feature. For example, the level of formality may mirror a level of formality associated with the first at least one suprasegmental feature and/or the second at least one suprasegmental feature. In one example, step 1906 and/or step 2006 and/or step 2106 may select the level of formality based on the input included in the audio data received by step 1804 and/or the particular movement of step 1805. For example, the level of formality may mirror a level of formality associated with the particular movement. In some examples, a data-structure and/or an algorithm may associate suprasegmental features with at least one of reactions, emotions, intents, levels of empathy, levels of self-assurance, or levels of formality. Further, step 1506 and/or step 1606 and/or step 1706 may access the data-structure and/or use the algorithm based on the audio data and/or based on the first at least one suprasegmental feature and/or based on the second at least one suprasegmental feature to select at least one of the selected reaction, the particular emotion, the particular intent, the level of empathy, the level of self-assurance, or the level of formality. In some examples, a data-structure and/or an algorithm may associate movements with at least one of reactions, emotions, intents, levels of empathy, levels of self-assurance, or levels of formality. Further, step 1906 and/or step 2006 and/or step 2106 may access the data-structure and/or use the algorithm based on the input and/or based on the particular movement to select at least one of the particular emotion, the particular intent, the level of empathy, the level of self-assurance, or the level of formality. In one example, the data structure may be included in and/or the algorithm may be implemented by at least one artificial neuron, for example in at least one artificial neuron of an artificial neural network included in a conversational artificial intelligence model (such as the conversational artificial intelligence model accessed by step 1001, a different conversational artificial intelligence model, and so forth). In another example, the data structure may be included in a database and/or a memory. In yet another example, the algorithm may be implemented using a programming language.

FIG. 18 is a flowchart of an exemplary process 1800 for using perceived body movements in conversational artificial intelligence, consistent with some embodiments of the present disclosure. In this example, process 1700 may comprise accessing a conversational artificial intelligence model (step 1001); receiving audio data (step 1804), the audio data includes an input from an entity in a natural language, the input includes at least a first part and a second part, the second part differs from the first part; receiving image data (step 1805), the image data depicts a particular movement, the particular movement is a movement of a particular portion of a particular body, the particular movement and the first part are concurrent, the particular body is associated with the entity; using the conversational artificial intelligence model to analyze the audio data and the image data to generate a response in the natural language to the input (step 1806), the response is based on the input and the particular movement; and providing the generated response to the entity (step 1008). In other examples, process 1800 may include additional steps or fewer steps. In other examples, one or more steps of process 1800 may be executed in a different order and/or one or more groups of steps may be executed simultaneously. In one example, the response generated by step 1806 may be configured to imitate a human individual. In another example, the response generated by step 1806 may not be associated with a specific human individual. In some examples, process 1800 may further comprise step 1906 described below. The desired at least one suprasegmental feature determined by step 1906 may be based on the input and/or the particular movement. Further, step 1008 may use the response generated by step 1806 and/or the desired at least one suprasegmental feature determined by step 1906 to generate an audible speech output during a communication with the entity, for example as described in relation to step 1108. The generated audible speech output may include at least an articulation of a specific word (for example, a specific word included in the generated response), and the articulation of the specific word in the generated audible speech output may be based on the desired at least one suprasegmental feature. In some examples, process 1800 may further comprise step 2106 described below. The desired movement determined by step 2106 may be based on the input and/or the particular movement. The specific body may differ from the particular body. Further, process 1800 may further comprise step 1308 described above. In one example, the interaction with the entity may include generating an audible speech output, for example an audible speech output generated by step 1108. The generated audible speech output may include at least an articulation of a specific word (for example, a specific word included in the response generated by step 1806), and the digital signals generated by step 1308 may be configured to cause the desired movement during the articulation of the specific word, for example as described herein.

In some examples, a system for using perceived body movements in conversational artificial intelligence and/or for image analysis for personal interaction may include at least one processing unit configured to perform process 1800. In one example, the system may further comprise at least one audio sensor, and the receiving the audio data by step 1804 may include capturing the audio data using the at least one audio sensor. In one example, the system may further comprise at least one image sensor, and the receiving the image data by step 1805 may include capturing the image data using the at least one image sensor. In one example, the system may further comprise at least one visual presentation device, and the providing the generated response to the entity by step 1008 may include using the at least one visual presentation device to visually present a textual representation of the response. In another example, the system may further comprise at least one audio speaker, and the providing the generated response to the entity by step 1008 may include generating an audible speech output using the at least one audio speaker. In some examples, a method for using perceived body movements in conversational artificial intelligence and/or for image analysis for personal interaction may include performing process 1800. In some examples, a non-transitory computer readable medium may store computer implementable instructions that when executed by at least one processor may cause the at least one processor to perform operations for using perceived body movements in conversational artificial intelligence and/or for image analysis for personal interaction, and the operations may include the steps of process 1800.

In some examples, step 1804 may comprise receiving audio data. The audio data may include an input from an entity in a natural language. In one example, the input may include one or more (such as one, two, three, four, five, more than five) parts. For example, the input may include at least a first part and a second part. The second part may differ from the first part. In one example, the first part and second part may have no portion in common. In another example, the first part may include at least one portion not included in the second part. In yet another example, the second part may include at least one portion not included in the first part. In an additional example, the first part and second part may have a common portion. In one example, receiving the audio data may comprise reading the audio data from memory, may comprise receiving the audio data from an external computing device (for example, using a digital communication device), may comprise capturing the audio data (for example, using a microphone, using an audio sensor, etc.), may comprise receiving the audio data from the entity, and so forth.

In some examples, step 1805 may comprise receiving image data. The image data may depict a particular movement. The particular movement may be a movement of a particular portion of a particular body. The particular body may be associated with an entity (such as the entity of step 1804, a different entity, and so forth). In one example, the particular movement and the first part of step 1804 may be concurrent. In another example, the particular movement and the first part of step 1804 may be non-simultaneous. In one example, receiving the image data may comprise reading the image data from memory, may comprise receiving the image data from an external computing device (for example, using a digital communication device), may comprise capturing the image data (for example, using a camera, using a virtual camera using an image sensor, etc.), may comprise capturing the image data from a physical environment, may be captured from the virtual environment using a virtual camera, and so forth. In some examples, the particular body of step 1805 may be a visual depiction of a virtual body associated with the entity. In other examples, the particular body of step 1805 may be a physical body associated with the entity. For example, the particular body of step 1805 may be an artificial body associated with the entity, such as a robot associated with the entity, a humanoid robot associated with the entity, a non-humanoid robot associated with the entity, a unipedal robot associated with the entity, a bipedal robot associated with the entity, a tripedal robot associated with the entity, a quadruped robot associated with the entity, a pentapedal robot associated with the entity, a hexapod robot associated with the entity, a robot with more than six legs associated with the entity, and so forth. In some examples, the particular portion of the particular body of step 1805 may include at least one of a hand, arm, head, face, torso or leg of the particular body. In some examples, the particular portion of the particular body of step 1805 may include at least part of a hand, an arm, a head, a face, a torso, or a leg of the particular body. In some examples, the particular movement depicted in the image data received by step 1805 may be associated with at least one of a gesture, a facial expression change, a posture change, a limb movement, a head movement or an eye movement. In some examples, the particular movement depicted in the image data received by step 1805 may convey at least one of a positive reaction, negative reaction, engagement, show of interest, agreement, respect, disagreement, skepticism, disinterest, boredom, discomfort, uncertainty, confusion or neutrality. In some examples, the particular movement depicted in the image data received by step 1805 may indicate at least one of a direction, a physical object, a virtual object or a motion pattern.

In some examples, step 1806 may comprise using a conversational artificial intelligence model (such as the conversational artificial intelligence model accessed by step 1001, a different conversational artificial intelligence model, and so forth) to analyze audio data (such as the audio data received by step 1804, different audio data, etc.) and/or the image data (such as the image data received by step 1805, different image data, etc.) to generate a response to the input included in the audio data received by step 1804. The response may be based on the input included in the audio data received by step 1804 and/or the particular movement of step 1805. In one example, the response may be in a natural language (such as the natural language of step 1804, a different natural language, and so forth). In another example, the response may be in a formal language. In one example, the response may be an audible verbal response, for example an audible verbal response in the natural language. In another example, the response may be a textual response, for example a textual response in the natural language. In one example, a conversational artificial intelligence model may be or include a multimodal LLM, and step 1806 may use the multimodal LLM to analyze the audio data and/or the image data (for example with a suitable textual prompt, such as 'respond to the input from this audio in a communication with an individual, considering the movement of the individual depicted in this video') to generate the response. In another example, a conversational artificial intelligence model may be or include a machine learning model, and step 1806 may use the machine learning model to analyze the audio data and/or the image data and/or additional information to generate the response. The machine learning model may be a machine learning model trained using training examples to generate responses to audio inputs while considering movements depicted in visual inputs. An example of such training example may include sample additional information and/or a sample audio input and/or a sample visual input, together with a sample response to the sample audio input that is based on a sample movement depicted in the sample visual input. In some examples, step 1806 may calculate a convolution of a fragment of the audio data associated with the first part to obtain a first plurality of numerical result values, may calculate a convolution of a fragment of the audio data associated with the second part to obtain a second plurality of numerical result values, may calculate a convolution of at least part of the image data to obtain a third plurality of numerical result values, may calculate a function of the first plurality of numerical result values, the second plurality of numerical result values and the third plurality of numerical result values to obtain a specific mathematical object in a mathematical space (for example using module 288), and may base the generation of the response on the specific mathematical object, for example as described above in relation to step 1006. In some examples, step 1806 may analyze the audio data to identify a first mathematical object in a mathematical space (for example, using module 284), may analyze the image data to identify a second mathematical object in the mathematical space (for example, using module 284), may calculate a function of the first mathematical object and the second mathematical object to obtain a specific mathematical object in the mathematical space (for example, using module 286), and may base the generation of the response on the specific mathematical object, for example as described above in relation to step 1006. In some examples, step 1806 may use the conversational artificial intelligence model to analyze the audio data and the image data to select a specific word based on the input and the particular movement, and may include the specific word in the generated response. In some examples, the response generated by step 1806 may be in a specific language register, and the specific language register may be based on the input and the particular movement. For example, the particular movement and/or the input may be associated with a level of formality (for example as described herein), and step 1806 may select the language register based on the level of formality (for example, to match the level of formality).

In some examples, the first part of the input included in the audio data received by step 1804 may include at least a first word, the second part of the input may include at least a second word, and the second word may differ from the first word. Further, the response generated by step 1806 may be further based on the first word and/or the second word. For example, the input may include either 'This is a spoon' or 'This isn't a fork', the first part may include 'is' or 'isn't', the second part may include 'spoon' or 'fork', the particular movement of step 1805 may include either a pointing gesture at a spoon, a fork or a knife. When the input includes 'This is a spoon', if a spoon is pointed, the response may include 'Correct!', and if a fork or a knife is pointed, the response may include 'Try again'. When the input includes 'This isn't a fork', if a spoon or a knife is pointed, the response may include 'Correct!', and if a fork is pointed, the response may include 'Try again'. In some examples, the first part of the input included in the audio data received by step 1404 may include at least a first non-verbal sound, the second part of the input may include at least a second non-verbal sound, and the second non-verbal sound may differ from the first non-verbal sound. Further, the response generated by step 1806 may be further based on the first non-verbal sound and/or the second non-verbal sound. In some examples, the first part of the input included in the audio data received by step 1804 may include at least a particular word, and the second part of the input may include at least a particular non-verbal sound. Further, the response generated by step 1806 may be further based on the particular word and the particular non-verbal sound. For example, a conversational artificial intelligence model may be or include a machine learning model, as described above, and step 1806 may use the machine learning model to analyze the audio data and/or the image data and/or the words and/or the non-verbal sounds (for example, using the words and/or the non-verbal sounds as additional information as described above) to generate the response.

In some examples, the particular movement of step 1805 may be associated with a particular emotion of the entity, and the response generated by step 1806 may be further based on the particular emotion. For example, the input included in the audio data received by step 1804 may include 'We need to talk'. When the particular movement is associated with furrowed brow and/or gentle touch on the arm, the particular emotion may be concern, the response may be attentive (for example, 'Is everything okay?') When the particular movement is associated with crossed arms and/or a stern expression, the particular emption may be angry, the response may be defensive (such as, 'What did I do?') In some examples, the particular movement of step 1805 may be associated with a particular level of empathy of the entity, and the response generated by step 1806 may be further based on the particular level of empathy. For example, the input included in the audio data received by step 1804 may include 'Is there anything I can do?' When the particular movement is associated with leaning in and/or maintaining eye contact, the particular level of empathy may be high, the response may include 'Yes, actually, . . . ' When the particular movement is associated with looking around and/or hands in pockets, the response may include 'No, it's okay'. In some examples, the particular movement of step 1805 may be associated with a particular level of self-assurance of the entity, and the response generated by step 1806 may be further based on the particular level of self-assurance. Some non-limiting examples of such level of self-assurance may include confidence, uncertainty, and so forth. For example, the input included in the audio data received by step 1804 may include 'I can do it'. When the particular movement is associated with steady eye contact and/or upright posture, the particular level of self-assurance may be high, the response may include 'I trust you'. When the particular movement is associated with looking down and/or slouched posture, the particular level of self-assurance may be low, the response may include 'Are you sure? Maybe you need help?' In some examples, the particular movement of step 1805 may be associated with a particular level of formality, and the response generated by step 1806 may be further based on the particular level of formality. For example, the input included in the audio data received by step 1804 may include 'Good to see you'. When the particular movement is associated with stiff posture and/or firm handshake, the particular level of formality may be highly formal, and the response may be in a formal language register (such as, 'Good to see you as well'). When the particular movement is associated with a relaxed posture and/or a friendly smile, the particular level of formality may be casual, and the response may be in a casual language register (such as, 'Hey, great to see you! What's up?') In some examples, the particular movement of step 1805 may be associated with a particular gesture, and the response generated by step 1806 may be further based on the particular gesture. For example, the input included in the audio data received by step 1804 may include 'is this the bathroom?', the particular gesture may be a pointing gesture, and the generated response may be 'yes' or 'no based on the direction of the pointing gesture and the location of the bathroom. In some examples, the particular movement of step 1805 may be associated with a particular facial expression, and the response generated by step 1806 may be further based on the particular facial expression. For example, the input included in the audio data received by step 1804 may include 'That's interesting', when the particular facial expression is associated with a slight smirk (such as subtle lift of one side of the mouth, narrowed eyes, and/or slight tilt of the head), the generated response may react to the input as polite but indifferent (such as, 'Yeah, I thought so too. But if it's not your thing, that's okay'), and when the particular facial expression is associated with smile and nod, the generated response may react to the input as genuine interest (such as, 'I thought you might find it interesting. Let's dive deeper'). In some examples, the particular movement of step 1805 may be associated with a particular posture, and the response generated by step 1806 may be further based on the particular posture. For example, the input included in the audio data received by step 1804 may include 'I can do it', when the particular posture conveys determination and focus (for example, leaning forward with hands on table), the generated response may be 'I believe you', and when the particular posture conveys uncertainty (for example, shrugging with a relaxed stance), the generated response may be 'Are you sure? You don't seem convinced'. For example, a conversational artificial intelligence model may be or include a machine learning model, as described above. Further, step 1806 may analyze the audio data received by step 1804 and/or the image data received by step 1805 to determine the particular emotion and/or the particular level of empathy and/or the particular level of self-assurance and/or the particular level of formality and/or the particular gesture and/or the particular facial expression and/or the particular posture, for example using a visual classification algorithms (where each class may be associated with a different emotion, level or empathy, level of self-assurance, level of formality, gesture, facial expression, and/or posture). Further, step 1806 may use the machine learning model to analyze the audio data received by step 1804 and/or the image data received by step 1805 and/or the particular emotion and/or the particular level of empathy and/or the particular level of self-assurance and/or the particular level of formality and/or the particular gesture and/or the particular facial expression and/or the particular posture (for example, using the particular emotion and/or the particular level of empathy and/or the particular level of self-assurance and/or the particular level of formality and/or the particular gesture and/or the particular facial expression and/or the particular posture as additional information as described above) to generate the response.

In some examples, the particular movement of step 1805 may create a particular distance between at least part of the particular body and a particular object and/or may a particular spatial orientation between at least part of the particular body and a particular object, and the response generated by step 1806 may be further based on the particular distance and/or on the particular spatial orientation. In some examples, the response generated by step 1806 may be further based on whether the particular movement causes a physical contact between at least part of the particular body and a particular object. For example, the particular object may be a body associated with the conversational artificial intelligence model. In another example, the particular object may be an inanimate object. In yet another example, the particular object may be an animate object. For example, the particular object may be a baby stroller, the input included in the audio data received by step 1804 may include 'Can you grab the other side?' When the particular body is closer to the back handle of the stroller than to the front foot rest, or when the particular body is at substantially even distances to both (standing to the side of the stroller) and faced to the back handle, the input may be understood as a request to grab the front foot rest, and the generated response may include 'Okay, I'll grab the stroller from the front foot rest'. When the particular body is closer to the front foot rest of the stroller than to the back handle, or when the particular body is at substantially even distances to both (standing to the side of the stroller) and faced to the front foot rest, the input may be understood as a request to grab the back handle, and the generated response may include 'Okay, I'll grab the stroller from the back handle'. In another example, the particular object may be a body associated with the conversational artificial intelligence model, the input included in the audio data received by step 1804 may include 'We need to talk'. When the particular movement is associated with a gentle touch, the generated response may be attentive (for example, 'Is everything okay?') When the particular movement is associated with no touch, the generated response may be defensive (such as, 'What did I do?') For example, a conversational artificial intelligence model may be or include a machine learning model, as described above. Further, step 1806 may analyze the audio data received by step 1804 and/or the image data received by step 1805 to determine the particular distance and/or the particular spatial orientation and/or an indication of whether the particular movement causes a physical contact between at least part of the particular body and the particular object, for example using a semantic segmentation algorithm and/or a visual pose estimation algorithm. Further, step 1806 may use the machine learning model to analyze the audio data received by step 1804 and/or the image data received by step 1805 and/or the particular distance and/or the particular spatial orientation and/or the indication (for example, using the particular distance and/or the particular spatial orientation and/or the indication as additional information as described above) to generate the response.

Figure 19:
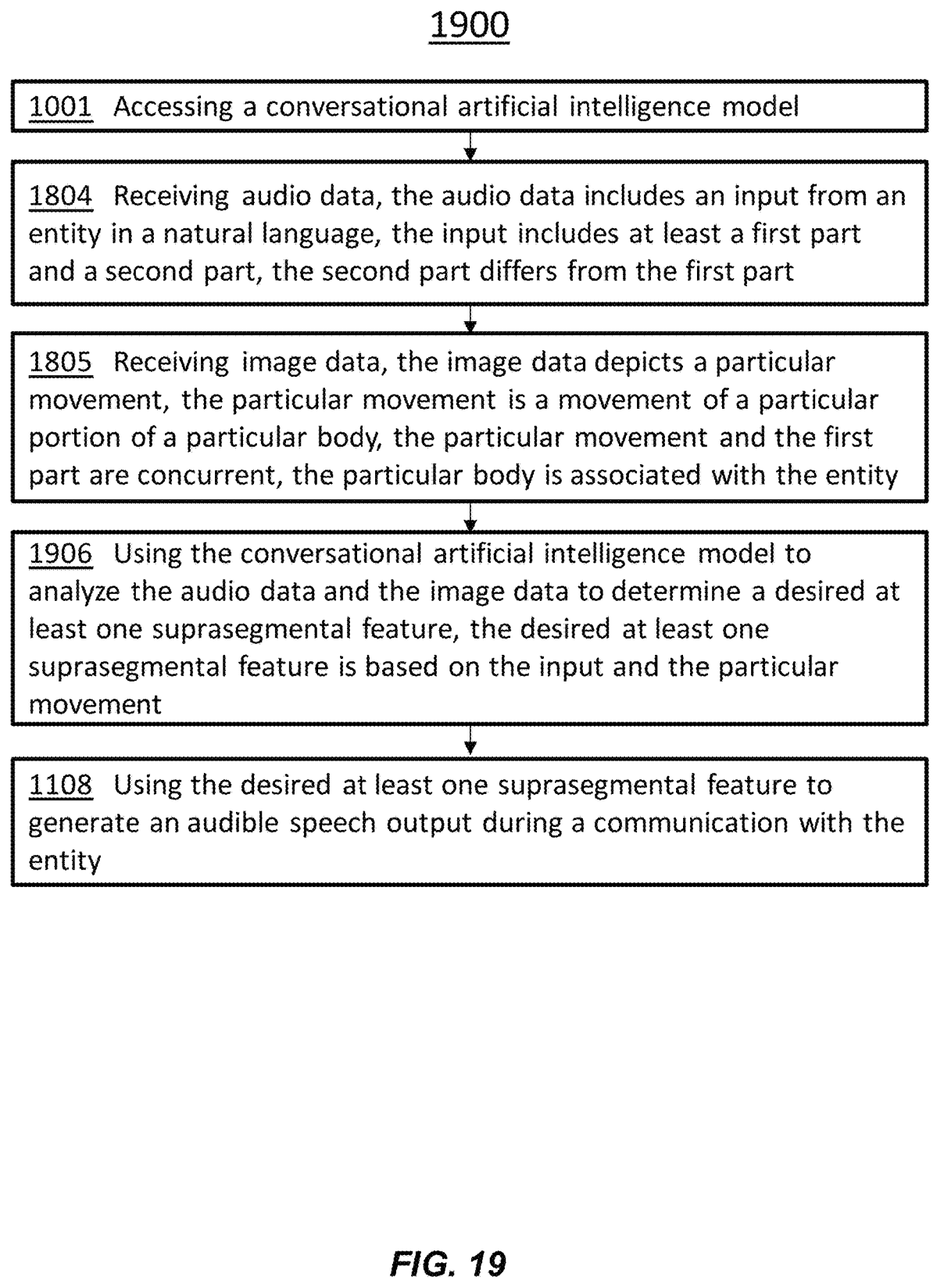

FIG. 19 is a flowchart of an exemplary process 1900 for using perceived body movements to control generated voice characteristics in conversational artificial intelligence, consistent with some embodiments of the present disclosure. In this example, process 1700 may comprise accessing a conversational artificial intelligence model (step 1001); receiving audio data (step 1804), the audio data includes an input from an entity in a natural language, the input includes at least a first part and a second part, the second part differs from the first part; receiving image data (step 1805), the image data depicts a particular movement, the particular movement is a movement of a particular portion of a particular body, the particular movement and the first part are concurrent, the particular body is associated with the entity; using the conversational artificial intelligence model to analyze the audio data and the image data to determine a desired at least one suprasegmental feature (step 1906), the desired at least one suprasegmental feature is based on the input and the particular movement; and using the desired at least one suprasegmental feature to generate an audible speech output during a communication with the entity (step 1108). In other examples, process 1900 may include additional steps or fewer steps. In other examples, one or more steps of process 1900 may be executed in a different order and/or one or more groups of steps may be executed simultaneously. In one example, the usage (by step 1108) of the desired at least one suprasegmental feature (determined by step 1906) may be associated with a desire to imitate a human individual. In another example, the usage (by step 1108) of the desired at least one suprasegmental feature (determined by step 1906) may not be associated with a specific human individual. In some examples, process 1900 may further comprise step 2106 described below. The desired movement determined by step 2106 may be based on the input and/or the particular movement. The specific body may differ from the particular body. Further, process 1900 may further comprise step 1308 described above. In one example, the audible speech output generated by step 1108 may include at least an articulation of a specific word (for example, a specific word included in the response generated by step 1806), and the digital signals generated by step 1308 may be configured to cause the desired movement during the articulation of the specific word, for example as described herein.

In some examples, a system for using perceived body movements to control generated voice characteristics in conversational artificial intelligence may include at least one processing unit configured to perform process 1900. In one example, the system may further comprise at least one audio sensor, and the receiving the audio data by step 1804 may include capturing the audio data using the at least one audio sensor. In one example, the system may further comprise at least one image sensor, and the receiving the image data by step 1805 may include capturing the image data using the at least one image sensor. In one example, the system may further comprise at least one audio speaker, and the generation of the audible speech output by step 1108 may include generating the audible speech output using the at least one audio speaker. In some examples, a method for using perceived body movements to control generated voice characteristics in conversational artificial intelligence may include performing process 1900. In some examples, a non-transitory computer readable medium may store computer implementable instructions that when executed by at least one processor may cause the at least one processor to perform operations for using perceived body movements to control generated voice characteristics in conversational artificial intelligence, and the operations may include the steps of process 1900.

In some examples, step 1906 may comprise using a conversational artificial intelligence model (such as the conversational artificial intelligence model accessed by step 1001, a different conversational artificial intelligence model, and so forth) to analyze audio data (such as the audio data received by step 1804, different audio data, etc.) and/or the image data (such as the image data received by step 1805, different image data, etc.) to determine a desired at least one suprasegmental feature. The desired at least one suprasegmental feature may be based on the input included in the audio data received by step 1804 and/or the particular movement of step 1805. In one example, a conversational artificial intelligence model may be or include a multimodal LLM, and step 1906 may use the multimodal LLM to analyze the audio data and/or the image data (for example with a suitable textual prompt, such as 'what suprasegmental features should be used when responding to the input from this audio in a communication with an individual, considering the movement of the individual depicted in this video') to determine the desired at least one suprasegmental feature. In another example, a conversational artificial intelligence model may be or include a machine learning model, and step 1906 may use the machine learning model to analyze the audio data and/or the image data and/or additional information to determine the desired at least one suprasegmental feature. The machine learning model may be a machine learning model trained using training examples to select suprasegmental features for responding to audio inputs while considering movements depicted in visual inputs. An example of such training example may include sample additional information and/or a sample audio input and/or a sample visual input, together with a sample desired suprasegmental feature for responding to the sample audio input that is based on a sample movement depicted in the sample visual input. In some examples, step 1906 may calculate a convolution of a fragment of the audio data associated with the first part to obtain a first plurality of numerical result values, may calculate a convolution of a fragment of the audio data associated with the second part to obtain a second plurality of numerical result values, may calculate a convolution of at least part of the image data to obtain a third plurality of numerical result values, may calculate a function of the first plurality of numerical result values, the second plurality of numerical result values and the third plurality of numerical result values to obtain a specific mathematical object in a mathematical space (for example using module 288), and may base the determination of the desired at least one suprasegmental feature on the specific mathematical object, for example as described above in relation to step 1106. In some examples, step 1906 may analyze the audio data to identify a first mathematical object in a mathematical space (for example, using module 284), may analyze the image data to identify a second mathematical object in the mathematical space (for example, using module 284), may calculate a function of the first mathematical object and the second mathematical object to obtain a specific mathematical object in the mathematical space (for example, using module 286), and may base the determination of the desired at least one suprasegmental feature on the specific mathematical object, for example as described above in relation to step 1106.

In some examples, the desired at least one suprasegmental feature determined by step 1906 may include at least one of intonation, stress, pitch, rhythm, tempo, loudness or prosody. In some examples, the desired at least one suprasegmental feature determined by step 1906 may include a desired intonation, the desired intonation may be based on the input included in the audio data received by step 1804 and/or the particular movement of step 1805, and the audible speech output generated by step 1108 may be based on the desired intonation. For example, the input included in the audio data received by step 1804 may include 'Look at that desert' and the audible speech output of step 1108 may include 'yes'. When the particular movement indicates that the input is said with excitement (for example, movement associated with wide eyes, raised eyebrows, leaning forward and/or energetic movement), the desired intonation may include rising pitch throughout the word ('Yes!') to mirror the excitement; and when the particular movement indicates that the input is said with melancholy (for example, movement associated with downcast eyes, slow movement and/or slouched posture), the desired intonation may include falling pitch to mirror the melancholy ('Ye-es'). In some examples, the desired at least one suprasegmental feature determined by step 1906 may include a desired stress, the desired stress may be based on the input included in the audio data received by step 1804 and/or the particular movement of step 1805, and the audible speech output generated by step 1108 may be based on the desired stress. In one example, stress may be the emphasis placed on specific syllables or words during speech. In some examples, the desired at least one suprasegmental feature determined by step 1906 may include a desired pitch, the desired pitch may be based on the input included in the audio data received by step 1804 and/or the particular movement of step 1805, and the audible speech output generated by step 1108 may be based on the desired pitch. In some examples, the desired at least one suprasegmental feature determined by step 1906 may include a desired rhythm, the desired rhythm may be based on the input included in the audio data received by step 1804 and/or the particular movement of step 1805, and the audible speech output generated by step 1108 may be based on the desired rhythm. In some examples, the desired at least one suprasegmental feature determined by step 1906 may include a desired tempo, the desired tempo may be based on the input included in the audio data received by step 1804 and/or the particular movement of step 1805, and the audible speech output generated by step 1108 may be based on the desired tempo. In some examples, the desired at least one suprasegmental feature determined by step 1906 may include a desired loudness, the desired loudness may be based on the input included in the audio data received by step 1804 and/or the particular movement of step 1805, and the audible speech output generated by step 1108 may be based on the desired loudness. In some examples, the desired at least one suprasegmental feature determined by step 1906 may include a desired prosody, the desired prosody may be based on the input included in the audio data received by step 1804 and/or the particular movement of step 1805, and the audible speech output generated by step 1108 may be based on the desired prosody. In some examples, a data-structure or an algorithm may associate body movement patterns with at least one of desired intonations, desired stresses, desired pitches, desired rhythms, desired tempos, desired loudness levels, or desired prosodies. Further, step 1906 may access the data-structure or use the algorithm based on the audio data and/or the image data and/or that particular movement and/or the particular portion of the particular body to select at least one of the desired intonation, the desired stress, the desired pitch, the desired rhythm, the desired tempo, the desired loudness, or the desired prosody. In one example, the data structure may be included in and/or the algorithm may be implemented by at least one artificial neuron, for example in at least one artificial neuron of an artificial neural network included in a conversational artificial intelligence model (such as the conversational artificial intelligence model accessed by step 1001, a different conversational artificial intelligence model, and so forth). In another example, the data structure may be included in a database and/or a memory. In yet another example, the algorithm may be implemented using a programming language.

In some examples, the first part of the input included in the audio data received by step 1804 may include at least a first word, the second part of the input may include at least a second word, and the second word may differ from the first word. Further, the desired at least one suprasegmental feature determined by step 1906 may be further based on the first word and/or the second word. For example, the input may include either 'This is a spoon' or 'This isn't a fork', the first part may include 'is' or 'isn't', the second part may include 'spoon' or 'fork', the particular movement of step 1805 may include either a pointing gesture at a spoon, a fork or a knife, and the audible speech output generated by step 1108 may include 'Okay'. When the input includes 'This is a spoon', if a spoon is pointed, the desired at least one suprasegmental feature may indicate that the 'Okay' means 'Correct', and if a fork or a knife is pointed, the desired at least one suprasegmental feature may indicate that the 'Okay' means 'Try again'. When the input includes 'This isn't a fork', the desired at least one suprasegmental feature may indicate that the 'Okay' means 'Correct', and if a fork is pointed, the desired at least one suprasegmental feature may indicate that the 'Okay' means 'Try again'. To convey that the 'Okay' means correct, the desired at least one suprasegmental feature may include rising intonation, and to convey that the 'Okay' means 'Try again', the desired at least one suprasegmental feature may include flat or falling intonation. In some examples, the first part of the input included in the audio data received by step 1404 may include at least a first non-verbal sound, the second part of the input may include at least a second non-verbal sound, and the second non-verbal sound may differ from the first non-verbal sound. Further, the desired at least one suprasegmental feature determined by step 1906 may be further based on the first non-verbal sound and/or the second non-verbal sound. In some examples, the first part of the input included in the audio data received by step 1804 may include at least a particular word, and the second part of the input may include at least a particular non-verbal sound. Further, the desired at least one suprasegmental feature determined by step 1906 may be further based on the particular word and the particular non-verbal sound. For example, a conversational artificial intelligence model may be or include a machine learning model, as described above, and step 1906 may use the machine learning model to analyze the audio data and/or the image data and/or the words and/or the non-verbal sounds (for example, using the words and/or the non-verbal sounds as additional information as described above) to determine the desired at least one suprasegmental feature.

In some examples, the particular movement of step 1805 may be associated with a particular emotion of the entity, and the desired at least one suprasegmental feature determined by step 1906 may be further based on the particular emotion. In some examples, the particular movement of step 1805 may be associated with a particular level of empathy of the entity, and the desired at least one suprasegmental feature determined by step 1906 may be further based on the particular level of empathy. In some examples, the particular movement of step 1805 may be associated with a particular level of self-assurance of the entity, and the desired at least one suprasegmental feature determined by step 1906 may be further based on the particular level of self-assurance. Some non-limiting examples of such level of self-assurance may include confidence, uncertainty, and so forth. In some examples, the particular movement of step 1805 may be associated with a particular level of formality, and the desired at least one suprasegmental feature determined by step 1906 may be further based on the particular level of formality. In some examples, the particular movement of step 1805 may be associated with a particular gesture, and the desired at least one suprasegmental feature determined by step 1906 may be further based on the particular gesture. In some examples, the particular movement of step 1805 may be associated with a particular facial expression, and the desired at least one suprasegmental feature determined by step 1906 may be further based on the particular facial expression. In some examples, the particular movement of step 1805 may be associated with a particular posture, and the desired at least one suprasegmental feature determined by step 1906 may be further based on the particular posture. For example, a conversational artificial intelligence model may be or include a machine learning model, as described above. Further, step 1906 may analyze the audio data received by step 1804 and/or the image data received by step 1805 to determine the particular emotion and/or the particular level of empathy and/or the particular level of self-assurance and/or the particular level of formality and/or the particular gesture and/or the particular facial expression and/or the particular posture, for example as described above. Further, step 1906 may use the machine learning model to analyze the audio data received by step 1804 and/or the image data received by step 1805 and/or the particular emotion and/or the particular level of empathy and/or the particular level of self-assurance and/or the particular level of formality and/or the particular gesture and/or the particular facial expression and/or the particular posture (for example, using the particular emotion and/or the particular level of empathy and/or the particular level of self-assurance and/or the particular level of formality and/or the particular gesture and/or the particular facial expression and/or the particular posture as additional information as described above) to determine the desired at least one suprasegmental feature.

In some examples, the particular movement of step 1805 may create a particular distance between at least part of the particular body and a particular object and/or may a particular spatial orientation between at least part of the particular body and a particular object, and the desired at least one suprasegmental feature determined by step 1906 may be further based on the particular distance and/or on the particular spatial orientation. In some examples, the desired at least one suprasegmental feature determined by step 1906 may be further based on whether the particular movement causes a physical contact between at least part of the particular body and a particular object. For example, the particular object may be a body associated with the conversational artificial intelligence model. In another example, the particular object may be an inanimate object. In yet another example, the particular object may be an animate object. For example, the particular object may be a first box, the first box may be much heavier than a second box, the input included in the audio data received by step 1804 may include 'Can you grab the other side?', and the audible speech output generated by step 1108 may include 'Sure'. When the particular body is closer to the first box than to the second box, or when the particular body is at substantially even distances to both and faced to the first box, the desired at least one suprasegmental feature may include wavering pitch to imply doubt or hesitation about the capability to handle the task. When the particular body is closer to the second box than to the first box, or when the particular body is at substantially even distances to both and faced to the second box, the desired at least one suprasegmental feature may include higher pitch and/or fast speaking pace to indicate positive and energetic agreement. In another example, the particular object may be a body associated with the conversational artificial intelligence model, the input included in the audio data received by step 1804 may include 'We need to talk', and the audible speech output generated by step 1108 may include 'What's up?' When the particular movement is associated with a gentle touch, the desired at least one suprasegmental feature may convey attentiveness (for example, calm tone and/or slightly rising intonation). When the particular movement is associated with no touch, the desired at least one suprasegmental feature may convey defensiveness (for example, abrupt tone and/or falling intonation). For example, a conversational artificial intelligence model may be or include a machine learning model, as described above. Further, step 1906 may analyze the audio data received by step 1804 and/or the image data received by step 1805 to determine the particular distance and/or the particular spatial orientation and/or an indication of whether the particular movement causes a physical contact between at least part of the particular body and the particular object, for example using a semantic segmentation algorithm and/or a visual pose estimation algorithm. Further, step 1906 may use the machine learning model to analyze the audio data received by step 1804 and/or the image data received by step 1805 and/or the particular distance and/or the particular spatial orientation and/or the indication (for example, using the particular distance and/or the particular spatial orientation and/or the indication as additional information as described above) to determine the desired at least one suprasegmental feature.

Figure 20:
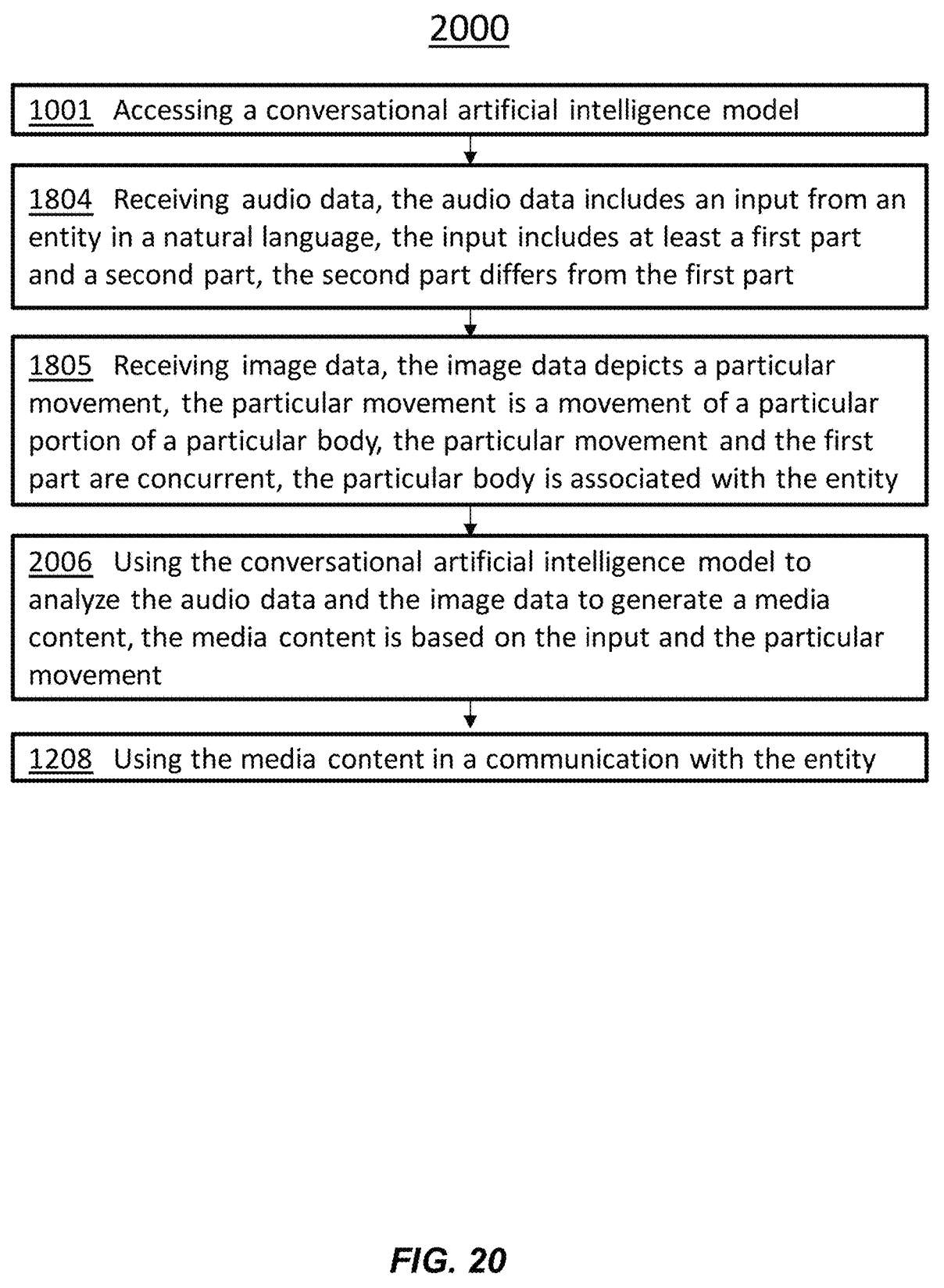

FIG. 20 is a flowchart of an exemplary process 2000 for using perceived body movements to control media content generation via conversational artificial intelligence, consistent with some embodiments of the present disclosure. In this example, process 1700 may comprise accessing a conversational artificial intelligence model (step 1001); receiving audio data (step 1804), the audio data includes an input from an entity in a natural language, the input includes at least a first part and a second part, the second part differs from the first part; receiving image data (step 1805), the image data depicts a particular movement, the particular movement is a movement of a particular portion of a particular body, the particular movement and the first part are concurrent, the particular body is associated with the entity; using the conversational artificial intelligence model to analyze the audio data and the image data to generate a media content (step 2006), the media content is based on the input and the particular movement; and using the media content in a communication with the entity (step 1208). In other examples, process 2000 may include additional steps or fewer steps. In other examples, one or more steps of process 2000 may be executed in a different order and/or one or more groups of steps may be executed simultaneously. In one example, the media content generated by step 2006 may be associated with a desire to imitate a human individual. In another example, the media content generated by step 2006 may not be associated with a specific human individual. In some examples, process 2000 may further comprise step 1906 described above. The desired at least one supraseg- mental feature determined by step 1906 may be based on the input included in the audio data received by step 1804 and/or the particular movement of step 1805. Further, step 2006 may use the desired at least one suprasegmental feature determined by step 1906 to generate an audible speech in the media content, for example as described above. In some examples, process 2000 may further comprise step 2106 described below. The desired movement determined by step 2106 may be based on the input included in the audio data received by step 1804 and/or the particular movement of step 1805. The specific body may differ from the particular body. Further, step 2006 may use the desired movement (determined by step 2106) for the specific portion of the specific body to generate a visual depiction of the desired movement to the specific portion of the specific in the media content, for example as described in relation to step 1308.

In some examples, a system for using perceived body movements to control media content generation via conver- sational artificial intelligence may include at least one pro- cessing unit configured to perform process 2000. In one example, the system may further comprise at least one audio sensor, and the receiving the audio data by step 1804 may include capturing the audio data using the at least one audio sensor. In one example, the system may further comprise at least one image sensor, and the receiving the image data by step 1805 may include capturing the image data using the at least one image sensor. In one example, the system may further comprise at least one visual presentation device, the media content generated by step 2006 may include a visual content, and the using the media content by step 1208 may include using the at least one visual presentation device to present the visual content. In one example, the system may further comprise at least one audio speaker, the media content generated by step 2006 may include an audible content, and the using the media content by step 1208 may include outputting the audible content using the at least one audio speaker. In some examples, a method for using perceived body movements to control media content gen- eration via conversational artificial intelligence may include performing process 2000. In some examples, a non-transi- tory computer readable medium may store computer imple- mentable instructions that when executed by at least one processor may cause the at least one processor to perform operations for using perceived body movements to control media content generation via conversational artificial intel- ligence, and the operations may include the steps of process 2000.

In some examples, step 2006 may comprise using a conversational artificial intelligence model (such as the conversational artificial intelligence model accessed by step 1001, a different conversational artificial intelligence model, and so forth) to analyze audio data (such as the audio data received by step 1804, different audio data, etc.) and/or the image data (such as the image data received by step 1805, different image data, etc.) to generate a media content. The media content may be based on the input included in the audio data received by step 1804 and/or the particular movement of step 1805. In one example, a conversational artificial intelligence model may be or include a multimodal LLM, and step 2006 may use the multimodal LLM to analyze the audio data and/or the image data (for example with a suitable textual prompt, such as 'generate a {desired type of media content} for {type of intendent usage} in a communication with an individual, when responding to the input from this audio, considering the movement of the individual depicted in this video') to generate the media content. In another example, a conversational artificial intel- ligence model may be or include a machine learning model, and step 2006 may use the machine learning model to analyze the audio data and/or the image data and/or addi- tional information to generate the media content. The machine learning model may be a machine learning model trained using training examples to generate media contents in response to audio inputs while considering movements depicted in visual inputs. An example of such training example may include sample additional information and/or a sample audio input and/or a sample visual input, together with a sample media content corresponding to the sample audio input and based on a sample movement depicted in the sample visual input. In some examples, step 2006 may calculate a convolution of a fragment of the audio data associated with the first part to obtain a first plurality of numerical result values, may calculate a convolution of a fragment of the audio data associated with the second part to obtain a second plurality of numerical result values, may calculate a convolution of at least part of the image data to obtain a third plurality of numerical result values, may calculate a function of the first plurality of numerical result values, the second plurality of numerical result values and the third plurality of numerical result values to obtain a specific mathematical object in a mathematical space (for example using module 288), and may base the generation of the media content on the specific mathematical object, for example as described above in relation to step 1206. In some examples, step 2006 may analyze the audio data to identify a first mathematical object in a mathematical space (for example, using module 284), may analyze the image data to identify a second mathematical object in the mathematical space (for example, using module 284), may calculate a function of the first mathematical object and the second mathematical object to obtain a specific mathematical object in the mathematical space (for example, using module 286), and may base the generation of the media content on the specific mathematical object, for example as described above in relation to step 1206.

In some examples, the first part of the input included in the audio data received by step 1804 may include at least a first word, the second part of the input may include at least a second word, and the second word may differ from the first word. Further, the media content generated by step 2006 may be further based on the first word and/or the second word. For example, the input may include either 'a baby mimicking this facial expression' or 'a teenager mimicking this hand gesture', the first part may include 'this facial expression' or 'this hand gesture', the second part may include 'a baby' or 'a teenager', the particular movement of step 1805 may be associated with either creating a particular facial expression or performing a particular hand gesture, and the generated media content may depicts either a baby with the particular facial expression, or a teenager perform- ing the particular hand gesture. In some examples, the first part of the input included in the audio data received by step 1404 may include at least a first non-verbal sound, the second part of the input may include at least a second non-verbal sound, and the second non-verbal sound may differ from the first non-verbal sound. Further, the media content generated by step 2006 may be further based on the first non-verbal sound and/or the second non-verbal sound. In some examples, the first part of the input included in the audio data received by step 1804 may include at least a particular word, and the second part of the input may include at least a particular non-verbal sound. Further, the media content generated by step 2006 may be further based on the particular word and the particular non-verbal sound. For example, a conversational artificial intelligence model may be or include a machine learning model, as described above, and step 2006 may use the machine learning model to analyze the audio data and/or the image data and/or the words and/or the non-verbal sounds (for example, using the words and/or the non-verbal sounds as additional information as described above) to generate the media content.

In some examples, the particular movement of step 1805 may be associated with a particular emotion of the entity, and the media content generated by step 2006 may be further based on the particular emotion. In some examples, the particular movement of step 1805 may be associated with a particular level of empathy of the entity, and the media content generated by step 2006 may be further based on the particular level of empathy. In some examples, the particular movement of step 1805 may be associated with a particular level of self-assurance of the entity, and the media content generated by step 2006 may be further based on the particular level of self-assurance. Some non-limiting examples of such level of self-assurance may include confidence, uncertainty, and so forth. In some examples, the particular movement of step 1805 may be associated with a particular level of formality, and the media content generated by step 2006 may be further based on the particular level of formality. In some examples, the particular movement of step 1805 may be associated with a particular gesture, and the media content generated by step 2006 may be further based on the particular gesture. In some examples, the particular movement of step 1805 may be associated with a particular facial expression, and the media content generated by step 2006 may be further based on the particular facial expression. In some examples, the particular movement of step 1805 may be associated with a particular posture, and the media content generated by step 2006 may be further based on the particular posture. For example, a conversational artificial intelligence model may be or include a machine learning model, as described above. Further, step 2006 may analyze the audio data received by step 1804 and/or the image data received by step 1805 to determine the particular emotion and/or the particular level of empathy and/or the particular level of self-assurance and/or the particular level of formality and/or the particular gesture and/or the particular facial expression and/or the particular posture, for example as described above. Further, step 2006 may use the machine learning model to analyze the audio data received by step 1804 and/or the image data received by step 1805 and/or the particular emotion and/or the particular level of empathy and/or the particular level of self-assurance and/or the particular level of formality and/or the particular gesture and/or the particular facial expression and/or the particular posture (for example, using the particular emotion and/or the particular level of empathy and/or the particular level of formality and/or self-assurance and/or the particular level of formality and/or the particular gesture and/or the particular facial expression and/or the particular posture as additional information as described above) to generate the media content.

In some examples, the particular movement of step 1805 may create a particular distance between at least part of the particular body and a particular object and/or may a particular spatial orientation between at least part of the particular body and a particular object, and the media content generated by step 2006 may be further based on the particular distance and/or on the particular spatial orientation. In some examples, the media content generated by step 2006 may be further based on whether the particular movement causes a physical contact between at least part of the particular body and a particular object. For example, the particular object may be a body associated with the conversational artificial intelligence model. In another example, the particular object may be an inanimate object. In yet another example, the particular object may be an animate object.

FIG. 21 is a flowchart of an exemplary process 2100 for using perceived body movements to control generated body movements via conversational artificial intelligence, consistent with some embodiments of the present disclosure. In this example, process 1700 may comprise accessing a conversational artificial intelligence model (step 1001); receiving audio data (step 1804), the audio data includes an input from an entity in a natural language, the input includes at least a first part and a second part, the second part differs from the first part; receiving image data (step 1805), the image data depicts a particular movement, the particular movement is a movement of a particular portion of a particular body, the particular movement and the first part are concurrent, the particular body is associated with the entity; using the conversational artificial intelligence model to analyze the audio data and the image data to determine a desired movement for a specific portion of a specific body (step 2106), the desired movement is based on the input and the particular movement, the specific body differs from the particular body; and generating digital signals (step 1308), the digital signals are configured to cause the desired movement to the specific portion of the specific body during an interaction with the entity. In other examples, process 2100 may include additional steps or fewer steps. In other examples, one or more steps of process 2100 may be executed in a different order and/or one or more groups of steps may be executed simultaneously. In one example, the desired movement determined by step 2106 may be associated with a desire to imitate a human individual. In another example, the desired movement determined by step 2106 may not be associated with a specific human individual. In one example, the specific portion may include at least one of a hand, arm, head, face, torso or leg of the specific body. In another example, the specific portion may include at least part of a hand, an arm, a head, a face, a torso, or a leg of the specific body.

In some examples, a system for using perceived body movements to control generated body movements via conversational artificial intelligence may include at least one processing unit configured to perform process 2100. In one examples, the system may further comprise the specific body of process 2100. For example, the specific body may include the at least one processing unit. In another example, the at least one processing unit may be external to the specific body. In one example, the specific body may include one or more actuators (such as motors and/or servos configured to cause motions to different parts of the specific body). The digital signals generated by step 1308 may be configured to control the one or more actuators to cause the desired movement to the specific portion of the specific body during the interaction with the entity, for example as described herein. In one example, the system may further comprise at least one audio sensor, and the receiving the audio data by step 1804 may include capturing the audio data using the at least one audio sensor. In one example, the system may further comprise at least one image sensor, and the receiving the image data by step 1805 may include capturing the image data using the at least one image sensor. In some examples, a method for using perceived body movements to control generated body movements via conversational artificial intelligence may include performing process 2100. In some examples, a non-transitory computer readable medium may store computer implementable instructions that when executed by at least one processor may cause the at least one processor to perform operations for using perceived body movements to control generated body movements via conversational artificial intelligence, and the operations may include the steps of process 2100.

In some examples, step 2106 may comprise using a conversational artificial intelligence model (such as the conversational artificial intelligence model accessed by step 1001, a different conversational artificial intelligence model, and so forth) to analyze audio data (such as the audio data received by step 1804, different audio data, etc.) and/or the image data (such as the image data received by step 1805, different image data, etc.) to determine a desired movement for a specific portion of a specific body. The desired movement may be based on the input included in the audio data received by step 1804 and/or the particular movement of step 1805. The specific body may differ from the particular body of step 1805 and/or step 2106. In one example, a conversational artificial intelligence model may be or include a multimodal LLM, and step 2106 may use the multimodal LLM to analyze the audio data and/or the image data (for example with a suitable textual prompt, such as 'what is a likely movement in response to the input from an individual in this audio, considering the movement of the individual depicted in this video') to determine the desired movement for the specific portion of the specific body. In another example, a conversational artificial intelligence model may be or include a machine learning model, and step 2106 may use the machine learning model to analyze the audio data and/or the image data and/or additional information to determine the desired movement for the specific portion of the specific body. The machine learning model may be a machine learning model trained using training examples to determine desired movements in response to audio inputs while considering movements depicted in visual inputs. An example of such training example may include sample additional information and/or a sample audio input and/or a sample visual input, together with a sample desired movement for responding to the sample audio input and based on a sample movement depicted in the sample visual input. In some examples, step 2106 may calculate a convolution of a fragment of the audio data associated with the first part to obtain a first plurality of numerical result values, may calculate a convolution of a fragment of the audio data associated with the second part to obtain a second plurality of numerical result values, may calculate a convolution of at least part of the image data to obtain a third plurality of numerical result values, may calculate a function of the first plurality of numerical result values, the second plurality of numerical result values and the third plurality of numerical result values to obtain a specific mathematical object in a mathematical space (for example using module 288), and may base the determination of the desired movement on the specific mathematical object, for example as described above in relation to step 1306. In some examples, step 2106 may analyze the audio data to identify a first mathematical object in a mathematical space (for example, using module 284), may analyze the image data to identify a second mathematical object in the mathematical space (for example, using module 284), may calculate a function of the first mathematical object and the second mathematical object to obtain a specific mathematical object in the mathematical space (for example, using module 286), and may base the determination of the desired movement on the specific mathematical object, for example as described above in relation to step 1306.

In some examples, the first part of the input included in the audio data received by step 1804 may include at least a first word, the second part of the input may include at least a second word, and the second word may differ from the first word. Further, the desired movement determined by step 2106 may be further based on the first word and/or the second word. For example, the input may include either 'mimic this hand gesture while laughing' or 'mimic this facial expression while walking', the first part may include 'this hand gesture' or 'this facial expression', the second part may include 'while laughing' or 'while walking', the particular movement of step 1805 may be associated with either performing a particular hand gesture or creating a particular facial expression, and the desired movement may be associated with mimicking the particular hand gesture or the particular facial expression while laughing or walking. In some examples, the first part of the input included in the audio data received by step 1404 may include at least a first non-verbal sound, the second part of the input may include at least a second non-verbal sound, and the second non-verbal sound may differ from the first non-verbal sound. Further, the desired movement determined by step 2106 may be further based on the first non-verbal sound and/or the second non-verbal sound. In some examples, the first part of the input included in the audio data received by step 1804 may include at least a particular word, and the second part of the input may include at least a particular non-verbal sound. Further, the desired movement determined by step 2106 may be further based on the particular word and the particular non-verbal sound. For example, a conversational artificial intelligence model may be or include a machine learning model, as described above, and step 2106 may use the machine learning model to analyze the audio data and/or the image data and/or the words and/or the non-verbal sounds (for example, using the words and/or the non-verbal sounds as additional information as described above) to determine the desired movement.

In some examples, the particular movement of step 1805 may be associated with a particular emotion of the entity, and the desired movement determined by step 2106 may be further based on the particular emotion. In some examples, the particular movement of step 1805 may be associated with a particular level of empathy of the entity, and the desired movement determined by step 2106 may be further based on the particular level of empathy. In some examples, the particular movement of step 1805 may be associated with a particular level of self-assurance of the entity, and the desired movement determined by step 2106 may be further based on the particular level of self-assurance. Some non-limiting examples of such level of self-assurance may include confidence, uncertainty, and so forth. In some examples, the particular movement of step 1805 may be associated with a particular level of formality, and the desired movement determined by step 2106 may be further based on the particular level of formality. In some examples, the particular movement of step 1805 may be associated with a particular gesture, and the desired movement determined by step 2106 may be further based on the particular gesture. In some examples, the particular movement of step 1805 may be associated with a particular facial expression, and the desired movement determined by step 2106 may be further based on the particular facial expression. In some examples, the particular movement of step 1805 may be associated with a particular posture, and the desired movement determined by step 2106 may be further based on the particular posture. For example, a conversational artificial intelligence model may be or include a machine learning model, as described above. Further, step 2106 may analyze the audio data received by step 1804 and/or the image data received by step 1805 to determine the particular emotion and/or the particular level of empathy and/or the particular level of self-assurance and/or the particular level of formality and/or the particular gesture and/or the particular facial expression and/or the particular posture, for example as described above. Further, step 2106 may use the machine learning model to analyze the audio data received by step 1804 and/or the image data received by step 1805 and/or the particular emotion and/or the particular level of empathy and/or the particular level of self-assurance and/or the particular level of formality and/or the particular gesture and/or the particular facial expression and/or the particular posture (for example, using the particular emotion and/or the particular level of empathy and/or the particular level of self-assurance and/or the particular level of formality and/or the particular gesture and/or the particular facial expression and/or the particular posture as additional information as described above) to determine the desired movement.

In some examples, the particular movement of step 1805 may create a particular distance between at least part of the particular body and a particular object and/or may a particular spatial orientation between at least part of the particular body and a particular object, and the desired movement determined by step 2106 may be further based on the particular distance and/or on the particular spatial orientation. In some examples, the desired movement determined by step 2106 may be further based on whether the particular movement causes a physical contact between at least part of the particular body and a particular object. For example, the particular object may be a body associated with the conversational artificial intelligence model. In another example, the particular object may be an inanimate object. In yet another example, the particular object may be an animate object. For example, the particular object may be a baby stroller, the input included in the audio data received by step 1804 may include 'Can you grab the other side?' When the particular body is closer to the back handle of the stroller than to the front foot rest, or when the particular body is at substantially even distances to both (standing to the side of the stroller) and faced to the back handle, the input may be understood as a request to grab the front foot rest, and the desired movement may be associated with tilting the head to indicate refusal (for example, with an audible response 'My back hurts, I can't reach down so low'. When the particular body is closer to the front foot rest of the stroller than to the back handle, or when the particular body is at substantially even distances to both (standing to the side of the stroller) and faced to the front foot rest, the input may be understood as a request to grab the back handle, and the desired movement may be associated with grabbing the back handle. In another example, the particular object may be a body associated with the conversational artificial intelligence model, the input included in the audio data received by step 1804 may include 'We need to talk'. When the particular movement is associated with a gentle touch, the desired movement may convey attentiveness (for example, nodding, smiling, slightly leaning forward, and/or raised eyebrows). When the particular movement is associated with no touch, the desired movement may convey defensiveness (for example, tightened lips, narrowed eyes, raised chin, and/or crossed arms). For example, a conversational artificial intelligence model may be or include a machine learning model, as described above. Further, step 2106 may analyze the audio data received by step 1804 and/or the image data received by step 1805 to determine the particular distance and/or the particular spatial orientation and/or an indication of whether the particular movement causes a physical contact between at least part of the particular body and the particular object, for example using a semantic segmentation algorithm and/or a visual pose estimation algorithm. Further, step 2106 may use the machine learning model to analyze the audio data received by step 1804 and/or the image data received by step 1805 and/or the particular distance and/or the particular spatial orientation and/or the indication (for example, using the particular distance and/or the particular spatial orientation and/or the indication as additional information as described above) to determine the desired movement.

In some examples, the desired movement determined by step 2106 may be configured to cause the specific body to perform a gesture, for example as described above. Further, the gesture may be based on the input included in the audio data received by step 1804 and/or the particular movement of step 1805, for example as described herein. In some examples, the desired movement determined by step 2106 may be configured to cause the specific body to produce a facial expression, for example as described above. Further, the facial expression may be based on the input included in the audio data received by step 1804 and/or the particular movement of step 1805, for example as described herein. In some examples, the desired movement determined by step 2106 may be configured to create a selected distance between at least part the specific body and at least part of the particular body, for example as described above. Further, the distance may be based on the input included in the audio data received by step 1804 and/or the particular movement of step 1805, for example as described herein. For example, when the particular movement is associated with friendliness (for example, associated with smiling, open posture, gentle touch, and/or mirroring), the selected distance may be shorter, and when the particular movement is associated with aggressiveness (for example, associated with clenched fists, tense jaw, and/or crossed arms), the selected distance may be longer. In some examples, the desired movement determined by step 2106 may be configured to create a selected spatial orientation between at least part the specific body and at least part of the particular body, for example as described above. Further, and the spatial orientation may be based on the input included in the audio data received by step 1804 and/or the particular movement of step 1805, for example as described herein. For example, when the particular movement is associated with an engagement (for example, associated with leaning forward, nodding, raising eyebrows and/or reflecting emotional engagement), the spatial orientation may direct the specific body directly towards the entity, and when the particular movement is associated with lack of excitement (for example, associated with slumped posture, crossed arms, minimal face expression, and/or fidgeting), the spatial orientation may direct the specific body away from the entity. In some examples, the desired movement determined by step 2106 may serve a goal, for example as described above. Further, the goal may be based on the input included in the audio data received by step 1804 and/or the particular movement of step 1805, for example as described herein. For example, when the particular movement conveys sadness (for example, associated with downcast eyes, slower movements, lack of facial expression and/or tearfulness), the goal may be to comfort the entity, and the desired movement may be associated with nodding and/or gentle touch; and when the particular movement conveys excitement (for example, associated with wide eyes, raised eyebrows, energetic movements, and/or leaning forward), the goal may be to mirror the excitement. In some examples, a data-structure or an algorithm may associate inputs in natural languages and/or input movements with at least one of desired gesture, desired facial expression, desired distance, desired spatial orientation, or goal. Further, step 2106 may access the data-structure or use the algorithm based on the input and/or based on the particular movement to select at least one of the gesture, facial expression, distance, spatial orientation, or goal. In one example, the data structure may be included in and/or the algorithm may be implemented by at least one artificial neuron, for example in at least one artificial neuron of an artificial neural network included in a conversational artificial intelligence model (such as the conversational artificial intelligence model accessed by step 1001, a different conversational artificial intelligence model, and so forth). In another example, the data structure may be included in a database and/or a memory. In yet another example, the algorithm may be implemented using a programming language.

In some examples, the desired movement may be configured to perform a particular manipulation of a particular object. In some examples, the input included in the audio data received by step 1804 may be indicative of a desire of the entity for the specific body to perform a particular manipulation of a particular object, for example as described above in relation to step 1306. In one example, step 2106 may determine to perform the particular manipulation of the particular object based on the input included in the audio data received by step 1804 and/or the particular movement of step 1805, and in response to the determination, the desired movement determined by step 2106 may be configured to cause the particular manipulation of the particular object. In another example, step 2106 may determine not to perform the particular manipulation of the particular object based on the input included in the audio data received by step 1804 and/or the particular movement of step 1805, and in response to the determination, the desired movement determined by step 2106 may be configured not to cause the particular manipulation of the particular object. For example, a data-structure or an algorithm may associate input in a natural language and/or specific objects and/or specific manipulations of the specific objects and/or movements with determinations of whether to perform the specific manipulations. Further, step 1706 may access the data-structure or use the algorithm based on the audio data and/or based on the particular movement to determine whether to perform the particular manipulation of the particular object. In one example, the data structure may be included in and/or the algorithm may be implemented by at least one artificial neuron, for example in at least one artificial neuron of an artificial neural network included in a conversational artificial intelligence model (such as the conversational artificial intelligence model accessed by step 1001, a different conversational artificial intelligence model, and so forth). In another example, the data structure may be included in a database and/or a memory. In yet another example, the algorithm may be implemented using a programming language. In one example, the particular manipulation may include bringing the particular object to the entity. In another example, the particular manipulation may include changing a state of the particular object to a particular state. For example, the particular object may be a device (such as an electric device, a mechanical device, etc.) with an off-state and an on-state, and the particular manipulation may include changing the state from the off-state to the on-state or changing the state from the on-state to the off-state. In another example, the particular object may be an object with an open-state and a closed-state (such as a door, a gate, a window, a container, a lock, etc.), and the particular manipulation may include changing the state from the open-state to the closed-state or changing the state from the closed-state to the open-state. In one example, the desired movement may include a physical contact with the particular object to cause the particular manipulation to the particular object. In another example, the desired movement may include a physical contact with a specific object to cause the particular manipulation to the particular object, and no physical contact with the particular object.

In some examples, step 2106 may further comprise using a conversational artificial intelligence model (such as the conversational artificial intelligence model accessed by step 1001, a different conversational artificial intelligence model, and so forth) to analyze the audio data received by step 1804 and/or the image data received by step 1805 to select the specific portion of the specific body. The specific portion may be based on the input included in the audio data and/or the particular movement of step 1805. In one example, a conversational artificial intelligence model may be or include a multimodal LLM, and step 2106 may use the LLM to analyze the audio data and the image data (for example with a suitable textual prompt, such as 'what part of your body is likely to move in response to the input from this audio, considering the body language depicted in this video') to select the specific portion of the specific body. In another example, a conversational artificial intelligence model may be or include a machine learning model, and step 2106 may use the machine learning model to analyze the audio data and/or the image data and/or additional information to select the specific portion of the specific body. The machine learning model may be a machine learning model trained using training examples to select portions of a body based on inputs included in audio data and/or movements depicted in image data and/or additional information. An example of such training example may include sample audio data including speech in a sample natural language, sample image data depicting sample movements, and sample additional information, together with a sample desired selection of a portion of a sample body for movement in response to the speech and the sample movements.

In some examples, the image data received by step 1805 may be analyzed, for example using a visual classification algorithm, to determine whether the particular movement of step 1805 causes a particular manipulation of a particular object. In some examples, the response generated by step 1806 may be further based on whether the particular movement of step 1805 causes a particular manipulation of a particular object. For example, a conversational artificial intelligence model may be or include a machine learning model, as described above in relation to step 1806, and step 1806 may use the machine learning model to analyze the audio data received by step 1804 and/or the image data received by step 1805 and/or an indication of whether the particular movement caused the particular manipulation of the particular object and/or an indication of the particular object and/or an indication of the particular manipulation (for example, using the indications as additional information as described above) to generate the response. In some examples, the desired at least one suprasegmental feature determined by step 1906 may be further based on whether the particular movement of step 1805 causes a particular manipulation of a particular object. For example, a conversational artificial intelligence model may be or include a machine learning model, as described above in relation to step 1906, and step 1906 may use the machine learning model to analyze the audio data received by step 1804 and/or the image data received by step 1805 and/or an indication of whether the particular movement caused the particular manipulation of the particular object and/or an indication of the particular object and/or an indication of the particular manipulation (for example, using the indications as additional information as described above) to determine the desired at least one suprasegmental feature. In some examples, the media content generated by step 2006 may be further based on whether the particular movement of step 1805 causes a particular manipulation of a particular object. For example, a conversational artificial intelligence model may be or include a machine learning model, as described above in relation to step 2006, and step 2006 may use the machine learning model to analyze the audio data received by step 1804 and/or the image data received by step 1805 and/or an indication of whether the particular movement caused the particular manipulation of the particular object and/or an indication of the particular object and/or an indication of the particular manipulation (for example, using the indications as additional information as described above) to generate the media content. In some examples, the desired movement determined by step 2106 may be further based on whether the particular movement of step 1805 causes a particular manipulation of a particular object. For example, a conversational artificial intelligence model may be or include a machine learning model, as described above in relation to step 2106, and step 2106 may use the machine learning model to analyze the audio data received by step 1804 and/or the image data received by step 1805 and/or an indication of whether the particular movement caused the particular manipulation of the particular object and/or an indication of the particular object and/or an indication of the particular manipulation (for example, using the indications as additional information as described above) to determine the desired movement. In some examples, the particular manipulation may include grabbing the particular object. In another example, the particular manipulation may include changing a state of the particular object to a particular state. For example, the particular object may be a device (such as an electric device, a mechanical device, etc.) with an off-state and an on-state, and the particular manipulation may include changing the state from the off-state to the on-state or changing the state from the on-state to the off-state. In another example, the particular object may be an object with an open-state and a closed-state (such as a door, a gate, a window, a container, a lock, etc.), and the particular manipulation may include changing the state from the open-state to the closed-state or changing the state from the closed-state to the open-state.

In one example, the particular movement of step 1805 may indicate that the input included in the audio data received by step 1804 is a humoristic remark. In another example, the particular movement of step 1805 may indicate that the input included in the audio data received by step 1804 is an offensive remark. In yet another example, the particular movement of step 1805 may indicate that the input included in the audio data received by step 1804 is a friendly remark. For example, the input included in the audio data received by step 1804 may include 'Aren't you special'. When the particular movement is associated with a playful grin and/or a wink, it may indicate that the input is a humoristic remark; when the particular movement is associated with an eye roll and/or crossed arms, it may indicate that the input is an offensive remark; and when the particular movement is associated with a nod of approval and/or a gentle pat on the back, it may indicate that the input is a friendly remark. In one example, a classification algorithm may be used to determine whether the particular movement indicates that the input is a humoristic remark, offensive remark, or friendly remark. For example, the classification algorithm may classify the audio data received by step 1804 and/or the image data received by step 1805 to a selected class of a plurality of classes, where each class of the plurality of classes may correspond to a humoristic remark, offensive remark, or friendly remark. In some examples, the response generated by step 1806 may be further based on whether the particular movement of step 1805 indicates that the input is a humoristic remark. In some examples, the response generated by step 1806 may be further based on whether the particular movement of step 1805 indicates that the input is an offensive remark. In some examples, the response generated by step 1806 may be further based on whether the particular movement of step 1805 indicates that the input is a friendly remark. For example, when the input includes 'Aren't you special', the generated response may include 'Oh, you got me!', 'Excuse me?', or 'Thanks! That means a lot!', to react to the input as a humoristic remark, offensive remark, or friendly remark, respectively. In some examples, the desired at least one suprasegmental feature determined by step 1906 may be further based on whether the particular movement of step 1805 indicates that the input is a humoristic remark. In some examples, the desired at least one suprasegmental feature determined by step 1906 may be further based on whether the particular movement of step 1805 indicates that the input is an offensive remark. In some examples, the desired at least one suprasegmental feature determined by step 1906 may be further based on whether the particular movement of step 1805 indicates that the input is a friendly remark. In some examples, the usage (by step 1108) of the desired at least one suprasegmental feature (determined by step 1906) may be configured to convey reacting to the input as a humoristic remark, and the selection to react to the input as a humoristic remark may be based on the input and/or the particular movement, for example as described above. In some examples, the usage (by step 1108) of the desired at least one suprasegmental feature (determined by step 1906) may be configured to convey reacting to the input as an offensive remark, and the selection to react to the input as an offensive remark may be based on the input and/or the particular movement, for example as described above. In some examples, the usage (by step 1108) of the desired at least one suprasegmental feature (determined by step 1906) may be configured to convey reacting to the input as a friendly remark, and the selection to react to the input as a friendly remark may be based on the input and/or the particular movement, for example as described above. For example, the input may include 'Aren't you special', the audible speech output generated by step 1108 may include the response 'I guess so'. To react to the input as a humoristic remark, the desired at least one suprasegmental feature may include playful intonation with a slight rise at the end, mild stress on 'guess', and smooth rhythm. To react to the input as an offensive remark, the desired at least one suprasegmental feature may include slightly sarcastic falling intonation, strong stress on 'guess', and an abrupt rhythm. To react to the input as a friendly remark, the desired at least one suprasegmental feature may include warm rising and falling intonation, mild stress on both 'I' and 'guess', and smooth rhythm. In some examples, the media content generated by step 2006 may be further based on whether the particular movement of step 1805 indicates that the input is a humoristic remark. In some examples, the media content generated by step 2006 may be further based on whether the particular movement of step 1805 indicates that the input is an offensive remark. In some examples, the media content generated by step 2006 may be further based on whether the particular movement of step 1805 indicates that the input is a friendly remark. In some examples, the desired movement determined by step 2106 may be further based on whether the particular movement of step 1805 indicates that the input is a humoristic remark. In some examples, the desired movement determined by step 2106 may be further based on whether the particular movement of step 1805 indicates that the input is an offensive remark. In some examples, the desired movement determined by step 2106 may be further based on whether the particular movement of step 1805 indicates that the input is a friendly remark. In some examples, based on the input and the particular movement, the desired movement determined by step 2106 may be configured to convey reacting to the input as a humoristic remark. In some examples, based on the input and the particular movement, the desired movement determined by step 2106 may be configured to convey reacting to the input as an offensive remark. In some examples, based on the input and the particular movement, the desired movement determined by step 2106 may be configured to convey reacting to the input as a friendly remark. For example, the input may include 'Aren't you special'. To react to the input as a humoristic remark, the desired movement may be associated with a playful smile and/or a light playful eye roll or a friendly wink. To react to the input as an offensive remark, the desired movement may be associated with a raised eyebrow and/or pursed lips. To react to the input as a friendly remark, the desired movement may be associated with a genuine smile and/or a nod of appreciation.

In some examples, the image data received by step 1805 may further depict a second movement. The second movement may be a movement of a second portion of the particular body. The second movement may differ from the particular movement. In one example, the second movement and the particular movement may be at least partly simultaneous, may be non-simultaneous, and so forth. In one example, the second movement and the second part of step 1804 may be concurrent. In another example, the second movement and the second part of step 1804 may be non-simultaneous. In some examples, the second portion of the particular body of step 1805 may include at least part of a hand, an arm, a head, a face, a torso, or a leg of the particular body. In some examples, the second movement depicted in the image data received by step 1805 may be associated with at least one of a gesture, a facial expression change, a posture change, a limb movement, a head movement or an eye movement. In some examples, the second movement depicted in the image data received by step 1805 may convey at least one of a positive reaction, negative reaction, engagement, show of interest, agreement, respect, disagreement, skepticism, disinterest, boredom, discomfort, uncertainty, confusion or neutrality. In some examples, the second movement depicted in the image data received by step 1805 may indicate at least one of a direction, a physical object, a virtual object or a motion pattern. In one example, the particular portion and the second portion may have no part in common. In another example, the particular portion and the second portion may be the same portion. In yet another example, the particular portion and the second portion may have at least one part in common. In some examples, the response generated by step 1806 may be further based on the second movement. In some examples, the desired at least one suprasegmental feature determined by step 1906 may be further based on the second movement. In some examples, the media content generated by step 2006 may be further based on the second movement. In some examples, the desired movement determined by step 2106 may be further based on the second movement. For example, the input included in the audio data received by step 1804 may include 'take this and put it in here', the first part of the input may include 'this', the second part of the input may include 'in here', the particular movement may indicate a particular object, the second movement may include a particular location. The generated response may include either 'sure' or 'that wouldn't fit there', and the desired movement may be associated with either relocating the particular object to the particular location or avoiding the relocation, based on the particular object and the particular location. Alternatively, the generated response may include 'Sure, that would fit there', and the desired at least one suprasegmental feature may be associated with either agreement (for example, steady intonation, natural stress and/or neutral speaking pace) or sarcasm (for example, rising and falling intonation, stress on 'that', slower speaking pace).

In some examples, the image data received by step 1805 may further depict a particular object and/or movement of the particular object. For example, the particular object may be a body associated with the conversational artificial intelligence model. In another example, the particular object may be an inanimate object. In yet another example, the particular object may be an animate object. In one example, the image data may be analyzed to detect and/or identify the particular object and/or the movement of the particular object, for example using a visual object detection algorithm, using a motion tracking algorithm, and so forth. In some examples, the response generated by step 1806 may be further based on the particular object and/or on the movement of the particular object. For example, a conversational artificial intelligence model may be or include a machine learning model, as described above in relation to step 1806. Further, step 1806 may use the machine learning model to analyze the audio data received by step 1804 and/or the image data received by step 1805 and/or an indication of the particular object and/or an indication of the movement and/or a characteristic of the particular object and/or a characteristic of the movement (for example, using the indications and/or characteristics as additional information as described above) to generate the response. In some examples, the desired at least one suprasegmental feature determined by step 1906 may be further based on the particular object and/or on the movement of the particular object. For example, a conversational artificial intelligence model may be or include a machine learning model, as described above in relation to step 1906. Further, step 1906 may use the machine learning model to analyze the audio data received by step 1804 and/or the image data received by step 1805 and/or an indication of the particular object and/or an indication of the movement and/or a characteristic of the particular object and/or a characteristic of the movement (for example, using the indications and/or characteristics as additional information as described above) to determine the desired at least one suprasegmental feature. In some examples, the media content generated by step 2006 may be further based on the particular object and/or on the movement of the particular object. For example, a conversational artificial intelligence model may be or include a machine learning model, as described above in relation to step 2006. Further, step 2006 may use the machine learning model to analyze the audio data received by step 1804 and/or the image data received by step 1805 and/or an indication of the particular object and/or an indication of the movement and/or a characteristic of the particular object and/or a characteristic of the movement (for example, using the indications and/or characteristics as additional information as described above) to generate the media content. In some examples, the desired movement determined by step 2106 may be further based on the particular object and/or on the movement of the particular object. For example, a conversational artificial intelligence model may be or include a machine learning model, as described above in relation to step 2106. Further, step 2106 may use the machine learning model to analyze the audio data received by step 1804 and/or the image data received by step 1805 and/or an indication of the particular object and/or an indication of the movement and/or a characteristic of the particular object and/or a characteristic of the movement (for example, using the indications and/or characteristics as additional information as described above) to determine the desired movement.

In some examples, step 1804 may further comprise obtaining an indication of a characteristic of an ambient noise, for example as described above in relation to process 1100. Some non-limiting examples of such characteristic of an ambient noise may include frequency range, intensity, temporal variation, source diversity, spatial distribution, harmonic content, and so forth. In one example, step 1806 may further base the response on the characteristic of the ambient noise. In another example, step 1906 may further base the determination of the desired at least one suprasegmental feature on the characteristic of the ambient noise. In yet another example, step 2006 may further base the generation of the media content on the characteristic of the ambient noise. In an additional example, step 2106 may further base the determination of the desired movement on the characteristic of the ambient noise. For example, the desired at least one suprasegmental feature determined by step 1906 may include desired loudness, and the desired loudness may be selected to compensate for ambient noise. In another example, the media content generated by step 2006 may include audible content based on the desired loudness. In yet another example, the response generated by step 1806 may be shorter and/or include words that are easier to pronounce when the ambient noise level is high. In an additional example, the desired movement determined by step 2106 may be associated using a hand to shield a voice from the surrounding when the ambient noise level is high.

In some examples, systems, methods and non-transitory computer readable media for using location in conversational artificial intelligence are provided. For example, a conversational artificial intelligence model may be accessed. The conversational artificial intelligence model may be associated with a specific digital character. Further, a digital signal may be received. The digital signal may indicate that the specific digital character is associated with a specific physical location during a specific time frame. Further, an input in a natural language may be received from an entity during the specific time frame. In one example, the conversational artificial intelligence model may be used to analyze the input and the digital signal to generate a response in the natural language, and the generated response may be provided to the entity. The response may be a response to the input. The response may be based on the location and/or the input and/or the time frame. In one example, the conversational artificial intelligence model may be used to analyze the input and the digital signal to determine a desired at least one suprasegmental feature, and the desired at least one suprasegmental feature may be used to generate an audible speech output during a communication with the entity. The desired at least one suprasegmental feature is based on the location and/or the input and/or the time frame. In one example, the conversational artificial intelligence model may be used to analyze the input and the digital signal to generate a media content, and the media content may be used in a communication with the entity. The media content may be based on the location and/or the input and/or the time frame. In one example, the conversational artificial intelligence model may be used to analyze the input and the digital signal to determine a desired movement for a specific portion of a specific body. The desired movement may be based on the location and/or the input and/or the time frame. The specific body may differ from the particular body. Further, digital signals may be generated. The digital signals may be configured to cause the desired movement to the specific portion of the specific body during an interaction with the entity.

What is claimed is:

1. A non-transitory computer readable medium storing computer implementable instructions that when executed by at least one processor cause the at least one processor to perform operations for image analysis for personal interaction, the operations comprising:

accessing a conversational artificial intelligence model;

receiving audio data, the audio data includes an input from an entity in a natural language, the input includes at least a first part and a second part, the second part differs from the first part;

receiving image data, the image data depicts a particular movement, the particular movement is a movement of a particular portion of a particular body, the particular movement and the first part are concurrent, the particular body is associated with the entity;

calculating a first convolution of a fragment of the audio data associated with the first part to obtain a first plurality of numerical result values;

calculating a second convolution of a fragment of the audio data associated with the second part to obtain a second plurality of numerical result values;

calculating a third convolution of at least part of the image data to obtain a third plurality of numerical result values;

calculating a function of the first plurality of numerical result values, the second plurality of numerical result values and the third plurality of numerical result values to obtain a specific mathematical object in a mathematical space;

using the conversational artificial intelligence model to analyze the audio data and the image data to generate a response in the natural language to the input, the response is based on the specific mathematical object, the input and the particular movement; and providing the generated response to the entity.

2. The non-transitory computer readable medium of claim 1, wherein the particular movement conveys at least one of agreement or disagreement.

3. The non-transitory computer readable medium of claim 1, wherein the particular movement indicates a physical object.

4. The non-transitory computer readable medium of claim 1, wherein the particular movement is associated with a particular emotion of the entity, and wherein the generated response is further based on the particular emotion.

5. The non-transitory computer readable medium of claim 1, wherein the particular movement is associated with a particular level of empathy of the entity, and wherein the generated response is further based on the particular level of empathy.

6. The non-transitory computer readable medium of claim 1, wherein the particular movement is associated with a particular level of self-assurance of the entity, and wherein the generated response is further based on the particular level of self-assurance.

7. The non-transitory computer readable medium of claim 1, wherein the particular movement is associated with a particular level of formality, and wherein the generated response is further based on the particular level of formality.

8. The non-transitory computer readable medium of claim 1, wherein the particular movement is associated with a particular gesture, and wherein the generated response is further based on the particular gesture.

9. The non-transitory computer readable medium of claim 1, wherein the particular movement is associated with a particular facial expression, and wherein the generated response is further based on the particular facial expression.

10. The non-transitory computer readable medium of claim 1, wherein the particular movement is associated with a particular posture, and wherein the generated response is further based on the particular posture.

11. The non-transitory computer readable medium of claim 1, wherein the particular movement creates a particular distance between at least part of the particular body and a particular object, and wherein the generated response is further based on the particular distance.

12. The non-transitory computer readable medium of claim 1, wherein the particular movement creates a particular spatial orientation between at least part of the particular body and a particular object, and wherein the generated response is further based on the particular spatial orientation.

13. The non-transitory computer readable medium of claim 1, wherein the generated response is further based on whether the particular movement causes a physical contact between at least part of the particular body and a particular object.

14. The non-transitory computer readable medium of claim 1, wherein the generated response is further based on whether the particular movement causes a particular manipulation of a particular object.

15. The non-transitory computer readable medium of claim 1, wherein the operations further comprise:
  analyzing the image data to make a determination whether the particular movement indicates that the input is a humoristic remark; and
  further basing the generated response on the determination.

16. The non-transitory computer readable medium of claim 1, wherein the operations further comprise:
  analyzing the image data to make a determination whether the particular movement indicates that the input is an offensive remark; and
  further basing the generated response on the determination.

17. The non-transitory computer readable medium of claim 1, wherein the generated response is in a specific language register, the specific language register is based on the input and the particular movement.

18. The non-transitory computer readable medium of claim 1, wherein operations further comprise:
  using the conversational artificial intelligence model to analyze the audio data and the image data to determine a desired at least one suprasegmental feature, the desired at least one suprasegmental feature is based on the input and the particular movement; and
  using the desired at least one suprasegmental feature based on the input and the particular movement to generate an audible speech output during a communication with the entity.

19. The non-transitory computer readable medium of claim 1, wherein operations further comprise:
  using the conversational artificial intelligence model to analyze the audio data and the image data to determine a desired physical movement for a specific portion of a specific physical body, the desired physical movement is based on the input and the particular movement, the specific physical body differs from the particular body; and
  generating digital signals, the digital signals are configured to cause the desired physical movement based on the input and the particular movement to the specific portion of the specific physical body during an interaction with the entity.

20. The non-transitory computer readable medium of claim 1, wherein the image data further depicts a movement of a particular object, and wherein the generated response is further based on the movement of the particular object.

21. The non-transitory computer readable medium of claim 1, wherein the first part includes at least a particular word, the second part includes at least a particular non-verbal sound, and the generated response is further based on the particular word and the particular non-verbal sound.

22. The non-transitory computer readable medium of claim 1, wherein the first part 1 includes at least a first word, the second part includes at least a second word, the second word differs from the first word, and the generated response is further based on the first word and the second word.

23. The non-transitory computer readable medium of claim 1, wherein the first part includes at least a first non-verbal sound, the second part includes at least a second non-verbal sound, the second non-verbal sound differs from the first non-verbal sound, and the generated response is further based on the first non-verbal sound and the second non-verbal sound.

24. The non-transitory computer readable medium of claim 1, wherein the entity is a human individual.

25. The non-transitory computer readable medium of claim 1, wherein the entity is a digital character.

26. The non-transitory computer readable medium of claim 1, wherein the generated response is configured to imitate a specific human individual.

27. The non-transitory computer readable medium of claim 1, wherein the particular body is a visual depiction of a virtual body associated with the entity.

28. The non-transitory computer readable medium of claim 1, wherein the particular body is a physical body associated with the entity.

29. The non-transitory computer readable medium of claim 1, wherein the particular body is a robot associated with the entity.

30. The non-transitory computer readable medium of claim 1, wherein the image data further depicts a second movement, the second movement is a movement of a second portion of the particular body, the second movement and the second part are concurrent, the second movement differs from the particular movement, and the generated response is further based on the second movement.

31. The non-transitory computer readable medium of claim 1, wherein the image data further depicts a particular object, and wherein the generated response is further based on the particular object.

32. A system for image analysis for personal interaction, the system comprising:

at least one audio sensor;

at least one image sensor; and at least one processing unit configured to perform operations, the operations comprise:

accessing a conversational artificial intelligence model;

capturing audio data using the at least one audio sensor, the audio data includes an input from an entity in a natural language, the input includes at least a first part and a second part, the second part differs from the first part;

capturing image data using the at least one image sensor, the image data depicts a particular movement, the particular movement is a movement of a particular portion of a particular body, the particular movement and the first part are concurrent, the particular body is associated with the entity;

calculating a first convolution of a fragment of the audio data associated with the first part to obtain a first plurality of numerical result values;

calculating a second convolution of a fragment of the audio data associated with the second part to obtain a second plurality of numerical result values;

calculating a third convolution of at least part of the image data to obtain a third plurality of numerical result values;

calculating a function of the first plurality of numerical result values, the second plurality of numerical result values and the third plurality of numerical result values to obtain a specific mathematical object in a mathematical space;

using the conversational artificial intelligence model to analyze the audio data and the image data to generate a response in the natural language to the input, the response is based on the specific mathematical object, the input and the particular movement; and providing the generated response to the entity.

33. A method for image analysis for personal interaction, the method comprising:

accessing a conversational artificial intelligence model;

receiving audio data, the audio data includes an input from an entity in a natural language, the input includes at least a first part and a second part, the second part differs from the first part;

receiving image data, the image data depicts a particular movement, the particular movement is a movement of a particular portion of a particular body, the particular movement and the first part are concurrent, the particular body is associated with the entity;

calculating a first convolution of a fragment of the audio data associated with the first part to obtain a first plurality of numerical result values;

calculating a second convolution of a fragment of the audio data associated with the second part to obtain a second plurality of numerical result values;

calculating a third convolution of at least part of the image data to obtain a third plurality of numerical result values;

calculating a function of the first plurality of numerical result values, the second plurality of numerical result values and the third plurality of numerical result values to obtain a specific mathematical object in a mathematical space;

using the conversational artificial intelligence model to analyze the audio data and the image data to generate a response in the natural language to the input, the response is based on the specific mathematical object, the input and the particular movement; and providing the generated response to the entity.

* * * * *